(12) United States Patent
Limberg

(10) Patent No.: US 10,594,537 B2
(45) Date of Patent: *Mar. 17, 2020

(54) RECEIVERS FOR COFDM SIGNALS CONVEYING THE SAME DATA IN LOWER- AND UPPER-FREQUENCY SIDEBANDS

(71) Applicant: Allen LeRoy Limberg, Port Charlotte, FL (US)

(72) Inventor: Allen LeRoy Limberg, Port Charlotte, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/037,747

(22) Filed: Jul. 17, 2018

(65) Prior Publication Data

US 2019/0007255 A1   Jan. 3, 2019

Related U.S. Application Data

(63) Continuation-in-part of application No. 15/960,681, filed on Apr. 24, 2018, now abandoned, and a continuation-in-part of application No. 15/796,834, filed on Oct. 29, 2017, now abandoned, and a continuation-in-part of application No. 15/641,014, filed on Jul. 3, 2017, now Pat. No. 10,171,280.

(51) Int. Cl.
| | |
|---|---|
| H04L 27/26 | (2006.01) |
| H04L 1/00 | (2006.01) |
| H04L 27/38 | (2006.01) |
| H04B 7/08 | (2006.01) |

(52) U.S. Cl.
CPC ........ *H04L 27/2698* (2013.01); *H04B 7/0885* (2013.01); *H04L 1/005* (2013.01); *H04L 1/0058* (2013.01); *H04L 27/265* (2013.01); *H04L 27/38* (2013.01); *H04L 1/0071* (2013.01)

(58) Field of Classification Search
CPC ..... H04L 1/0071; H04L 1/005; H04L 1/0058; H04L 27/265; H04L 27/38; H04L 27/2698; H04L 27/2649; H04B 7/0885
See application file for complete search history.

(56) References Cited

U.S. PATENT DOCUMENTS

| | | | | |
|---|---|---|---|---|
| 2013/0028335 A1* | 1/2013 | Limberg | ............... | H04L 1/0071 375/240.27 |
| 2013/0115903 A1* | 5/2013 | Kroeger | ............... | H04B 7/0845 455/193.1 |

(Continued)

*Primary Examiner* — Syed Haider

(57) ABSTRACT

Receivers for coded orthogonal frequency-division multiplexed (COFDM) signals conveying the same coded data both in lower-frequency and upper-frequency sidebands thereof. Apparatus for performing a complex synchrodyne of COFDM signal to baseband is followed by apparatus for extracting the COFDM subcarriers of the lower-frequency and upper-frequency sidebands of the COFDM signal from the in-phase and quadrature-phase results of the complex synchrodyne. The COFDM subcarriers of the lower-frequency sideband as converted to baseband are supplied to apparatus for demodulating and demapping those subcarriers to recover a first set of coded data. The COFDM subcarriers of the upper-frequency sideband as converted to baseband are supplied to apparatus for demodulating and demapping those subcarriers to recover a second set of coded data. A diversity combiner combines the first and second sets of coded data for subsequent decoding.

22 Claims, 80 Drawing Sheets

(56) References Cited

U.S. PATENT DOCUMENTS

| | | | | |
|---|---|---|---|---|
| 2014/0153625 A1* | 6/2014 | Vojcic | ................. | H04L 25/0236 375/224 |
| 2014/0157092 A1* | 6/2014 | Vojcic | .................. | H04L 1/0041 714/776 |
| 2014/0161209 A1* | 6/2014 | Limberg | ............... | H04L 5/0016 375/299 |
| 2015/0155948 A1* | 6/2015 | Chen | .................. | H04B 10/5165 398/188 |

* cited by examiner

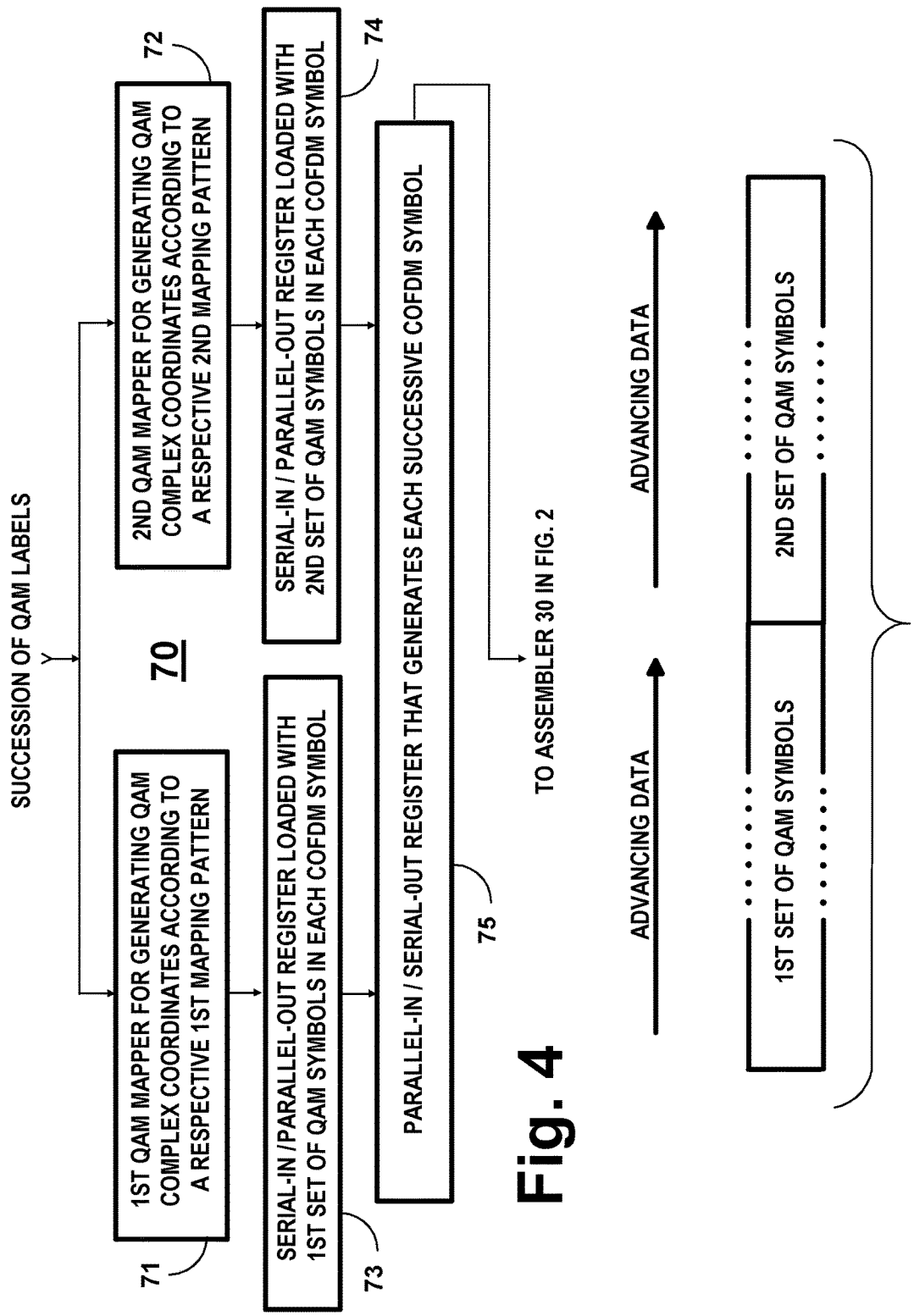

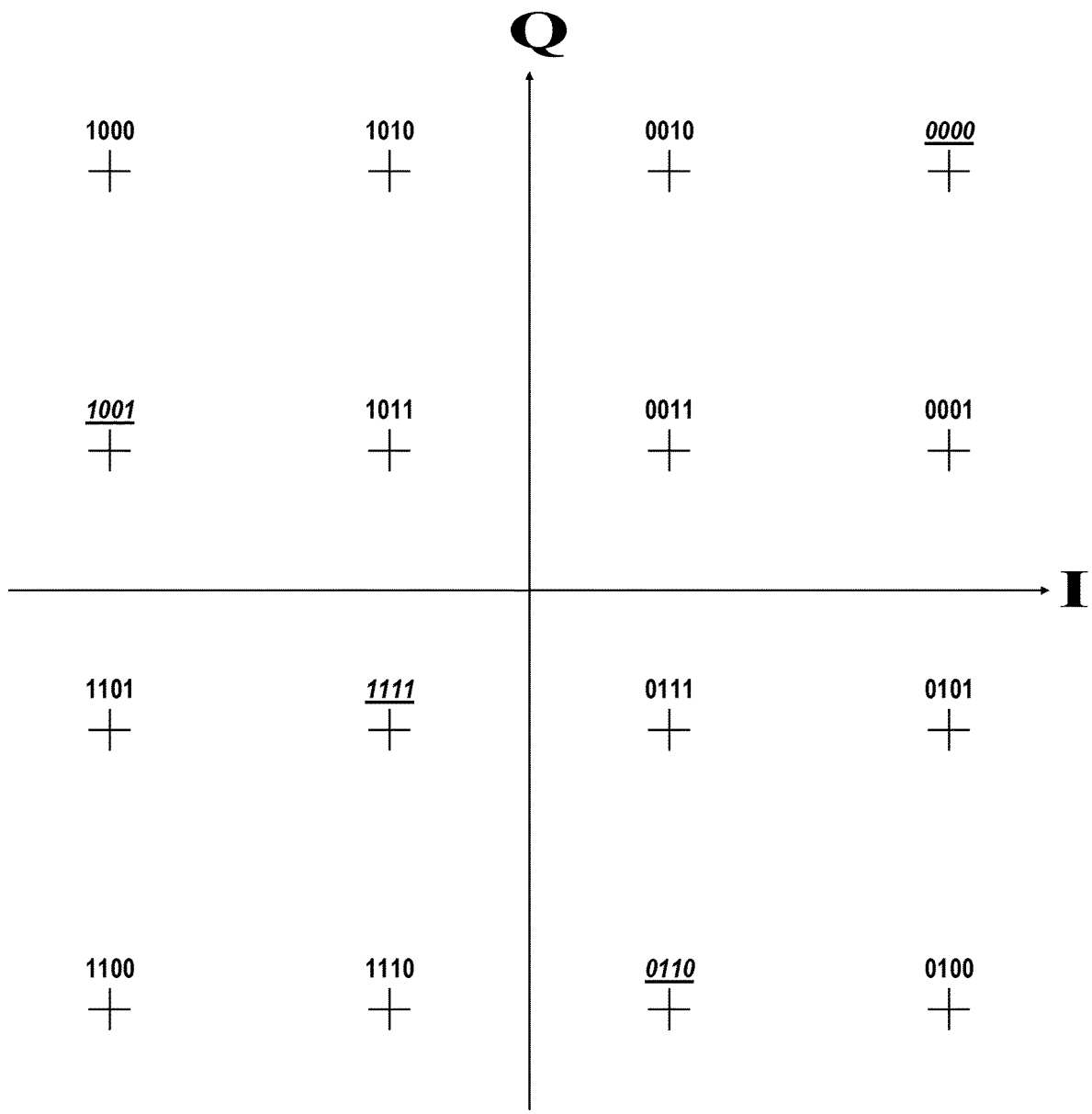
Fig. 6 1st Gray Map of 16QAM
(Labels mirror those of Fig. 7 2nd Gray Map of 16QAM)

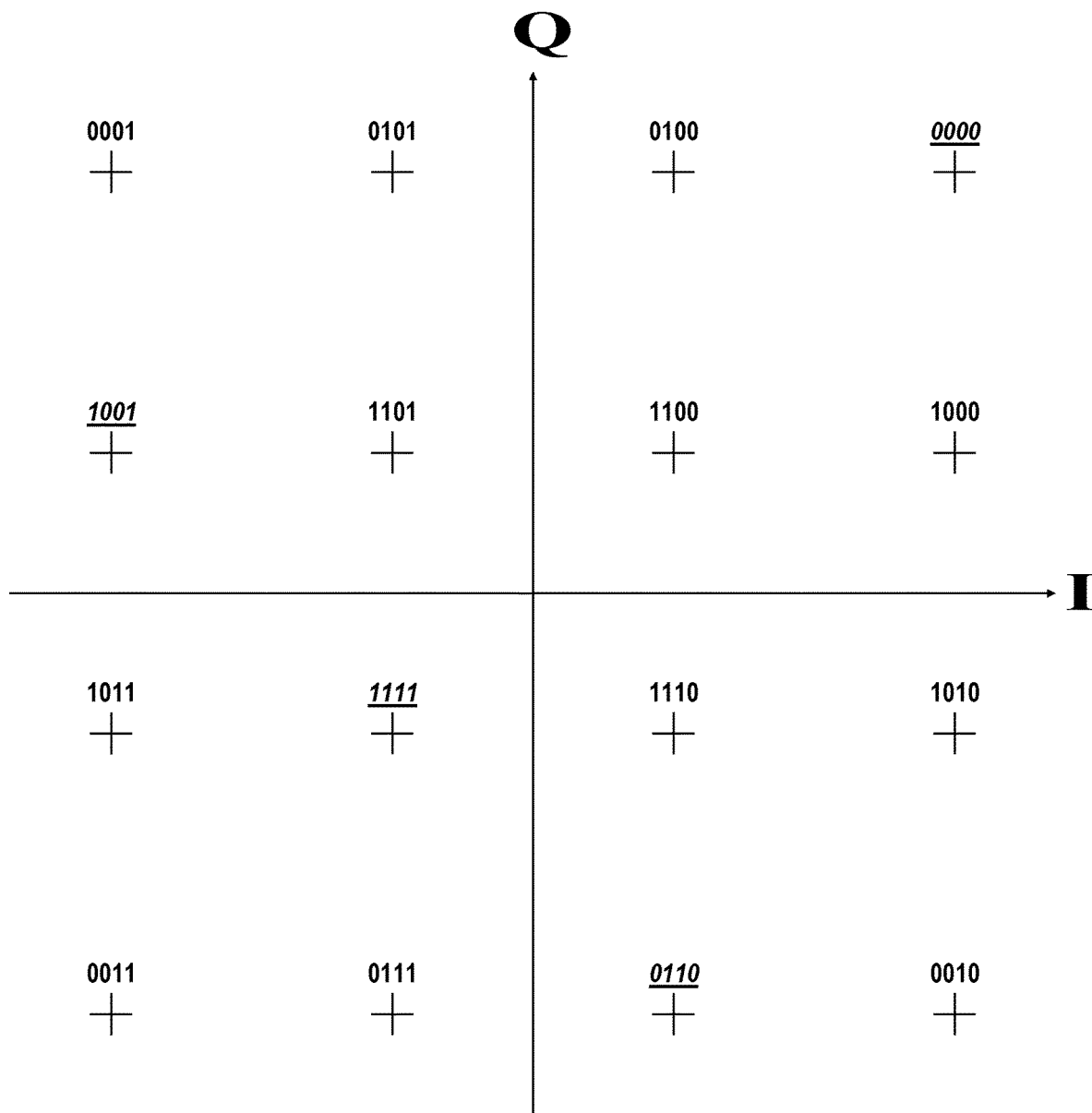
Fig. 7 2nd Gray Map of 16QAM
(Labels mirror those of Fig. 6 1st Gray Map of 16QAM)

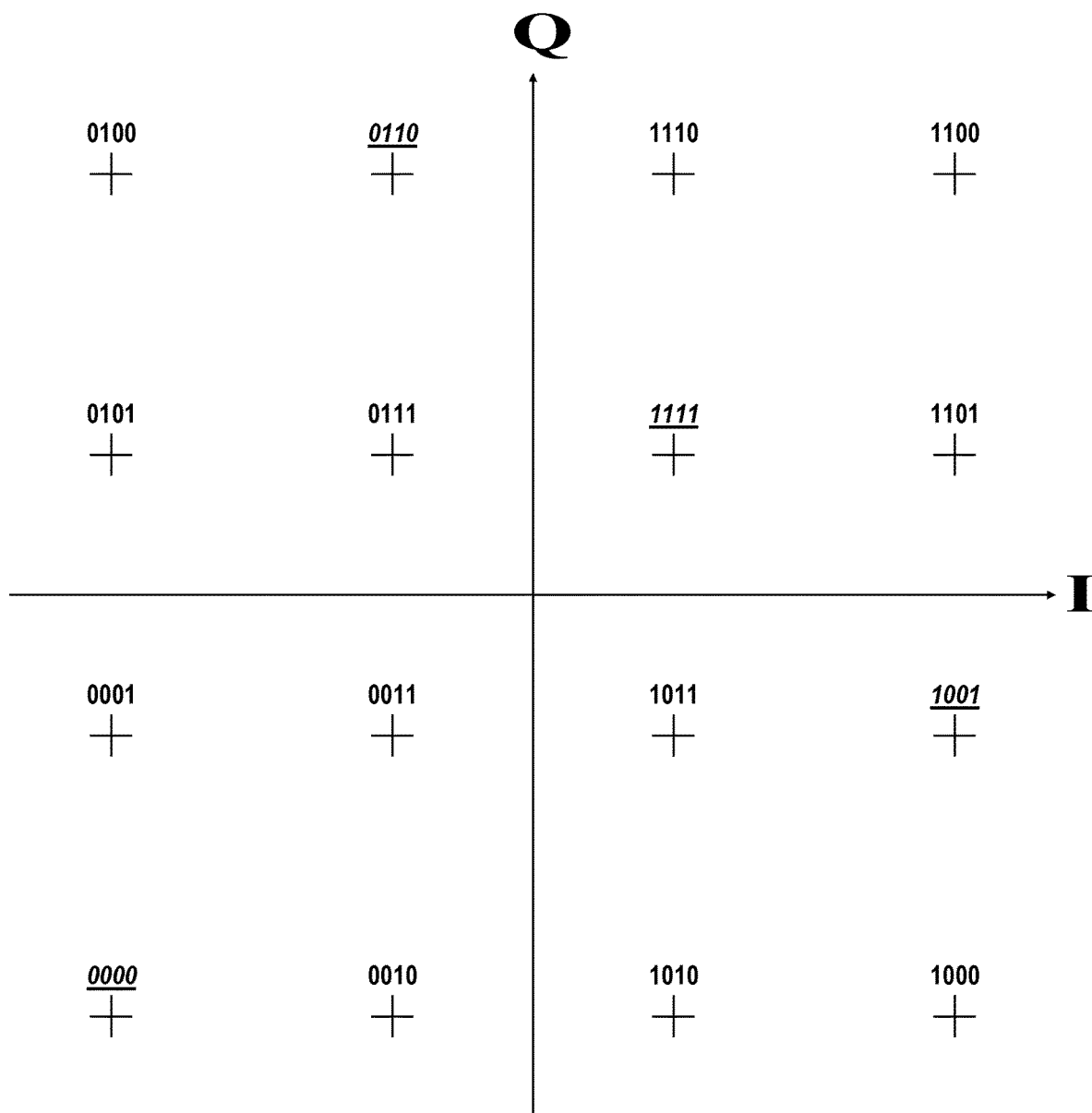
Fig. 8 3rd Gray Map of 16QAM
(180° rotation of Fig. 6 1st Gray Map of 16QAM)

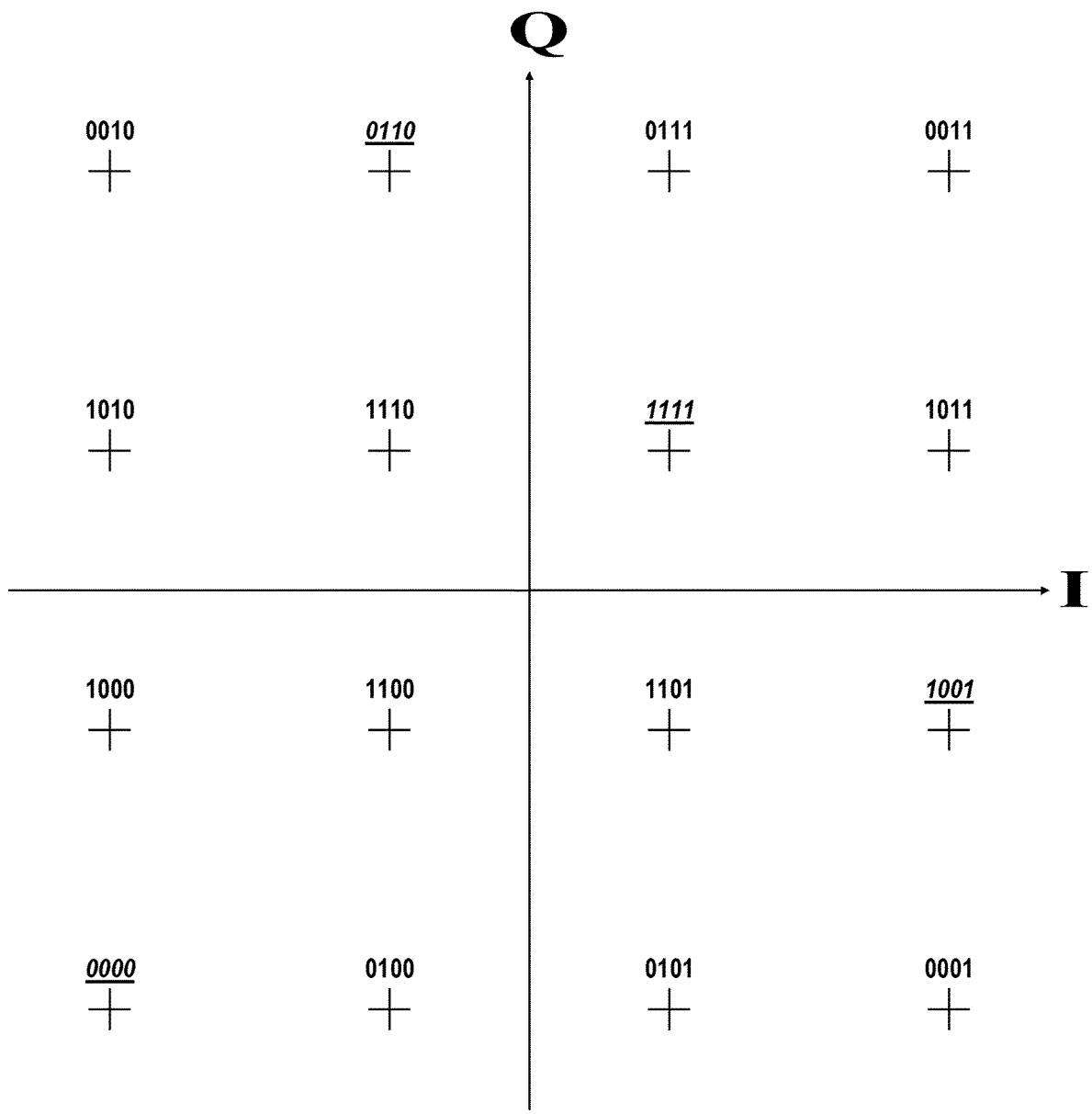
Fig. 9 4th Gray Map of 16QAM
(180° rotation of Fig. 7 2nd Gray Map of 16QAM)

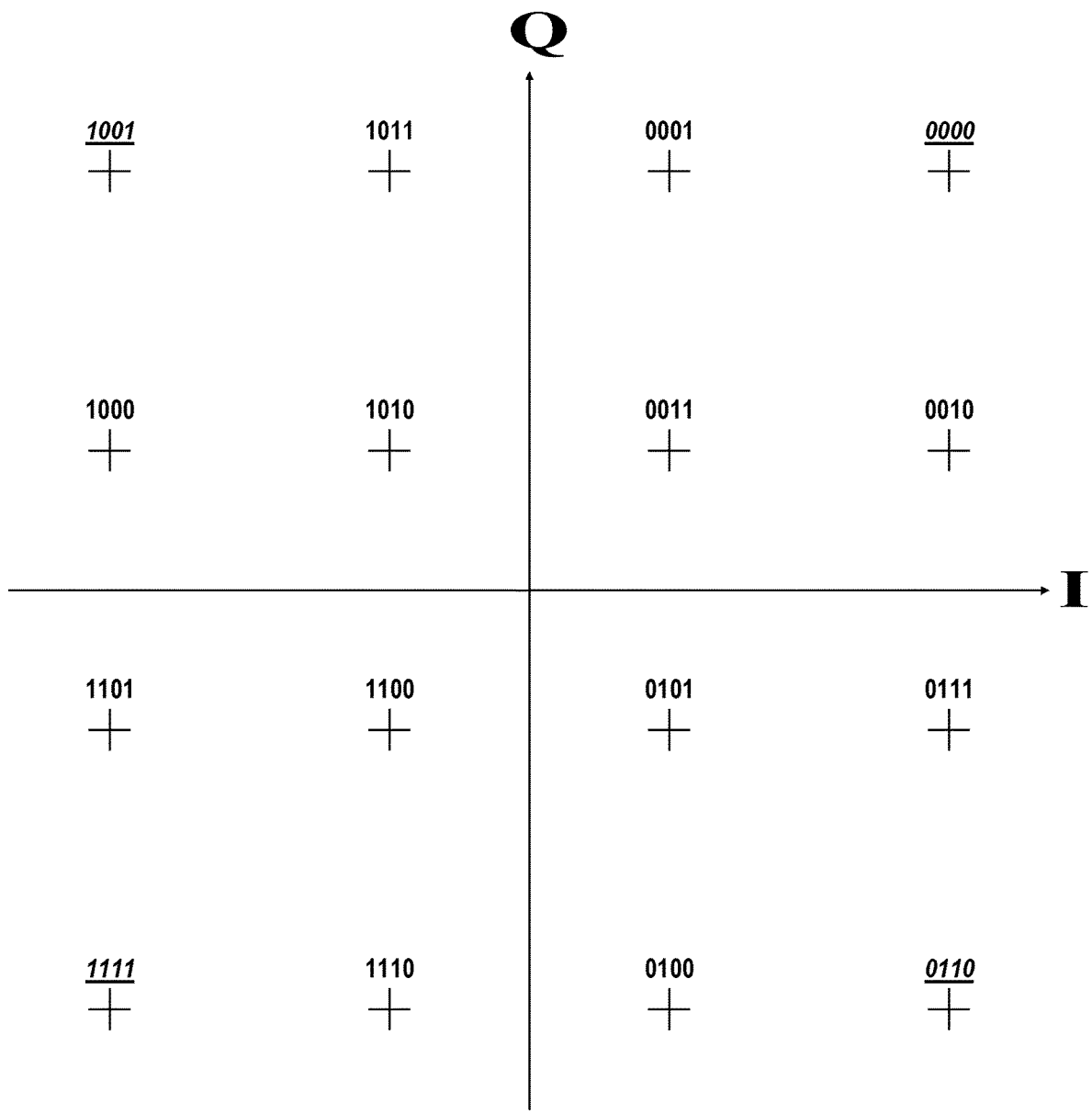
Fig. 10 1st SCM Map of 16QAM
(Labels mirror those of Fig. 11 2nd SCM Map of 16QAM)

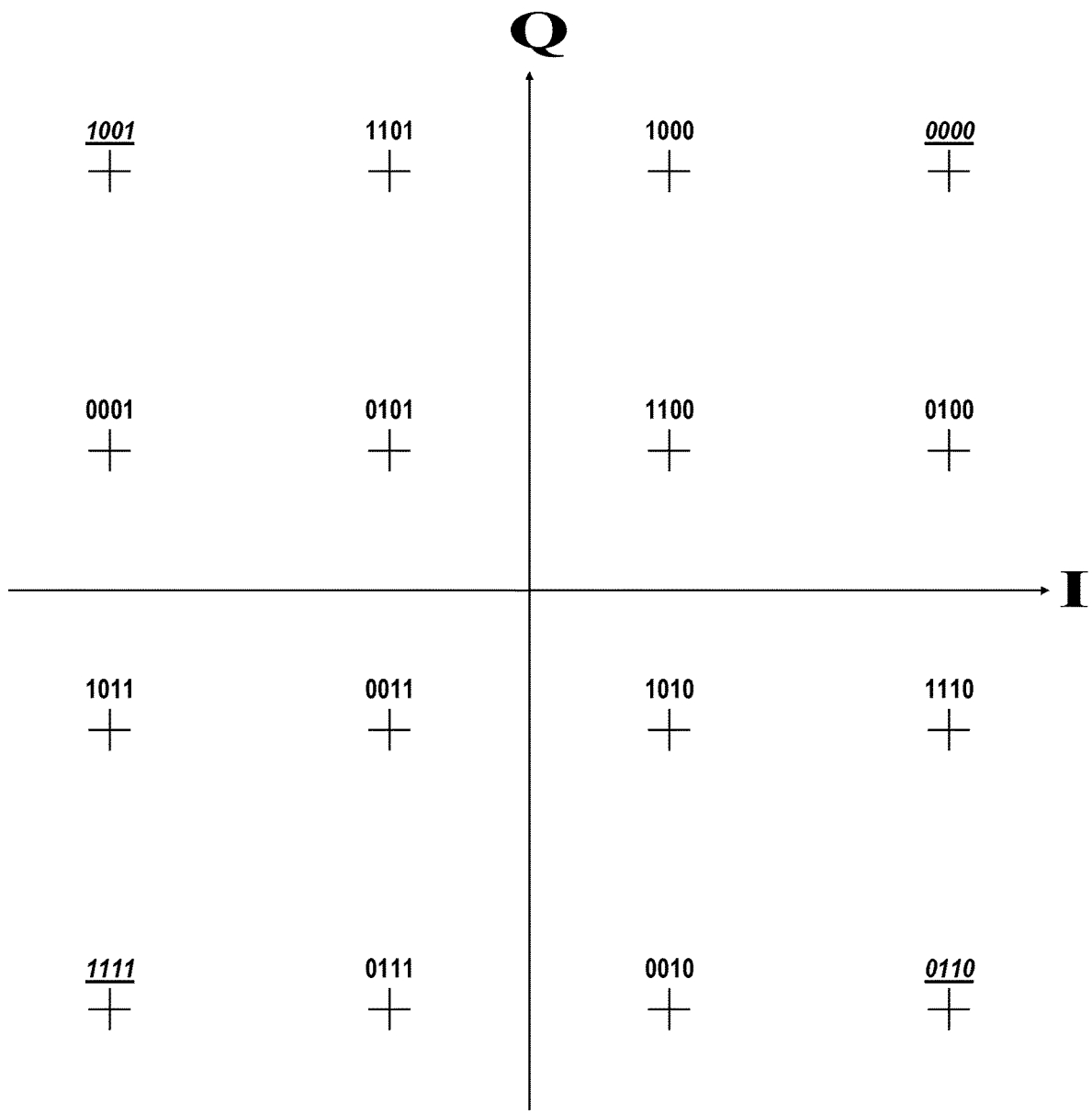
Fig. 11 2nd SCM Map of 16QAM
(Labels mirror those of Fig. 10 1st SCM Map of 16QAM)

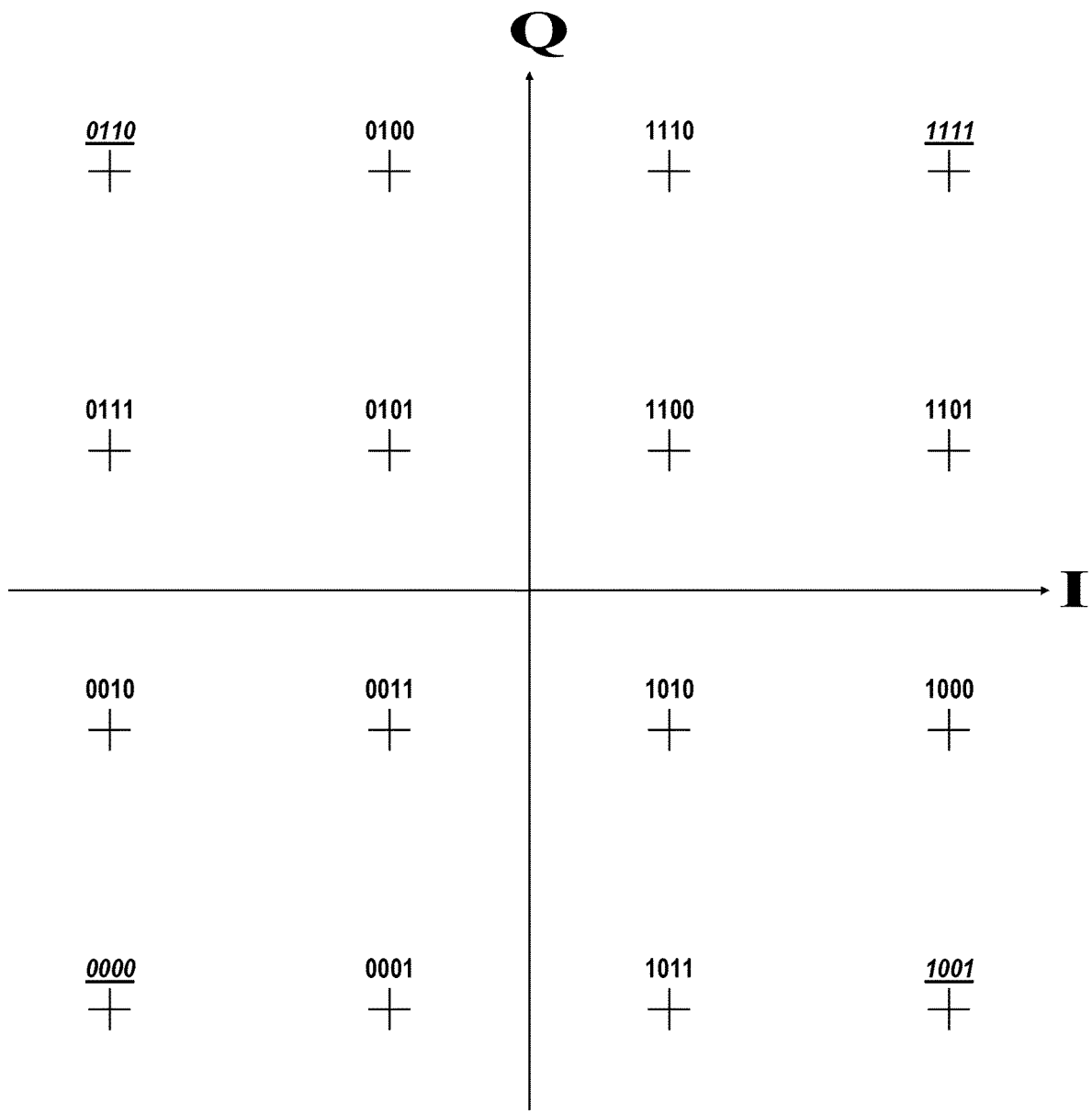
Fig. 12 3rd SCM Map of 16QAM
( 180° rotation of Fig. 10 1st SCM Map of 16QAM)

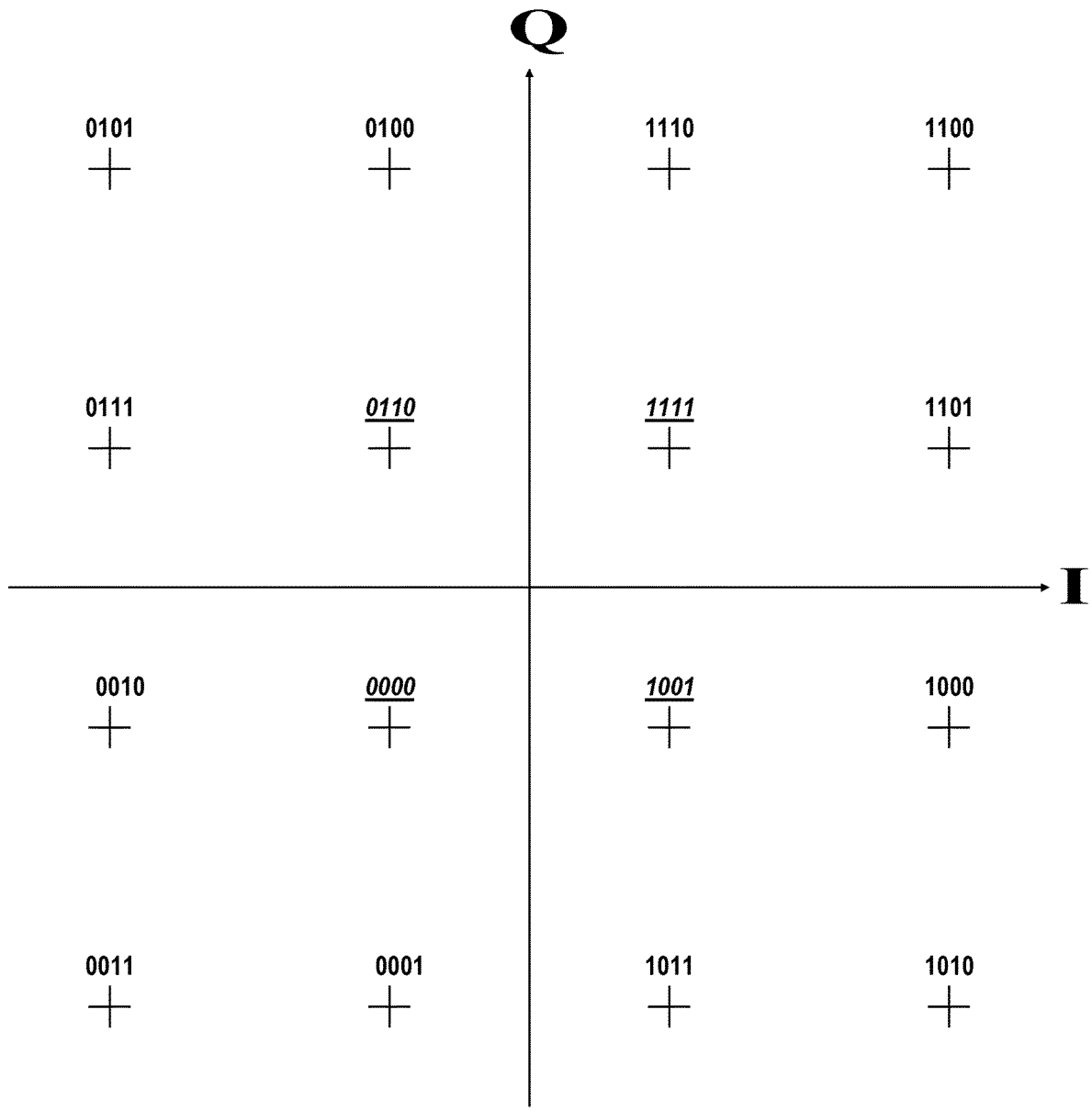
Fig. 13 4th SCM Map of 16QAM
(Labeled quadrants each diagonally twisted from a corresponding one of Fig. 12 3rd SCM Map of 16QAM)

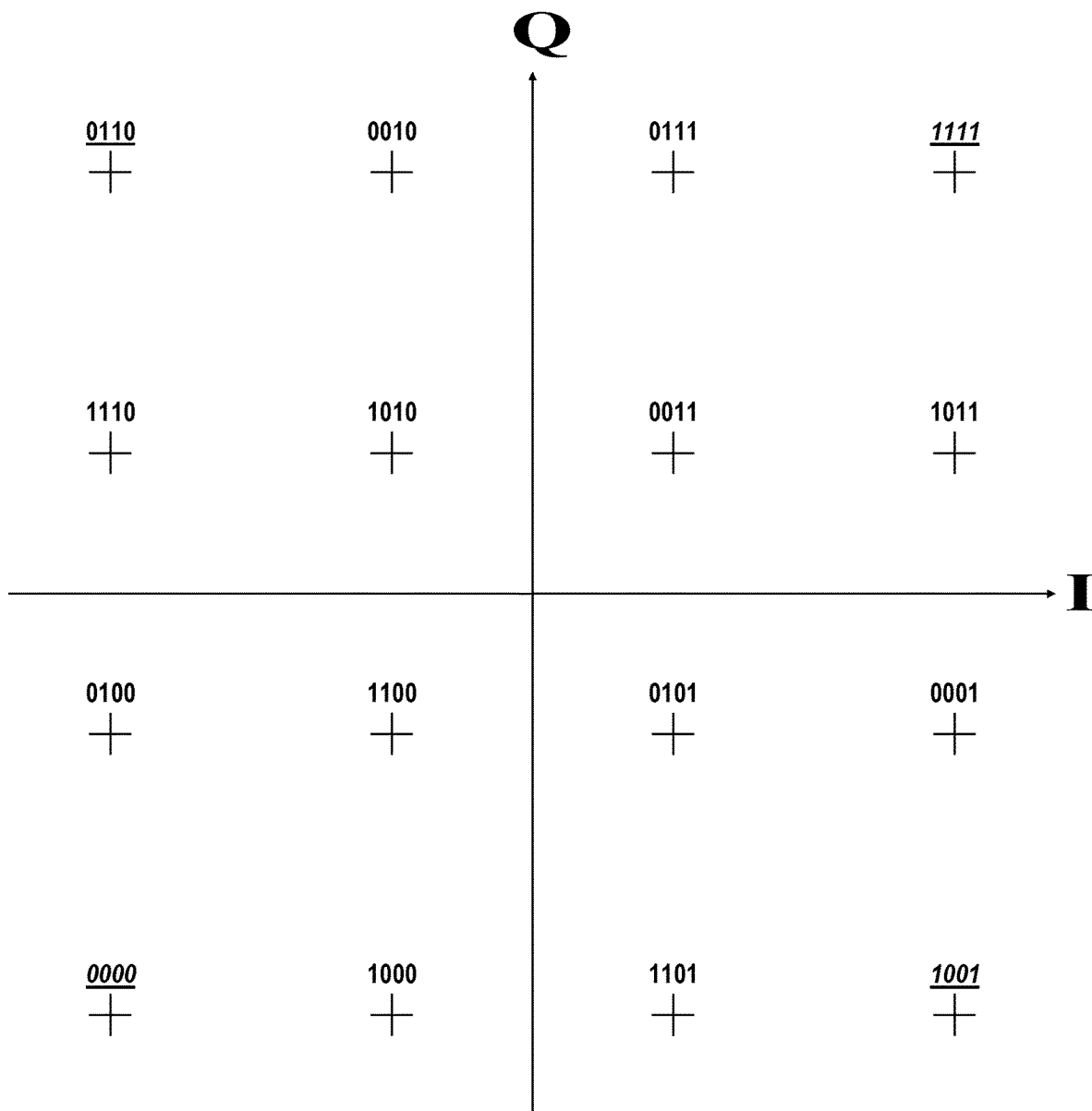
Fig. 14 5th SCM Map of 16QAM
(180° rotation of Fig. 11 2nd SCM Map of 16QAM)

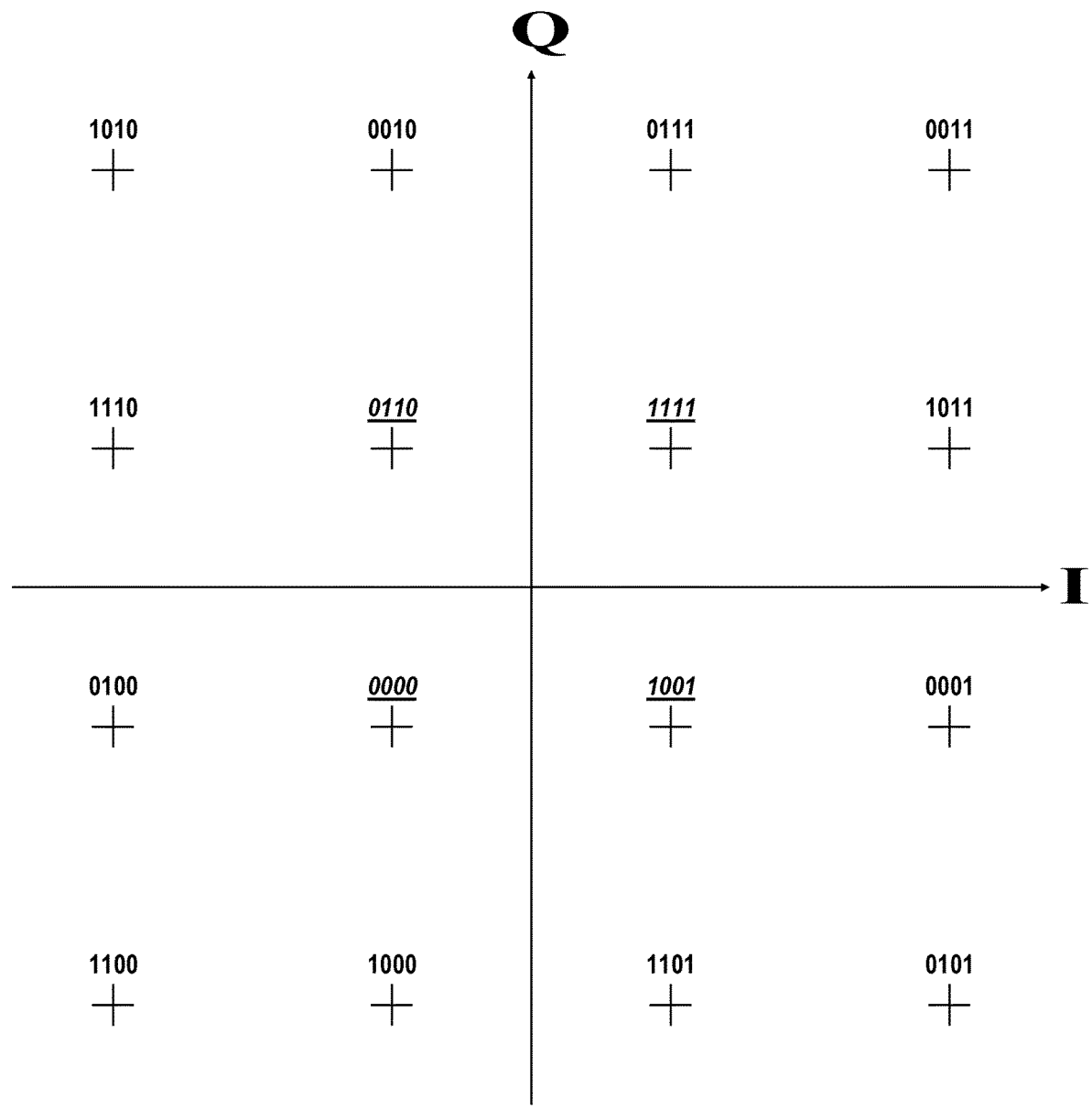
Fig. 15 6th SCM Map of 16QAM
(Labeled quadrants each diagonally twisted from a corresponding one of Fig. 14 5th SCM Map of 64QAM)

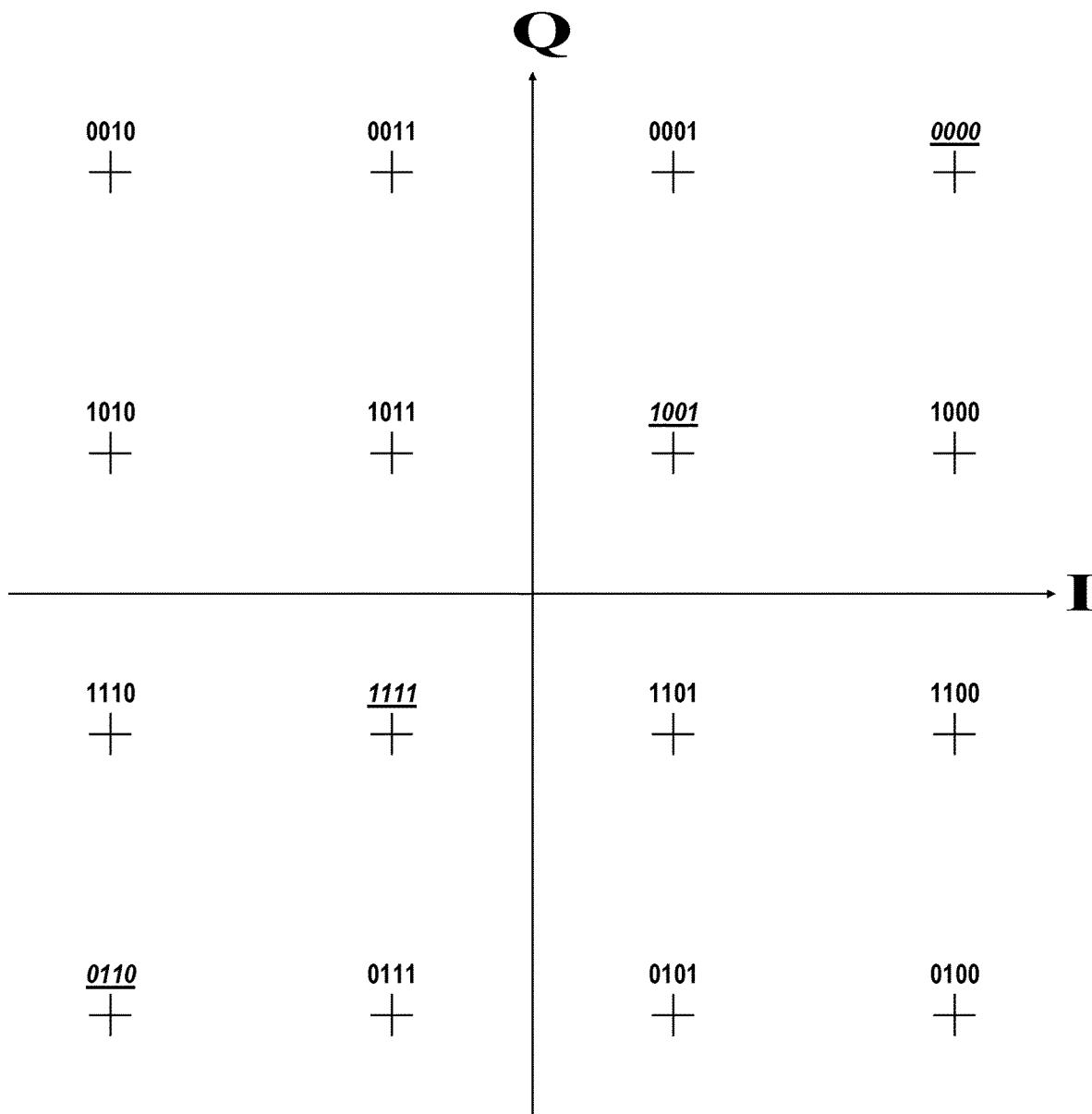
Fig. 16 5th Gray Map of 16QAM
(Labels mirror those of Fig. 17 6th Gray Map of 16QAM)

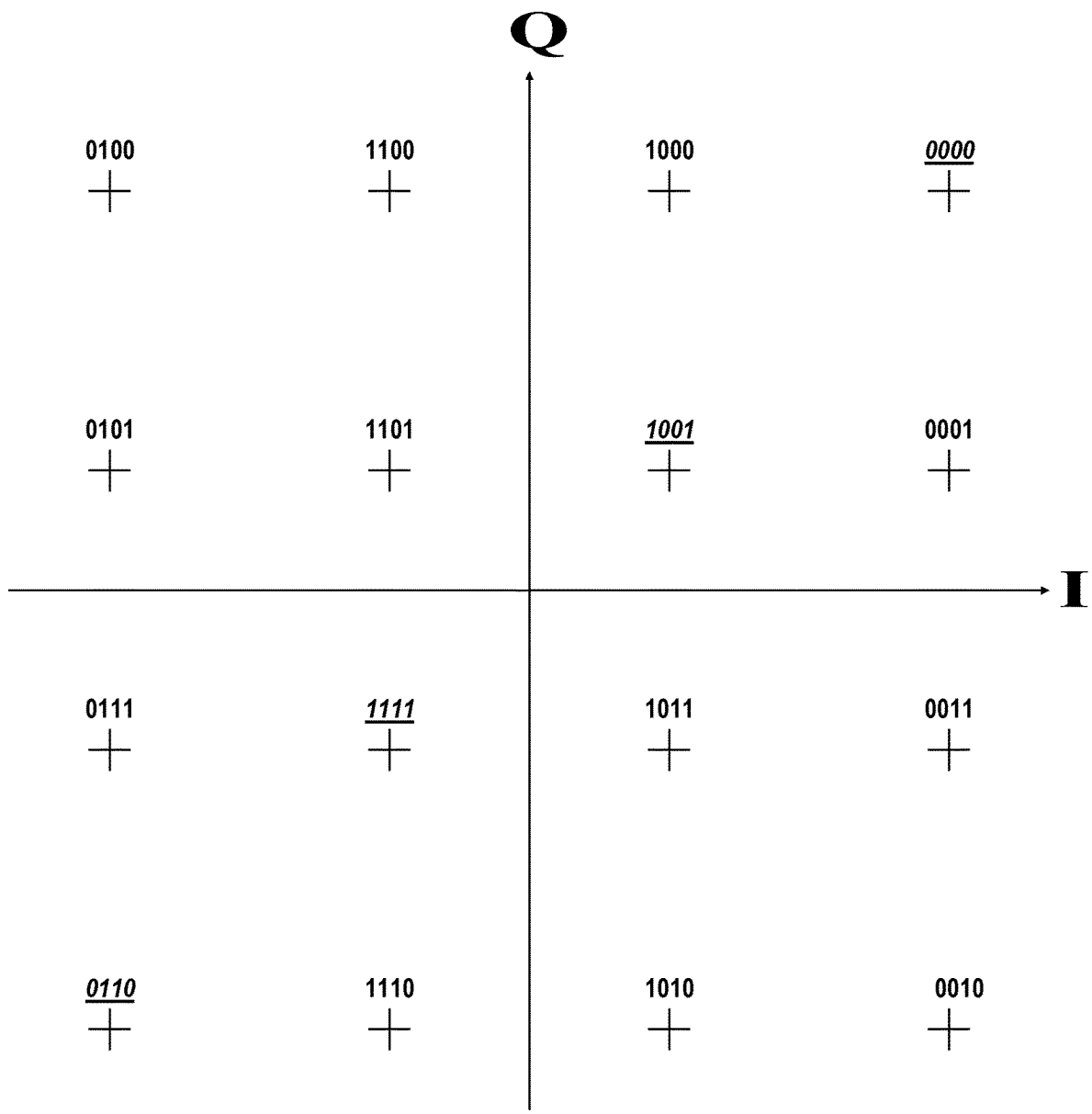
Fig. 17 6th Gray Map of 16QAM
(Labels mirror those of Fig. 16 5th Gray Map of 16QAM)

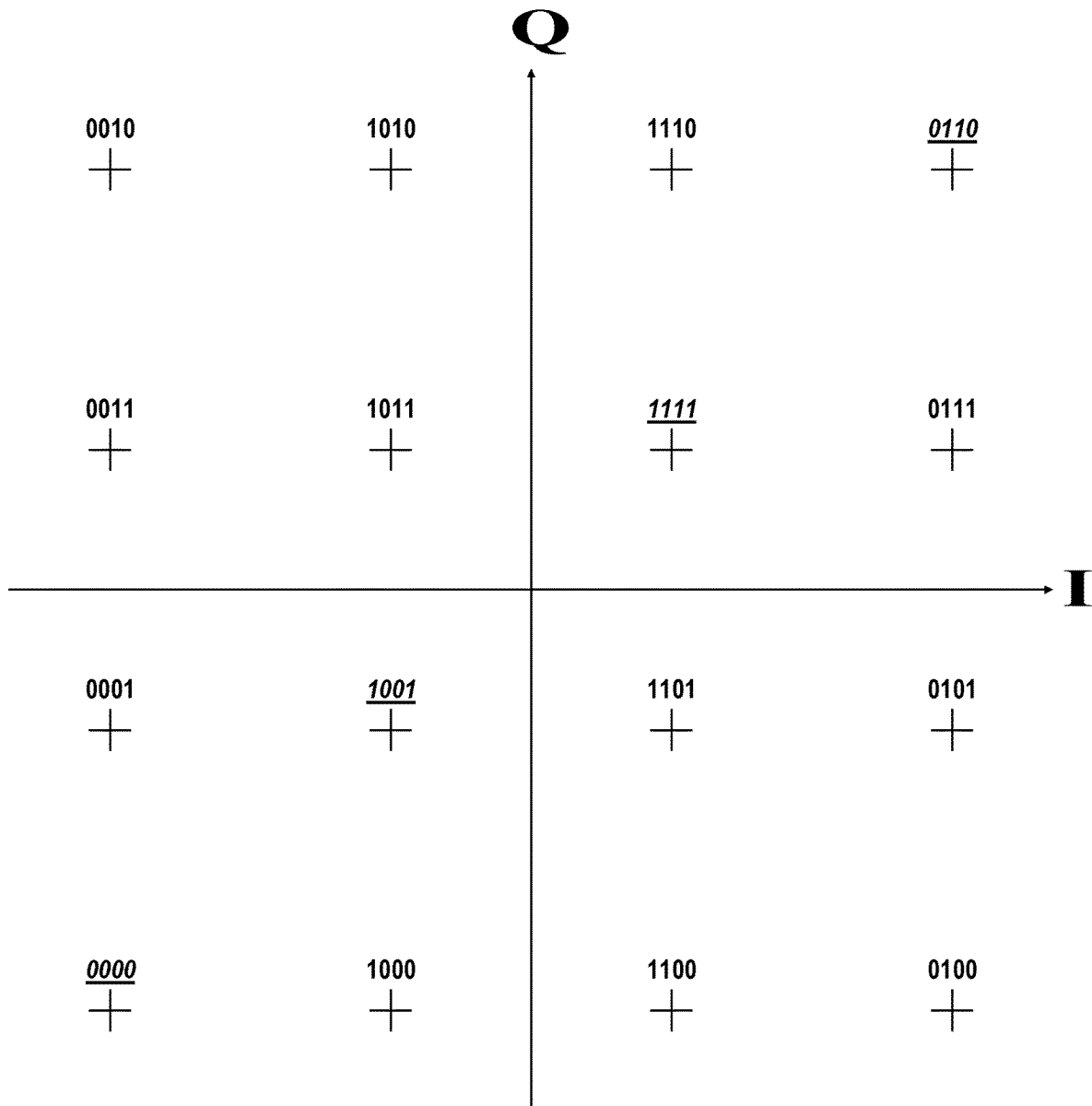
Fig. 18 7th Gray Map of 16QAM
(Constellation of Fig. 16 5th Gray Map of 16QAM flipped over by 180° rotation around 0010 to 0100 diagonal axis)

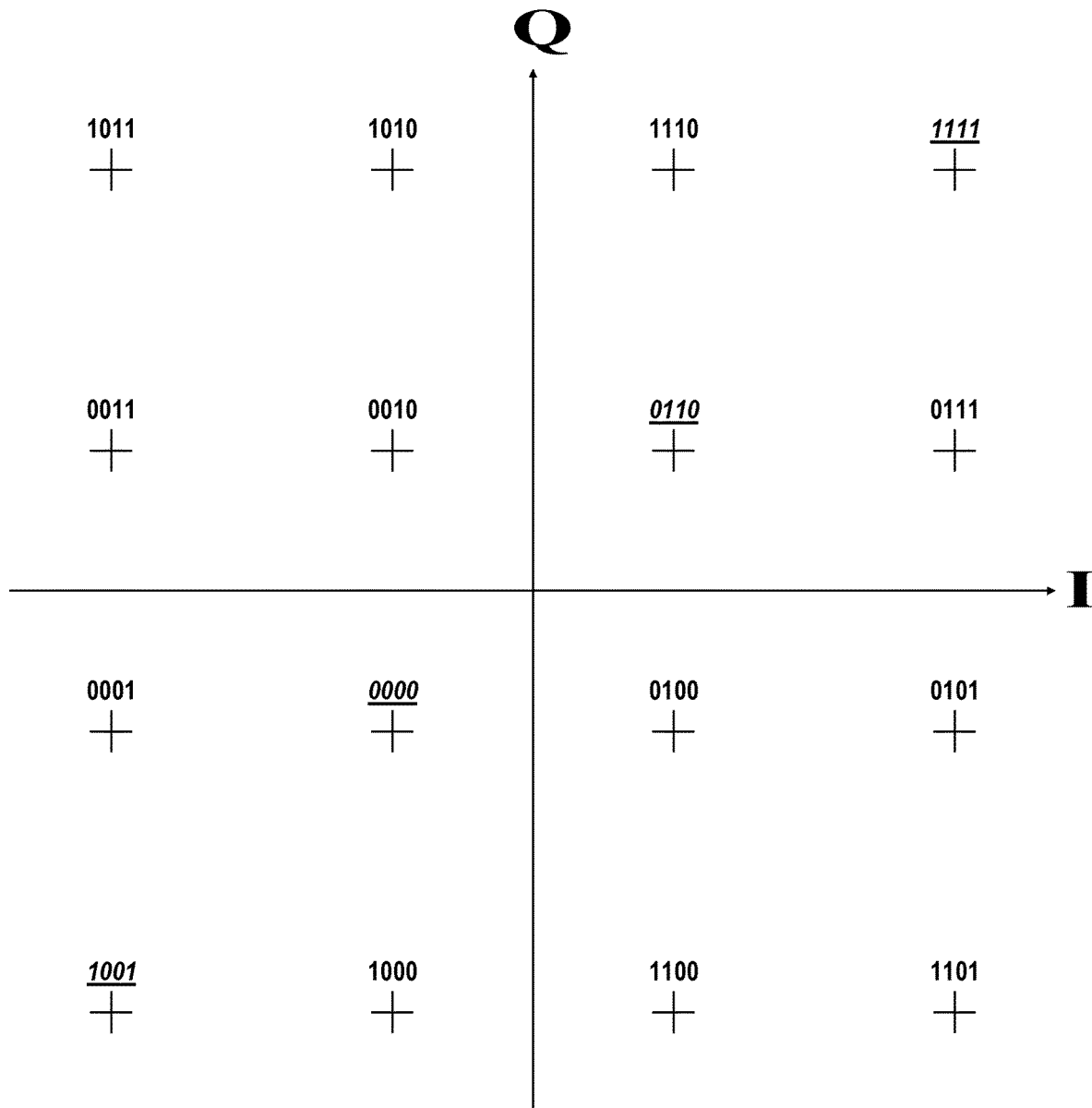
Fig. 19 8th Gray Map of 16QAM
(Labeled quadrants each diagonally twisted from a corresponding one of the Fig. 18 7th Gray map of 16QAM)

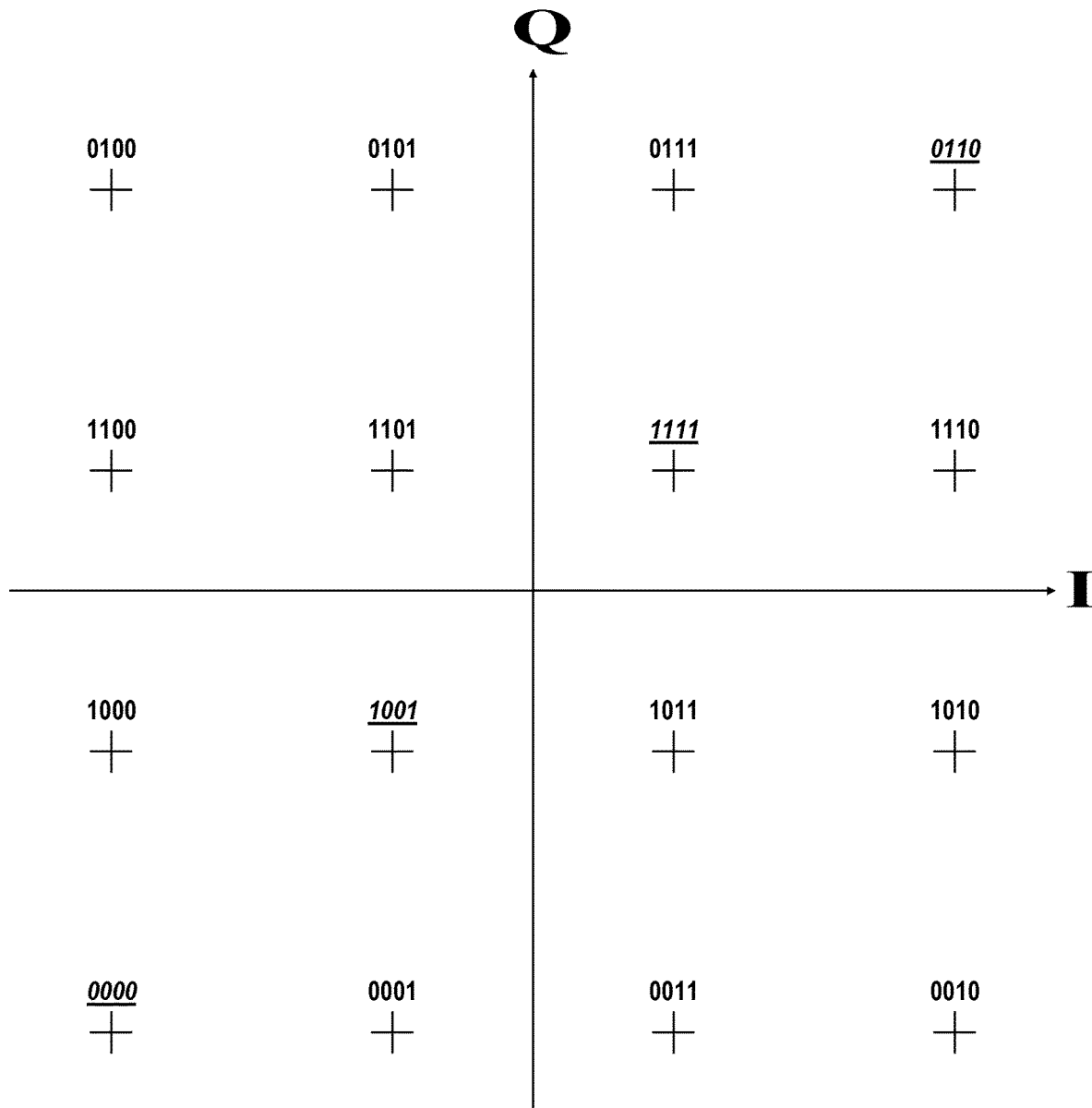
Fig. 20 9th Gray Map of 16QAM
(Constellation of Fig. 17 6th Gray Map of 16QAM flipped over by 180° rotation around 0100 to 0010 diagonal axis)

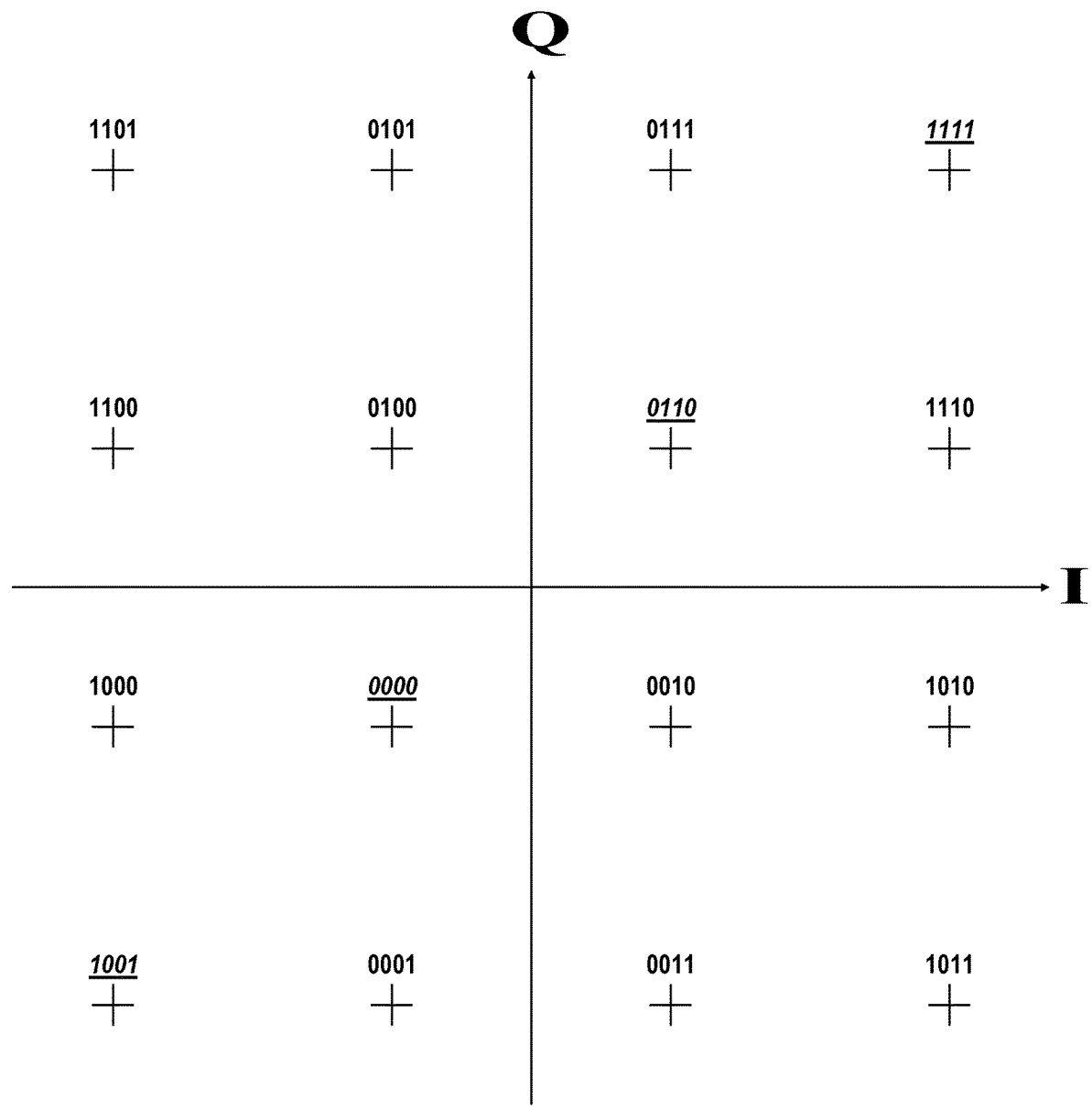
Fig. 21 10th Gray Map of 16QAM
(Labeled quadrants each diagonally twisted from a corresponding one of the Fig. 20 9th Gray map of 16QAM)

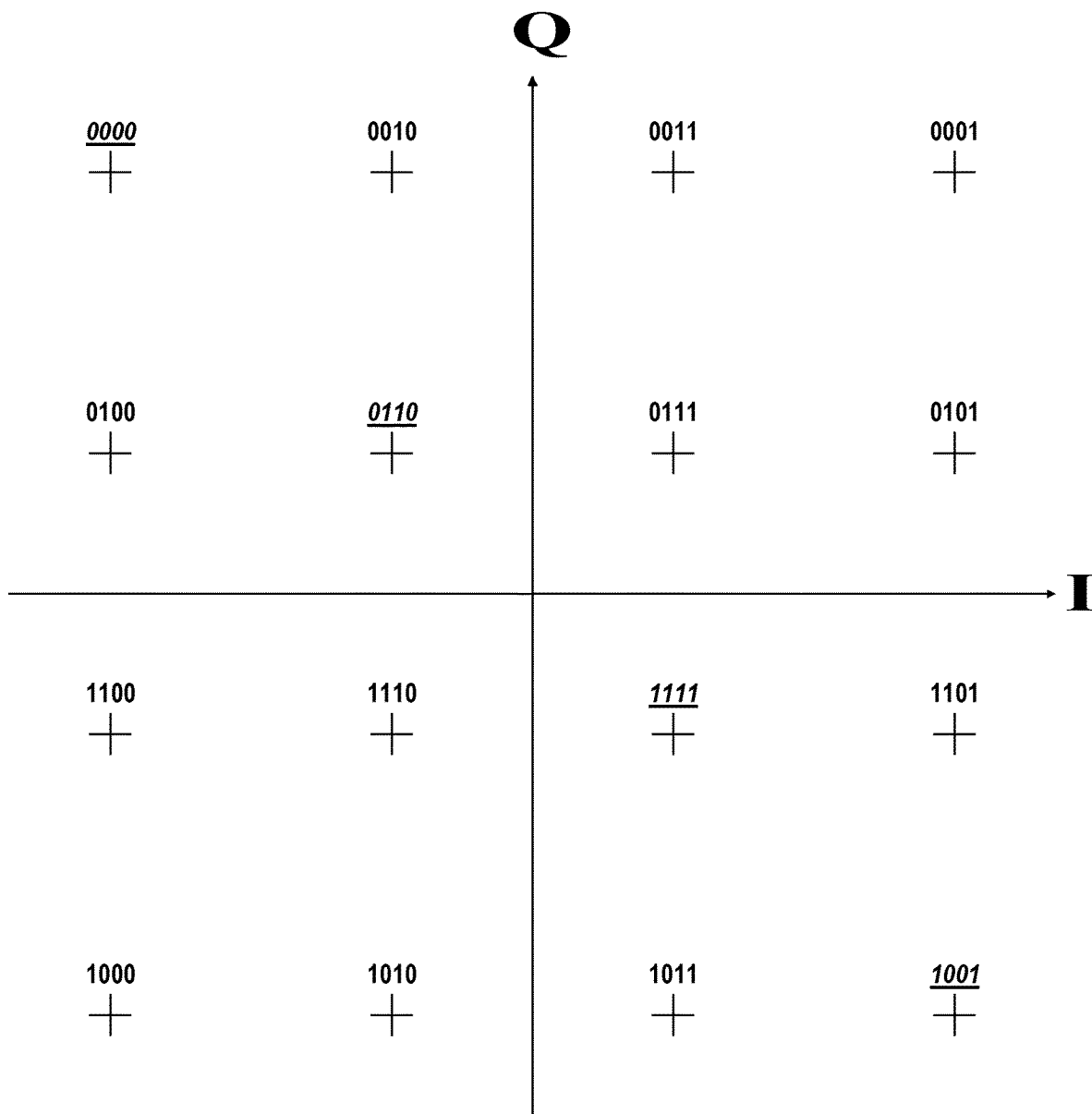
Fig. 22 11<sup>th</sup> Gray Map of 16QAM
(Labels mirror those of Fig. 23 12th Gray Map of 16QAM)

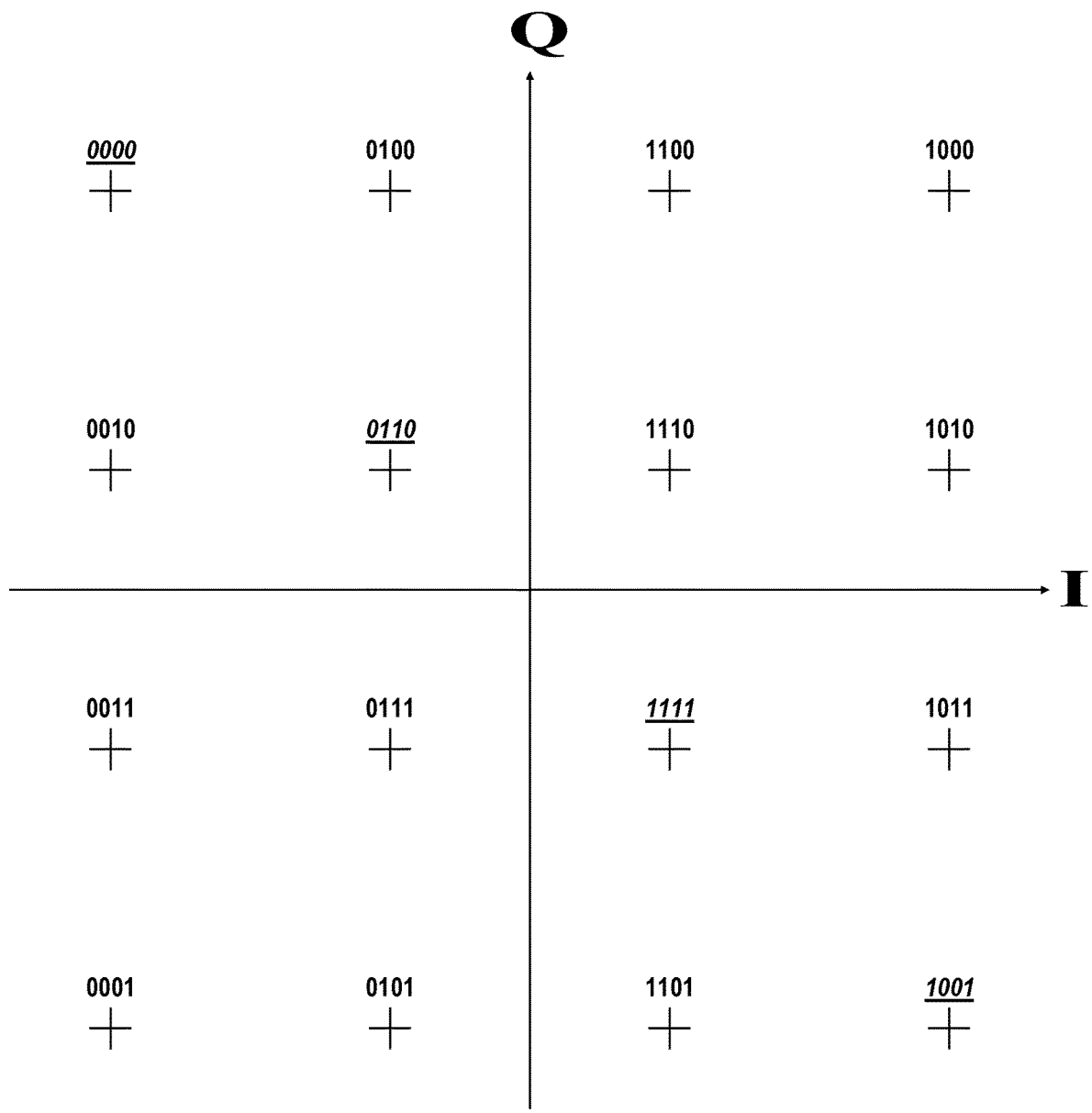
Fig. 23 12th Gray Map of 16QAM
(Labels mirror those of Fig. 22 11th Gray Map of 16QAM)

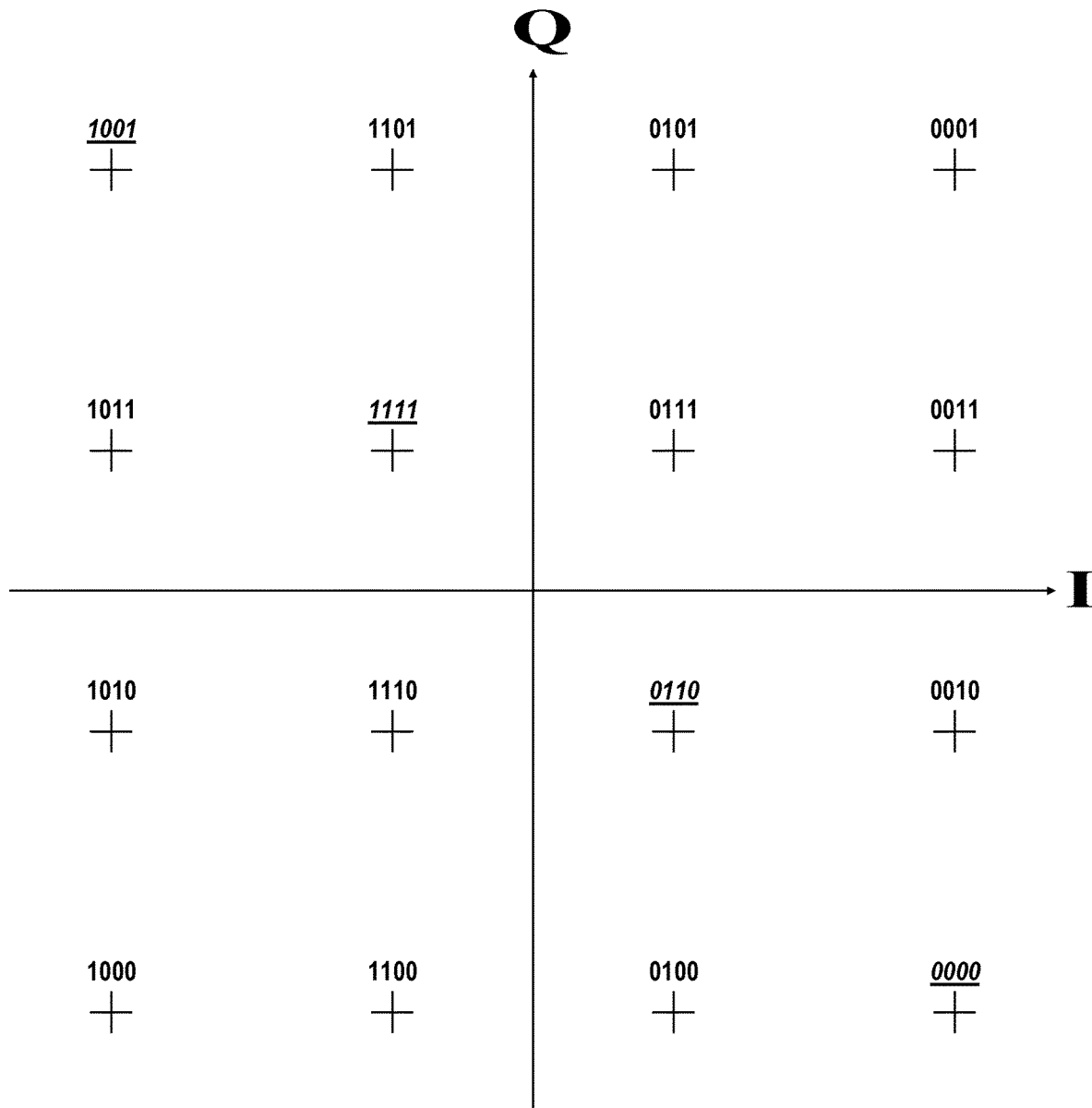
Fig. 24 13th Gray Map of 16QAM
(Constellation of Fig. 22 11th Gray Map of 16QAM flipped over by 180° rotation around 1000 to 0001 diagonal axis)

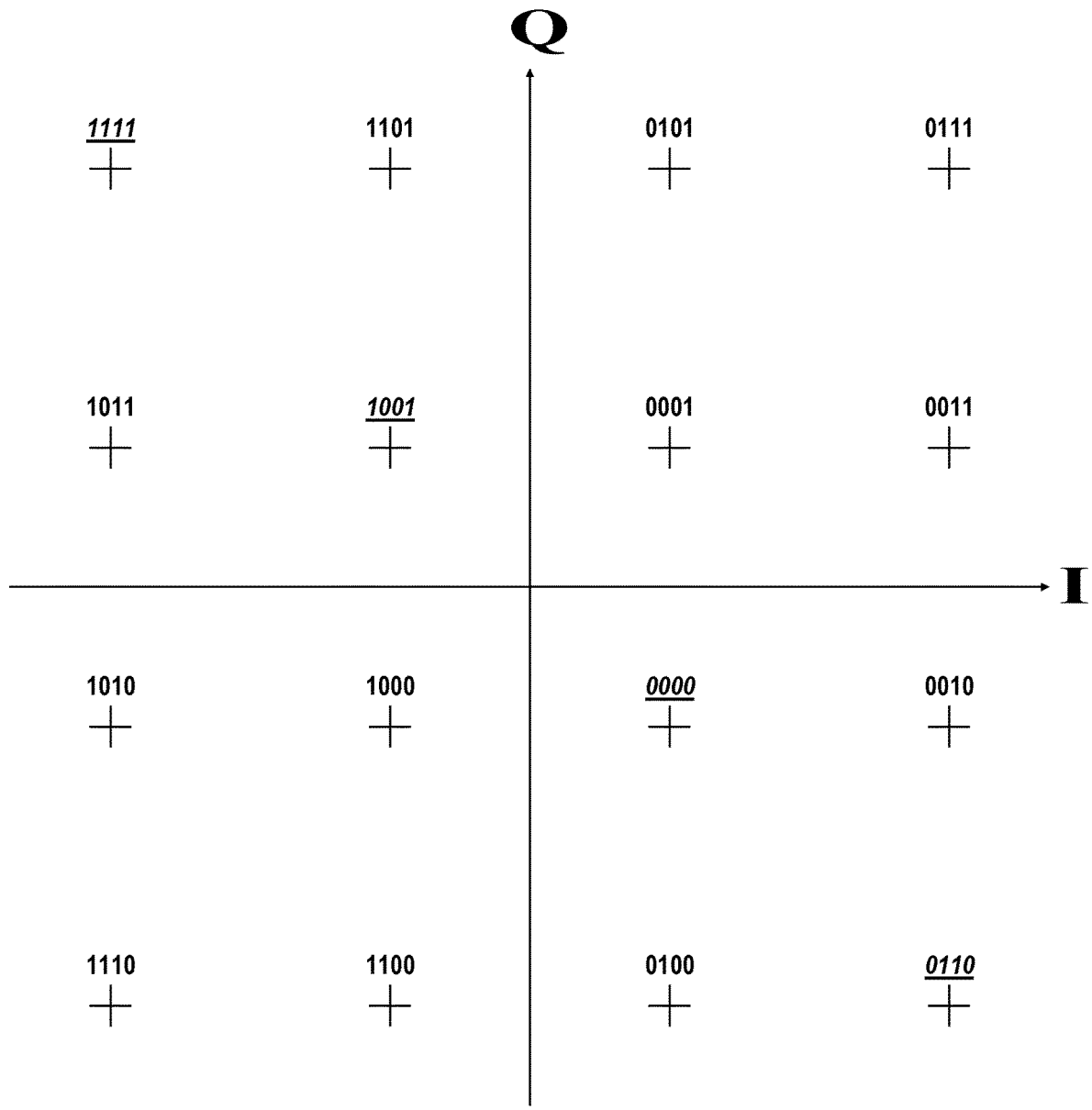
Fig. 25 14th Gray Map of 16QAM
(Labeled quadrants each diagonally twisted from a corresponding one of the Fig. 24 13th Gray map of 16QAM)

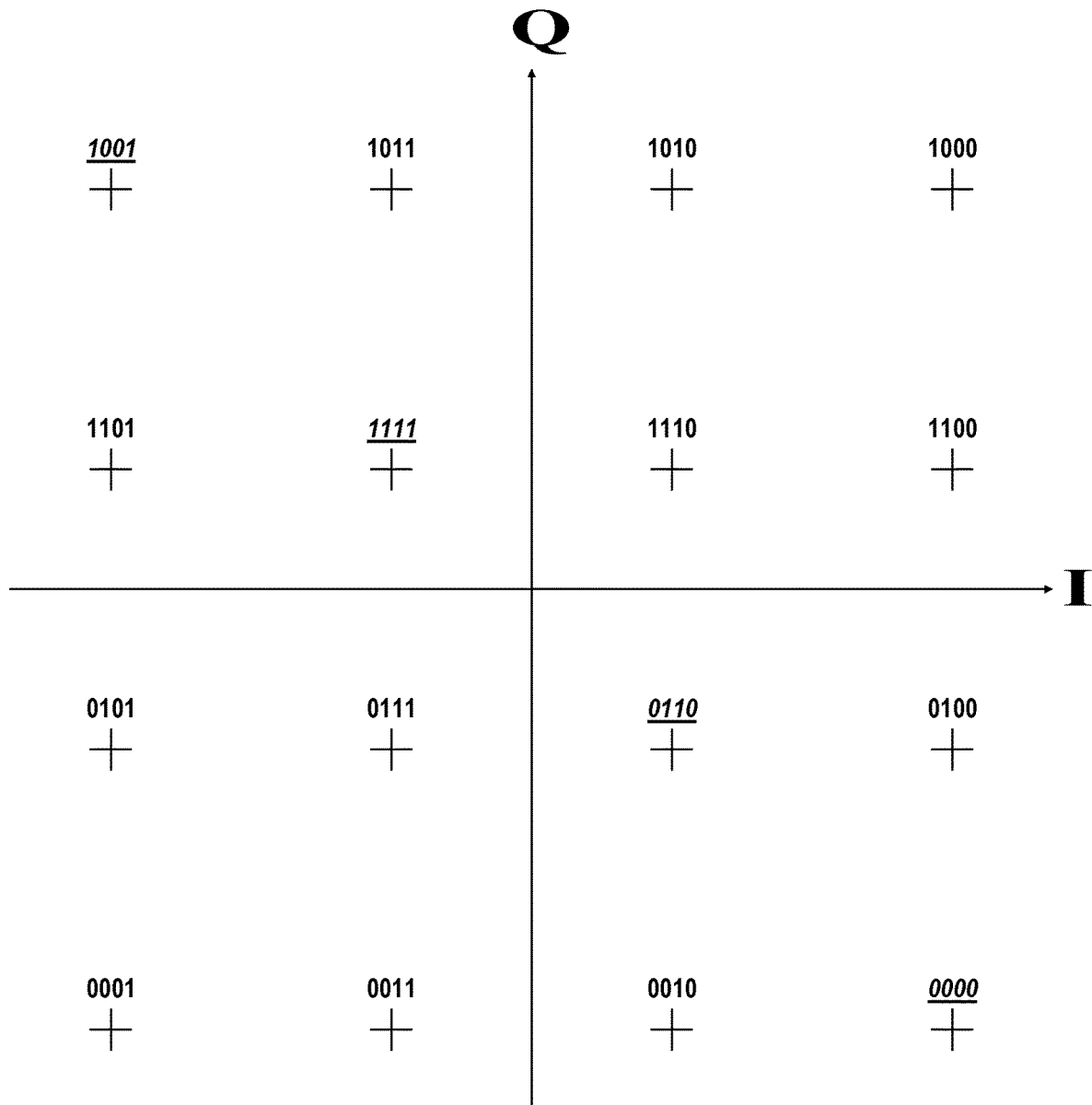
Fig. 26 15th Gray Map of 16QAM
(Constellation of Fig. 23 12th Gray Map of 16QAM flipped over by 180° rotation around 0001 to 1000 diagonal axis)

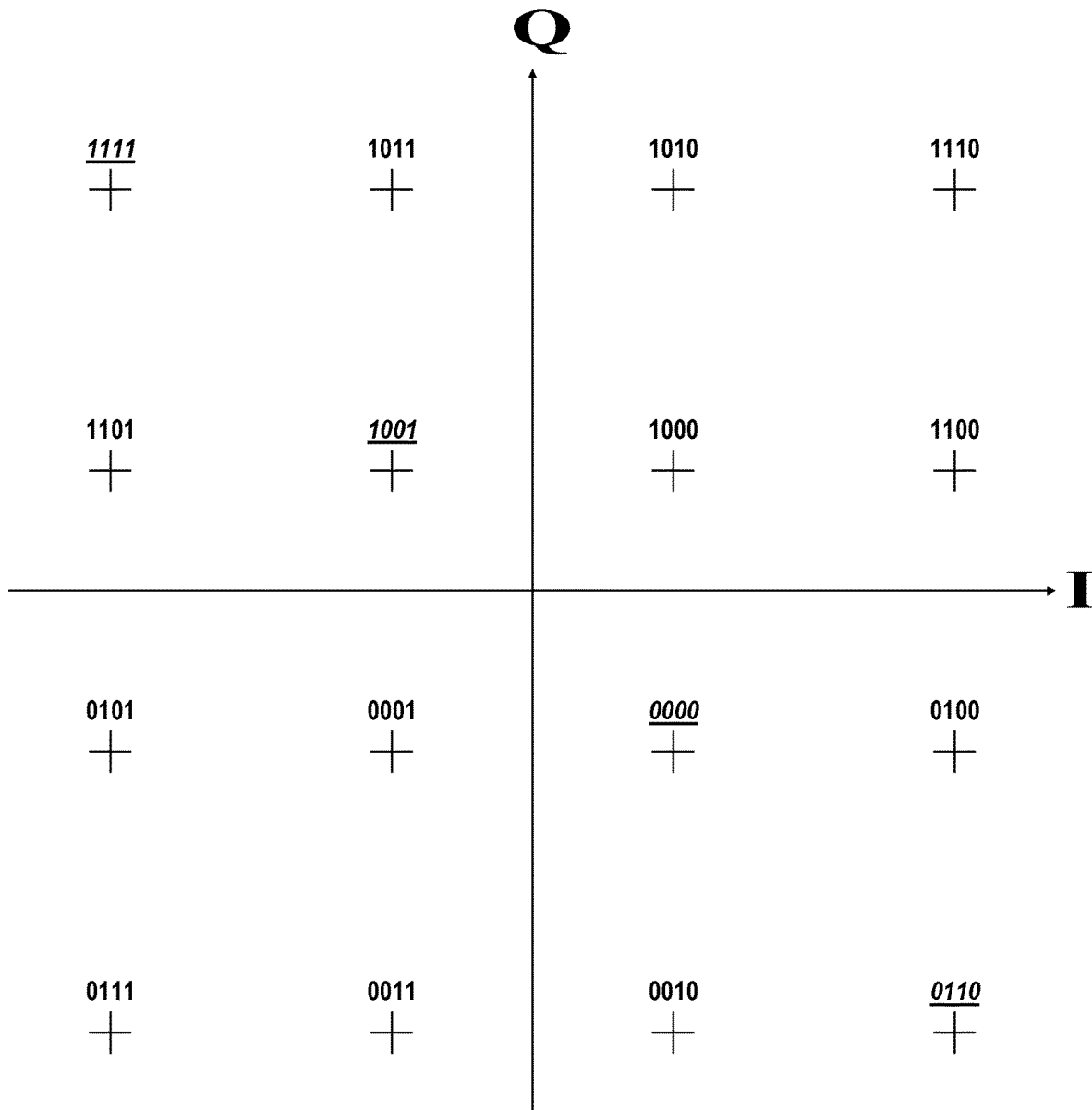
Fig. 27 16th Gray Map of 16QAM
(Labeled quadrants each diagonally twisted from a corresponding one of the Fig. 26 15h Gray map of 16QAM)

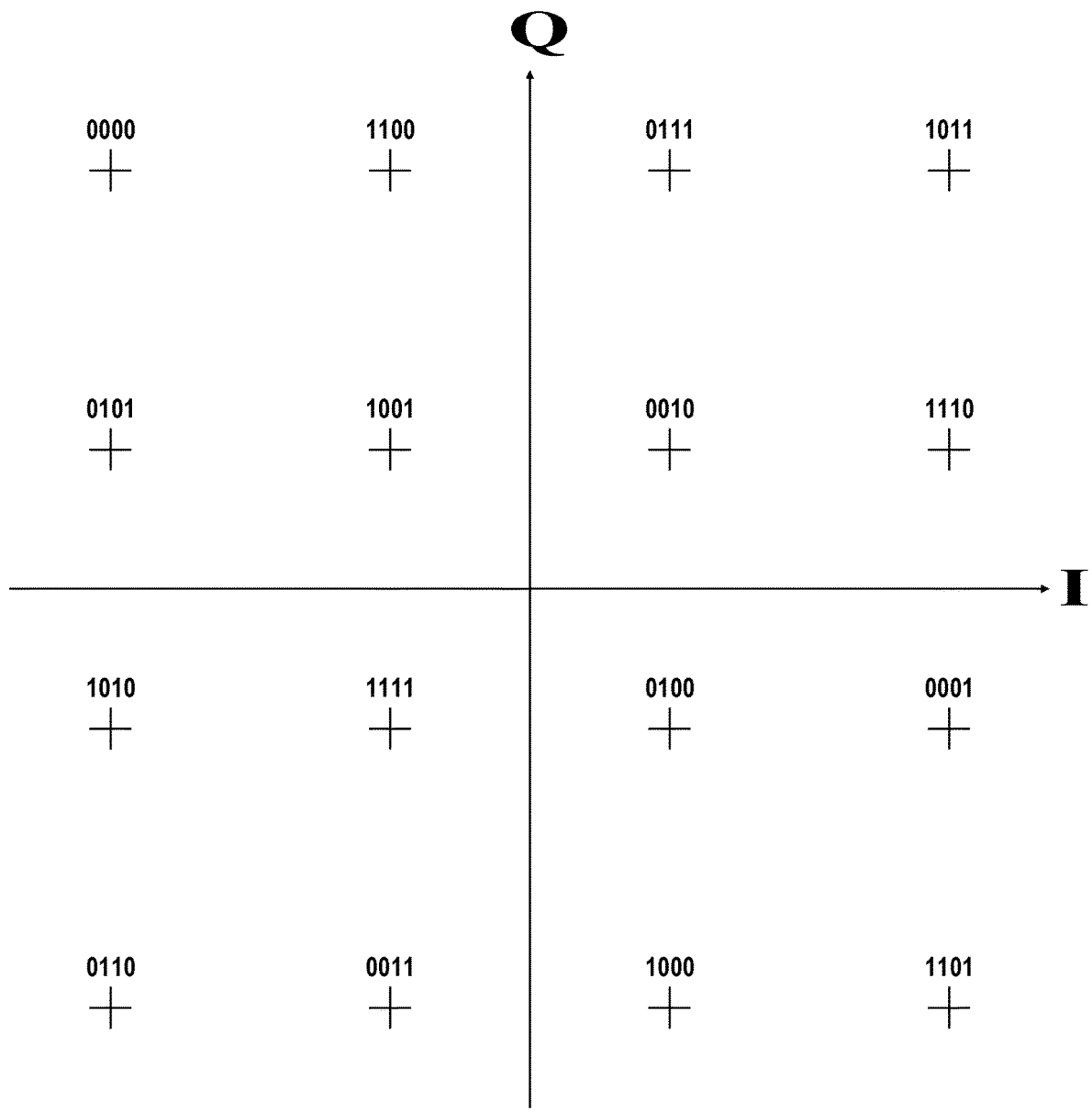
Fig. 28 1ˢᵗ Optimized 16QAM Map
(First of a 1st Pair of Maps of 16QAM with Maximum
Labeling Diversity, as disclosed by M. Krasicki)

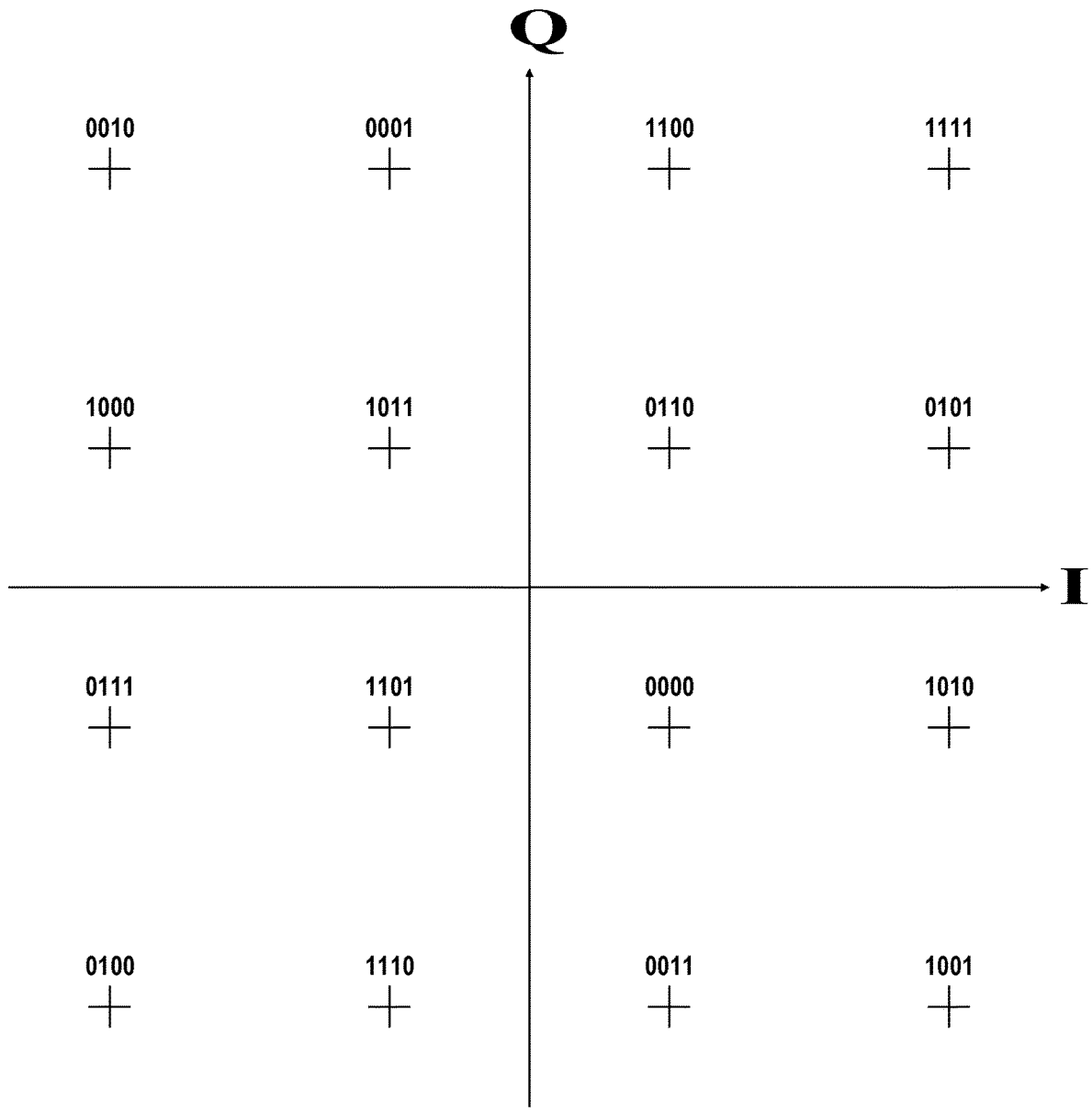
Fig. 29 2nd Optimized 16QAM Map
(Second of a 1st Pair of Maps of 16QAM with Maximum Labeling Diversity, as disclosed by M. Krasicki)

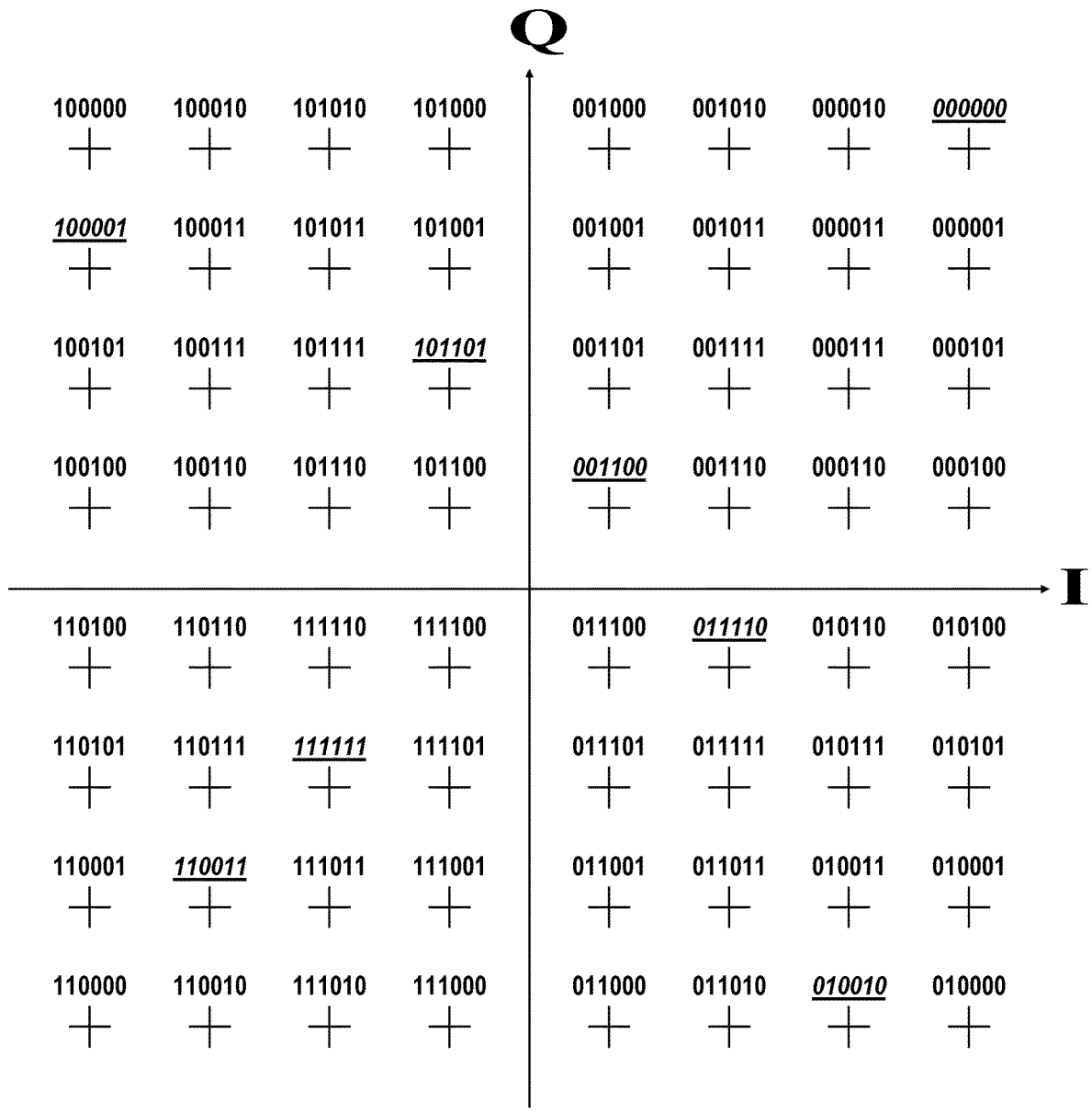
Fig. 30 1st Gray Map of 64QAM
(Labels mirror those of Fig. 31 2nd Gray Map of 64QAM)

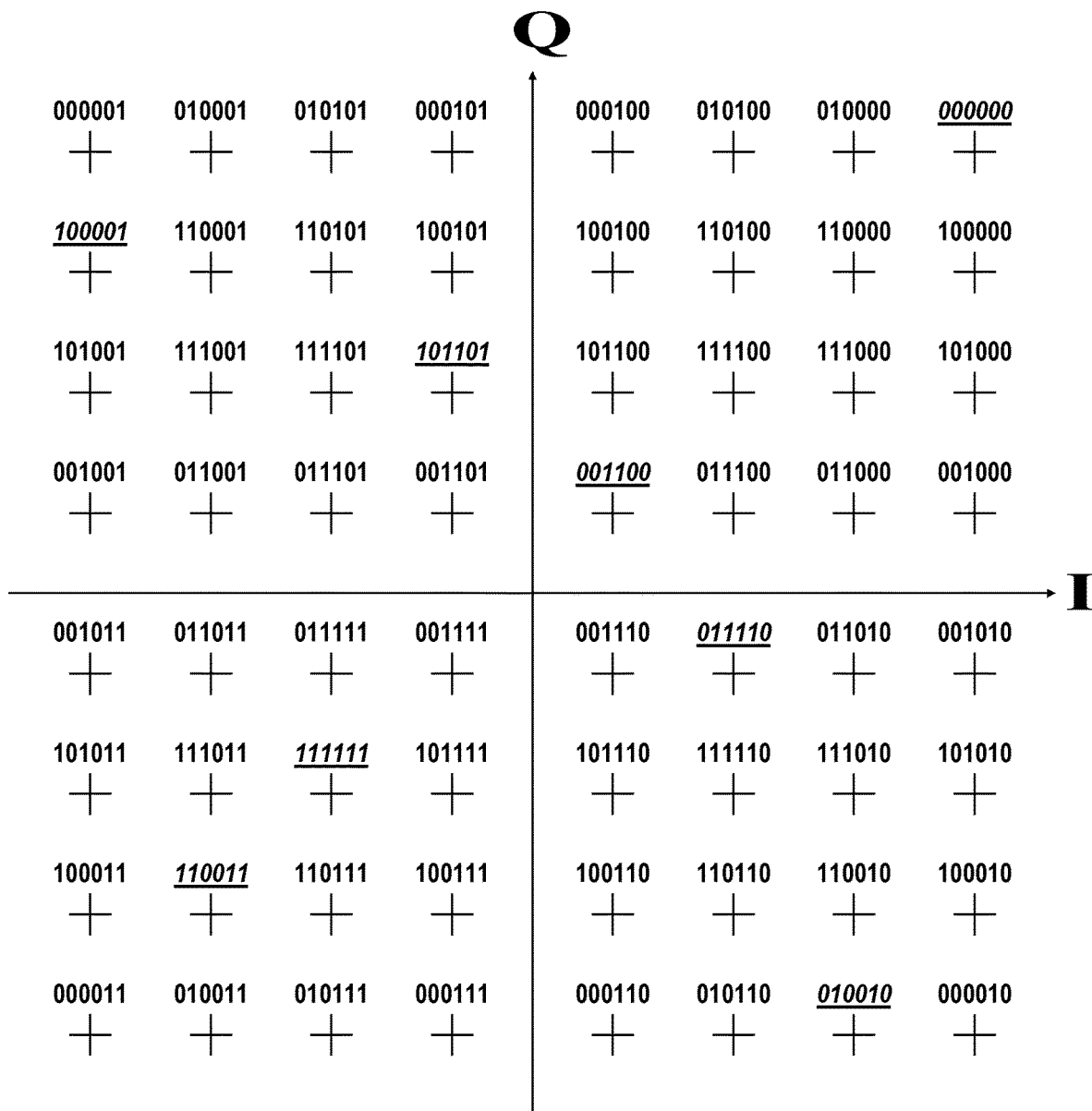
Fig. 31 2nd Gray Map of 64QAM
(Labels mirror those of Fig. 30 1st Gray Map of 64QAM)

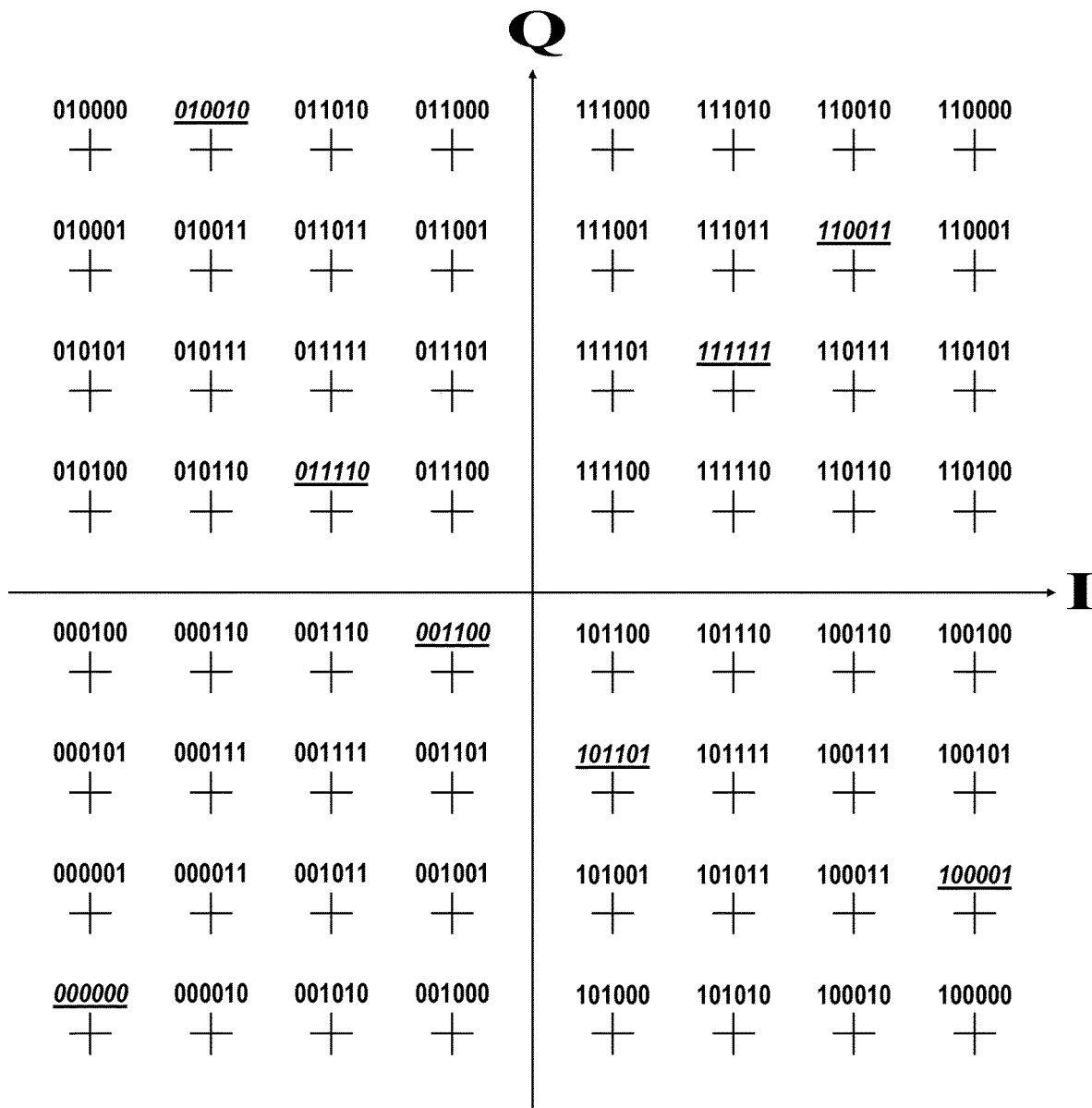
Fig. 32  3rd Gray Map of 64QAM
(180° rotation of Fig. 30 1st Gray Map of 64QAM)

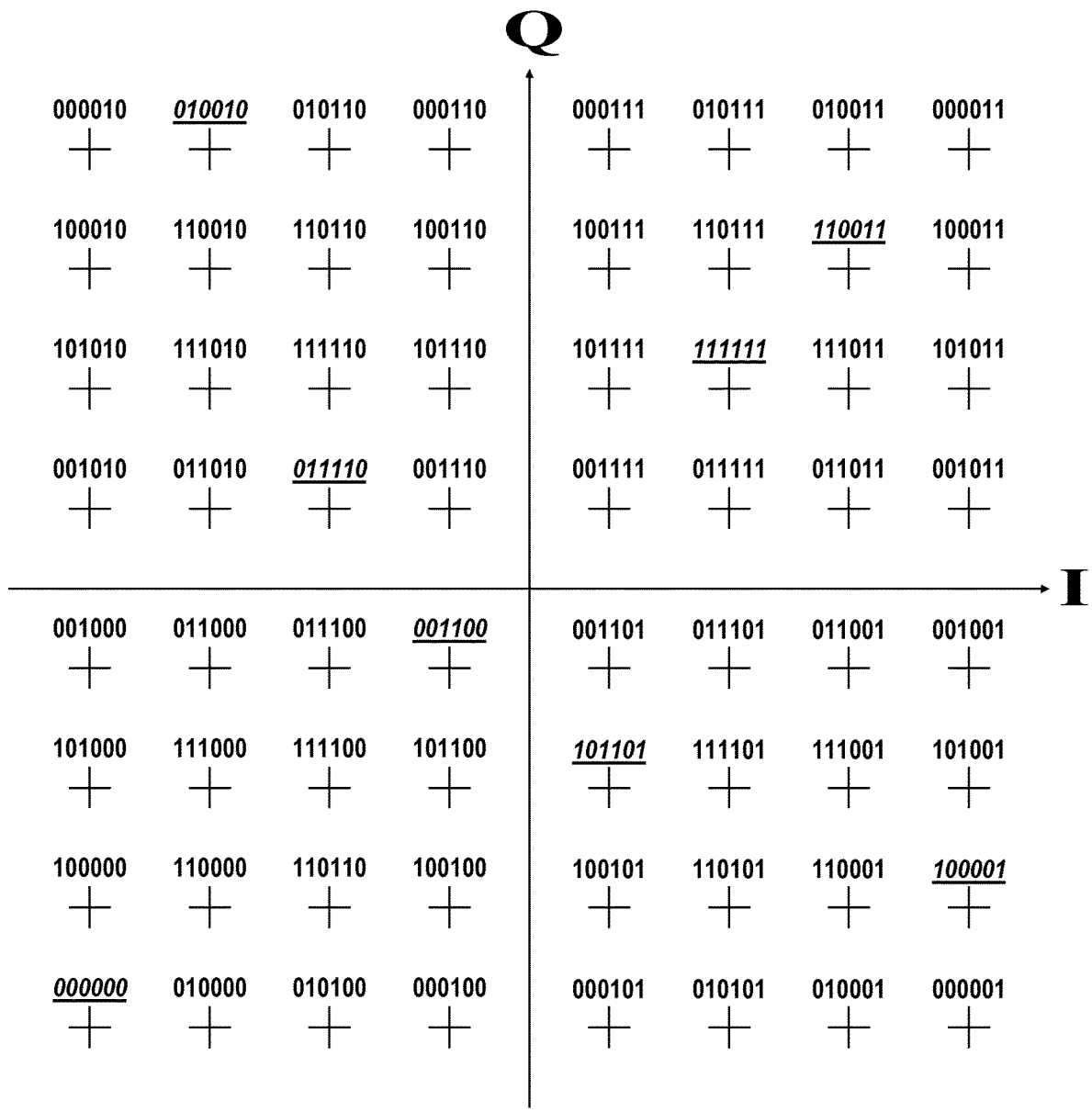
Fig. 33 4th Gray Map of 64QAM
(180° rotation of Fig. 31 2nd Gray Map of 64QAM)

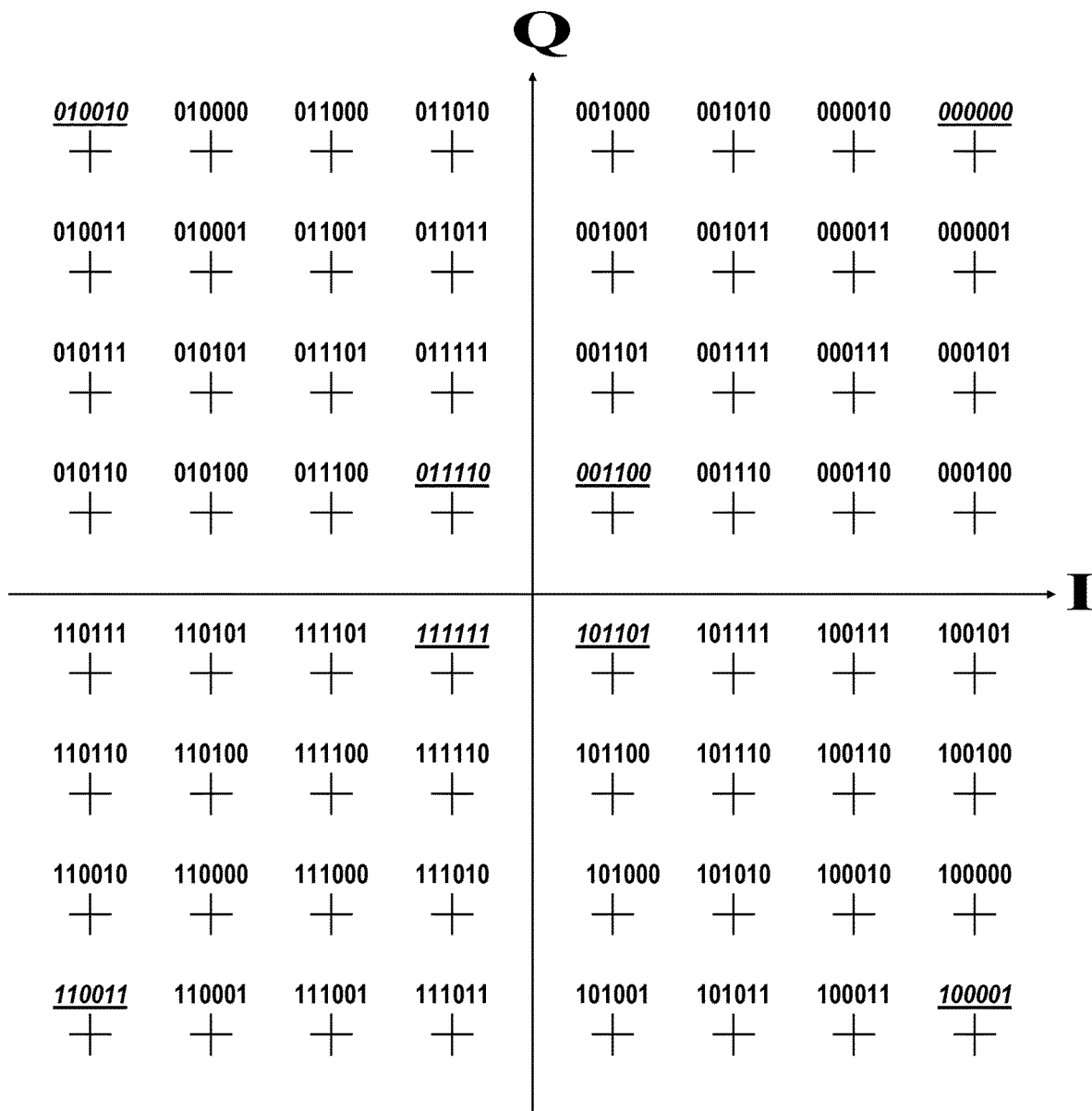
Fig. 34 1st SCM Map of 64QAM
(Labels mirror those of Fig. 35 2nd SCM Map of 64QAM)

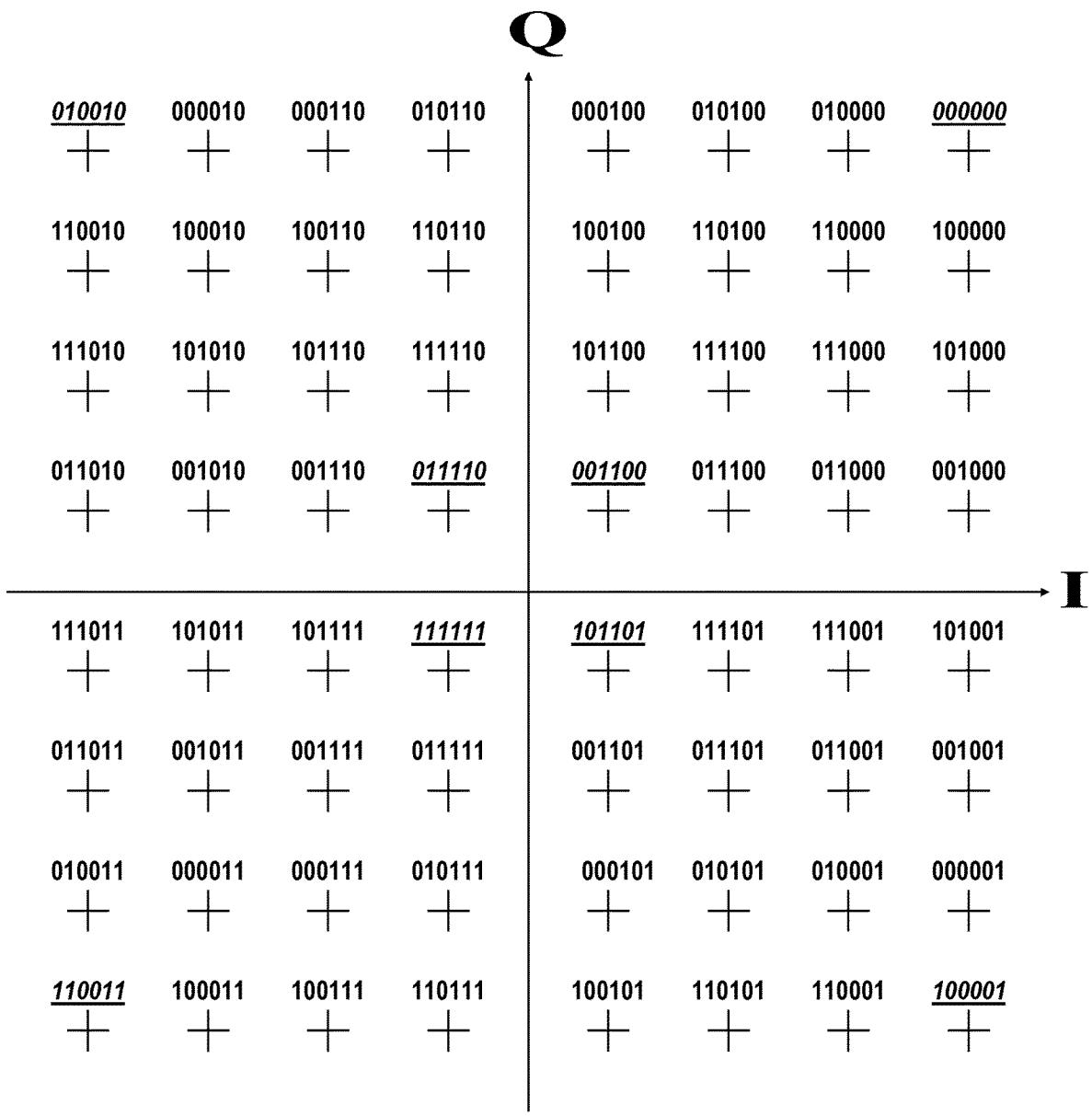
Fig. 35 2nd SCM Map of 64QAM
(Labels mirror those of Fig. 34 1st SCM Map of 64QAM)

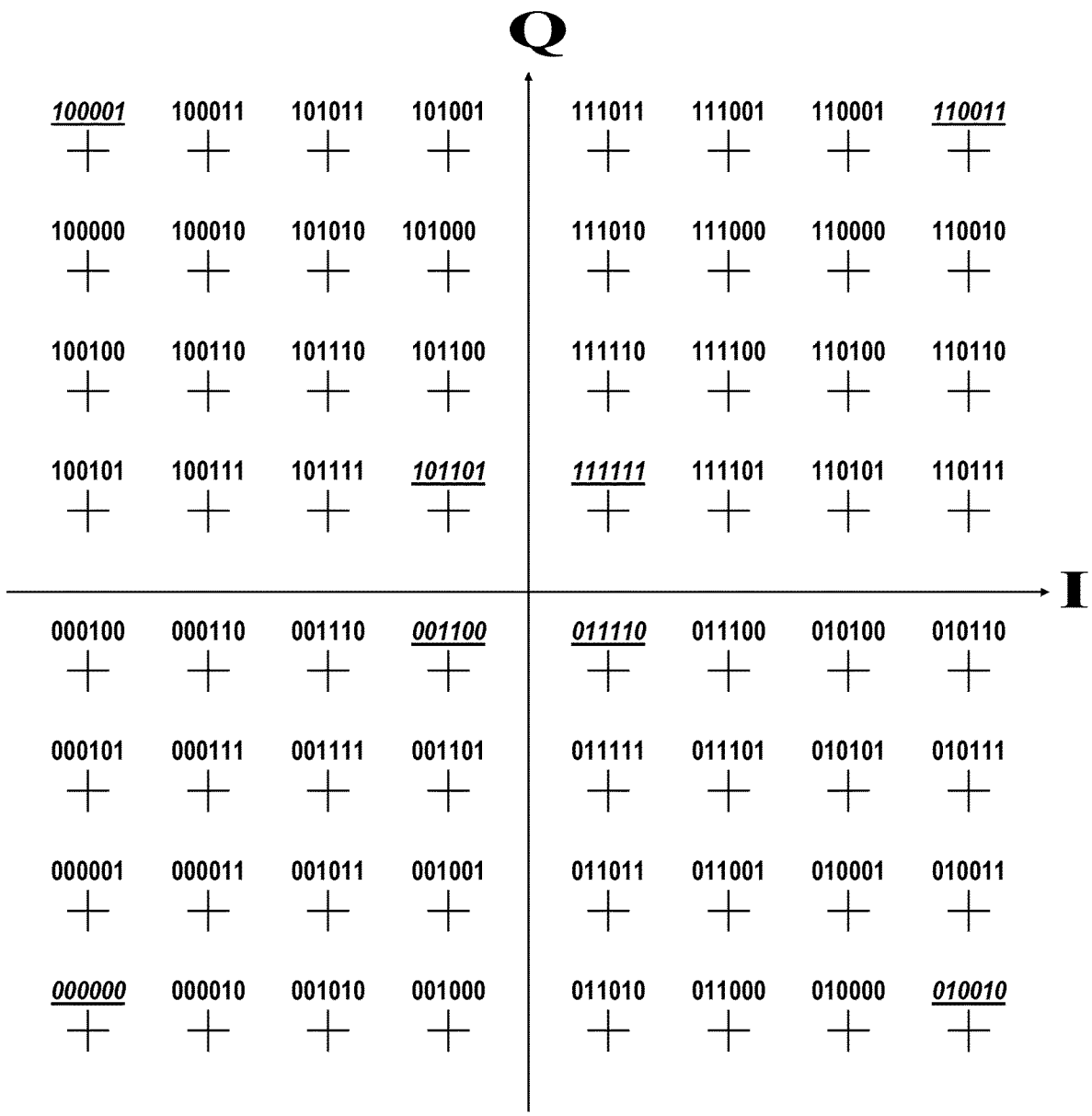
Fig. 36 3rd SCM Map of 64QAM
(180° rotation of Fig. 34 1st SCM Map of 64QAM)

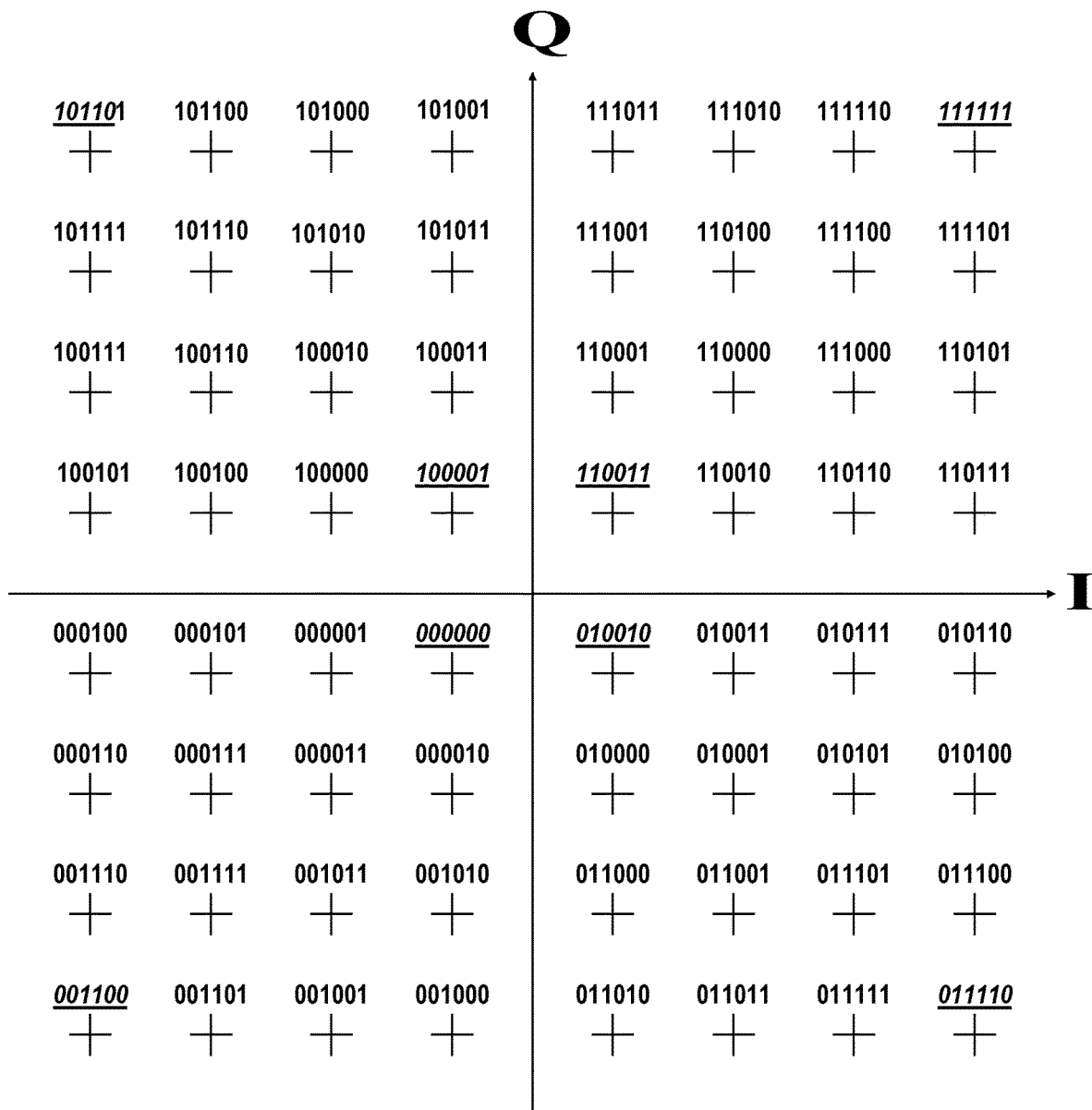
Fig. 37 4th SCM Map of 64QAM
(Labeled quadrants each diagonally twisted from a corresponding one in Fig. 36 3rd SCM Map of 64QAM)

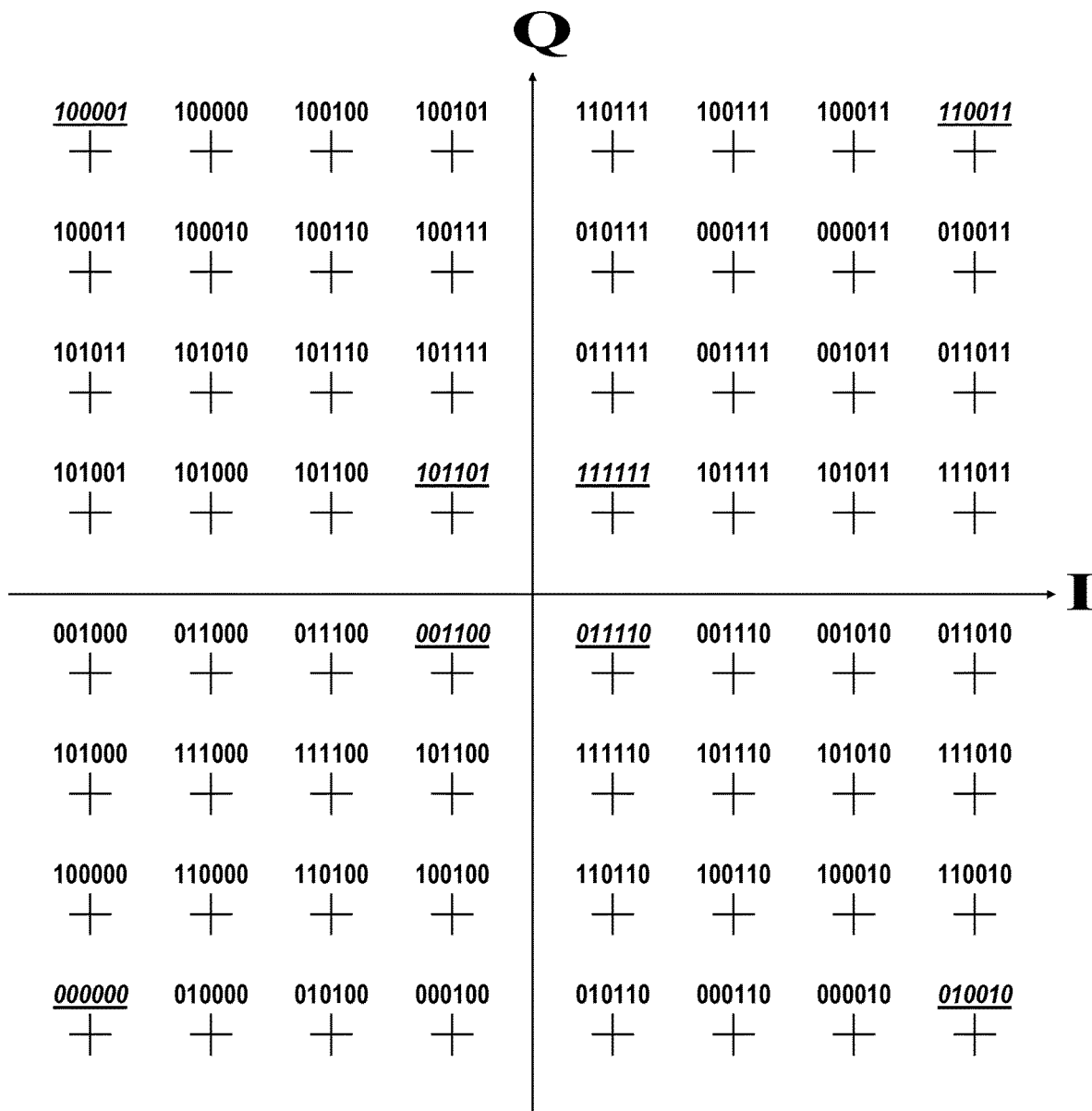
Fig. 38 5th SCM Map of 64QAM
(180° rotation of Fig. 35 2nd SCM Map of 64QAM)

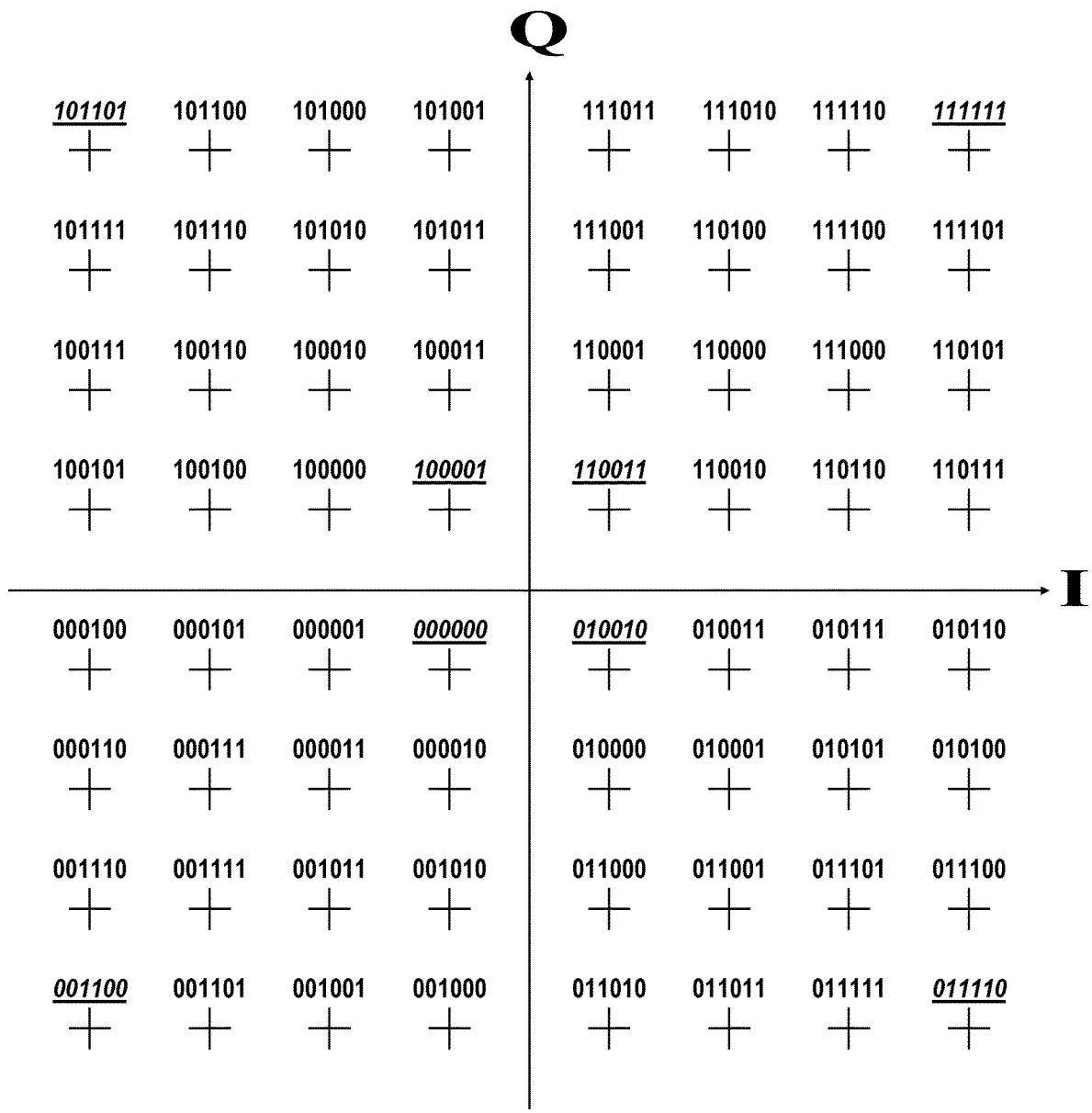
Fig. 39 6th SCM Map of 64QAM
(Labeled quadrants each diagonally twisted from a corresponding one in Fig. 38 5th SCM Map of 64QAM)

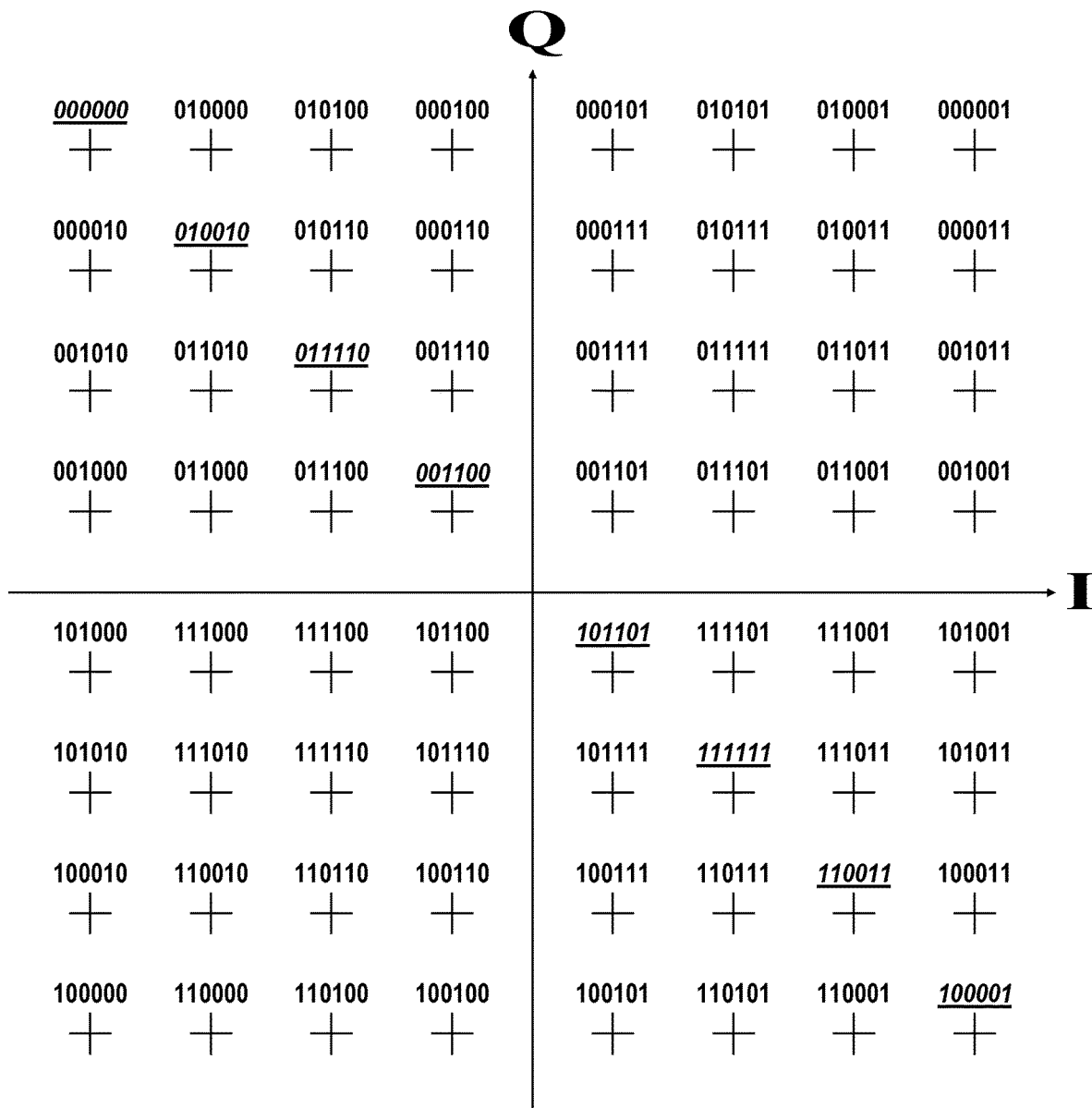
Fig. 40 5th Gray Map of 64QAM
(Labels mirror those of Fig. 41 6th Gray Map of 64QAM)

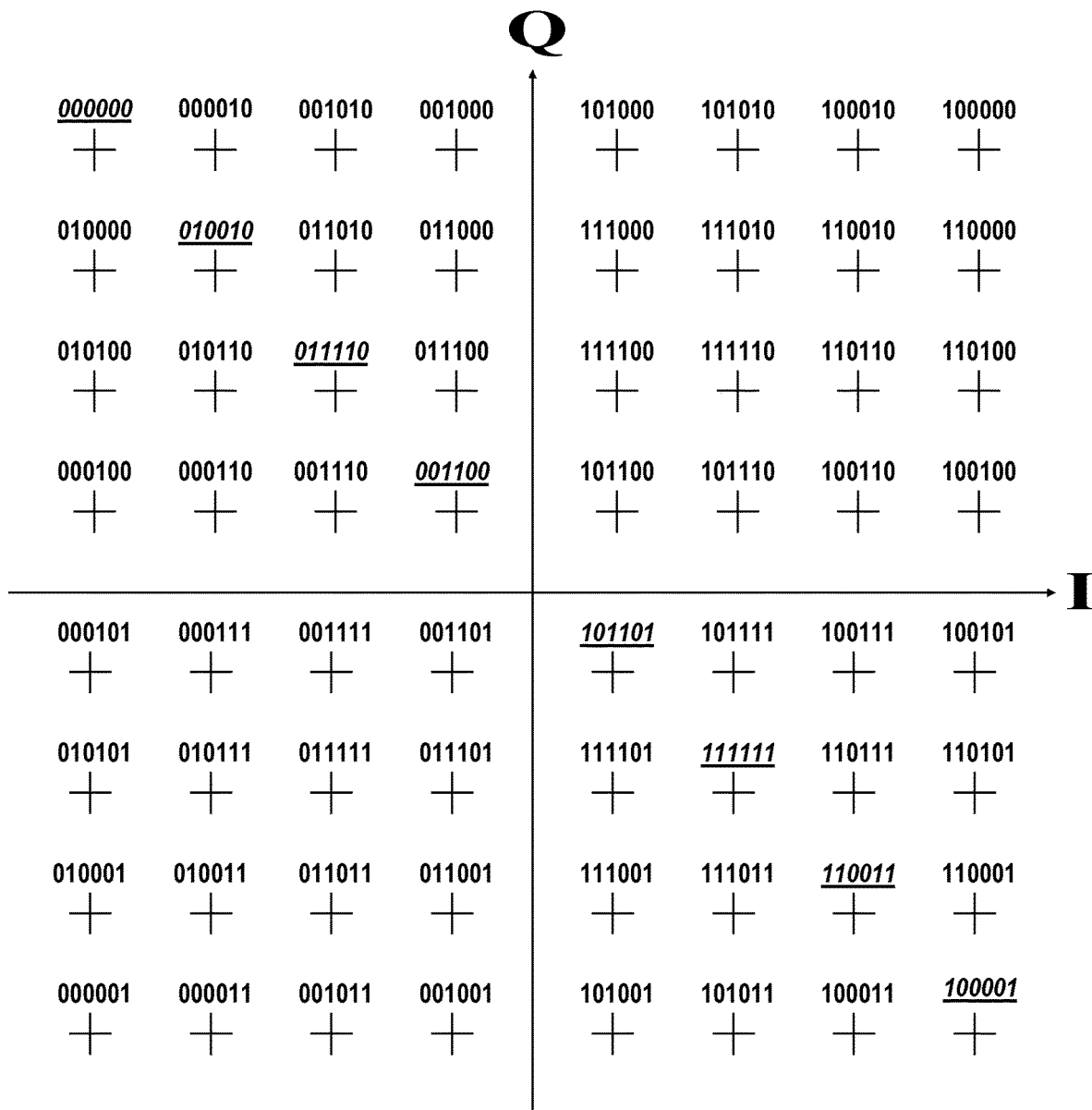
Fig. 41 6th Gray Map of 64QAM
(Labels mirror those of Fig. 40 5th Gray Map of 64QAM)

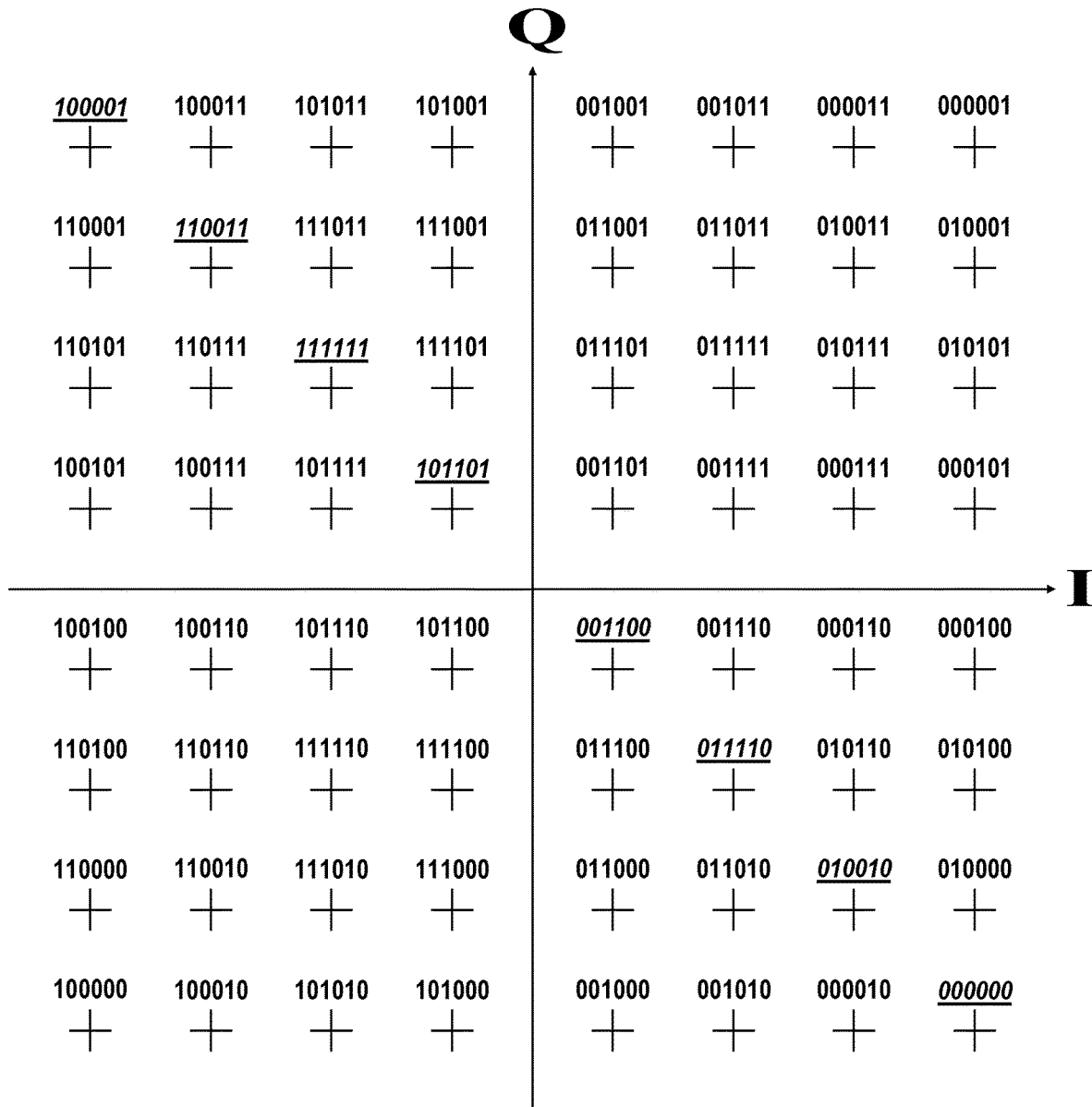
Fig. 42 7th Gray Map of 64QAM
(Constellation of Fig. 40 5th Gray Map of 64QAM flipped over by 180° rotation around 000001 to 100000 diagonal axis)

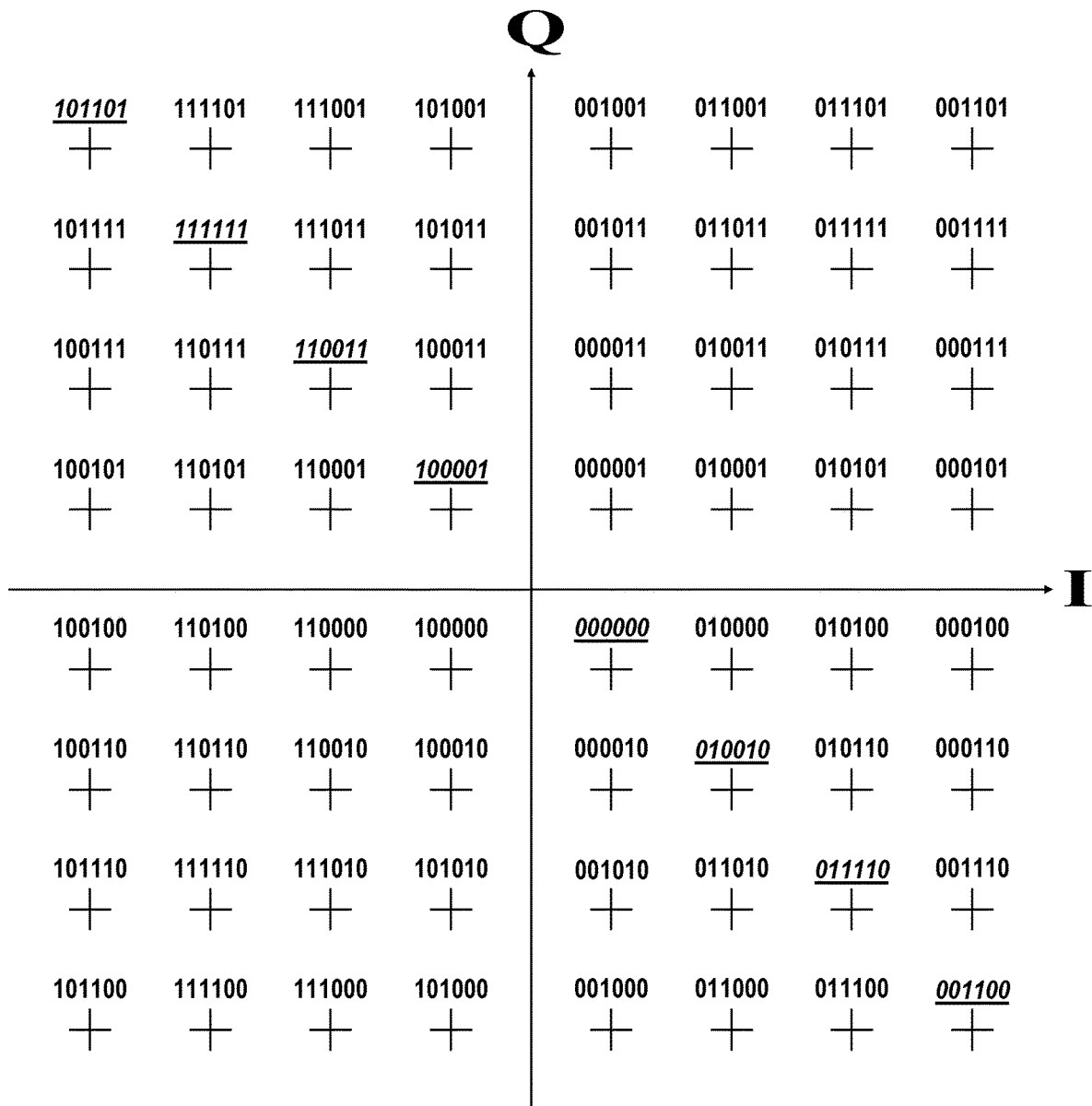
Fig. 43 8th Gray Map of 64QAM
(Labeled quadrants each diagonally twisted from a corresponding one in Fig. 42 7th Gray Map of 64QAM)

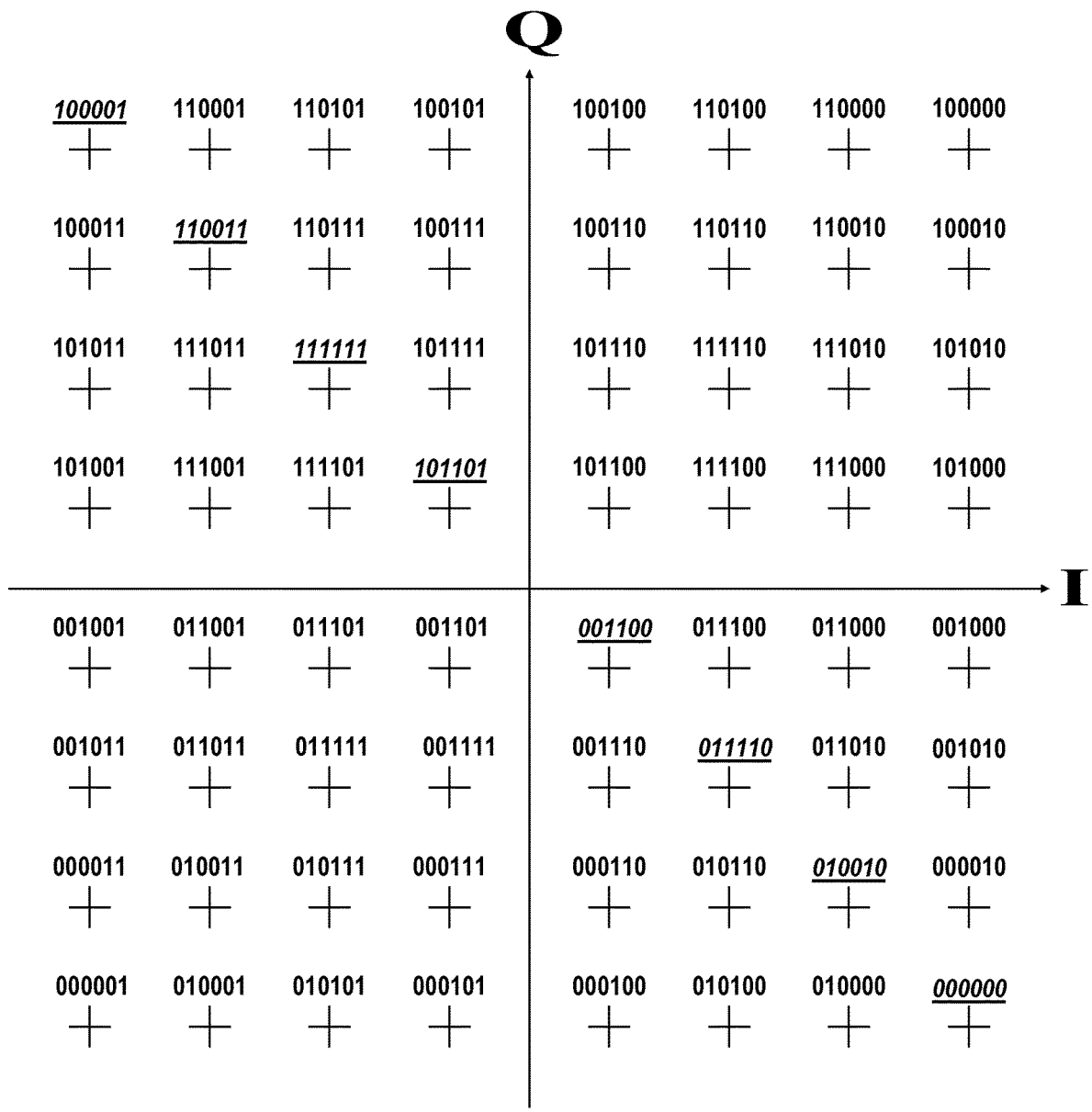
Fig. 44 9th Gray Map of 64QAM
(Constellation of Fig. 39 6th Gray Map of 64QAM flipped over by 180° rotation around 100000 to 000001 diagonal axis)

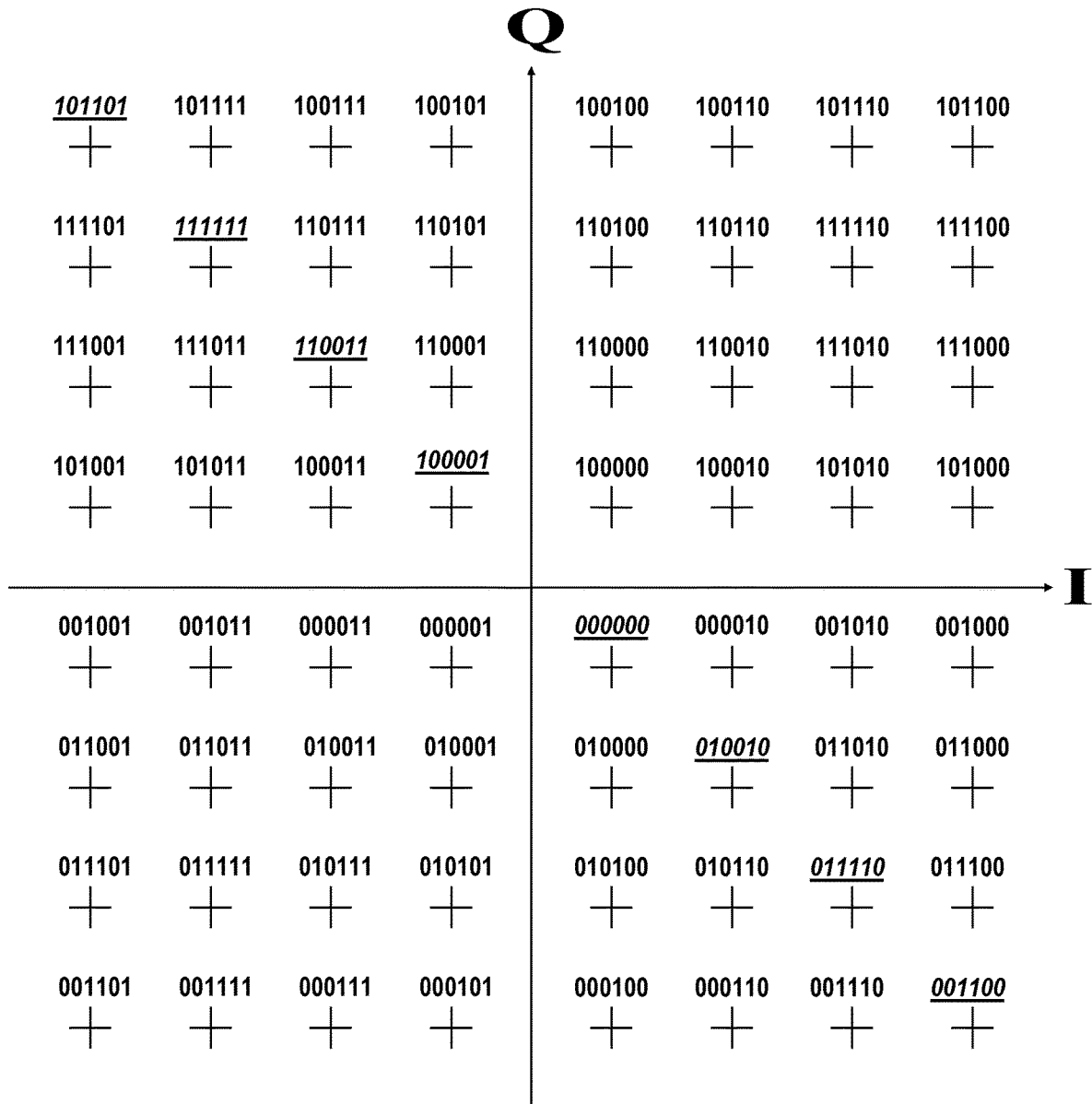
Fig. 45 10th Gray Map of 64QAM
(Labeled quadrants each diagonally twisted from a corresponding one in Fig. 44 9th Gray Map of 64QAM)

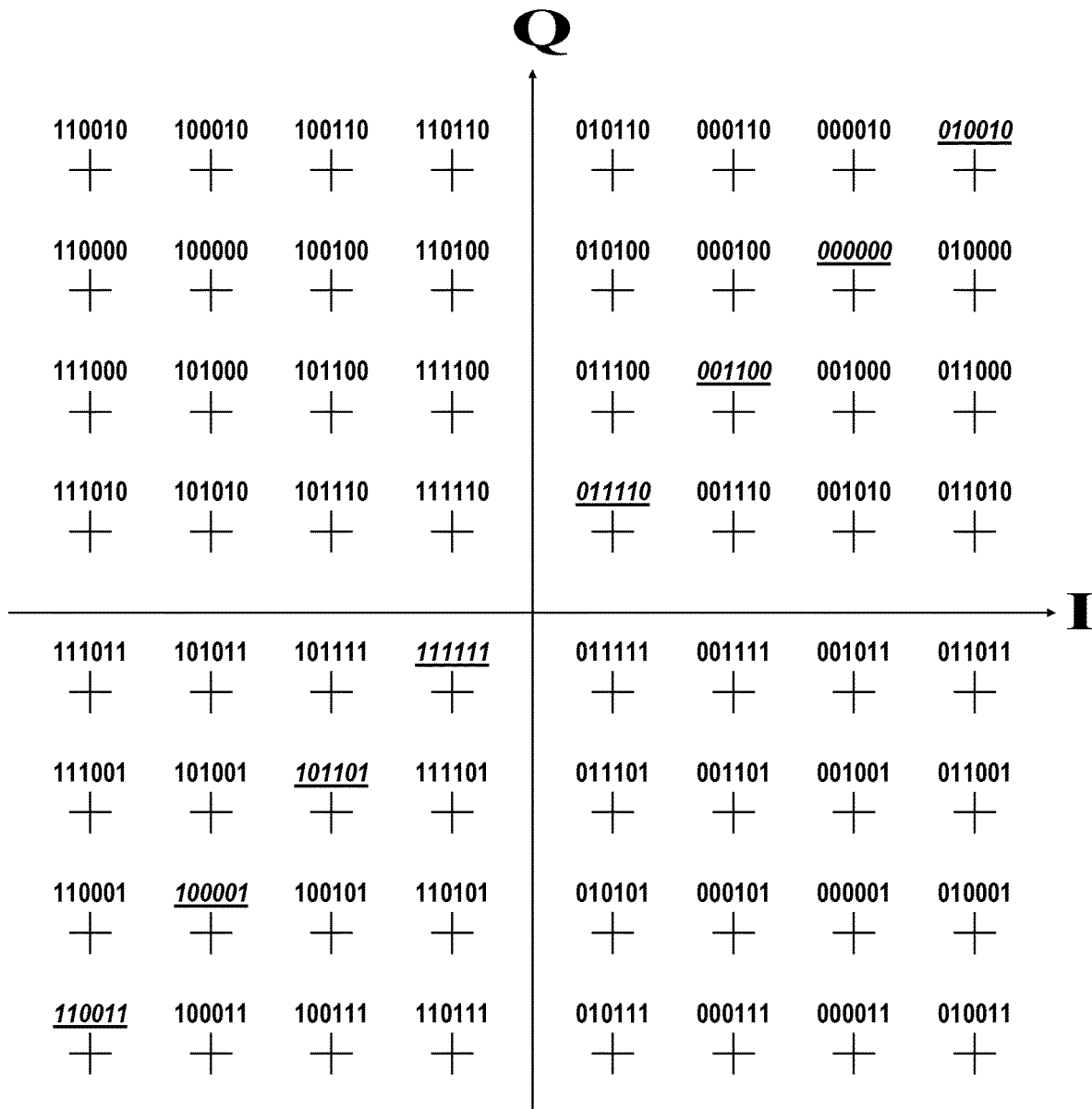
Fig. 46 11th Gray Map of 64QAM
(Labels mirror those of Fig. 47 12th Gray Map of 64QAM)

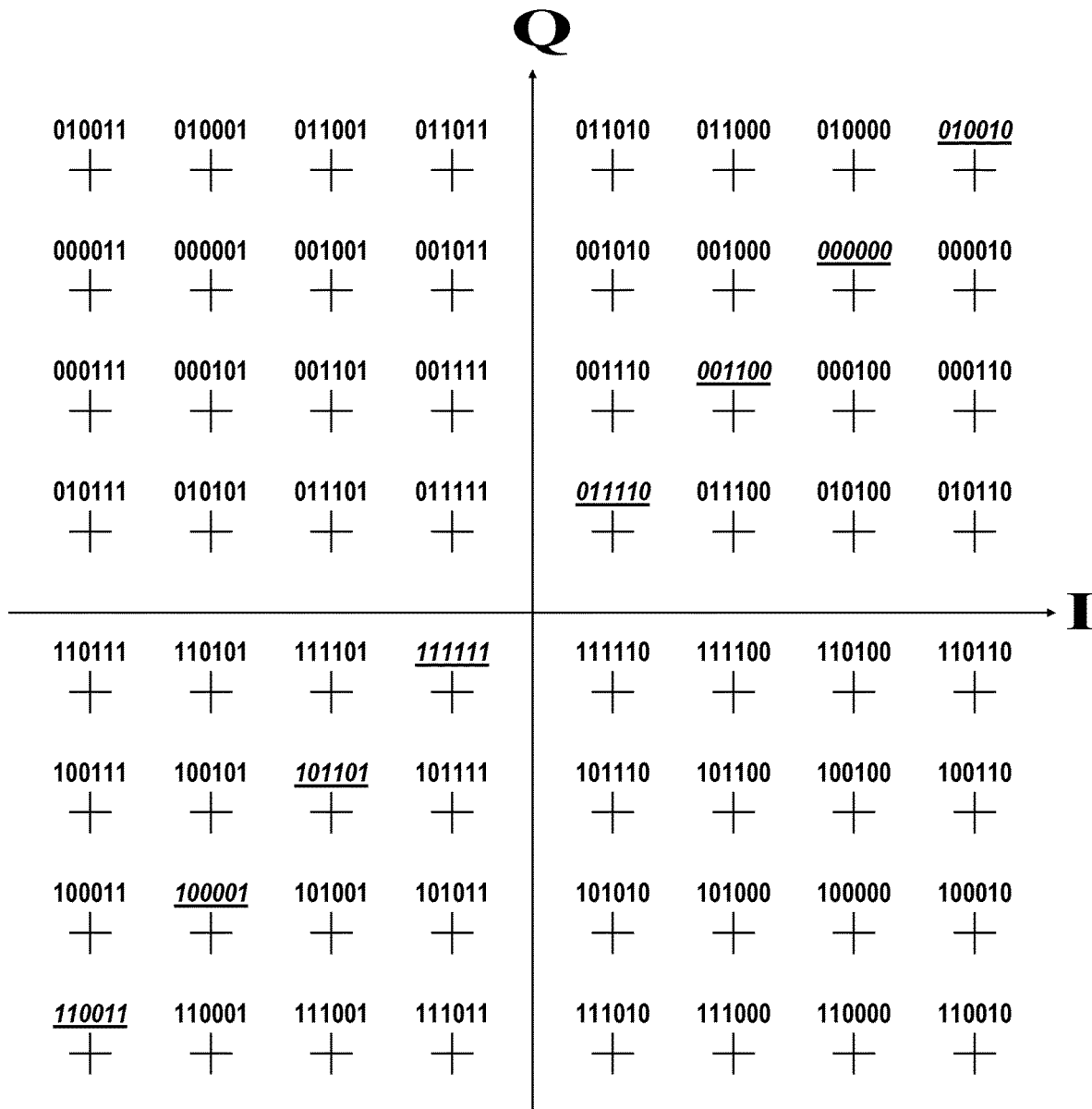
Fig. 47 12th Gray Map of 64QAM
(Labels mirror those of Fig. 46 11th Gray Map of 64QAM)

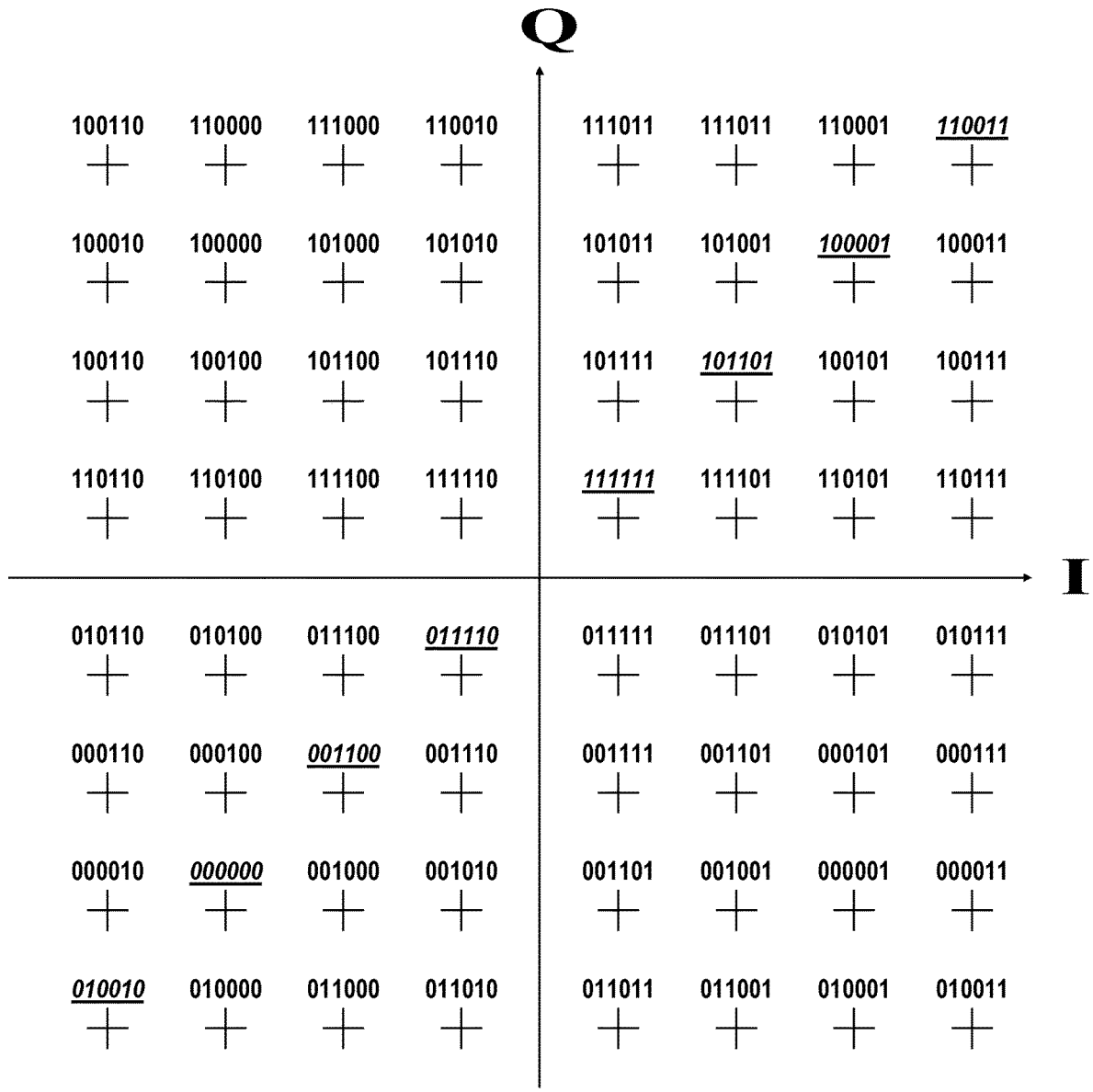
Fig. 48 13th Gray Map of 64QAM
(Constellation of Fig. 46 11th Gray Map of 64QAM flipped over by 180° rotation around 110010 to 010011 diagonal axis)

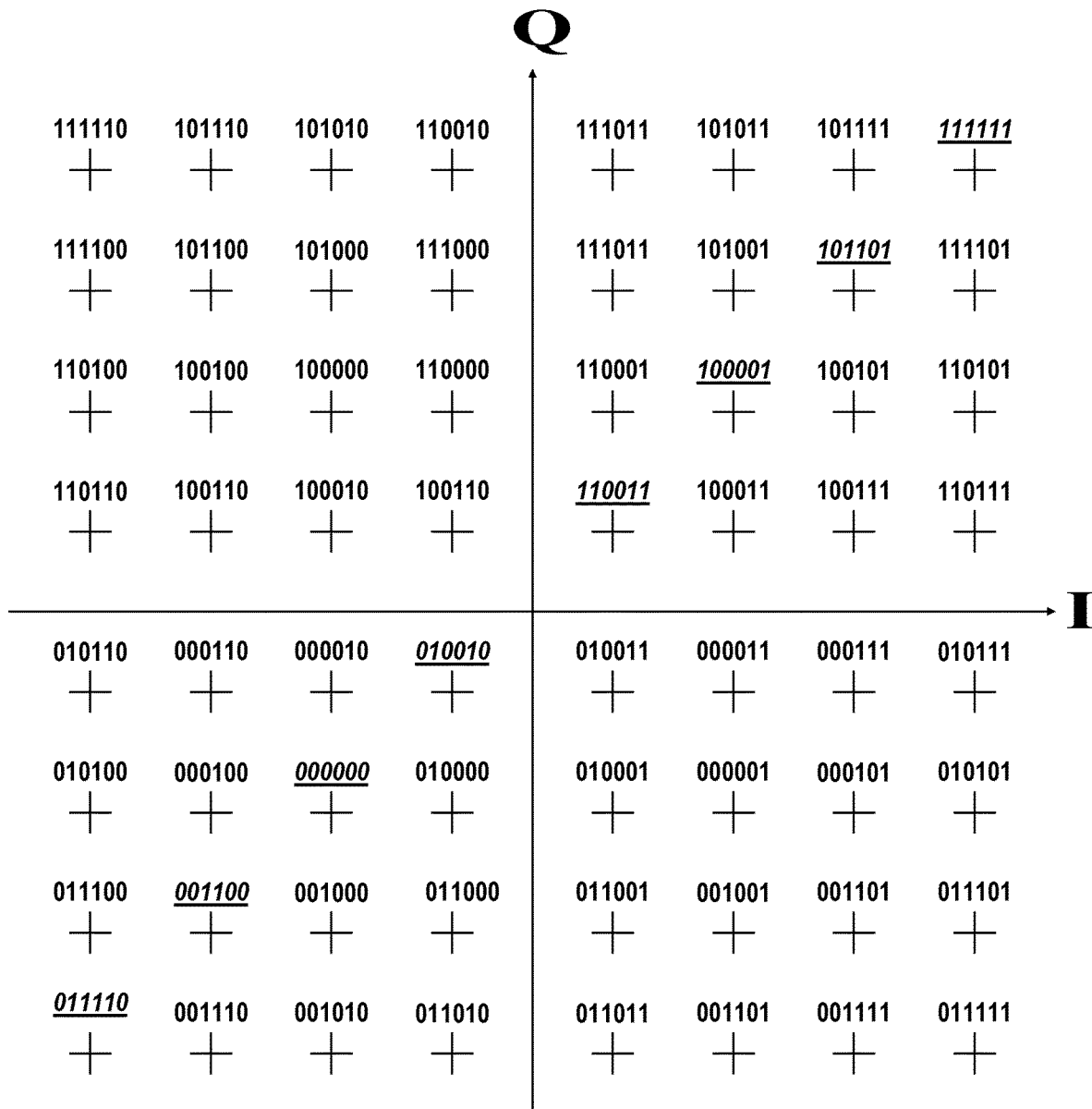
Fig. 49 14th Gray Map of 64QAM
(Labeled quadrants each diagonally twisted from a corresponding one in Fig. 48 13th Gray Map of 64QAM)

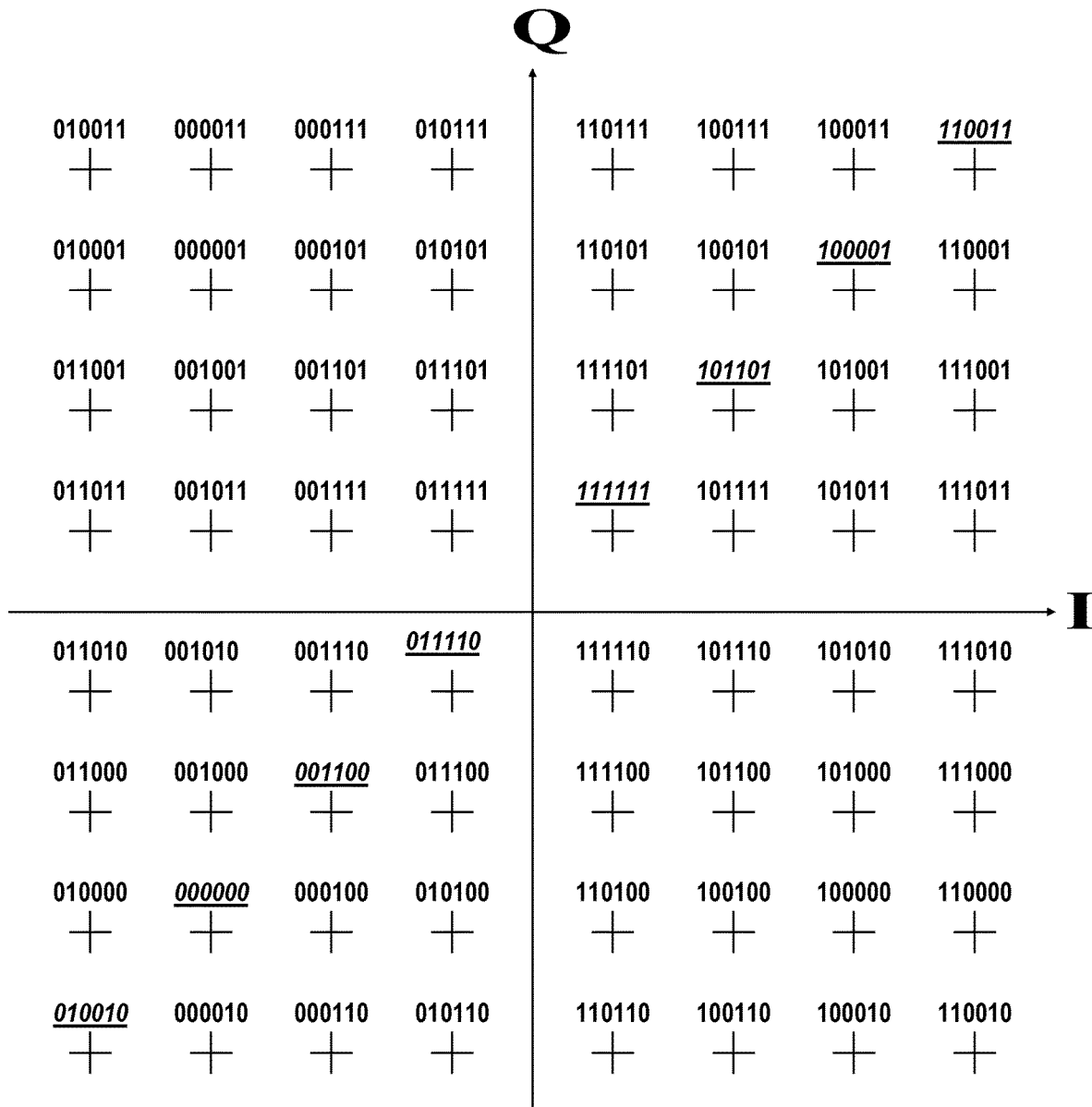
Fig. 50 15th Gray Map of 64QAM
(Constellation of Fig. 47 12th Gray Map of 64QAM flipped over by 180° rotation around 010011 to 110010 diagonal axis)

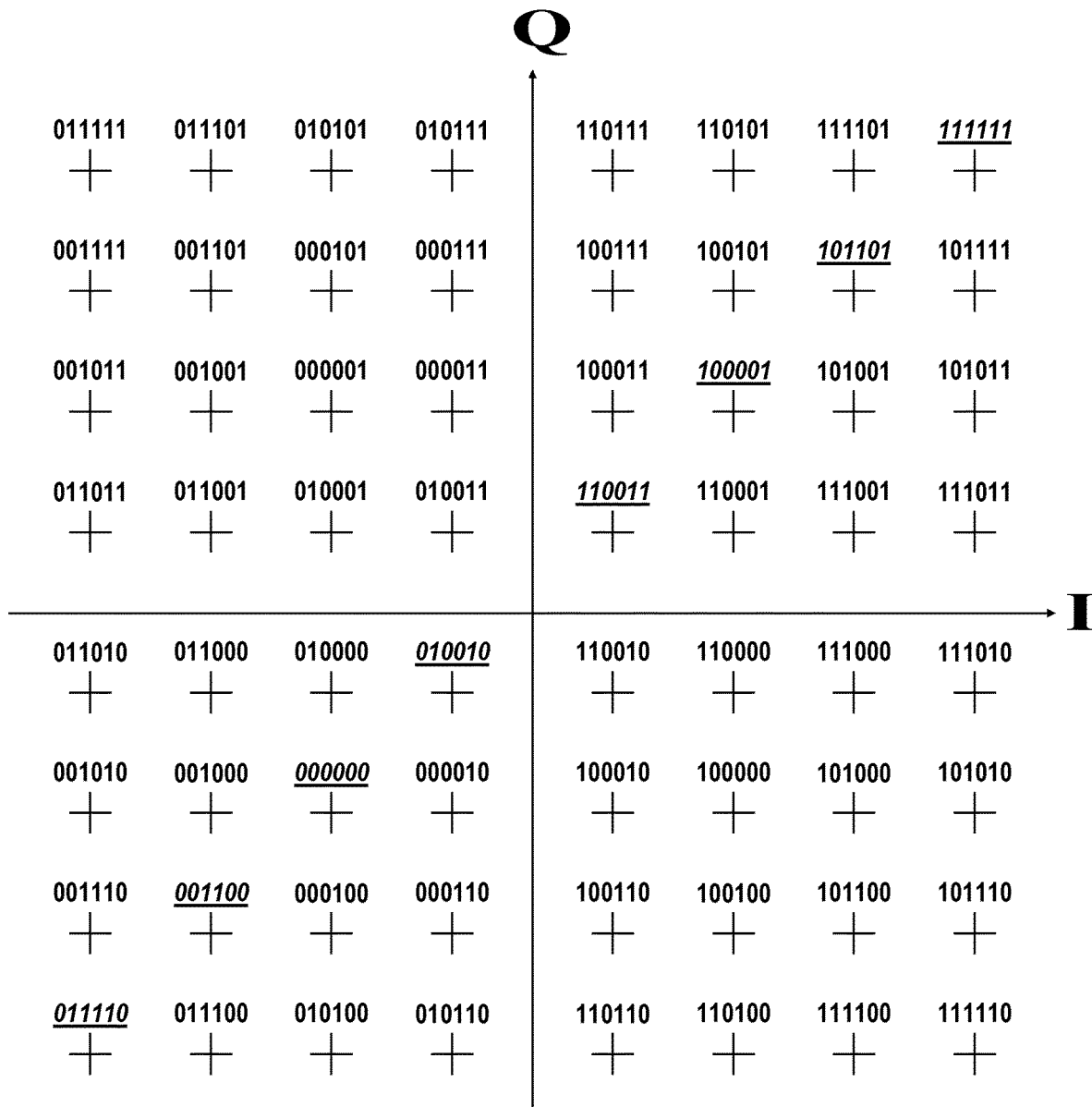
Fig. 51 16th Gray Map of 64QAM
(Labeled quadrants each diagonally twisted from a corresponding one in Fig. 50 15th Gray Map of 64QAM)

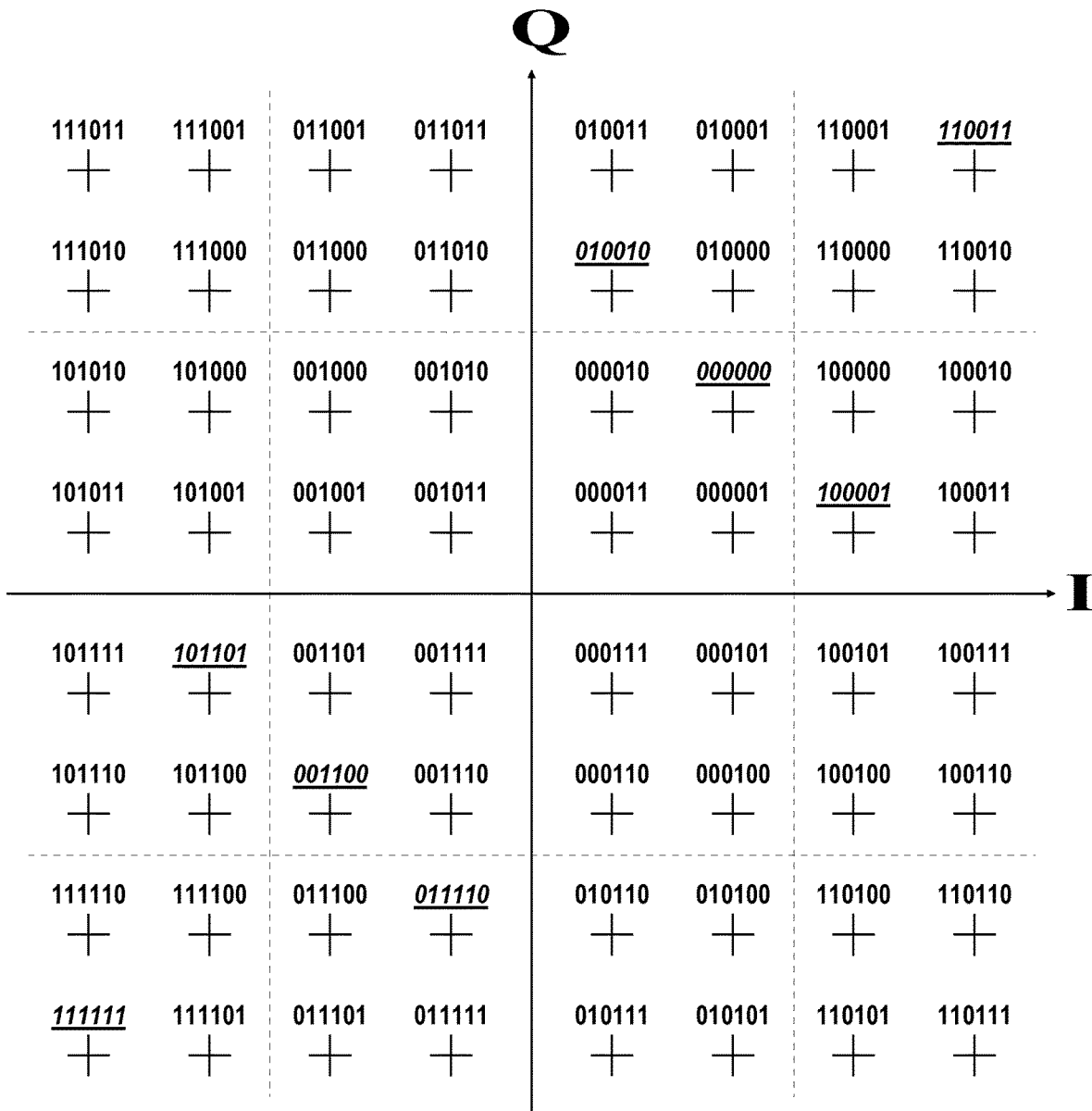
Fig. 52 17th Gray Map of 64QAM
(Labels mirror those of Fig. 53 18th Gray Map of 64QAM)

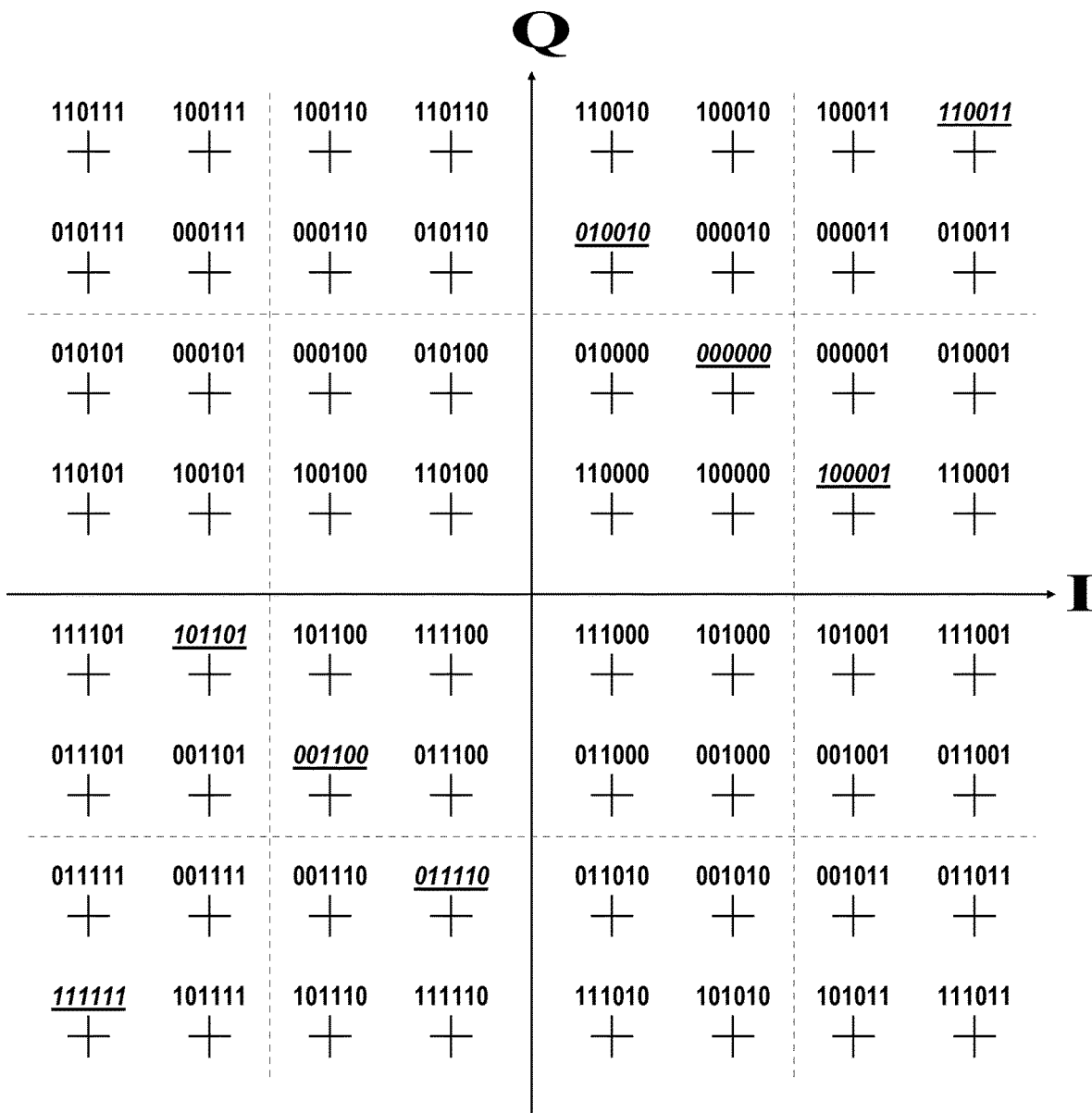
Fig. 53 18th Gray Map of 64QAM
(Labels mirror those of Fig. 52 17th Gray Map of 64QAM)

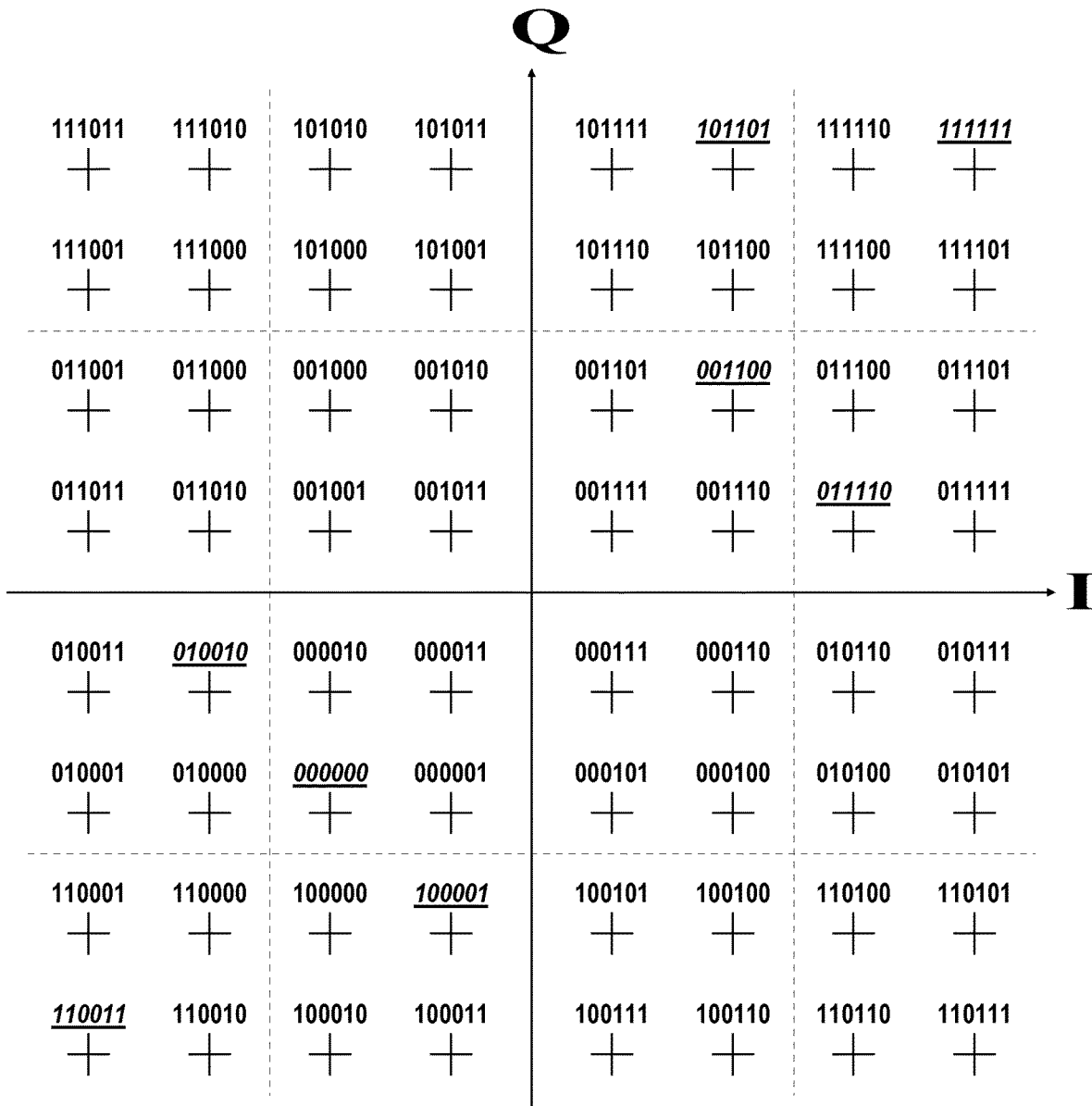
Fig. 54 19th Gray Map of 64QAM
(Constellation of Fig. 52 17th Gray Map of 64QAM flipped over by 180° rotation around 111011 to 110111 diagonal axis)

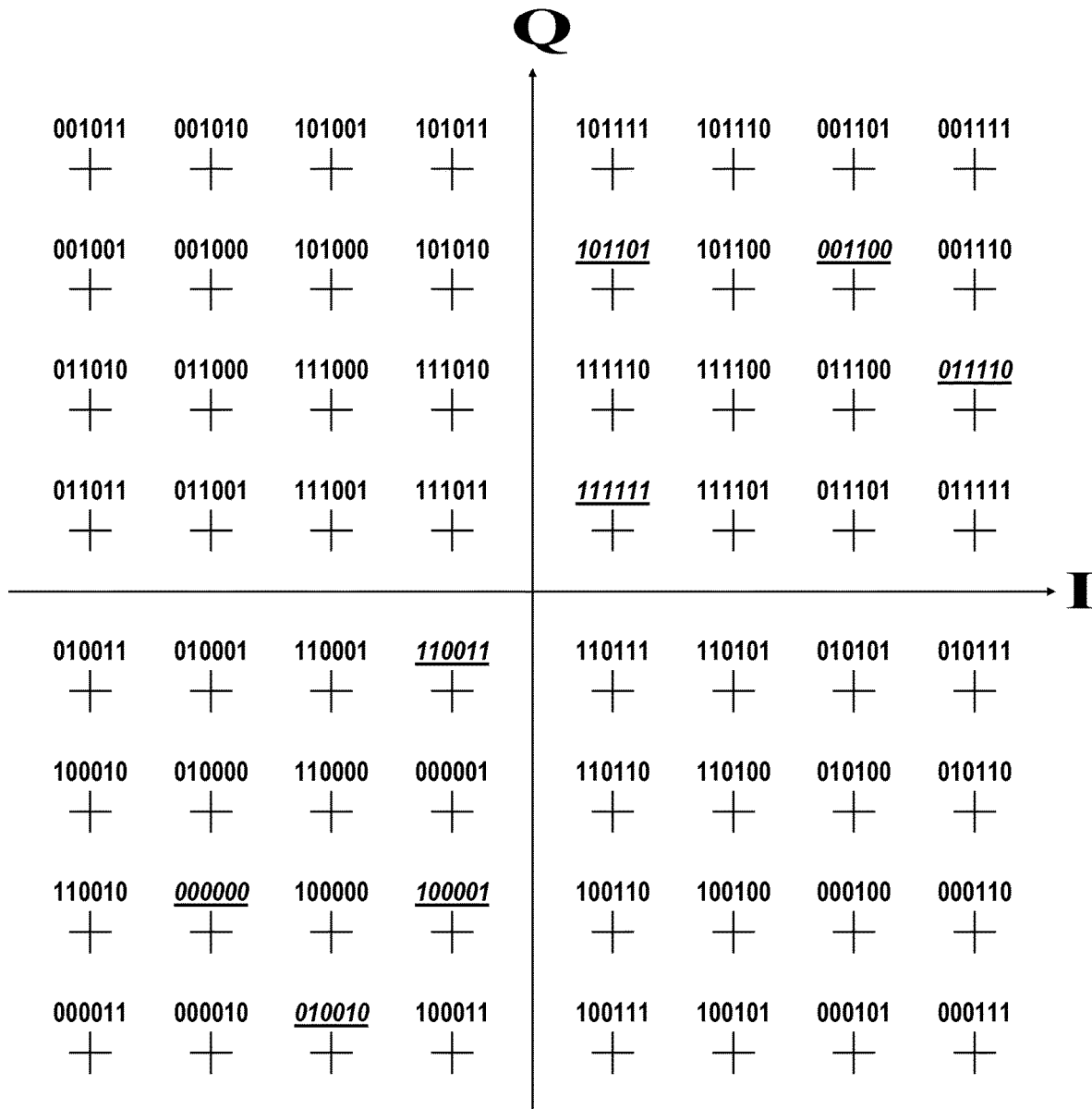
Fig. 55 20th Gray Map of 64QAM
(Labeled quadrants each diagonally twisted from a corresponding one in Fig. 54 19th Gray Map of 64QAM)

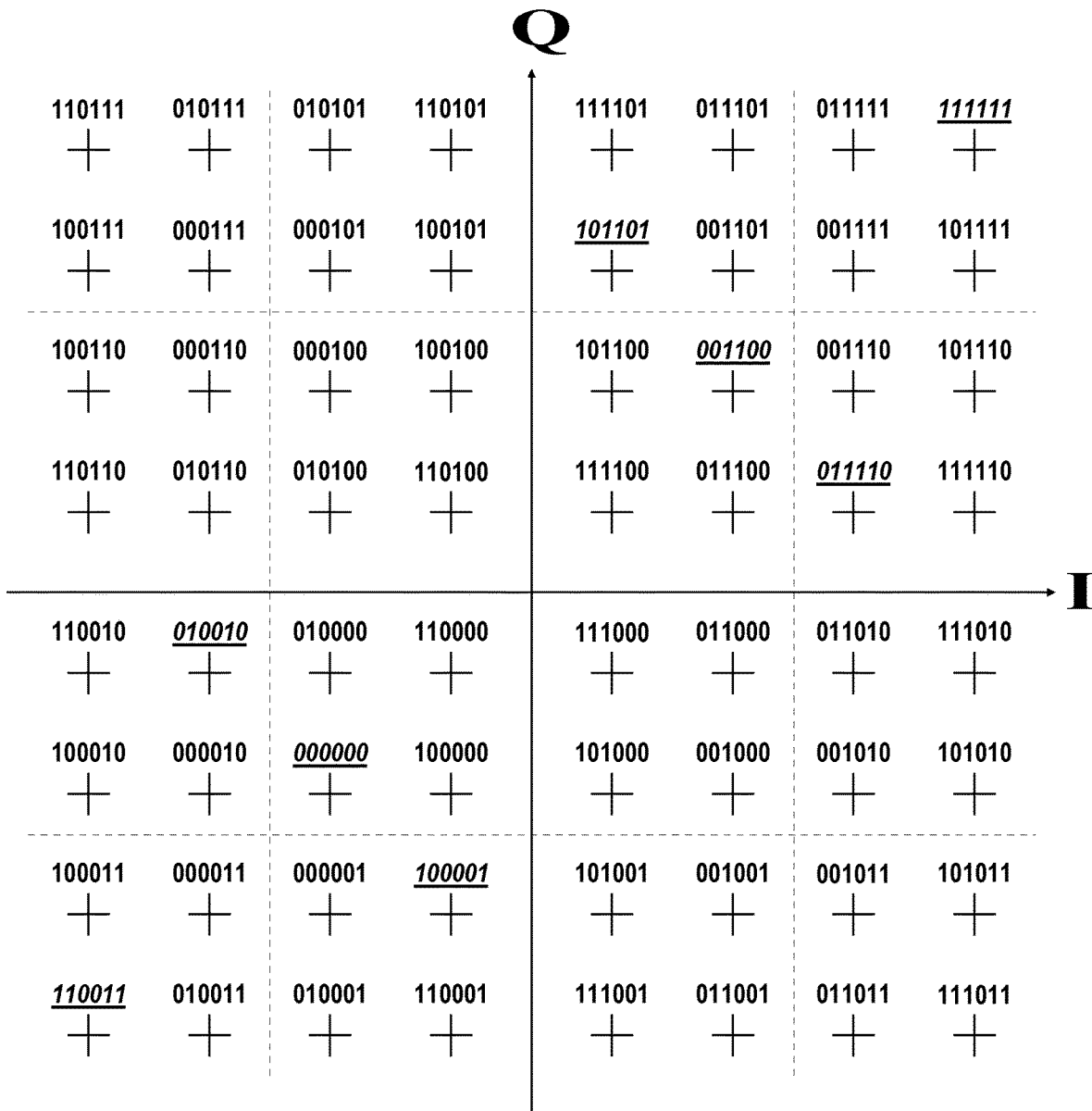
Fig. 56 21st Gray Map of 64QAM
(Constellation of Fig. 53 18th Gray Map of 64QAM flipped over by 180° rotation around 110111 to 1110110 diagonal axis)

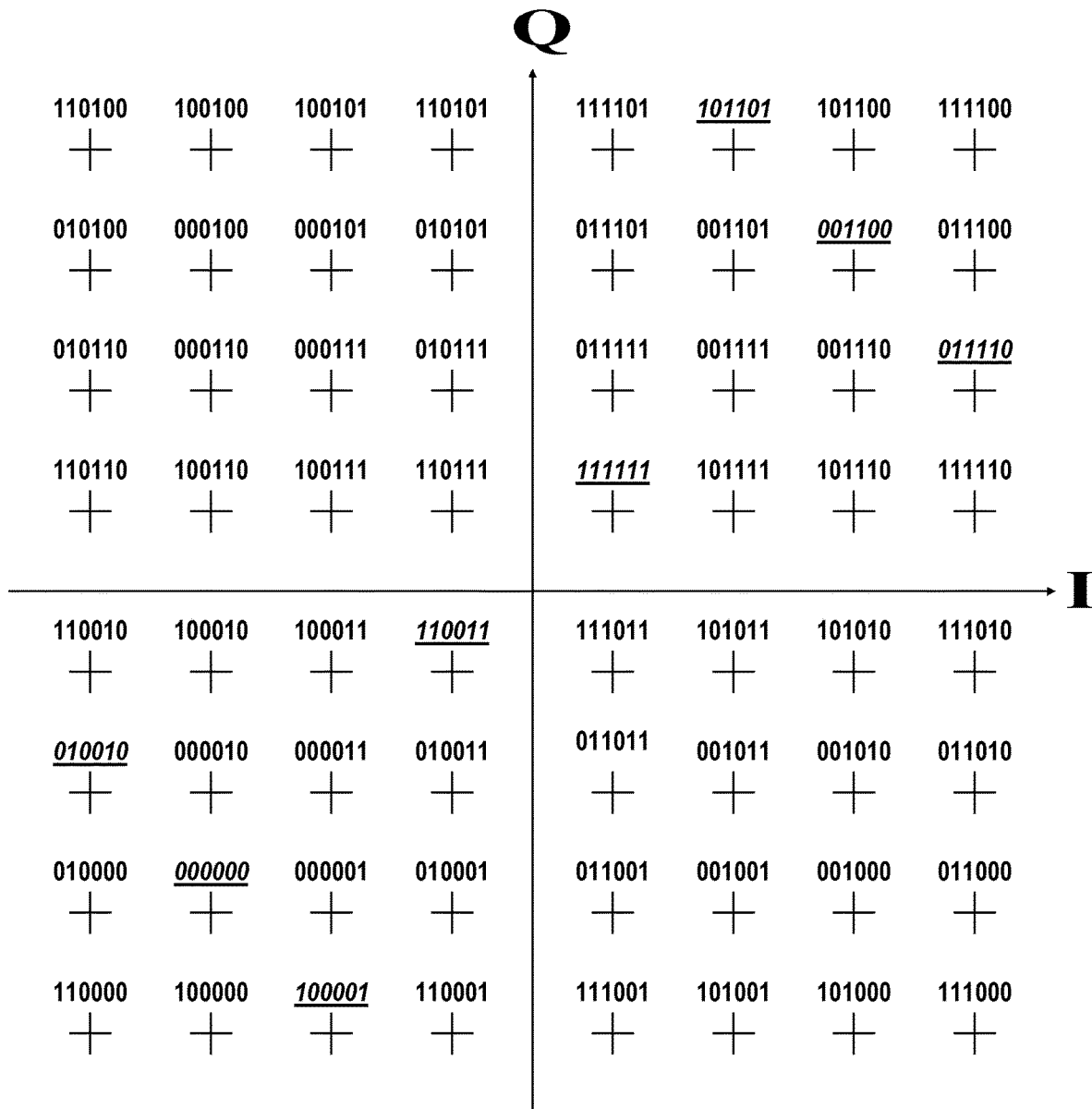
Fig. 57 22nd Gray Map of 64QAM
(Labeled quadrants each diagonally twisted from a corresponding one in Fig. 56 21st Gray Map of 64QAM)

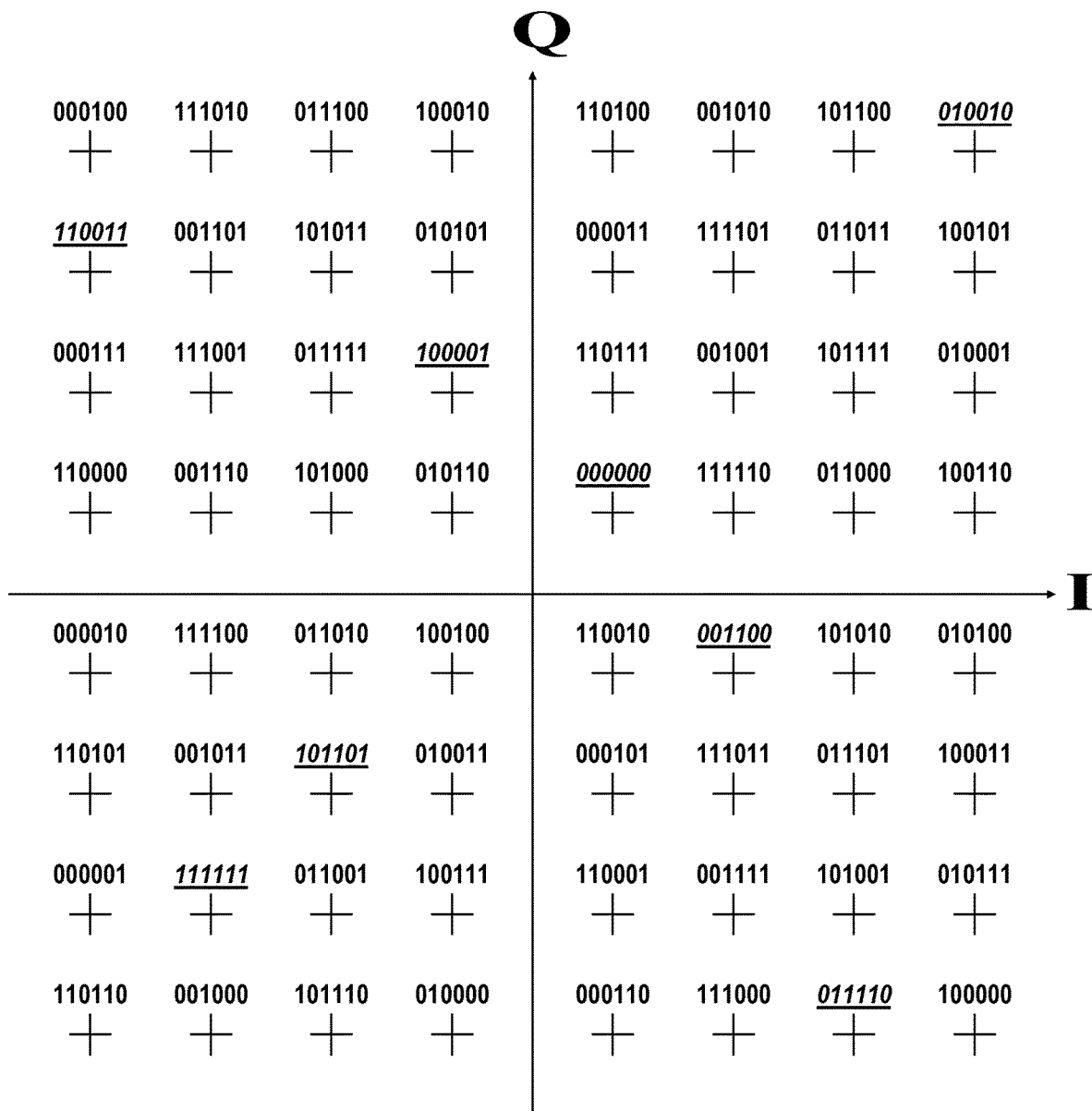
Fig. 58 1st Optimized Map of 64QAM
(As disclosed by K. Govindasamy, H.J. Xu & N. Pillay)

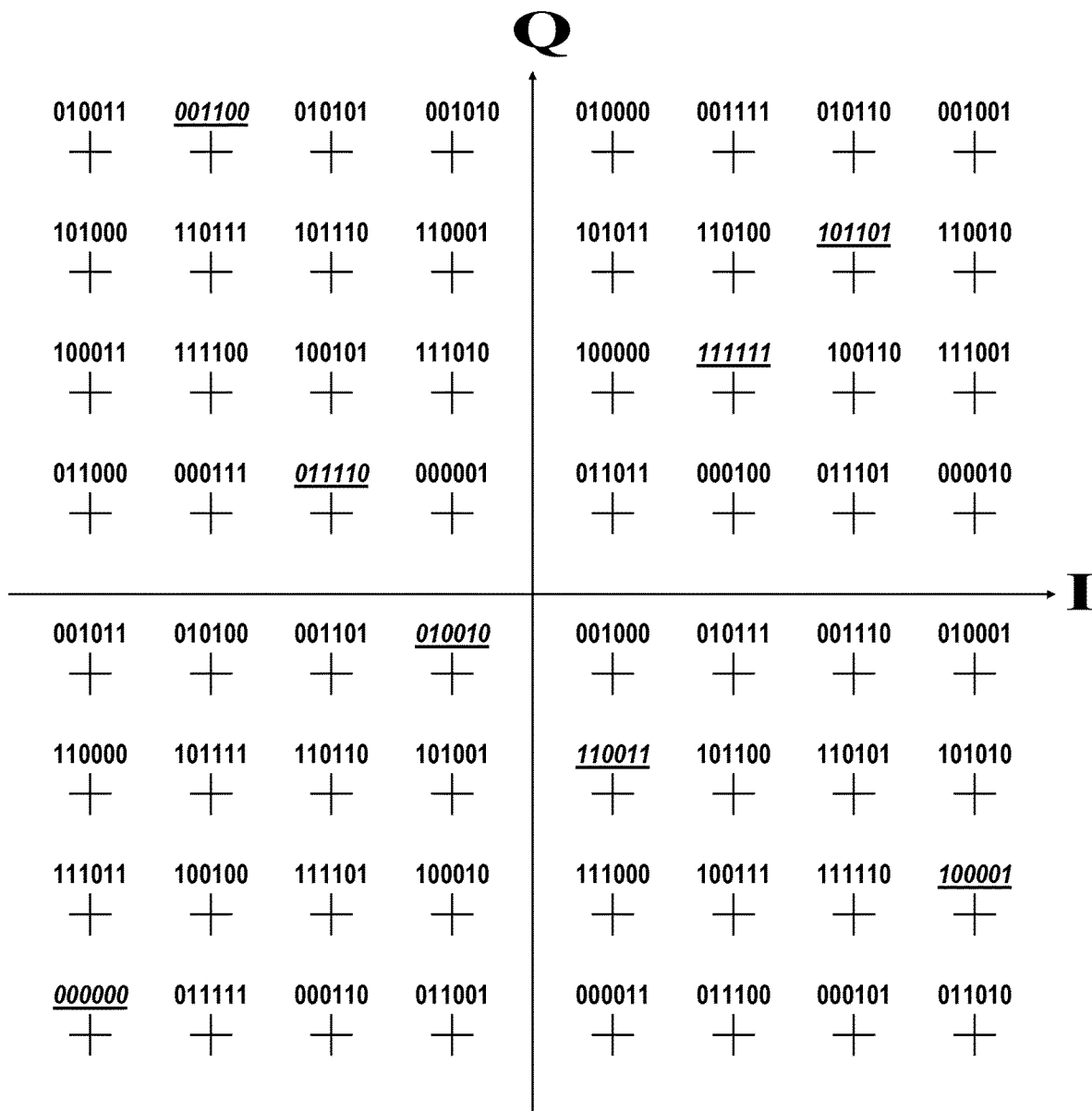
Fig. 59 2ⁿᵈ Optimized Map of 64QAM
(As derived from Fig. 58 1st Optimized Map of 64QAM )

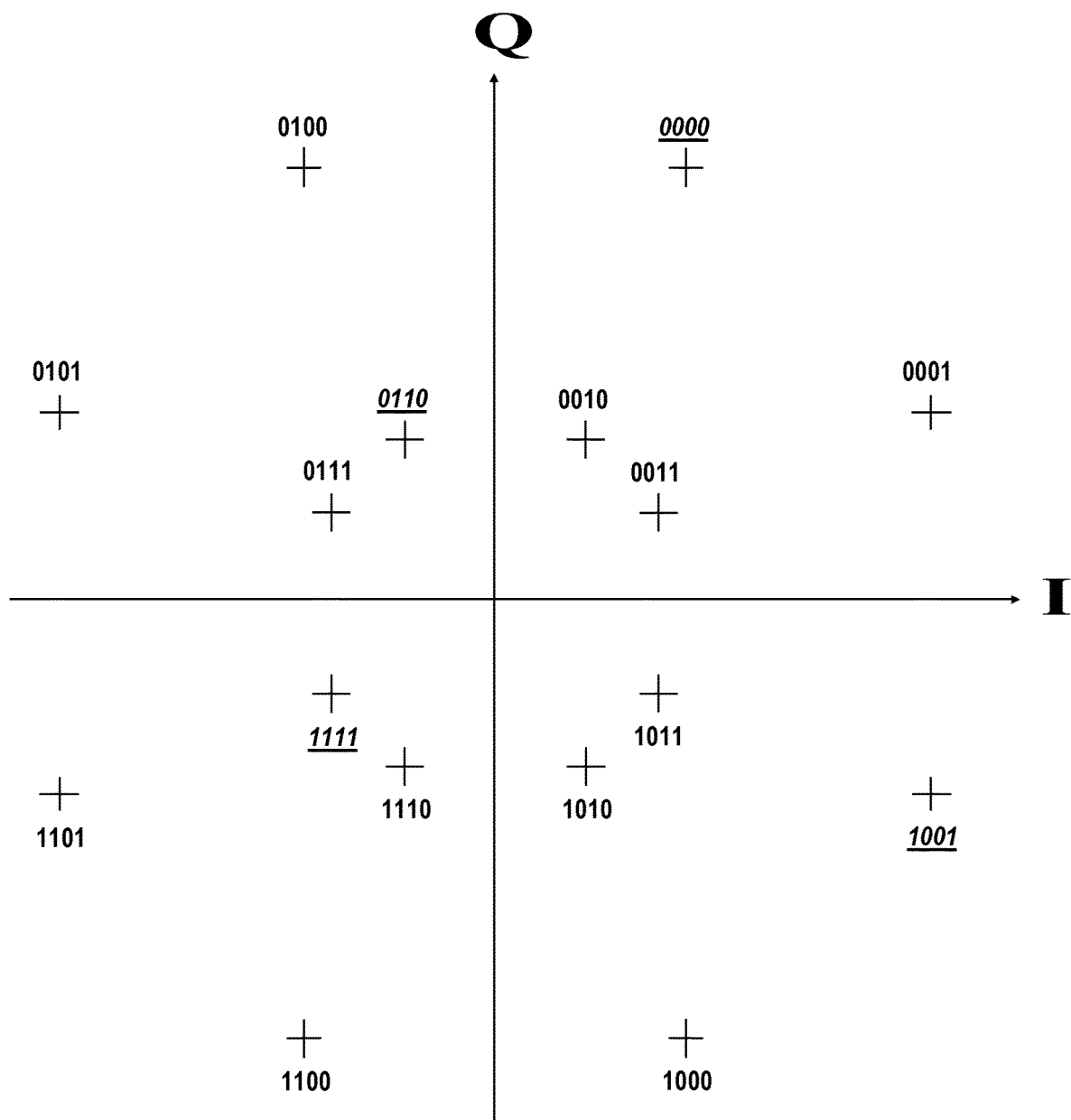
Fig. 60 1st Gray Map of 16APSK
(Labels mirror those of Fig. 61 2nd Gray Map of 16APSK)

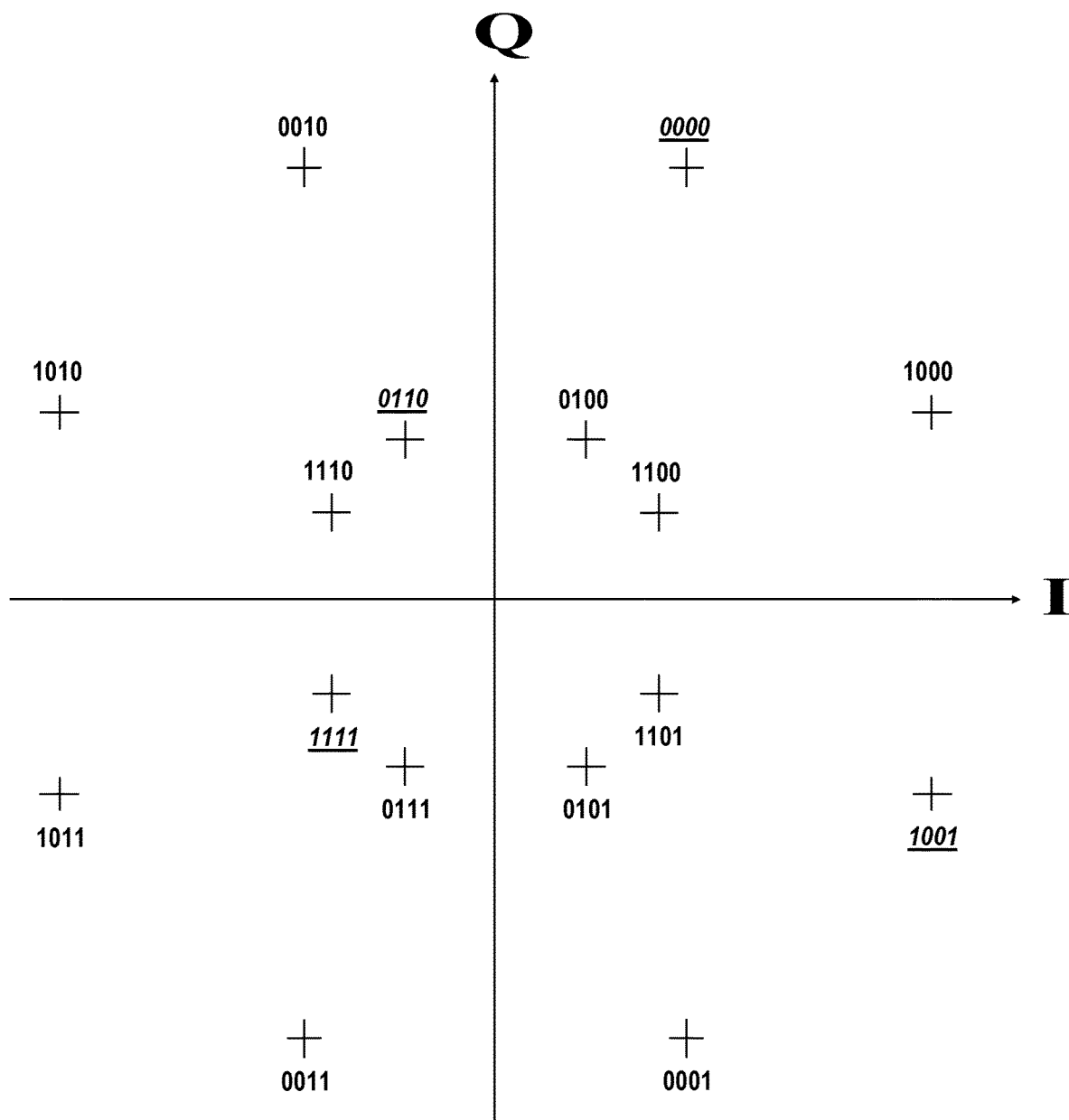
Fig. 61 2ⁿᵈ Gray Map of 16APSK
(Labels mirror those of Fig. 60 1st Gray Map of 16APSK)

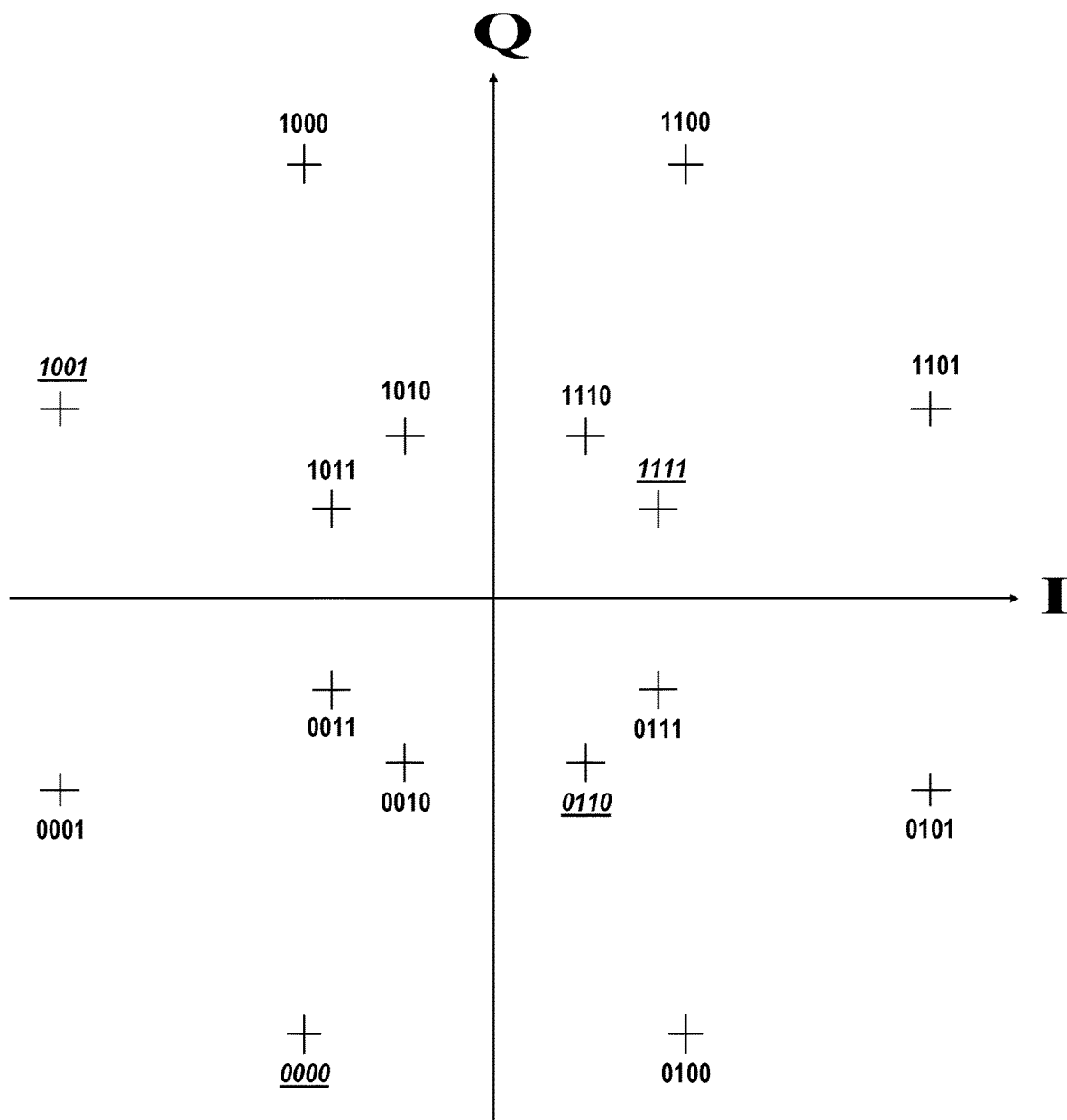
Fig. 62 3rd Gray Map of 16ASPK
(180° rotation of Fig. 60 1st Gray Map of 16APSK)

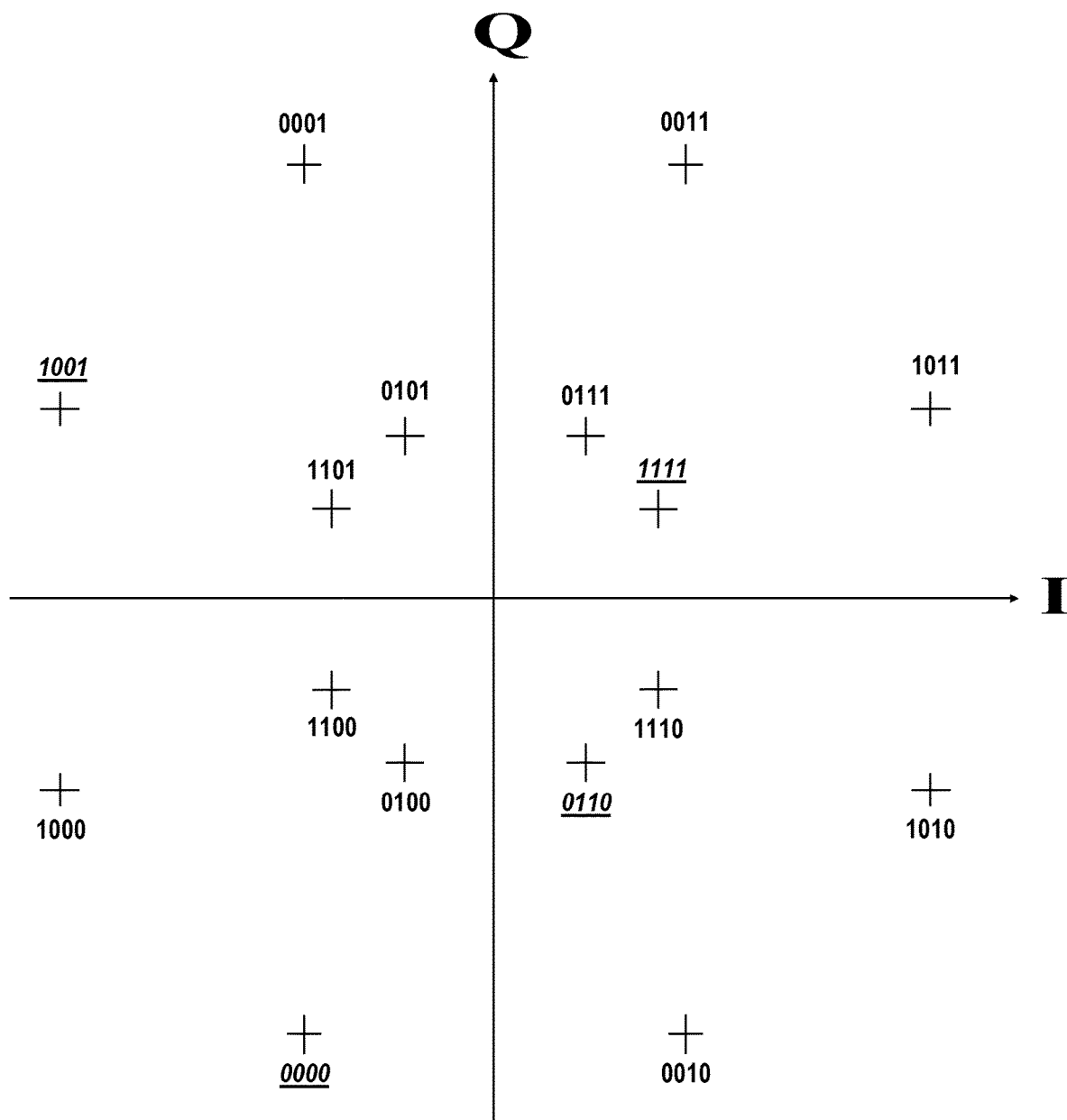
Fig. 63 4th Gray Map of 16ASPK
(180° rotation of Fig. 61 2nd Gray Map of 16APSK)

RECEIVERS FOR COFDM SIGNALS CONVEYING THE SAME DATA IN LOWER- AND UPPER-FREQUENCY SIDEBANDS

This is a continuation-in-part of U.S. patent application Ser. No. 15/641,014 filed 3 Jul. 2017, of U.S. patent application Ser. No. 15/796,834 filed 29 Oct. 2017, and of U.S. patent application Ser. No. 15/960,681 filed 24 Apr. 2018. The contents of each of these patent applications are incorporated herein by reference, if not also in actuality. Application Ser. Nos. 15/796,834 and 15/960,681 were both explicitly abandoned pursuant to petitions filed 19 Jul. 2018.

FIELD OF THE INVENTION

The invention relates to receiver apparatuses for communication systems employing coded orthogonal frequency-division multiplexing (COFDM) modulation, such as a digital television (DTV) broadcasting system, particularly to communication systems wherein the lower and upper halves of the frequency spectrum of the COFDM modulation signal convey the same coded data.

BACKGROUND OF THE INVENTION

The lower and upper halves of the frequency spectrum of the COFDM modulation signal that convey the same coded data mirror each other in double-sideband COFDM (abbreviated as DSB-COFDM). The term asymmetric-sideband COFDM (abbreviated as ASB-COFDM) is used herein to specify COFDM in which the lower and upper halves of the frequency spectrum of the COFDM modulation signal that convey the same coded data do not mirror each other. DSB-COFDM and ASB-COFDM are respective species of COFDM dual-subcarrier-modulation (DCM).

Double-sideband COFDM or DSB-COFDM modulation of radio-frequency (RF) signals has been used several years for over-the-air broadcasting of DTV in accordance with the DVB-T and DVB-T2 Standards for Digital Video Broadcasting in several countries other than the United States of America and Canada. DSB-COFDM RF signals are being broadcast in the Republic of South Korea and in the United States of America in accordance with an ATSC 3.0 Standard developed by the Advanced Television Systems Committee, an industry-wide consortium of DTV broadcasters, manufacturers of DTV transmitter apparatus and manufacturers of DTV receiver apparatus. In over-the-air DTV broadcasting in accordance with any of these standards, the OFDM carriers are transmitted in DSB format as subcarriers of a principal RF carrier that is suppressed in amplitude to some degree.

Prior-art receivers for DSB-COFDM modulated RF signals, such as receivers for DTV broadcasting, have folded the frequency spectrum in half by synchrodyne to baseband before discrete Fourier transformation (DFT) and subsequent demapping of the quadrature amplitude-modulation (QAM) of COFDM signal subcarriers. The constructive combining of mirrored OFDM subcarriers improves the signal-to-noise ratio (SNR) of reception over an additive-white-Gaussian-noise (AWGN) channel by 6 dB.

Receivers that demodulate the lower and upper halves of the frequency spectrum of a DSB-COFDM modulated RF signal independently of each other, thus to avoid the folding of frequency spectrum in synchrodyning to baseband, are described in U.S. patent application Ser. No. 15/641,014 filed by Allen LeRoy Limberg on 3 Jul. 2017 and titled "Double-sideband COFDM signal receivers that demodulate unfolded frequency spectrum". This patent application prescribed respective discrete Fourier transform (DFT) of the lower and the upper halves of the frequency spectrum of the COFDM modulation signal. The sets of QAM symbols from those two halves of that frequency spectrum are demapped separately, and then their corresponding QAM-map labels are diversity combined. (DSB-COFDM modulation affords some frequency diversity that can help receivers as described in U.S. patent application Ser. No. 15/641,014 to overcome some frequency-selective fading and narrowband interference, so long as neither affects the more central frequencies of the transmission channel.)

The diversity combining performed by the receivers described in U.S. patent application Ser. No. 15/641,014 includes combining soft bits of corresponding QAM-map labels in accordance with the respective amplitudes of their QAM symbols prior to channel equalization, thus to improve SNR of reception over an AWGN channel by 8.5 dB. This improvement is 2.5 dB better than the 6 dB improvement obtained by QAM symbol averaging, as obtains in synchrodyning procedures that fold the frequency spectrum of the DSB-COFDM signal in half. This 2.5 dB better SNR is in line with observations concerning multiple-in/multiple-out (MIMO) reception of COFDM modulation signals from plural-antenna arrays, as reported in U.S. Pat. No. 7,236,548 titled "Bit level diversity combining for COFDM system" issued 26 Jun. 2007 to Monisha Ghosh, Joseph P. Meehan and Xuemei Ouyang.

U.S. patent application Ser. No. 15/685,965 filed by Allen LeRoy Limberg on 24 Aug. 2017 and titled "Communication systems using independent-sideband COFDM" concerns transmitters and receivers for certain ASB-COFDM signals. In these certain ASB-COFDM signals the QAM of subcarriers in the lower-frequency half of the signal frequency spectrum convey the same coded data as the QAM of subcarriers in the upper-frequency half of the signal frequency spectrum. U.S. patent application Ser. No. 15/685,965 posits that symbol recombination techniques known to be advantageous in connection with transmitting coded data twice in respective DSB-COFDM signals can be adapted for securing similar advantages in connection with ASB-COFDM modulated RF signal that transmits similar coded data in both the lower-frequency and upper-frequency halves of its frequency spectrum. I.e., Limberg discerned that teachings in regard to techniques for hybrid automatic repeat request (HARQ) and for MIMO could have more general application, particularly with regard to ASB-COFDM modulated RF signal transmitting similar coded data in both the lower-frequency and upper-frequency halves of its frequency spectrum.

By way of specific example, U.S. patent application Ser. No. 15/685,965 pointed out that ASB-COFDM signals can be designed to transmit dissimilar respective mapping patterns in two sets of QAM symbols transmitted parallel in time. Such procedure is adapted from that known for mobile communications using QAM signals directly for transmission and reception. The dissimilarity in the respective mapping patterns in two sets of QAM symbols transmitted parallel in time is referred to as "labeling diversity".

Labeling diversity (sometimes referred to as "symbol recombination") can be designed to support a bit-reliability-averaging (BRA) procedure. Bits more likely to experience error in lattice-point labels of the mapping pattern for the first set of symbol constellations correspond to bits less likely to experience error in lattice-point labels for the second set of symbol constellations. Bits less likely to experience error in lattice-point labels of the mapping pattern for the first set of symbol constellations correspond to bits more likely to experience error in lattice-point labels for the second set of symbol constellations. The BRA procedure is implemented in a receiver by diversity combining pairs of corresponding labels from the first and second sets of symbol constellations, using a procedure known as "soft-bit maximal ratio combining" or "SBMRC". Akram Bin Sediq and Halim Yanikomeroglu described such procedure in a paper titled "Performance Analysis of Soft-Bit Maximal Ratio Combining in Cooperative Relay Networks", which was published in *IEEE Transactions on Wireless Communications* (Volume: 8, Issue: 10, October 2009), pp. 4934-4939. Receivers for two sets of QAM symbols transmitted parallel in time can thus be designed to exploit labeling diversity to achieve shaping gain significantly larger than that which can be secured from NuQAM—i.e., QAM with non-uniform spacing between labeled points in the QAM symbol constellation mapping. De-mapping QAM with uniform spacing between labeled points can be done more simply than de-mapping QAM with non-uniform spacing between labeled points. Also, NuQAM requires forward-error-correction (FEC) code rates not significantly greater than ½ in order to provide shaping gain, while BRA provides significant shaping gains at higher FEC code rates.

In June 2005 a paper "Symbol mapping diversity design for multiple packet transmissions" authored by Harvind Samra, Zhi Ding, Peter M. Hahn was published in *IEEE Transactions on Communications* Vol. 53, No. 5, pp. 810-817. The Samra et al. paper presented a simple, but effective method of enhancing and exploiting diversity from multiple packet transmissions in systems that employ nonbinary linear modulations such as phase-shift keying (PSK) and quadrature amplitude modulation (QAM). This diversity improvement results from redesigning the symbol mapping for each packet transmission. Symbol mapping diversity (SMD) requires a small increase in receiver complexity, but provides very substantial reductions of bit error rate when applied to additive white Gaussian noise (AWGN) and flat-fading channels. The general SMD concept was later incorporated in multiple-input/multiple-output (MIMO) and multiple-input/single-output (MISO) communication systems, but was referred to as "labeling diversity".

Panasonic Corporation sent a paper titled "Enhanced HARQ Method with Signal Constellation Rearrangement" to the TSG-RAN Working Group 1 for discussion during its Meeting #19 held Feb. 27-Mar. 2, 2001 in Las Vegas, Nev., USA. Combining two 16QAM transmissions with labeling diversity between the labeling of the lattice points in their respective square 16QAM symbol constellations was reported to provide a 1.2 dB advantage over Chase combining two 16QAM transmissions without labeling diversity. Combining two 64QAM transmissions with labeling diversity between the labeling of the lattice points in their respective square 64QAM symbol constellations was reported to provide a 1.8 dB advantage over Chase combining two 64QAM transmissions without labeling diversity. Turbo coding rate was ¾, both for 16QAM transmissions and for 64QAM transmissions. The Panasonic Corporation paper was not directed to COFDM signals.

In Gray mapping of QAM and APSK, the plural-bit labels of immediately adjacent lattice points differ in only a single one of their bits. With regard to Gray mapping 16QAM symbols, it has been shown that a constellation rearrangement approach improves the performance if two or more versions of the same word are transmitted. The constellation rearrangement scheme for Gray mapping is based on different levels of reliability for the bits, depending on the position of the selected 16QAM symbols within the constellation. Consequently, the rearrangement rules focus on changing the location of the rearranged version of the QAM symbol to achieve an averaging effect of the levels of reliability. First and second sets of QAM symbols transmitted parallel in time are labeled such that the labeling of each set of QAM symbols bits more likely to experience error in the labeling of each set of QAM symbols is in accordance with the bits less likely to experience error in the labeling in the other set of QAM symbols. For details on constellation rearrangement for 16-QAM Gray mapping, one is referred to U.S. Pat. No. 7,920,645 titled "Data transmissions in a mobile communication system employing diversity and constellation rearrangement of a 16 QAM scheme" granted 5 Apr. 2011 to Alexander Golitschek Edler Von Elbwart, Christian Wengerter and Isamu Yoshi. U.S. Pat. No. 7,957,482 titled "Bit-operated rearrangement diversity for AICO mapping" granted 7 Jun. 2011 to Alexander Golitschek Edler Von Elbwart, Christian Wengerter and Isamu Yoshi describes more extensively the use of labeling diversity for more than one set of 16QAM symbols transmitted parallelly in time. (AICO is the acronym for "Antipodal Inverted Constellation".) The Von Elbwart et alii patents were not directed to COFDM signals.

A 2015 paper "Labeling Diversity for 2×2 WLAN Coded-Cooperative Networks" authored by Saqib Ejaz, Feng-Fan Yang and Hong-Jun Xu was published in Radio Engineering, Vol. 24, No. 2, pp. 470-479. Wireless local area networks (WLAN) utilize OFDM signals, and this Ejaz et alii paper considers labeling diversity in QAM of OFDM signals employed in MIMO networks. This Ejaz et al. paper does not propose the application of labeling diversity to QAM of respective sets of OFDM subcarriers within a single COFDM DCM signal. This Ejaz et alii paper does aver that the general idea of labeling diversity can be extended to other high order modulation schemes besides 16QAM. This Ejaz et al. paper reports that labeling diversity has shown promising BER performance improvements in systems without labeling diversity, and that labeling diversity also lowers the Error Floor (EF) region by ensuring error-free feedback during the iterative decoding process.

Mappings that maximize labeling diversity in 16QAM symbol constellations were disclosed specifically by Maciej Krasicki in his paper "The essence of 16-QAM labeling diversity" published 11 Apr. 2013 in *Electronics Letters*, Vol. 49, issue 8, pp. 567-569. Maps for such a mapping will be referred to as optimal-SMD maps in this specification, its accompanying claims, and FIGS. 27 and 28 of its drawings. Krasicki described his work in more detail in a 20 Feb. 2015 open-access on-line Springerlink publication titled "Algorithm for Generating All Optimal 16-QAM BI-STCM-ID Labelings". This publication focused on 16-QAM labelings of bit-interleaved space-time coded modulation with iterative decoding (BI-STCM-ID), describing an algorithm to generate (without need for random search) optimal labelings for BI-STCM-ID systems with any number of transmit and receive antennas, transmitting over a Rayleigh-fading channel.

U.S. patent application Ser. No. 15/685,965 pointed out that bit-reliability averaging (BRA) of QAM symbols can be advantageously applied to COFDM DCM signals, thus to advance such art significantly. As contrasted to transmitting one set of consecutive NuQAM symbols a single time to obtain shaping gain, BRA has one significant disadvantage. BRA involves transmission of two sets of consecutive QAM symbols conveying similar FEC-coded data, which double transmission halves data throughput for given channel bandwidth. However, BRA does not further reduce data throughput for given channel bandwidth in ASB-COFDM in which the lower and upper halves of the frequency spectrum of the COFDM modulation signal convey the same coded data. Data throughput for given channel bandwidth can be the same as for DSB-COFDM.

In some types of COFDM DCM signals, all pairs of subcarriers each conveying the same coded data have uniform spacing between the subcarriers of each pair. This enables receivers as described in U.S. patent application Ser. No. 15/685,965 to overcome some frequency-selective fading and narrowband interference, even if it affects the more central frequencies of the transmission channel. This reduces the need for forward-error correction coding of data to be done at as low a code rate as for DSB-COFDM.

Patent application US-20170104553-A1 published 13 Apr. 2017, titled "LDPC Tone Mapping Schemes for Dual-Sub-Carrier Modulation in WLAN" and claiming an original filing date of 11 Oct. 2016 for inventors Jian-Han Liu, Sheng-Quan Hu, Tian-Yu Wu and Thomas Edward Pare, Jr. describes a species of ASB split-spectrum COFDM modulation signal which utilizes dual subcarrier modulation (DCM). The DCM modulates the same information on a pair of subcarriers, which can be separated in frequency to improve frequency diversity in OFDM systems. Such separation is re improves reliability of reception, especially when there are narrow-band interferences, according to US-20170104553-A1. US-20170104553-A1 describes respective mappings of the sets of 16QAM symbols transmitted parallelly in time, which mappings are similar to each other.

Undesirably large peak-to-average-power ratio (PAPR) has long been a well-known problem in regard to over-the-air (OTA) multiple-carrier radio-frequency (RF) signal transmissions, such as the COFDM signals used for digital television (DTV) broadcasting. The average power of the DTV transmissions has to be held back substantially to avoid frequent occurrence of non-linearity and clipping in the amplifiers for COFDM symbols. Such effects cause undesirable spectrum spreading. Typically, average power is held back 10 to 15 dB or so. A variety of techniques to reduce PAPR in OFDM transmissions, so that average power need not be held back as much, have been proposed in the prior art. However, most of these techniques have at least one shortcoming and have not been used very much, if at all, in commercial OTA DTV broadcasting.

Simply clipping peaks of baseband COFDM signals is one technique used in the prior art to limit PAPR, but it introduces bit errors into the baseband COFDM signals recovered by a receiver. These bit errors are corrected insofar as possible during decoding of FEC coding. The need for such correction undesirably reduces the capability of the decoding of FEC coding to correct other errors in the received baseband COFDM signals, such as those attributable to accompanying noise or short-duration diminution in the strength of received signal. The clipping procedures tend to generate out-of-band radiation, which should be taken into consideration in the design of passband filtering for the COFDM transmitter. Also, there tends to be a problem with re-growth of peaks in the digital-to-analog conversion, which re-growth taxes subsequent band filtering procedures. If the coded data conveyed by the baseband COFDM signals has been randomized, very large peaks in their power are unlikely to occur as frequently, so clipping of them in the linear power amplifier of a transmitter may be tolerated if adequate band filtering procedures follow.

Selected portions of the transmitted COFDM signals can be transmitted at reduced power to reduce the energy of their peaks. Such schemes require both transmitter and receivers to be of more complex construction; and side information concerning the pattern of reduced power of transmission must be conveyed from the transmitter to the receivers. Such side information undesirably tends to reduce data throughput.

In other schemes the COFDM transmitter switches QAM symbols around in several patterns, the pattern that offers the lowest PAPR being selected for transmission. Such schemes also require both transmitter and receivers to be of more complex construction; and side information concerning the pattern of symbol switching must be conveyed from the transmitter to the receivers. Such side information undesirably tends to reduce data throughput.

To avoid the necessity of transmitting side information, other PAPR reduction techniques have been pursued, in which some of the OFDM carriers are used for PAPR reduction purposes rather than for data transmission. Reserved tones are inserted, the respective modulations of these dummy carriers being calculated so as to reduce PAPR. This comes at the cost of reduced data throughput, however. Typically this reduction in data throughput is of the order of 10% or so.

U.S. Pat. No. 8,040,963 titled "Method for reducing peak-to-average power ratio in an OFDM transmission system" claiming a 20 Oct. 2006 priority date was granted 18 Oct. 2011 to Ondrej Hlinka, Ondrej Hrdlicka and Pavol Svac. The patent describes PAPR reduction based on a complementary parity coding in which the coding rules are derived from an appropriate auto-correlation property of transmitted symbol sequences. The techniques were also described by P. Svac and O. Hrdlicka in a paper titled "A high peak-to-average power ratio reduction in OFDM systems by ideal N/2-shift aperiodic auto-correlation property" presented as part of the Joint IST Workshop on Mobile Future, 2006 within the Symposium on Trends in Communications '06 held 24-27 Jun. 2006 in Bratislava, Slovakia. This paper and U.S. Pat. No. 8,040,963 assert that a significant PAPR reduction of 6 dB, independent of the number of subcarriers, can be achieved in OFDM by assuring the appropriate auto-correlation property of transmitted data symbol sequences. Binary phase-shift keying (BPSK) data symbols were arranged in paired sequences, each successive pair of sequences being transmitted in a respective OFDM symbol. So, in an OFDM signal having a number N of subcarriers the data symbols conveying the same information are N/2 subcarriers apart. This procedure is a species of symmetric cancellation coding (SCC).

COFDM can use a technique symmetric cancellation coding (SCC) in which OFDM carriers are arranged in pairs, the QAM of each of the two OFDM carriers in a pair being antipodal to the QAM of the other. While such SCC is used principally for PAPR reduction, it is reported to reduce PAPR of COFDM in a paper titled "PAPR Performance of Dual Carrier Modulation using Improved Data Allocation Scheme" that Soobum Cho and Sang Kyo Park presented at the 13th International Conference on Advanced Communication Technology (ICACT2011) held 13-16 Feb. 2011 in Seoul, Republic of Korea. Their dual carrier modulation (DCM) spaces the OFDM subcarriers N/2 carriers apart to maximize frequency diversity, N being the total number of carriers in the OFDM signal. FIG. 4 of that paper shows PAPR of OFDM DCM being about 2.5 dB less than PAPR of conventional OFDM, when 16QAM of OFDM subcarriers is used. The labeling diversity of the two 16QAM mapping patterns Cho and Park used to secure lower PAPR does not support BRA, so as to optimize shaping gain.

Newer designs of COFDM transmitters for broadcast television improve power amplifier efficiency using variants of the methods described U.S. Pat. No. 6,625,430 titled "Method and apparatus for attaining higher amplifier efficiencies at lower power levels" granted 23 Sep. 2003 to Peter J. Doherty. Accordingly, the PAPR reduction techniques described supra have become less likely to be resorted to. However, the large PAPR of DSB-COFDM also causes problems in receiver apparatus which are not avoided (and indeed may be exacerbated) by using a Doherty method in the broadcast transmitter. These problems concern maintaining linearity in the radio-frequency (RF) amplifier, in the intermediate-frequency (IF) amplifier (if used) and in the analog-to-digital (A-to-D) converter.

Superposition coded modulation is described in detail by Li Peng, Jun Tong, Xiaojun Yuan and Qinghua Guo in their paper "Superposition Coded Modulation and Iterative Linear MMSE Detection", *IEEE Journal on Selected Areas in Communications*, Vol. 27, No. 6, August 2009, pp. 995-1004. In superposition coded modulation (SCM) the four quadrants of square QAM symbol constellations are each Gray mapped independently from the others and from the pair of bits in the map label specifying that quadrant. Peng et alii studied iterative linear minimum-mean-square-error (LMMSE) detection being used in the reception of SCM and found that SCM offers an attractive solution for highly complicated transmission environments with severe interference. Peng et alii analyzed the impact of signaling schemes on the performance of iterative LMMSE detection to prove that among all possible signaling methods, SCM maximizes the output signal-to-noise/interference ratio (SNIR) in the LMMSE estimates during iterative detection. Their paper describes measurements that were made to demonstrate that SCM outperforms other signaling methods when iterative LMMSE detection is applied to multi-user/multi-antenna/multipath channels.

Jun Tong and Li Peng in a subsequent paper "Performance analysis of superposition coded modulation", *Physical Communication*, Vol. 3, September 2010, pp. 147-155, separate superposition coded modulation into two general classes: single-code superposition coded modulation (SC-SCM) and multi-code superposition coded modulation (MC-SCM). In SC-SCM the bits in the superposed code layers are generated using a single encoder. SC-SCM can be viewed as conveying a special BICM scheme over successive SCM constellations. In MC-SCM the bits in the superposed code layers are generated using a plurality of encoders supplying respective codewords. MC-SCM can be viewed as conveying special-case multi-level coding (MLC) scheme over successive SCM constellations.

An important aspect of the invention described infra is recognition that there are previously unrecognized ways in which SC-SCM maps of QAM symbol constellations can be advantageously used in dual QAM mapping, wherein the same coded data is conveyed by two streams of QAM symbols that are differently mapped from each other. The use of dual QAM mapping for COFDM involves a form of dual carrier modulation (DCM) commonly referred to as dual-carrier COFDM or DC-COFDM, since each segment of coded data governs the modulation of two COFDM carriers. (Single carrier modulation is referred to as "SCM" in some other texts, but in this document the acronym "SCM" will be used exclusively to refer to superposition coded modulation.) SCM mapping of QAM symbol constellations in the lower sideband of ISB-COFDM and SCM mapping of QAM symbol constellations in the upper sideband of ISB-COFDM can be designed to reduce the PAPR of COFDM symbols by making the amplitude of the ISB-COFDM more uniform.

SUMMARY OF THE INVENTION

The invention is embodied in certain receivers for signals employing coded orthogonal frequency-division multiplexing (COFDM) dual-subcarrier modulation (DCM), wherein the lower and upper halves of the frequency spectrum of the COFDM modulation signal convey the same coded data. In these receivers the subcarriers in the lower half of the frequency spectrum of a COFDM modulation signal are demodulated and demapped separately from the subcarriers in the lower half of the frequency spectrum of a COFDM modulation signal. Then, the resulting two sets of demapping results are, at least in part, diversity combined at soft-bit level.

BRIEF DESCRIPTION OF THE DRAWINGS

FIG. 4 is a detailed schematic diagram of any of a number of cascade connections as can be used in respective physical layer pipes of the FIG. 2 portion of the transmitter apparatus for radio-frequency COFDM DCM signal, each of which cascade connections comprises a parallel pair of mappers to QAM symbol constellations and a subsequent frequency interleaver.

FIG. 5 is an illustration of the preferred response of the frequency interleaver depicted in FIG. 4.

FIGS. 6, 7, 8 and 9 are first, second, third and fourth different Gray mappings of square 16QAM symbol constellations (based on the Gray mapping of 16QAM symbol constellations as prescribed originally in the DVB-T standard for COFDM digital television broadcasting), which first and third Gray mappings of 16QAM symbol constellations have an antiphase-energy relationship with each other, and which second and fourth Gray mappings of 16QAM symbol constellations have an antiphase-energy relationship with each other.

FIGS. 10 and 11 are first and second superposition-coded-modulation (SCM) mappings of square 16QAM symbol constellations for conveying the same coded data in respective half spectra of COFDM DCM signal, wherein (a) the bits of the labels in the first SCM mapping more likely to experience error owing to AWGN correspond to the bits of the labels in the second SCM mapping less likely to experience error owing to AWGN of similar strength, and (b) the bits of the labels in the second SCM mapping more likely to experience error owing to AWGN correspond to the bits of the labels in the first SCM mapping less likely to experience error owing to AWGN of similar strength.

FIG. 12 is a third SCM mapping of 16QAM symbol constellations that modifies the first SCM mapping by 180° rotation around its center, the third and second SCM mappings of 16QAM symbol constellations conveying the same coded data in respective half spectra of a COFDM DCM signal with reduced peak-to-average power ratio compared with the first and second SCM mappings of 16QAM symbol constellations conveying the same coded data.

FIG. 13 is a fourth SCM mapping of 16QAM symbol constellations that modifies the FIG. 12 third SCM mapping by twisting the pattern of map labels in each quadrant.

FIG. 14 is a fifth SCM mapping of 16QAM symbol constellations that modifies the second SCM mapping by 180° rotation around its center, the first and fifth SCM mappings of 16QAM symbol constellations conveying the same coded data in respective half spectra of a COFDM DCM signal with reduced peak-to-average power ratio compared with the first and second SCM mappings of 16QAM symbol constellations conveying the same coded data.

FIG. 15 is a sixth SCM mapping of 16QAM symbol constellations that modifies the FIG. 15 fifth SCM mapping by twisting the pattern of map labels in each quadrant.

FIGS. 16, 17, 18, 19, 20 and 21 are fifth, sixth, seventh, eighth, ninth and tenth different Gray mappings of 16QAM symbol constellations, which Gray mappings each arrange palindromic lattice-point labels along a diagonal of its lattice.

FIGS. 22, 23, 24, 25, 26 and 27 are alternative eleventh, twelfth, thirteenth, fourteenth, fifteenth and sixteenth different Gray mappings of 16QAM symbol constellations, which Gray mappings each arrange palindromic lattice-point labels along a diagonal of its lattice.

FIGS. 28 and 29 are respective optimized mappings of 16QAM symbol constellations, with labeling diversity between them.

FIGS. 30, 31, 32 and 33 are first, second, third and fourth different Gray mappings of 64QAM symbol constellations (based on the Gray mapping of 64QAM symbol constellations as prescribed originally in the DVB-T standards for COFDM digital television broadcasting), which first and third Gray mappings of 64QAM symbol constellations have an antiphase-energy relationship with each other, and which second and fourth Gray mappings of 64QAM symbol constellations have an antiphase-energy relationship with each other.

FIGS. 34 and 35 are first and second SCM mappings of 64QAM symbol constellations for conveying the same coded data in respective half spectra of a COFDM DCM signal, wherein (a) the bits of the labels in the first SCM mapping more likely to experience error owing to AWGN correspond to the bits of the labels in the second SCM mapping less likely to experience error owing to AWGN of similar strength, and (b) the bits of the labels in the second SCM mapping more likely to experience error owing to AWGN correspond to the bits of the labels in the first SCM mapping less likely to experience error owing to AWGN of similar strength.

FIG. 36 is a third SCM mapping of 64QAM symbol constellations that modifies the FIG. 34 first SCM mapping by 180° rotation around its center, the third and second SCM mappings of 64QAM symbol constellations conveying the same coded data in respective half spectra of a COFDM DCM signal with reduced peak-to-average power ratio compared with the first and second SCM mappings of 64QAM symbol constellations conveying the same coded data.

FIG. 37 is a fourth SCM mapping of 64QAM symbol constellations that modifies the FIG. 36 third SCM mapping by twisting the pattern of map labels in each quadrant.

FIG. 38 is a fifth SCM mapping of 64QAM symbol constellations that modifies the FIG. 15 second SCM mapping by 180° rotation around its center, the first and fifth SCM mappings of 64QAM symbol constellations conveying the same coded data in respective half spectra of a COFDM DCM signal with reduced peak-to-average power ratio compared with the first and second SCM mappings of 64QAM symbol constellations conveying the same coded data.

FIG. 39 is a sixth SCM mapping of 64QAM symbol constellations that modifies the FIG. 38 fifth SCM mapping by twisting the pattern of map labels in each quadrant.

FIGS. 40, 41, 42, 43, 44 and 45 are fifth, sixth, seventh, eighth, ninth and tenth different Gray mappings of 64QAM symbol constellations in a first group for consideration, which Gray mappings each arrange along a diagonal of its lattice those lattice-point labels having mirror symmetry regarding the order of ONE and ZERO bits therein.

FIGS. 46, 47, 48, 49, 50 and 51 are eleventh, twelfth, thirteenth, fourteenth, fifteenth and sixteenth different Gray mappings of 64QAM symbol constellations in a second group for consideration, which Gray mappings each arrange along a diagonal of its lattice those lattice-point labels each having mirror symmetry regarding the order of ONE and ZERO bits therein.

FIGS. 52 and 53 are respective optimized mappings of 64QAM symbol constellations, with labeling diversity between them.

FIGS. 54, 55, 56, 57, 58 and 59 are seventeenth, eighteenth, nineteenth, twentieth, twenty-first and twenty-second different Gray mappings of 64QAM symbol constellations, each rearranging to good advantage one of the first and second Gray mappings of 64QAM symbol constellations depicted in FIGS. 30 and 31.

FIGS. 60, 61, 62 and 63 are first, second, third and fourth different Gray mappings of 16APSK symbol constellations, which first and third Gray mappings of 16APSK symbol constellations have an antiphase-energy relationship with each other, and which second and fourth Gray mappings of 16APSK symbol constellations have an antiphase-energy relationship with each other.

FIGS. 74 and 65 together form a schematic diagram of the general structure of receiver apparatus for COFDM DCM radio-frequency signals using respective phase-shift methods to respond separately to the concurrent lower-frequency and upper-frequency sidebands of those signals, which receiver apparatus embodies aspects of the invention.

FIGS. 77 and 65 together form a schematic diagram of a variant of the receiver apparatus for demodulation of COFDM DCM radio-frequency signals that is depicted in FIGS. 74 and 65, digital circuitry depicted in FIG. 77 replacing some of the analog circuitry depicted in FIG. 74.

FIGS. 78 and 65 together form a schematic diagram of the general structure of novel receiver apparatus for demodulation of COFDM DCM radio-frequency signals using phase-shift methods modified in a first manner, which receiver apparatus embodies aspects of the invention.

FIGS. 79 and 65 together form a schematic diagram of a variant of the receiver apparatus for demodulation of COFDM DCM radio-frequency signals depicted in FIGS. 78 and 65, digital circuitry depicted in FIG. 79 replacing some of the analog circuitry depicted in FIG. 78.

FIGS. 81 and 65 together form a schematic diagram of the general structure of receiver apparatus for COFDM DCM radio-frequency signals using Weaver methods, which receiver apparatus embodies aspects of the invention.

FIGS. 82 and 65 together form a schematic diagram of receiver apparatus for demodulation of COFDM DCM radio-frequency signals using modified phase-shift methods to respond separately to the concurrent lower-frequency and upper-frequency sidebands of those signals after discrete Fourier transforms of those sidebands are computed, which receiver apparatus embodies aspects of the invention.

DETAILED DESCRIPTION

Figure 1:
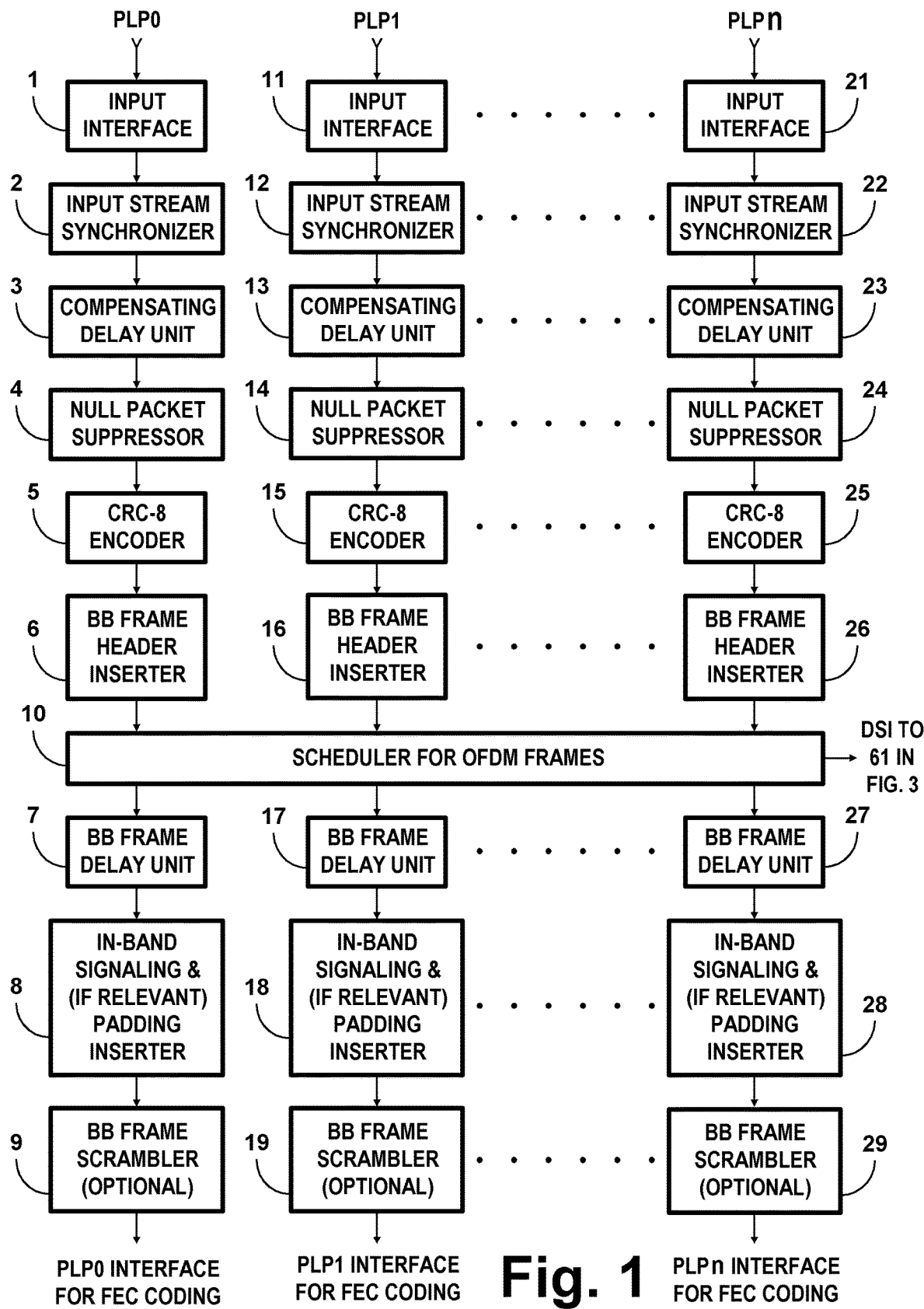
FIGS. 1, 2 and 3 together form a schematic diagram of transmitter apparatus for radio-frequency COFDM DCM signal, the FIGS. 2 and 3 portions of which transmitter apparatus depart from prior art and embody aspects of the invention.
Figure 2:
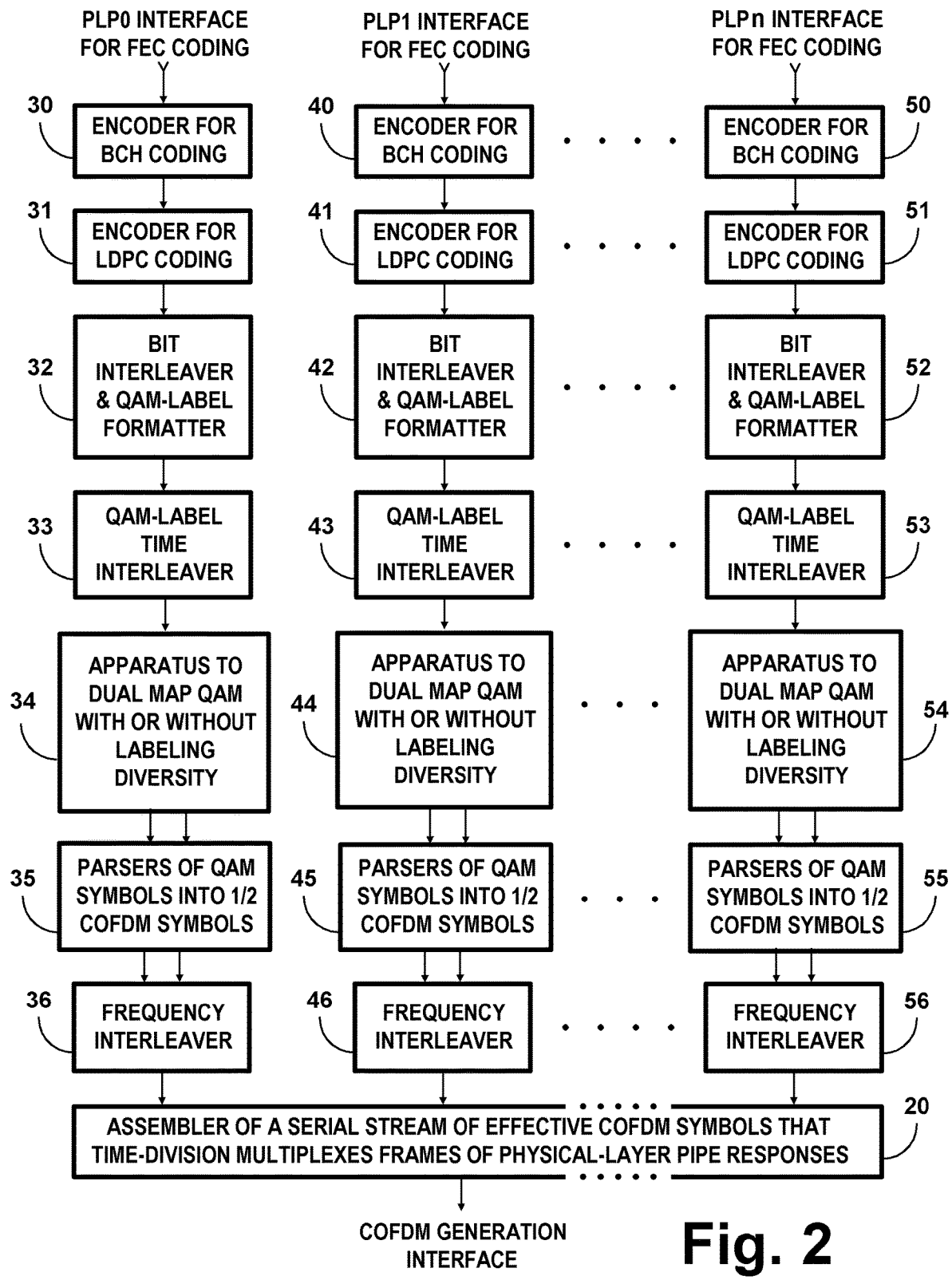
Figure 3:
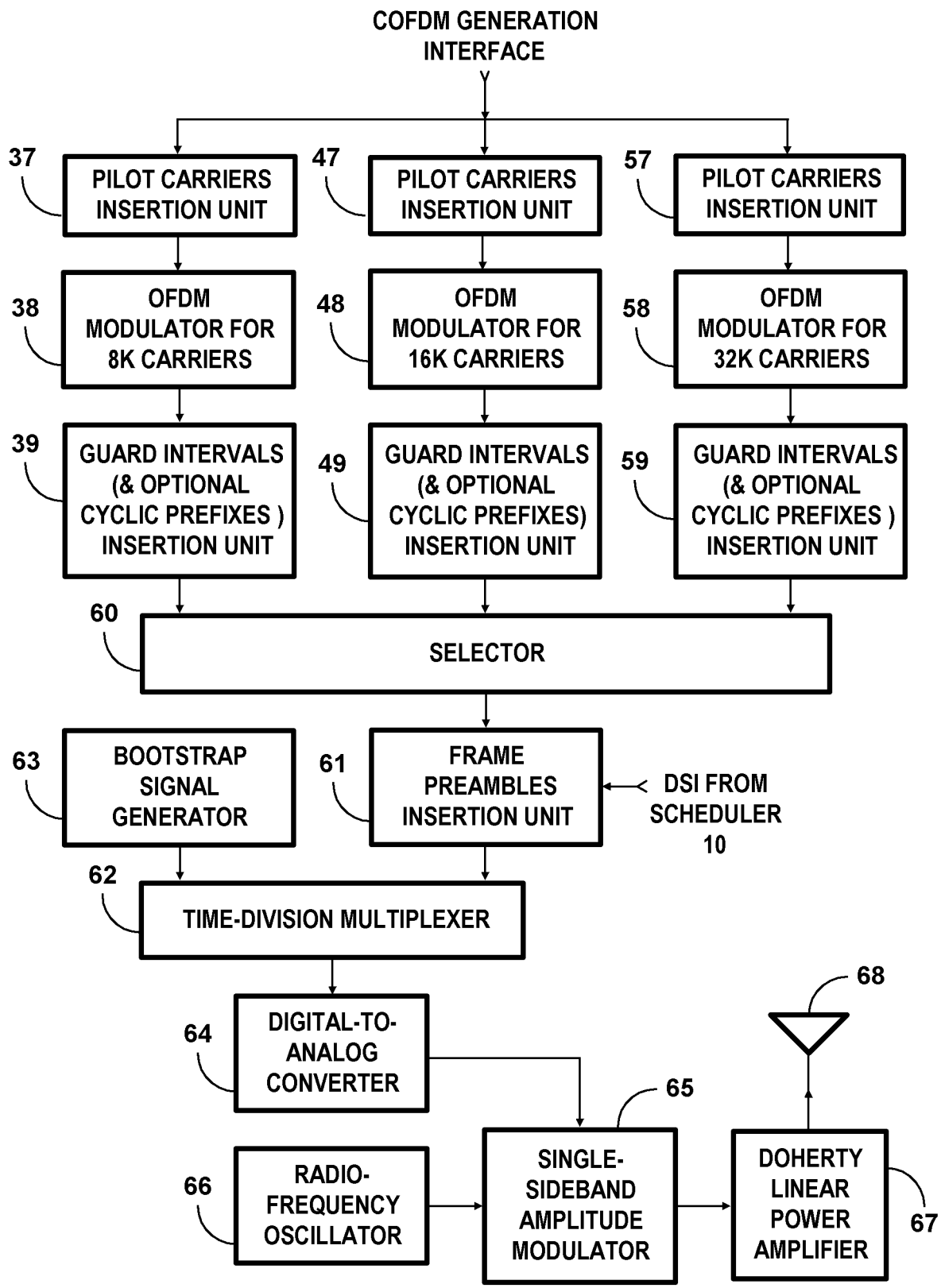

FIGS. 1, 2 and 3 depict a DTV transmitter apparatus generating COFDM signals designed for reception by DTV receivers. FIG. 1 depicts apparatus for generating baseband frames (BBFRAMES) at physical-layer-pipe (PLP) interfaces. FIG. 2 depicts apparatus for generating bit-wise forward-error-correction (FEC) coding and subsequent COFDM symbol blocks responsive to the BBFRAMEs supplied at the PLP interfaces. FIG. 3 depicts apparatus for generating and transmitting radio-frequency COFDM signals. Much of the DTV transmitter apparatus depicted in FIGS. 1, 2 and 3 is similar to that specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference. An important difference is that the main carrier is asymmetric-sideband (ASB) amplitude-modulated by COFDM subcarriers in the FIG. 3 portion of the transmitter apparatus, rather than being double-sideband (DSB) amplitude-modulated by COFDM subcarriers.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to an additional PLP depicted in FIG. 3, which additional PLP generates OFDM symbol blocks that convey the DSI and first layer conformation specifications. Recommended practice is that at least the physical layer pipe PLP0 is a so-called "common" PLP used for transmitting data, such as a program guide, relating to the other "data" PLPs. The common PLP or PLPs are transmitted in each OFDM frame following the P1 and P2 symbols, but before the data PLP or PLPs. A data PLP may be of a first type transmitted as a single slice per OFDM frame, or a data PLP may be of a second type transmitted as a plurality of sub-slices disposed in non-contiguous portions of each OFDM frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 interface for forward-error-correction (FEC) coding. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is insufficient to fill a BBFRAME completely, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 interface for FEC coding. In practice the delay unit 7, the inserter 8 and the BBFRAME scrambler 9 are realized by suitable configuration of a multi-port random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 interface for forward-error-correction (FEC) coding. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data-randomizes bits of the BBFRAME supplied from the output port of the BBFRAME scrambler 19 as the PLP1 interface for FEC coding. In practice the delay unit 17, the inserter 18 and the BBFRAME scrambler 19 are realized by suitable operation of a multi-port random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn interface for forward-error-correction (FEC) coding. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn interface for FEC coding. In practice the delay unit 27, the inserter 28 and the BBFRAME scrambler 29 are apt to be realized by appropriate operation of a multi-port random-access memory.

The input stream synchronizers 2, 12, 22 etc. are operable to guarantee Constant Bit Rate (CBR) and constant end-to-end transmission delay for any input data format when there is more than one input data format. Some transmitters may omit ones of the input stream synchronizers 2, 12, 22 etc. or ones of the compensating delay units 3, 13, 23 etc. For some Transport-Stream (TS) input signals, a large percentage of null-packets may be present in order to accommodate various bit-rate services in a constant bit-rate TS. In such case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Program Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 specifically indicates FEC coding to be concatenated BCH/LDPC coding composed of Bose-Chaudhuri-Hocquenghem (BCH) outer block coding and low-density parity-check (LDPC) inner block coding, which FEC coding is currently favored in the DVB-T2 broadcasting art and is specified in the ATSC 3.0 DTV broadcasting standard. Alternatively, the FEC coding can take any one of a variety of other forms, including concatenated Reed-Solomon (RS) outer coding and turbo inner coding—e.g., as specified by the earlier DVB-T broadcast standard.

FIG. 2 depicts the (n+1)th physical layer pipe PLP0 further comprising elements 30-38 in cascade connection after the PLP0 interface for FEC coding, but before a respective input port of an assembler 20 for assembling a serial stream of effective COFDM symbols. More specifically, FIG. 2 depicts an encoder 30 for BCH coding with its input port connected to receive the PLP0 FEC-coding interface signal from the output port of the BBFRAME scrambler 9 and with its output port connected to the input port of an encoder 31 for LDPC coding. The output port of the encoder 31 connects to the input port of a bit interleaver and QAM-label formatter 32. FIG. 2 depicts the output port of the bit interleaver and QAM-label formatter 32 connected to the input port of a time interleaver 33 for successive QAM labels. The time interleaver 33 shuffles the order of the QAM symbols in each successive FEC block. This shuffling implements cyclic delay diversity (CDD) that helps the FEC coding to overcome fading. The output port of the QAM-label time interleaver 33 connects to the respective input ports of a pair 34 of QAM mappers for dual mapping successive QAM labels to the complex coordinates of respective successions of QAM symbol constellations. The two QAM mappers in the pair 34 of them map same coded data to QAM of their respective OFDM carriers according to respective patterns that differ from each other, thereby to implement labeling diversity. In the case of transmissions broadcast for reception by mobile DTV receivers, these QAM symbol constellations are apt to be square 16QAM symbol constellations, square 64QAM symbol constellations or 16APSK symbol constellations, by way of specific examples.

In the case of transmissions broadcast for reception by stationary DTV receivers, these QAM symbol constellations are most likely to be square 64QAM symbol constellations, although square 256QAM symbol constellations or even square 1024QAM symbol constellations could be used. Going from 16QAM to 64QAM symbol constellations increases the number of bits in lattice-point labels from four to six, increasing channel capacity 50%. Going from 16QAM to 256QAM symbol constellations increases the number of bits in lattice-point labels from four to eight, doubling channel capacity, but the increase of channel capacity over that for 64QAM symbol constellations is only 33%. Going from 256QAM to 1024QAM symbol constellations increases the number of bits in lattice-point labels from eight to ten, for a 25% increase in channel capacity. The diminishing increases in channel capacity for larger than 64QAM symbol constellations probably do not justify the extra risk of error caused by noise. Stronger FEC coding necessary to overcome these errors will decrease channel capacity, offsetting increase in channel capacity owing to a larger QAM symbol constellation.

The respective output ports of the pair 34 of QAM mappers are connected for supplying first and second sets of successive QAM symbol constellations to respective input ports of parsers 35 of the first and second sets of successive of QAM symbols into respective successions of half COFDM symbols. These successions of half COFDM symbols are supplied to first and second input ports of a frequency interleaver 36, which responds to their half COFDM symbols alternately to generate complete COFDM symbols. The output port of the frequency interleaver 36 is connected to a respective input port of an assembler 20 of a serial stream of effective COFDM symbols, in which frames of PLP responses from the various physical layer pipes are time-division multiplexed. Together the parsers 35 and the frequency interleaver 36 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

FIG. 2 depicts the first physical layer pipe PLP1 further comprising elements 40-46 in cascade connection after the PLP1 interface for FEC coding, but before a respective input port of an assembler 20 for assembling a serial stream of effective COFDM symbols. More specifically, FIG. 2 depicts an encoder 40 for BCH coding with its input port connected to receive the PLP1 FEC-coding interface signal from the output port of the BBFRAME scrambler 19 and with its output port connected to the input port of an encoder 41 for LDPC coding. The output port of the encoder 41 is connected to the input port of a bit interleaver and QAM-label formatter 42. FIG. 2 depicts the output port of the bit interleaver and QAM-label formatter 42 connected to the input port of a time interleaver 43 for successive QAM labels. The time interleaver 43 shuffles the order of the QAM symbols in each successive FEC block. This shuffling implements cyclic delay diversity that helps the FEC coding to overcome fading. The output port of the QAM-label time interleaver 43 connects to the respective input ports of pair 44 of QAM mappers for dual mapping successive QAM labels to the complex coordinates of respective successions of QAM symbol constellations. The two QAM mappers in the pair 44 of them map same coded data to QAM of their respective OFDM carriers according to respective patterns that differ from each other, thereby to implement labeling diversity.

The respective output ports of the pair 44 of QAM mappers are connected for supplying first and second sets of successive QAM symbol constellations to respective input ports of parsers 45 of the first and second sets of successive of QAM symbols into respective successions of half COFDM symbols. These successions of half COFDM symbols are supplied to first and second input ports of a frequency interleaver 46, which responds to their half COFDM symbols alternately to generate complete COFDM symbols. The output port of the frequency interleaver 46 is connected to a respective input port of an assembler 20 of a serial stream of effective COFDM symbols, in which frames of PLP responses from the various physical layer pipes are time-division multiplexed. Together the parsers 45 and the frequency interleaver 46 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

FIG. 2 depicts the (n)th physical layer pipe PLPn further comprising elements 50-55 in cascade connection after the PLP0 interface for FEC coding, but before a respective input port of the assembler 20 for assembling a serial stream of effective COFDM symbols. More specifically, FIG. 2 depicts an encoder 50 for BCH coding with its input port connected to receive the PLPn FEC-coding interface signal from the output port of the BBFRAME scrambler 29 and with its output port connected to the input port of an encoder 51 for LDPC coding. The output port of the encoder 51 is connected to the input port of bit interleaver and QAM-label formatter 52. FIG. 2 depicts the output port of the bit interleaver and QAM-label formatter 52 connected to the input port of a time interleaver 53 for successive QAM labels. The time interleaver 53 shuffles the order of the QAM symbols in each successive FEC block. This shuffling implements cyclic delay diversity (CDD) that helps the FEC coding to overcome fading. The output port of the QAM-label time interleaver 53 connects to the respective input ports of a pair 54 of QAM mappers for dual mapping successive QAM labels to the complex coordinates of respective successions of QAM symbol constellations. The two QAM mappers in the pair 54 of them map same coded data to QAM of their respective OFDM carriers according to respective patterns that differ from each other, thereby to implement labeling diversity.

The respective output ports of the pair 54 of QAM mappers are connected for supplying first and second sets of successive QAM symbol constellations to respective input ports of parsers 55 of the first and second sets of successive of QAM symbols into respective successions of half COFDM symbols. These successions of half COFDM symbols are supplied to first and second input ports of a frequency interleaver 56, which responds to their half COFDM symbols alternately to generate complete COFDM symbols. The output port of the frequency interleaver 56 is connected to a respective input port of an assembler 20 of a serial stream of effective COFDM symbols, in which frames of PLP responses from the various physical layer pipes are time-division multiplexed. Together the parsers 55 and the frequency interleaver 56 combine to provide a COFDM symbol generator for arranging successive ones of the first set of QAM symbols in first prescribed order in initial halves of successive COFDM symbols and arranging successive ones of the second set of QAM symbols in second prescribed order in final halves of successive COFDM symbols.

Customarily there is a number of other physical layer pipes besides PLP0, PLP1 and PLPn, which other physical layer pipes are identified by the prefix PLP followed by respective ones of consecutive numbers two through (n−1). Each of the PLPs, n+1 in number, may differ from the others in at least one aspect. One possible difference between these n+1 PLPs concerns the natures of the FEC coding these PLPs respectively employ. The current trend is to use concatenated BCH coding and LDPC block coding for the FEC coding, but concatenated Reed-Solomon coding and convolutional coding have been used in the past. EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ. Also, there could be a transition period to a new DTV broadcasting standard in which ASB-COFDM DCM signals are transmitted, during which transition period at least one PLP originates DSB-COFDM signal as specified per the DVB-T2 or ATSC 3.0 DTV broadcasting standard. Such DSB-COFDM signal would be applied to a further input port of the assembler 20 of a serial stream of effective COFDM symbols.

FIG. 2 indicates that the output port of the assembler 20 of a serial stream of effective COFDM symbols, in which frames of PLP responses from the various physical layer pipes are time-division multiplexed, connects to subsequent elements via a COFDM generation interface depicted in both FIGS. 2 and 3. These subsequent elements are depicted in FIG. 3, which indicates where pilot carrier symbols are inserted into the effective COFDM symbols to generate complete COFDM symbols to be supplied to each at least one COFDM modulator. Pilot-carrier symbols can be similar to those used in the ATSC 3.0 Digital Standards, being inserted in conventional spectral order among the QAM symbols for the upper sideband of the COFDM DC signal, and being inserted in mirrored spectral order among the QAM symbols for the lower sideband of the COFDM DC signal.

FIG. 3 depicts a pilot carriers insertion unit 37 having an input port connected for receiving the serial stream of effective COFDM symbols supplied from the FIG. 2 assembler 20 thereof via the COFDM generation interface. The pilot carriers insertion unit 37 inserts pilot carrier symbols into the effective COFDM symbols to generate complete COFDM symbols suitable for a subsequent 8K inverse fast Fourier transform (I-FFT). The output port of the pilot carriers insertion unit 37 is connected for supplying complete COFDM symbols to the input port of an OFDM modulator 38 which performs that subsequent 8K I-FFT. I.e., the pilot carriers insertion unit 37 cooperates with the assembler 20 of a serial stream of effective COFDM symbols to form a COFDM symbol generator for supplying complete COFDM symbols to the OFDM modulator 38 that is the initial element of a subsequent generator of COFDM DCM radio-frequency signal. Guard interval insertion following each COFDM symbol is subsumed within the 8K I-FFT procedure in the OFDM modulator 38. In customary practice somewhat fewer than the nominal eight thousand subcarriers are generated by the 8K I-FFT procedure. In preferred practice, cyclic prefixes are disposed in respective guard intervals, and for implementing such option FIG. 3 depicts a cyclic prefixes inserter 39 included within the connection of the output port of the OFDM modulator 38 to a respective input port of a subsequent selector 60.

FIG. 3 depicts a pilot carriers insertion unit 47 having an input port connected for receiving the serial stream of effective COFDM symbols supplied from the FIG. 2 assembler 20 thereof via the COFDM generation interface. The pilot carriers insertion unit 47 inserts pilot carrier symbols into the effective COFDM symbols to generate complete COFDM symbols suitable for a subsequent 16K I-FFT. The output port of the pilot carriers insertion unit 47 is connected for supplying complete COFDM symbols to the input port of an OFDM modulator 48 which performs that subsequent 16K I-FFT. I.e., the pilot carriers insertion unit 47 cooperates with the assembler 20 of a serial stream of effective COFDM symbols to form a COFDM symbol generator for supplying complete COFDM symbols to the OFDM modulator 48 that is the initial element of a subsequent generator of COFDM DCM radio-frequency signal. Guard interval insertion following each COFDM symbol is subsumed within the 16K I-FFT procedure in the OFDM modulator 48. In customary practice somewhat fewer than the nominal sixteen thousand subcarriers are generated by the 16K I-FFT procedure. In preferred practice, cyclic prefixes are disposed in respective guard intervals, and for implementing such option FIG. 3 depicts a cyclic prefixes inserter 49 included within the connection of the output port of the OFDM modulator 48 to a respective input port of the subsequent selector 60.

FIG. 3 depicts a pilot carriers insertion unit 57 having an input port connected for receiving the serial stream of effective COFDM symbols supplied from the FIG. 2 assembler 20 thereof via the COFDM generation interface. The pilot carriers insertion unit 57 inserts pilot carrier symbols into the effective COFDM symbols to generate complete COFDM symbols suitable for a subsequent 32K I-FFT. The output port of the pilot insertion unit 57 is connected for supplying complete COFDM symbols to the input port of an OFDM modulator 58 which performs that subsequent 32K I-FFT. I.e., the pilot carriers insertion unit 57 cooperates with the assembler 20 of a serial stream of effective COFDM symbols to form a COFDM symbol generator for supplying complete COFDM symbols to the OFDM modulator 58 that is the initial element of a subsequent generator of COFDM DCM radio-frequency signal. Guard interval insertion following each COFDM symbol is subsumed within the 32K I-FFT procedure in the OFDM modulator 58. In customary practice somewhat fewer than the nominal thirty-two thousand subcarriers are generated by the 32K I-FFT procedure. In preferred practice, cyclic prefixes are disposed in respective guard intervals, and to implement such option FIG. 3 depicts a cyclic prefixes inserter 59 included within the connection of the output port of the OFDM modulator 58 to a respective input port of the subsequent selector 60.

Clipping methods of PAPR reduction necessarily involve distortion that tends to increase bit errors and thus tax iterative soft decoding of error-correction coding more. Furthermore, the PAPR reduction method using a complementary-power pair of QAM mappers suppresses occasional power peaks, which the various clipping methods of PAPR reduction rely upon to be markedly effective. Even so, most COFDM transmitter apparatus permits some clipping of power peaks that tend to occur infrequently, even where the power amplifier is of Doherty type. This is permitted in recognition of practical limitations on linearity in COFDM receiver apparatuses. However, band-limit filtering designed to suppress widening of the frequency spectrum caused by such clipping should follow the power amplifier for final-radio-frequency COFDM signal.

FIG. 3 further depicts a selector 60 having respective input ports to which the output ports of the guard intervals insertion units 39, 49 and 59 respectively connect. FIG. 3 depicts the output port of the selector 60 connected to the input port of a frame preambles insertion unit 61. The pilot carriers insertion unit 37, the OFDM modulator 38, any subsequent supplemental PAPR reduction unit and the guard intervals insertion unit 39 may be selectively powered, being powered only when transmissions using close to 16K OFDM carriers are made. Elements 37, 38 and 39 may all be omitted in some transmitters. The pilot carriers insertion unit 47, the OFDM modulator 48, any subsequent supplemental PAPR reduction unit and the guard intervals insertion unit 49 may be selectively powered, being powered only when transmissions using close to 32K OFDM carriers are made. Elements 47, 48 and 49 may all be omitted in some transmitters. The pilot carriers insertion unit 57, the OFDM modulator 58, any subsequent supplemental PAPR reduction unit and the guard intervals insertion unit 59 may be selectively powered, being powered only when transmissions using close to 64K OFDM carriers are made. All the elements 57, 58 and 59 may be omitted in some transmitters.

FIG. 3 shows the output port of the frame preambles insertion unit 61 connected to one of the two input ports of a time-division multiplexer 62. The other of the two input ports of the time-division multiplexer 62 is connected for receiving a bootstrap signal that a bootstrap signal generator 63 supplies from its output port. The bootstrap signal is an innovation introduced by developers of the ATSC 3.0 Digital Television Standards. It conveys metadata descriptive of the transmission standard used for DTV broadcasting and critical information concerning the configuration of receivers for receiving DTV broadcasts made in accordance with that standard. The bootstrap signal is conveyed by an OFDM signal using a set of carriers that are apt to differ in frequencies in a defined way from the set of carriers used for COFDM transmission of DTV signal. The OFDM signal conveying the bootstrap is of narrower bandwidth (typically 4.5 MHz) than the 6 MHz, 7 MHz or 8 MHZ signals currently used for DTV in various countries around the world. The baseband bootstrap signal developed for the ATSC 3.0 Digital Television Standards comprises a Zadoff-Chu sequence, which identifies the basic standard governing the DTV broadcasting, and a set of repetitive pseudo-random-noise sequences that convey further metadata. This is described more fully in ATSC Standard A/321, System Discovery and Signaling (Doc. A/321:2016, approved 23 Mar. 2016).

FIG. 3 shows the output port of the time-division multiplexer 62 connected to the input port of a digital-to-analog converter 64, the output port of which is connected for supplying analog COFDM carriers as modulating input signal to a first input port of an amplitude modulator 65. FIG. 3 shows the output port of a radio-frequency oscillator 66 connected for supplying radio-frequency (RF) carrier wave to a second input port of the amplitude modulator 65. The amplitude modulator 65 is of a type that generates a single-sideband (SSB) amplitude-modulation (AM) signal with a principal carrier that is suppressed at least to some degree. The amplitude modulator 65 replaces the amplitude modulator of the type that generates a double-sideband (DSB) amplitude-modulation (AM) signal conventionally found in commercial over-the-air DTV broadcasting in European and Asian countries. (The SSB amplitude-modulating signal occupies the full frequency spectrum of the RF channel, rather than just half the full frequency spectrum as is the case with DSB amplitude-modulating signal. This is taken into account in the sizes of the inverse discrete Fourier transforms respectively computed by the OFDM modulators 38, 48 and 58.) The amplitude modulator 65 supplies RF analog COFDM signal from an output port thereof to the input port of a linear power amplifier 67, which is preferably of Doherty type to reduce the likelihood of clipping on peaks of RF signal amplitude. FIG. 3 shows the output port of the linear power amplifier 67 connected for driving amplified RF analog COFDM signal power to a transmission antenna 68. FIG. 3 omits showing some DTV transmitter details, such as band-shaping filters for the RF signals.

FIG. 3 shows a single-sideband amplitude modulator 65 connected for modulating a RF carrier wave of the frequency of the ultimate transmissions from the transmission antenna 68. In actual commercial practice the SSB amplitude modulator 65 is apt to be connected for modulating a carrier wave of intermediate frequency (IF). An up-converter converts the analog COFDM carriers in the SSB amplitude modulator 65 response to final radio frequencies and is connected for supplying them from its output port to the input port of the linear power amplifier 67. In some designs for the DTV transmitter the DAC 64 is designed to compensate for non-linear transfer functions of the SSB amplitude modulator 65, of the up-converter if used, and of the linear power amplifier 67.

The frame preambles inserted by the frame preambles insertion unit 61 convey the conformation of each OFDM frame structure and also convey the dynamic scheduling information (DSI) produced by the scheduler 10. This information is conveyed using at least some of OFDM carriers also used for conveying the baseband OFDM information in the input signals to the frame preambles insertion unit 61. The OFDM carriers supplied by the bootstrap signal generator 63 are apt to have different frequencies than OFDM carriers used for conveying the baseband OFDM information in the input signals to the frame preambles insertion unit 61. The OFDM carriers supplied by the bootstrap signal generator 63 are constrained to a narrower bandwidth than the OFDM carriers used for conveying the baseband OFDM information in the input signals to the frame preambles insertion unit 61. The bootstrap signal conveys basic information as to the standard to which OFDM broadcasts conform, the bandwidth of the RF channel, and the size of the I-FFT used in the broadcasting of groups of OFDM frames, for example. If bootstrap signals are not used in the standard used for COFDM broadcasting, the elements 62 and 65 will be omitted, and the output port of the frame preambles insertion unit 61 will connect directly to the input port of the digital-to-analog converter 64.

FIG. 4 is a detailed schematic diagram of representative structure 70 for any one of a number of cascade connections in respective physical layer pipes of the FIG. 2 portion of COFDM transmitter apparatus, which structure 70 is configured so as to generate separate half COFDM symbols to be transmitted in lower and upper sidebands respectively of the COFDM signal. Each of these cascade connections comprises a respective pair of QAM mappers to QAM symbol constellations, followed by a respective frequency interleaver. One of these cascade connections comprises the elements 34, 35 and 36 in PLP0. Another of these cascade connections comprises the elements 44, 45 and 46 in PLP1. Still another of these cascade connections comprises the elements 54, 55 and 56 in PLPn.

FIG. 4 shows any one of the respective pairs 34, 44, 54 etc. of mappers to QAM symbol constellations in the physical layer pipes PLP0, PLP1, PLPn etc. as consisting of a respective first QAM mapper 71 and a respective second QAM mapper 72. The respective input ports of the QAM mappers 71 and 72 are each connected for receiving the same succession of QAM lattice-point labels from a foregoing element, such as one of the QAM-label time interleavers 33, 43, 53 etc. Serial-input/parallel-output registers 73 and 74 correspond to the subsequent one of the pairs of parsers 35, 45, 55 etc. A parallel-input/serial-output (PISO) register 75 is configured as a frequency interleaver of a type that is preferred for the respective frequency interleavers 36, 46, 56 etc. in the physical layer pipes PLP0, PLP1, PLPn etc.

The output port of the first QAM mapper 71 is connected for serially supplying the complex coordinates of a first set of QAM symbols to the input port of the serial-input/parallel-output register 73, which is capable of storing the complex coordinates of QAM symbols for inclusion in the lower-sideband half of each COFDM symbol. The output port of the second QAM mapper 72 is connected for serially supplying the complex coordinates of a second set of QAM symbols to the input port of the serial-input/parallel-output register 74, which is capable of storing the complex coordinates of QAM symbols for inclusion in the upper-sideband half of each COFDM symbol. The parallel output ports of the serial-input/parallel-output registers 73 and 74 are connected for delivering complex coordinates of respective first and second sets of QAM symbols as half COFDM symbols to the parallel input ports of the parallel-input/serial-output register 75, the output port of which connects to a respective input port of the assembler 20 in FIG. 2.

FIG. 5 illustrates the serial response that the parallel-input/serial-output register 75 is designed to supply from its serial output port to that one of the input ports of the assembler 20. Such response is obtained by appropriately connecting ones of the parallel output ports of the serial-input/parallel-output registers 73 and 74 to appropriate ones of the parallel input ports of the parallel-input/serial-output register 75. The complete first set of QAM symbols as generated by the first QAM mapper 71 for inclusion in a half COFDM symbol to be transmitted in the lower sideband of the COFDM DCM signal is followed by the complete second set of QAM symbols as generated by the second QAM mapper 71 for inclusion in a half COFDM symbol to be transmitted in the upper sideband of the COFDM DCM signal. This causes the SSB amplitude modulator 65 depicted in FIG. 3 to generate asymmetric-sideband amplitude modulation, presuming the principal carrier to be completely suppressed. The FIG. 5 frequency interleaving format spreads all the QAM symbols conveying the same information the maximum possible uniform distance in the frequency domain.

FIGS. 6, 7, 8 and 9 are first, second, third and fourth Gray mappings of 16QAM symbol constellations. The first Gray mapping of 16QAM symbol constellations is as prescribed in European standard ETSI EN 300 744 V1.5.1 published in June 2004 and titled *Digital Video Broadcasting (DVB); Framing structure, channel coding and modulation for digital terrestrial television*. The first and third Gray mappings of 16QAM symbol constellations have an antiphase-energy relationship with each other, so they could be used together in the FIG. 5 frequency interleaving format to implement symmetric cancellation coding (SCC). The second and fourth Gray mappings of 16QAM symbol constellations have an antiphase-energy relationship with each other, so they also could be used together in the FIG. 5 frequency interleaving format to implement SCC.

FIGS. 6 and 7 respectively depict first and second Gray maps of lattice points in 16QAM symbol constellations that the QAM mappers 71 and 72 respectively provide in a physical layer pipe in some ASB-COFDM transmitter apparatuses embodying aspects of the invention. The FIG. 6 first Gray map implements transmission of coded data in one of the sidebands of an ASB-COFDM signal, and the FIG. 7 second Gray map implements transmission of the same coded data in the other sideband of that ASB-COFDM signal. The FIG. 6 and FIG. 7 Gray maps govern quadrature amplitude modulation of their respective sets of OFDM carriers according to first and second 16QAM patterns, respectively, support bit-reliability averaging (BRA) to provide shaping gain. Bits of the lattice-point labels for the FIG. 6 Gray map of 16QAM symbol constellations more likely to experience error correspond to bits of the lattice-point labels for the FIG. 7 Gray map of 16QAM symbol constellations less likely to experience error. Bits of the lattice-point labels for the FIG. 7 Gray map of 16QAM symbol constellations more likely to experience error correspond to bits of the lattice-point labels for the FIG. 6 Gray map of 16QAM symbol constellations less likely to experience error. These characteristics are achieved simply by reversing the order of bits in the labeling of each pair of lattice points similarly located in respective ones of the FIG. 6 and FIG. 7 Gray maps.

Simply reversing the order of bits in the labeling of positions in the complex plane used for a first two-dimensional mapping of modulation symbol constellations to generate the labeling of positions in the complex plane used for a second two-dimensional mapping of modulation symbol constellations is a powerful technique that lends itself to sorts of COFDM DCM that employ Gray mapping. This technique guarantees that the bits of the labeling of positions in the first two-dimensional Gray mapping of modulation symbol constellations more likely to experience error passing through an AWGN channel correspond to bits of the labeling of positions in the second two-dimensional Gray mapping of modulation symbol constellations less likely to experience error passing through that AWGN channel. This technique guarantees that the bits of the labeling of positions in the second two-dimensional Gray mapping of modulation symbol constellations more likely to experience error passing through an AWGN channel correspond to bits of the labeling of positions in the first two-dimensional Gray mapping of modulation symbol constellations less likely to experience error passing through that AWGN channel. This supports BRA to provide shaping gain.

Note that each of certain pairs of lattice points similarly located in respective ones of the FIG. 6 and FIG. 7 Gray maps have like labeling, owing to mirror symmetry of their bits. Such palindromic labels are italicized and underlined in FIGS. 6-63. In 16QAM there are four palindromic lattice-point labels—i.e. 0000, 0110, 1001, and 1111. One of these palindromic lattice-point labels, 0000, is located at similar corner lattice points in both of the FIG. 6 and FIG. 7 Gray maps.

Therefore, if QAM mappers 71 and 72 use respective ones of the FIG. 6 first Gray map and the FIG. 7 second Gray map of 16QAM symbol constellations, there is no reduction of peak-to-average-power ratio (PAPR) compared with conventional DSB-COFDM. This is because peak power is as large as in conventional DSB-COFDM when both lattice-point labels are 0000 throughout an entire OFDM symbol. Average power is the same as for conventional DSB-COFDM.

The labeling of lattice points in the FIG. 8 third Gray map corresponds to the labeling of lattice points in the FIG. 6 first Gray map were that first Gray map rotated by π radians or 180°. QAM mappers 71 and 72 using respective ones of the FIG. 6 first Gray map and the FIG. 8 third Gray map of 16QAM symbol constellations implement symmetric cancellation coding (SCC) that reduces PAPR of the COFDM DCM compared to conventional COFDM.

QAM mappers 71 and 72 using respective ones of the FIG. 7 second Gray map and the FIG. 8 third Gray map of 16QAM symbol constellations support BRA to provide the same shaping gain as with QAM mappers 71 and 72 using respective ones of the FIG. 6 first Gray map and the FIG. 7 second Gray map of 16QAM symbol constellations. When the lattice-point labels of the FIG. 7 second Gray map and the FIG. 8 third Gray map of 16QAM symbol constellations are both 0000 throughout an entire OFDM symbol, their OFDM subcarriers are modulated antipodally, to curtail their combined peak power similarly to what obtains in SCC. So, when the QAM mappers 71 and 72 use respective ones of the FIG. 7 second Gray map and the FIG. 8 third Gray map of 16QAM symbol constellations, PAPR is somewhat lower than when the QAM mappers 71 and 72 use respective ones of the FIG. 6 first Gray map and the FIG. 7 second Gray map of 16QAM symbol constellations.

The labeling of lattice points in the FIG. 9 fourth Gray map corresponds to the labeling of lattice points in the FIG. 7 second Gray map were that second Gray map rotated by π radians or 180°. QAM mappers 71 and 72 using respective ones of the FIG. 7 second Gray map and the FIG. 9 fourth Gray map of 16QAM symbol constellations implement symmetric cancellation coding (SCC) that reduces PAPR of the COFDM DCM compared to conventional COFDM.

QAM mappers 71 and 72 using respective ones of the FIG. 6 first Gray map and the FIG. 9 fourth Gray map of 16QAM symbol constellations support BRA to provide the same shaping gain as with QAM mappers 71 and 72 using respective ones of the FIG. 6 first Gray map and the FIG. 7 second Gray map of 16QAM symbol constellations. When the lattice-point labels of the FIG. 6 first Gray map and the FIG. 9 fourth Gray map of 16QAM symbol constellations are both 0000 throughout an entire OFDM symbol, their OFDM subcarriers are modulated antipodally, to curtail their combined peak power similarly to what obtains in SCC. So, when the QAM mappers 71 and 72 use respective ones of the FIG. 6 first Gray map and the FIG. 9 fourth Gray map of 16QAM symbol constellations, PAPR is somewhat lower than when the QAM mappers 71 and 72 use respective ones of FIG. 6 first Gray map and the FIG. 7 second Gray map of 16QAM symbol constellations.

Superposition-coded-modulation (SCM) mappings of square QAM symbol constellations have some advantages over many Gray mappings of such constellations, besides those referred to supra in the "Background of the Invention". Pairs of SCM mappings of 16QAM symbol constellations can be developed in which the four palindromic lattice-point labels (i.e., 0000, 0110, 1001, and 1111) are located in the four corner positions of each symbol constellation, but arranged for antipodal modulation in the two 16QAM symbol constellations so as to reduce PAPR of the COFDM DCM signal. Pairs of SCM mappings of 16QAM symbol constellations can be developed in which the four palindromic lattice-point labels (i.e., 0000, 0110, 1001, and 1111) are positioned at the four corner positions of one of the symbol constellations, but are positioned centrally in the other of the symbol constellations to reduce PAPR of the COFDM DCM signal to a degree. There are eight palindromic lattice-point labels (i.e., 000000, 001100, 010010, 011110, 100001, 101101, 110011 and 111111) in the mapping of each square 64QAM symbol constellation. Pairs of SCM mappings of 64QAM symbol constellations can be developed in which four of the eight palindromic lattice-point labels are located in the four corner positions of each symbol constellation, but arranged for antipodal modulation in the two 64QAM symbol constellations so as to reduce PAPR of the COFDM DCM signal. Pairs of SCM mappings of 64QAM symbol constellations can be developed in which a completely different set of four of the eight palindromic lattice-point labels are located in the four corner positions of each symbol constellation. A group of four of the eight palindromic lattice-point labels are respectively located in the four corner positions of each of a first set of 64QAM symbol constellations is centrally located in each of a second set of 64QAM symbol constellation, thus to reduce to a degree the PAPR of the COFDM DCM signal. This particular sort of PAPR reduction is inapplicable to most, if not all, purely Gray mapping formats.

FIGS. 10 and 11 respectively depict first and second SCM maps of lattice points in 16QAM symbol constellations that the QAM mappers 71 and 72 respectively provide in a physical layer pipe in some COFDM DCM transmitter apparatuses embodying aspects of the invention. The FIG. 10 first SCM map is used throughout a first serial set of 16QAM symbols that convey coded data in one of the asymmetric sidebands of an COFDM DCM signal, and the FIG. 11 second SCM map is used throughout a second serial set of 16QAM symbols that convey the same coded data in the other asymmetric sideband of that COFDM DCM signal.

The FIG. 10 and FIG. 11 SCM maps govern quadrature amplitude modulation of their respective sets of OFDM carriers according to first and second 16QAM patterns, respectively, to support BRA to provide shaping gain. Bits of the lattice-point labels for the FIG. 10 SCM map of 16QAM symbol constellations more likely to experience error passing through an AWGN channel correspond to bits of the lattice-point labels for the FIG. 11 SCM map of 16QAM symbol constellations less likely to experience error passing through that AWGN channel. Bits of the lattice-point labels for the FIG. 11 SCM map of 16QAM symbol constellations more likely to experience error passing through that AWGN channel correspond to bits of the lattice-point labels for the FIG. 10 SCM map of 16QAM symbol constellations less likely to experience error passing through that AWGN channel. These characteristics are achieved simply by reversing the order of bits in the labeling of each pair of lattice points similarly located in respective ones of the FIG. 10 and FIG. 11 SCM maps.

Note that each of certain pairs of lattice points similarly located in respective ones of the FIG. 10 and FIG. 11 SCM maps have like labeling, owing to mirror symmetry of their bits. In 16QAM there are four palindromic lattice-point labels—i.e. 0000, 0110, 1001, and 1111. Each of these palindromic lattice-point labels is located at similar corner lattice points in both of the FIG. 10 and FIG. 11 SCM maps. Therefore, there is no reduction of PAPR compared with conventional DSB COFDM when QAM mappers 71 and 72 use respective ones of the FIG. 10 first SCM map and the FIG. 11 second SCM map of 16QAM symbol constellations. This is because peak power is as large as in conventional DSB COFDM when lattice-point labels in both sets of QAM symbol constellations have the same mirror-symmetric lattice-point label throughout an entire OFDM symbol. Average power over a series of COFDM symbols conveying random coded data is similar to that for conventional DSB COFDM.

FIG. 12 is a third SCM mapping of 16QAM symbol constellations, the labeling of lattice points of which corresponds to the labeling of lattice points in the FIG. 10 first SCM map were either SCM map rotated by 7C radians or 180° around its center. The first and third SCM mappings of 16QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional DSB COFDM. However, this implementation of SCC does not support BRA to provide shaping gain.

QAM mappers 71 and 72 using respective ones of the FIG. 11 second SCM map and the FIG. 12 third SCM map of 16QAM symbol constellations support BRA to provide the same shaping gain as with QAM mappers 71 and 72 using respective ones of the FIG. 11 first SCM map and the FIG. 12 second SCM map of 16QAM symbol constellations. When the lattice-point labels of the FIG. 11 second SCM map and the FIG. 12 third SCM map of 16QAM symbol constellations are both 0000, 0110, 1001 or 1111 throughout an entire OFDM symbol, their OFDM subcarriers are modulated antipodally, to curtail their combined peak power similarly to what obtains in SCC. So, when the QAM mappers 71 and 72 use respective ones of the FIG. 11 second SCM map and the FIG. 12 third SCM map of 16QAM symbol constellations, PAPR is substantially lower than when the QAM mappers 71 and 72 use respective ones of FIG. 10 first SCM map and the FIG. 11 second SCM map of 16QAM symbol constellations.

FIG. 13 is a fourth SCM mapping of 16QAM symbol constellations that modifies the FIG. 12 third SCM mapping by twisting the pattern of map labels in each quadrant, thereby exchanging the positions of innermost and outermost lattice-point labels in each quadrant. This reduces the maximum peak power associated with each of the 0000, 0110, 1001 and 1111 lattice-point labels being associated with the respective QAM modulation of all OFDM carriers during a COFDM symbol. This should improve PAPR when the QAM mappers 71 and 72 use respective ones of the FIG. 11 second SCM map and the FIG. 13 fourth SCM map of 16QAM symbol constellations.

FIG. 14 is a fifth SCM mapping of 16QAM symbol constellations, the labeling of lattice points in which corresponds to the labeling of lattice points in the FIG. 11 second SCM map were either SCM map rotated by 7C radians or 180° around its center. The second and sixth SCM mappings of 16QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional DSB COFDM. However, this implementation of SCC does not support BRA to provide shaping gain.

QAM mappers 71 and 72 using respective ones of the FIG. 10 first SCM map and the FIG. 14 fifth SCM map of 16QAM symbol constellations support BRA to provide the same shaping gain as with QAM mappers 71 and 72 using respective ones of the FIG. 10 first SCM map and the FIG. 11 second SCM map of 16QAM symbol constellations. When the lattice-point labels of the FIG. 10 first SCM map and the FIG. 14 fifth SCM map of 16QAM symbol constellations are both 0000, 0110, 1001 or 1111 throughout an entire OFDM symbol, their OFDM subcarriers are modulated antipodally, to curtail their combined peak power similarly to what obtains in SCC. So, when the QAM mappers 71 and 72 use respective ones of the FIG. 10 first SCM map and the FIG. 14 fifth SCM map of 16QAM symbol constellations, PAPR is substantially lower than when the QAM mappers 71 and 72 use respective ones of the FIG. 10 first SCM map and the FIG. 11 second SCM map of 16QAM symbol constellations.

FIG. 15 is a sixth SCM mapping of 16QAM symbol constellations that modifies the FIG. 14 fifth SCM mapping by twisting the pattern of map labels in each quadrant, thereby exchanging the positions of innermost and outermost lattice-point labels in each quadrant. This reduces the maximum peak power associated with each of the 0000, 0110, 1001 and 1111 lattice-point labels being associated with the respective QAM modulation of all OFDM carriers during a COFDM symbol. This should improve PAPR when the QAM mappers 71 and 72 use respective ones of the FIG. 10 first SCM map and the FIG. 15 sixth SCM map of 16QAM symbol constellations.

FIGS. 16, 17, 18, 19, 20 and 21 depict fifth, sixth, seventh, eighth, ninth and tenth different Gray mappings of 16QAM symbol constellations, which Gray mappings each arrange along a diagonal of its lattice the palindromic lattice-point labels each having mirror symmetry regarding the order of ONE and ZERO bits therein. The diagonal extends through the −I, −Q and +I, +Q quadrants of each of these mappings. Each of these diagonals extends from 0000, through 1001, through 1111 to 0110.

FIGS. 16 and 17 respectively depict fifth and sixth Gray maps of lattice points in 16QAM symbol constellations that the QAM mappers 71 and 72 respectively provide in a physical layer pipe in some COFDM DCM transmitter apparatuses embodying aspects of the invention. The FIG. 16 fifth Gray map implements transmission of coded data in one of the asymmetric sidebands of a COFDM DCM signal, and the FIG. 17 sixth Gray map implements transmission of the same coded data in the other asymmetric sideband of that COFDM DCM signal. The FIG. 16 and FIG. 17 Gray maps govern quadrature amplitude modulation of their respective sets of OFDM carriers per fifth and sixth 16QAM Gray mapping patterns, respectively, to support BRA to provide shaping gain. Bits of the lattice-point labels for the FIG. 16 Gray map of 16QAM symbol constellations more likely to experience error correspond to bits of the lattice-point labels for the FIG. 17 Gray map of 16QAM symbol constellations less likely to experience error. Bits of the lattice-point labels for the FIG. 17 Gray map of 16QAM symbol constellations more likely to experience error correspond to bits of the lattice-point labels for the FIG. 16 Gray map of 16QAM symbol constellations less likely to experience error. These characteristics are achieved simply by reversing the order of bits in the labeling of each pair of lattice points similarly located in respective ones of the FIG. 16 and FIG. 17 Gray maps.

The 0000 and 0110 palindromic lattice-point labels are located at similar corner lattice points in both of the FIG. 16 and FIG. 17 Gray maps. Therefore, there is no reduction of PAPR compared with conventional DSB COFDM when QAM mappers 71 and 72 use respective ones of the FIG. 16 fifth Gray map and the FIG. 17 sixth Gray map of 16QAM symbol constellations. This is because peak power is as large as in conventional DSB COFDM when lattice-point labels in both sets of QAM symbol constellations have the same 0000 or 0110 lattice-point label throughout an entire OFDM symbol. Average power over a series of COFDM symbols conveying random coded data is similar to that for conventional DSB COFDM.

Rotation of one of FIG. 16 and FIG. 17 Gray maps by π radians or 180° does not result in a pair of mappings for COFDM DCM with reduced PAPR compared to that of conventional DSB COFDM. Such rotation causes the 0010 and 0100 lattice-point labels at the corners of the QAM constellations to be similarly positioned. Peak power is as large as in conventional DSB COFDM when lattice-point labels in both sets of QAM symbol constellations have the same 0010 or 0100 lattice-point label throughout an entire OFDM symbol.

FIG. 18 depicts a seventh Gray mapping of 16QAM symbol constellations that flips the fifth Gray mapping over by rotating the FIG. 16 fifth Gray map 180° around its 0010-to-0100 diagonal axis. QAM mappers 71 and 72 using respective ones of the FIG. 18 seventh Gray map and the FIG. 17 sixth Gray map of 16QAM symbol constellations support BRA to provide the same shaping gain as with QAM mappers 71 and 72 using respective ones of the FIG. 16 fifth Gray map and the FIG. 17 sixth Gray map of 16QAM symbol constellations. Whenever the lattice-point labels of the FIG. 17 sixth Gray map and the FIG. 18 seventh Gray map of 16QAM symbol constellations are both 0000 or 0110 throughout an entire OFDM symbol, their OFDM subcarriers are modulated antipodally, to curtail their combined peak power similarly to what obtains in SCC. So, when the QAM mappers 71 and 72 use respective ones of the sixth and the seventh Gray maps of 16QAM symbol constellations, PAPR is substantially lower than when the QAM mappers 71 and 72 use respective ones of the fifth and sixth Gray maps of 16QAM symbol constellations.

FIG. 19 is an eighth Gray mapping of 16QAM symbol constellations that modifies the FIG. 18 seventh Gray mapping by twisting the pattern of map labels in each quadrant about one of its diagonal axes, thereby exchanging the positions of innermost and outermost lattice-point labels in each quadrant. This reduces the maximum peak power associated with either of the 0000 or 0110 lattice-point labels being associated with the respective QAM modulation of all OFDM carriers during a COFDM symbol. This should improve PAPR somewhat further when the QAM mappers 71 and 72 use respective ones of the sixth and eighth Gray maps of 16QAM symbol constellations, rather than respective ones of the sixth and seventh Gray maps of 16QAM symbol constellations.

FIG. 20 is a ninth Gray mapping of 16QAM symbol constellations that that flips the sixth Gray mapping over by rotating the FIG. 17 sixth Gray map 180° around its 0100-to-0010 diagonal axis. QAM mappers 71 and 72 using respective ones of the FIG. 16 fifth Gray map and the FIG. 20 ninth Gray map of 16QAM symbol constellations support BRA to provide the same shaping gain as with QAM mappers 71 and 72 using respective ones of the FIG. 16 fifth Gray map and the FIG. 17 sixth Gray map of 16QAM symbol constellations. Whenever the lattice-point labels of the FIG. 16 fifth Gray map and the FIG. 20 ninth Gray map of 64QAM symbol constellations are both 0010 or 0100 throughout an entire OFDM symbol, their OFDM subcarriers are modulated antipodally, to curtail their combined peak power similarly to what obtains in SCC. So, when the QAM mappers 71 and 72 use respective ones of the fifth and ninth Gray maps of 16QAM symbol constellations, PAPR is substantially lower than when the QAM mappers 71 and 72 use respective ones of the fifth and sixth Gray maps of 16QAM symbol constellations.

FIG. 21 is a tenth Gray mapping of 16QAM symbol constellations that modifies the FIG. 20 ninth Gray mapping by twisting the pattern of map labels in each quadrant about one of its diagonal axes, thereby exchanging the positions of innermost and outermost lattice-point labels in each quadrant. This reduces the maximum peak power associated with either of the 0000 or 0110 lattice-point labels being associated with the respective QAM modulation of all OFDM carriers during a COFDM symbol. This should improve PAPR somewhat further when the QAM mappers 71 and 72 use respective ones of the fifth and tenth Gray maps of 16QAM symbol constellations, rather than respective ones of the fifth and ninth Gray maps of 16QAM symbol constellations.

FIGS. 22, 23, 24, 25, 26 and 27 depict eleventh, twelfth, thirteenth, fourteenth, fifteenth and sixteenth different Gray mappings of 16QAM symbol constellations, which Gray mappings each arrange along a diagonal of its lattice the palindromic lattice-point labels each having mirror symmetry regarding the order of ONE and ZERO bits therein. The diagonal extends through the −I, +Q and +I, −Q quadrants of each of these mappings. Each of these diagonals extends from 0000, through 0110, through 1111 to 1001.

FIGS. 22 and 23 respectively depict eleventh and twelfth Gray maps of lattice points in 16QAM symbol constellations that the QAM mappers 71 and 72 respectively provide in a physical layer pipe in some COFDM DCM transmitter apparatuses embodying aspects of the invention. The FIG. 22 eleventh Gray map implements transmission of coded data in one of the sidebands of a COFDM DCM signal, and the FIG. 23 twelfth Gray map implements transmission of the same coded data in the other sideband of that COFDM DCM signal. The FIG. 22 and FIG. 23 Gray maps govern quadrature amplitude modulation of their respective sets of OFDM carriers according to eleventh and twelfth 16QAM Gray mapping patterns, respectively, to achieve shaping gain from BAR. Bits of the lattice-point labels for the FIG. 22 Gray map of 16QAM symbol constellations more likely to experience error correspond to bits of the lattice-point labels for the FIG. 23 Gray map of 16QAM symbol constellations less likely to experience error. Bits of the lattice-point labels for the FIG. 23 Gray map of 16QAM symbol constellations more likely to experience error correspond to bits of the lattice-point labels for the FIG. 22 Gray map of 16QAM symbol constellations less likely to experience error. These characteristics are achieved simply by reversing the order of bits in the labeling of each pair of lattice points similarly located in respective ones of the FIG. 22 and FIG. 23 Gray maps.

The 0000 and 1001 palindromic lattice-point labels are located at similar corner lattice points in both of the FIG. 22 and FIG. 23 Gray maps. Therefore, there is no reduction of PAPR compared with conventional DSB COFDM when QAM mappers 71 and 72 use respective ones of the FIG. 22 eleventh Gray map and the FIG. 23 twelfth Gray map of 16QAM symbol constellations. This is because peak power is as large as in conventional DSB COFDM when lattice-point labels in both sets of QAM symbol constellations have the same 0000 or 1001 lattice-point label throughout an entire OFDM symbol. Average power over a series of COFDM symbols conveying random coded data is similar to that for conventional DSB COFDM.

Rotation of one of FIG. 22 and FIG. 23 Gray maps by π radians or 180° does not result in a pair of mappings for COFDM DCM with reduced PAPR compared to that of conventional DSB COFDM. Such rotation causes the 0001 and 1000 lattice-point labels at the corners of the QAM constellations to be similarly positioned. Peak power is as large as in conventional DSB COFDM when lattice-point labels in both sets of QAM symbol constellations have the same 0001 or 1000 lattice-point label throughout an entire OFDM symbol.

FIG. 24 depicts a thirteenth Gray mapping of 16QAM symbol constellations that flips the eleventh Gray mapping over by rotating the FIG. 22 eleventh Gray map 180° around its 0001-to-1000 diagonal axis. QAM mappers 71 and 72 using respective ones of the FIG. 24 thirteenth Gray map and the FIG. 23 twelfth Gray map of 16QAM symbol constellations support BRA to provide the same shaping gain as with QAM mappers 71 and 72 using respective ones of the FIG. 22 eleventh Gray map and the FIG. 23 twelfth Gray map of 16QAM symbol constellations. Whenever the lattice-point labels of the FIG. 23 twelfth Gray map and the FIG. 24 thirteenth Gray map of 64QAM symbol constellations are both 0000 or 1001 throughout an entire OFDM symbol, their OFDM subcarriers are modulated antipodally, to curtail their combined peak power similarly to what obtains in SCC. So, when the QAM mappers 71 and 72 use respective ones of the twelfth and the thirteenth Gray maps of 16QAM symbol constellations, PAPR is substantially lower than when the QAM mappers 71 and 72 use respective ones of the eleventh and twelfth Gray maps of 16QAM symbol constellations.

FIG. 25 is an fourteenth Gray mapping of 16QAM symbol constellations that modifies the FIG. 24 thirteenth Gray mapping by twisting the pattern of map labels in each quadrant about one of its diagonal axes, thereby exchanging the positions of innermost and outermost lattice-point labels in each quadrant. This reduces the maximum peak power associated with either of the 0000 or 1001 lattice-point labels being associated with the respective QAM modulation of all OFDM carriers during a COFDM symbol. This should improve PAPR somewhat further when the QAM mappers 71 and 72 use respective ones of the twelfth and fourteenth Gray maps of 16QAM symbol constellations, rather than respective ones of the twelfth and thirteenth Gray maps of 16QAM symbol constellations.

FIG. 26 is a fifteenth Gray mapping of 16QAM symbol constellations that that flips the twelfth Gray mapping over by rotating the FIG. 23 twelfth Gray map 180° around its 0001-to-1000 diagonal axis. QAM mappers 71 and 72 using respective ones of the FIG. 22 eleventh Gray map and the FIG. 26 fifteenth Gray map of 16QAM symbol constellations support BRA to provide the same shaping gain as with QAM mappers 71 and 72 using respective ones of the FIG. 22 eleventh Gray map and the FIG. 23 twelfth Gray map of 16QAM symbol constellations. Whenever the lattice-point labels of the FIG. 22 eleventh Gray map and the FIG. 26 fifteenth Gray map of 64QAM symbol constellations are both 0010 or 1000 throughout an entire OFDM symbol, their OFDM subcarriers are modulated antipodally, to curtail their combined peak power similarly to what obtains in SCC. So, when the QAM mappers 71 and 72 use respective ones of the eleventh and the ninth Gray maps of 16QAM symbol constellations, PAPR is substantially lower than when the QAM mappers 71 and 72 use respective ones of the eleventh and twelfth Gray maps of 16QAM symbol constellations.

FIG. 27 is a sixteenth Gray mapping of 16QAM symbol constellations that modifies the FIG. 26 fifteenth Gray mapping by twisting the pattern of map labels in each quadrant about one of its diagonal axes, thereby exchanging the positions of innermost and outermost lattice-point labels in each quadrant. This reduces the maximum peak power associated with either of the 0001 or 1000 lattice-point labels being associated with the respective QAM modulation of all OFDM carriers during a COFDM symbol. This should improve PAPR somewhat further when the QAM mappers 71 and 72 use respective ones of the eleventh and sixteenth Gray maps of 16QAM symbol constellations, rather than respective ones of the eleventh and fifteenth Gray maps of 16QAM symbol constellations.

There are still other groups of different Gray mappings of 16QAM symbol constellations, each of which Gray mappings in a group arranges the four palindromic lattice-point labels along a diagonal of its lattice. The group of fifth, sixth, seventh, eighth, ninth and tenth different Gray mappings of 16QAM symbol constellations sequentially depicted in FIGS. 16, 17, 18, 19, 20 and 21 can be rotated π/2 radians or 90° in either direction, so the diagonal containing successive 0000, 1001, 1111 and 0110 map labels extends through the −I, +Q and +I, −Q quadrants of each of the resulting mappings. The group of eleventh, twelfth, thirteenth, fourteenth, fifteenth and sixteenth different Gray mappings of 16QAM symbol constellations sequentially depicted in FIGS. 22, 23, 24, 25, 26 and 27 can be rotated π/2 radians or 90° in either direction, so the diagonal containing successive 0000, 0110, 1111 and 1001 map labels extends through the +I, +Q and −I, −Q quadrants of each of the resulting mappings.

The order of successive lattice-point labels along either of the diagonals of a 16QAM symbol constellation can be selected in any of four sequences from the loop of successive 0000, 1001, 1111 and 0110 map labels. The order of successive lattice-point labels along either of the diagonals of a 16QAM symbol constellation can be selected in any of four sequences from the (reverse) loop of successive 0000, 0110, 1111 and 1001 map labels. In all there are sixteen groups of different Gray mappings of 16QAM symbol constellations, each of which Gray mappings in a group arranges the palindromic lattice-point labels along a diagonal of its lattice.

There is an interesting aspect to a pair of different Gray mappings of square QAM symbol constellations each arranging the palindromic lattice-point labels in similar order along a diagonal of its lattice. Perforce, flipping either of the maps over by 180° rotation around such diagonal axis results in a map like the other one of that pair.

FIGS. 28 and 29 depict first and second optimized maps of lattice points in 16QAM symbol constellations that the QAM mappers 71 and 72 respectively provide in a physical layer pipe in some COFDM DCM transmitter apparatuses embodying aspects of the invention. The respective 4-bit labels of adjacent points in the lattice of an optimized mapping of 16QAM differ in two or three of their bits, rather than differing in only one or two of their bits. This benefits receiver apparatus employing iterative de-mapping and decoding procedures when reception is via a Rayleigh channel, without impairing reception via an AWGN channel too much. Reception via an AWGN channel is not as good as with full Gray mapping of QAM subcarriers, and reception via a Rayleigh channel is not as good as with full anti-Gray mapping of QAM subcarriers. This pair of optimized maps is one of seven pairs of optimized maps disclosed by M. Krasicki in his paper titled "The essence of QAM labelling diversity" published April 2013 in *Electronics Letters* 49(8), pp. 567-569. The optimized maps in each of those seven pairs are arranged to have maximum labeling diversity between them. So, any one of these pairs of optimized maps is suited for use in COFDM DCM signals.

FIGS. 30 and 31 respectively depict first and second Gray maps of lattice points in 64QAM symbol constellations that the QAM mappers 71 and 72 respectively provide in a physical layer pipe in some transmitter apparatuses for COFDM DCM signals. The FIG. 30 first 64QAM Gray map implements transmission of coded data in one of the sidebands of a COFDM DCM signal, and the FIG. 31 second 64QAM Gray map implements transmission of the same coded data in the other sideband of that COFDM DCM signal. The FIG. 30 and FIG. 31 Gray maps govern quadrature amplitude modulation of their respective sets of OFDM carriers according to first and second 64QAM patterns, respectively, to support BRA to provide shaping gain. Bits of the lattice-point labels for the FIG. 30 Gray map of 64QAM symbol constellations more likely to experience error correspond to bits of the lattice-point labels for the FIG. 31 Gray map of 64QAM symbol constellations less likely to experience error. Bits of the lattice-point labels for the FIG. 31 Gray map of 64QAM symbol constellations more likely to experience error correspond to bits of the lattice-point labels for the FIG. 30 Gray map of 64QAM symbol constellations less likely to experience error. These characteristics are achieved simply by reversing the order of bits in the labeling of each pair of lattice points similarly located in respective ones of the FIG. 30 and FIG. 31 Gray maps.

Note that each of certain pairs of lattice points similarly located in respective ones of the FIG. 30 and FIG. 31 Gray maps have like labeling, owing to mirror symmetry of their bits. In 64QAM maps there are eight palindromic lattice-point labels—i.e. 000000, 001100, 010010, 011110, 100001, 101101, 110011 and 111111. One of these palindromic lattice-point labels, 000000, is located at similar corner lattice points in both of the FIG. 30 and FIG. 31 Gray maps. So, there is no reduction of PAPR compared with conventional DSB COFDM if QAM mappers 71 and 72 use respective ones of the FIG. 30 first Gray map and the FIG. 31 second Gray map of 64QAM symbol constellations. This is because peak power is as large as in conventional DSB COFDM when both lattice-point labels are 000000 throughout an entire OFDM symbol. Average power is the same as for conventional DSB COFDM.

FIG. 32 is a third Gray mapping of 64QAM symbol constellations that rotates the FIG. 30 first Gray mapping 180° around its center. QAM mappers 71 and 72 using respective ones of the FIG. 31 second Gray map and the FIG. 32 third Gray map of 64QAM symbol constellations support BRA to provide the same shaping gain as with QAM mappers 71 and 72 using respective ones of the FIG. 30 first Gray map and the FIG. 31 second Gray map of 64QAM symbol constellations. However, PAPR is lowered. Whenever the lattice-point labels of the FIG. 31 second Gray map and the FIG. 32 third Gray map of 64QAM symbol constellations are both 000000 throughout an entire OFDM symbol, their OFDM subcarriers are modulated antipodally, to curtail their combined peak power similarly to what obtains in SCC.

Furthermore, whenever the lattice-point labels of the FIG. 31 second Gray map and the FIG. 32 third Gray map of 64QAM symbol constellations are both 001100, 010010, 011110, 100001, 101101, 110011 or 111111, their OFDM subcarriers are modulated antipodally. Whenever any one of these lattice-point labels occurs throughout an entire OFDM symbol or most of one, their OFDM subcarriers are modulated antipodally, to curtail their combined peak power similarly to what obtains in SCC.

FIG. 33 is an fourth Gray mapping of 64QAM symbol constellations that rotates the FIG. 31 second Gray mapping 180° around its center. QAM mappers 71 and 72 using respective ones of the FIG. 30 first Gray map and the FIG. 33 fourth Gray map of 64QAM symbol constellations support BRA to provide the same shaping gain with QAM mappers 71 and 72 using respective ones of the FIG. 30 first Gray map and the FIG. 31 second Gray map of 64QAM symbol constellations. However, PAPR is lowered. Whenever the lattice-point labels of the FIG. 30 first Gray map and the FIG. 33 fourth Gray map of 64QAM symbol constellations are both 000000 throughout an entire OFDM symbol, their OFDM subcarriers are modulated antipodally, to curtail their combined peak power similarly to what obtains in SCC.

Furthermore, whenever the lattice-point labels of the FIG. 30 first Gray map and the FIG. 33 fourth Gray map of 64QAM symbol constellations are both 001100, 010010, 011110, 100001, 101101, 110011 or 111111, their OFDM subcarriers are modulated antipodally. Furthermore, whenever the lattice-point labels of the FIG. 31 second Gray map and the FIG. 32 third Gray map of 64QAM symbol constellations are both 001100, 010010, 011110, 100001, 101101, 110011 or 111111, their OFDM subcarriers are modulated antipodally. Whenever any one of these lattice-point labels occurs throughout an entire OFDM symbol or most of one, their OFDM subcarriers are modulated antipodally, to curtail their combined peak power similarly to what obtains in SCC.

As noted supra, superposition-coded-modulation (SCM) mappings of square 64QAM symbol constellations have some advantages over many Gray mappings of such constellations. FIGS. 34 and 35 respectively depict first and second SCM maps of lattice points in 64QAM symbol constellations that the QAM mappers 71 and 72 respectively provide in a physical layer pipe in some COFDM DCM transmitter apparatuses embodying aspects of the invention. The FIG. 34 first SCM map is used throughout a first serial set of 64QAM symbols that convey coded data in one of the sidebands of an COFDM DCM signal, and the FIG. 35 second SCM map is used throughout a second serial set of 64QAM symbols that convey the same coded data in the other sideband of that COFDM DCM signal.

The FIG. 34 and FIG. 35 SCM maps govern quadrature amplitude modulation of their respective sets of OFDM carriers according to first and second 64QAM patterns, respectively, to support BRA to provide shaping gain. Bits of the lattice-point labels for the FIG. 34 SCM map of 64QAM symbol constellations more likely to experience error passing through an AWGN channel correspond to bits of the lattice-point labels for the FIG. 35 SCM map of 64QAM symbol constellations less likely to experience error passing through that AWGN channel. Bits of the lattice-point labels for the FIG. 35 SCM map of 64QAM symbol constellations more likely to experience error passing through that AWGN channel correspond to bits of the lattice-point labels for the FIG. 34 SCM map of 64QAM symbol constellations less likely to experience error passing through that AWGN channel. These characteristics are achieved simply by reversing the order of bits in the labeling of each pair of lattice points similarly located in respective ones of the FIG. 34 and FIG. 35 SCM maps.

Note that each of eight pairs of lattice points similarly located in respective ones of the FIG. 34 and FIG. 35 SCM maps have like labeling, owing to mirror symmetry of their bits. The four palindromic lattice-point labels 001100, 011110, 101101 and 111111 are located at similar close-to-center lattice points in both of the FIG. 34 and FIG. 35 SCM maps.

The other four palindromic lattice-point labels 000000, 010010, 100001 and 110011 are located at similar outside-corner lattice points in both of the FIG. 34 and FIG. 35 SCM maps. So, there is no reduction of PAPR compared with conventional COFDM DSB when QAM mappers 71 and 72 use respective ones of the FIG. 34 first SCM map and the FIG. 35 second SCM map of 64QAM symbol constellations. This is because peak power is as large as in conventional COFDM DSB when lattice-point labels in both sets of QAM symbol constellations have the same lattice-point label 000000, 010010, 100001 or 110011 throughout an entire OFDM symbol. Average power over a series of COFDM symbols conveying random coded data is similar to that for conventional COFDM DSB.

FIG. 36 is a third SCM mapping of 64QAM symbol constellations, the labeling of lattice points of which corresponds to the labeling of lattice points in the FIG. 34 first SCM map were either SCM map rotated by 7C radians or 180° around its center. The first and third SCM mappings of 64QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional COFDM DSB, but this implementation of SCC does not support BRA to provide shaping gain.

QAM mappers 71 and 72 using respective ones of the FIG. 35 second SCM map and the FIG. 36 third SCM map of 64QAM symbol constellations support BRA to provide the same shaping gain as with QAM mappers 71 and 72 using respective ones of the FIG. 34 first SCM map and the FIG. 35 second SCM map of 64QAM symbol constellations. When the lattice-point labels of the FIG. 35 second SCM map and the FIG. 36 third SCM map of 64QAM symbol constellations are both 000000, 010010, 100001 or 110011 throughout an entire OFDM symbol, their OFDM subcarriers are modulated antipodally, to curtail their combined peak power similarly to what occurs in SCC. So, when the QAM mappers 71 and 72 use respective ones of the FIG. 35 second SCM map and the FIG. 36 third SCM map of 64QAM symbol constellations, PAPR is substantially lower than when the QAM mappers 71 and 72 use respective ones of FIG. 34 first SCM map and the FIG. 35 second SCM map of 64QAM symbol constellations.

FIG. 37 is a fourth SCM mapping of 64QAM symbol constellations that modifies the FIG. 36 third SCM mapping by twisting the pattern of map labels in each quadrant, thereby exchanging the positions of innermost and outermost lattice-point labels in each quadrant. This reduces the maximum peak power associated with each of the 000000, 010010, 100001 and 110011 lattice-point labels being associated with the respective QAM modulation of all OFDM carriers during a COFDM symbol. This should improve PAPR when the QAM mappers 71 and 72 use respective ones of the FIG. 35 second SCM map and the FIG. 37 fourth SCM map of 64QAM symbol constellations.

FIG. 38 is a fifth SCM mapping of 64QAM symbol constellations, the labeling of lattice points of which corresponds to the labeling of lattice points in the FIG. 35 second SCM map were either SCM map rotated by 7C radians or 180° around its center. The second and fifth SCM mappings of 64QAM symbol constellations have an antiphase-energy relationship with each other, so they and the FIG. 5 frequency interleaving format can be used together to implement symmetric cancellation coding (SCC). SCC reduces PAPR of the COFDM DCM somewhat compared to conventional COFDM DSB. However, this implementation of SCC does not support BRA to provide shaping gain.

QAM mappers 71 and 72 using respective ones of the FIG. 34 first SCM map and the FIG. 38 fifth SCM map of 64QAM symbol constellations support BRA to provide the same shaping gain as with QAM mappers 71 and 72 using respective ones of the FIG. 34 first SCM map and the FIG. 35 second SCM map of 64QAM symbol constellations. When the lattice-point labels of the FIG. 34 first SCM map and the FIG. 39 fifth SCM map of 64QAM symbol constellations are both 000000, 010010, 100001 or 110011 throughout an entire OFDM symbol, their OFDM subcarriers are modulated antipodally, to curtail their combined peak power similarly to what occurs in SCC. So, when the QAM mappers 71 and 72 use respective ones of the FIG. 34 first SCM map and the FIG. 39 fifth SCM map of 64QAM symbol constellations, PAPR is substantially lower than when the QAM mappers 71 and 72 use respective ones of FIG. 34 first SCM map and the FIG. 35 second SCM map of 64QAM symbol constellations.

FIG. 39 is a sixth SCM mapping of 64QAM symbol constellations that modifies the FIG. 38 fifth SCM mapping by twisting the pattern of map labels in each quadrant, thereby exchanging the positions of innermost and outermost lattice-point labels in each quadrant. This reduces the maximum peak power associated with each of the 000000, 010010, 100001 and 110011 lattice-point labels being associated with the respective QAM modulation of all OFDM carriers during a COFDM symbol. This should improve PAPR when the QAM mappers 71 and 72 use respective ones of the FIG. 34 first SCM map and the FIG. 39 sixth SCM map of 64QAM symbol constellations.

Gray mappings of square 64QAM symbol constellations preferred for reducing PAPR of COFDM DCM, besides concurrently providing shaping gain from BRA, differ from the specified standards for DVB-T and DVB-T2 digital terrestrial television broadcasting systems. Preferred Gray mappings of 64QAM are characterized in that all eight of the palindromic lattice-point labels 000000, 001100, 010010, 011110, 100001, 101101, 110011 and 111111 are positioned along one of the two diagonals of the square lattice in the mapping. The sequence of eight palindromic lattice-point labels successively positioned along that diagonal can be selected from any of six different loops of the eight palindromic lattice-point labels, respective sequences from which are listed following.

1) 000000, 001100, 011110, 010010, 110011, 111111, 101101, 100001
2) 000000, 001100, 101101, 100001, 110011, 111111, 011110, 010010
3) 000000, 001100, 101101, 111111, 011110, 010010, 110011, 100001
4) 000000, 010010, 011110, 001100, 101101, 111111, 110011, 100001
5) 000000, 010010, 110011, 111111, 011110, 001100, 101101, 100001
6) 000000, 010010, 110011, 100001, 101101, 111111, 011110, 001100

These six loops scanned forward can be scanned in reverse direction to generate six more sequences, each oppositely ordered to one of the above-listed six sequences. Each of the twelve sequences can be rotated in loop by one label at a time through eight phasings. So, there are 96 possible arrangements of the eight palindromic lattice-point labels along either of the two diagonals of the 64QAM lattice. It is possible that a few of these arrangements will not support a Gray-mapped square 64QAM symbol constellation, however.

FIGS. 44, 45, 46, 47, 48 and 49 depict ninth, tenth, eleventh, twelfth, thirteenth and fourteenth different Gray mappings of 64QAM symbol constellations, which Gray mappings each arrange the eight palindromic lattice-point labels along a diagonal of its lattice. The diagonal extends through the +I, −Q and −I, +Q quadrants of each of these mappings.

FIGS. 40 and 41 respectively depict fifth and sixth Gray maps of lattice points in 64QAM symbol constellations that the QAM mappers 71 and 72 respectively provide in a physical layer pipe in some COFDM DCM transmitter apparatuses embodying aspects of the invention. The FIG. 40 fifth Gray map implements transmission of coded data in one of the asymmetric sidebands of a COFDM DCM signal, and the FIG. 41 sixth Gray map implements transmission of the same coded data in the other asymmetric sideband of that COFDM DCM signal. The FIG. 40 and FIG. 41 Gray maps govern quadrature amplitude modulation of their respective sets of OFDM carriers according to fifth and sixth 64QAM-Gray mapping patterns, respectively. A sequence of successive map labels 000000, 010010, 011110, 001100, 101101, 111111, 110011, 100001 extends along a diagonal from the top left corner of each of the FIG. 40 and FIG. 41 Gray maps to its bottom right corner.

The 000000 and 100001 palindromic lattice-point labels are located at similar corner lattice points in both of the FIG. 40 and FIG. 41 Gray maps. Therefore, there is no reduction of PAPR compared with conventional DSB COFDM when QAM mappers 71 and 72 use respective ones of the FIG. 40 fifth Gray map and the FIG. 41 sixth Gray map of 64QAM symbol constellations. This is because peak power is as large as in conventional DSB COFDM when lattice-point labels in both sets of QAM symbol constellations have the same 000000 or 100001 lattice-point label throughout an entire OFDM symbol. Average power over a series of COFDM symbols conveying random coded data is similar to that for conventional DSB COFDM.

Rotation of one of FIG. 40 and FIG. 41 Gray maps by π radians or 180° does not result in a pair of mappings for COFDM DCM with reduced PAPR compared to that of conventional DSB COFDM. Such rotation causes the 000001 and 100000 lattice-point labels at the corners of the QAM constellations to be similarly positioned. Peak power is as large as in conventional DSB COFDM when lattice-point labels in both sets of QAM symbol constellations have the same 000001 or 100000 lattice-point label throughout an entire OFDM symbol.

FIG. 42 depicts a seventh Gray mapping of 64QAM symbol constellations that flips the fifth Gray mapping over by rotating the FIG. 40 fifth Gray map 180° around its 000001-to-100000 diagonal axis. QAM mappers 71 and 72 using respective ones of the FIG. 42 eleventh Gray map and the FIG. 41 tenth Gray map of 64QAM symbol constellations support BRA to provide the same shaping gain as with QAM mappers 71 and 72 using respective ones of the FIG. 40 fifth Gray map and the FIG. 41 sixth Gray map of 64QAM symbol constellations. Whenever the lattice-point labels of the FIG. 41 sixth Gray map and the FIG. 42 seventh Gray map of 64QAM symbol constellations are both 000000, 000001, 100000 or 100001 throughout an entire OFDM symbol, their OFDM subcarriers are modulated antipodally, to curtail their combined peak power similarly to what obtains in SCC. So, when the QAM mappers 71 and 72 use respective ones of the sixth and the seventh Gray maps of 64QAM symbol constellations, PAPR is substantially lower than when the QAM mappers 71 and 72 use respective ones of the fifth and sixth Gray maps of 64QAM symbol constellations.

FIG. 43 is an eighth Gray mapping of 64QAM symbol constellations that modifies the FIG. 42 seventh Gray mapping by twisting the pattern of map labels in each quadrant about one of its diagonal axes, thereby exchanging the positions of innermost and outermost lattice-point labels in each quadrant. This reduces the maximum peak power associated with either of the 000000 or 100001 lattice-point labels being associated with the respective QAM modulation of all OFDM carriers during a COFDM symbol. This should improve PAPR somewhat further when the QAM mappers 71 and 72 use respective ones of the sixth and eighth Gray maps of 64QAM symbol constellations, rather than respective ones of the sixth and seventh Gray maps of 64QAM symbol constellations.

FIG. 44 is a ninth Gray mapping of 64QAM symbol constellations that that flips the sixth Gray mapping over by rotating the FIG. 41 sixth Gray map 180° around its 000001-to-100000 diagonal axis. QAM mappers 71 and 72 using respective ones of the FIG. 40 fifth Gray map and the FIG. 44 ninth Gray map of 64QAM symbol constellations support BRA to provide the same shaping gain as with QAM mappers 71 and 72 using respective ones of the FIG. 40 fifth Gray map and the FIG. 41 sixth Gray map of 64QAM symbol constellations. Whenever the lattice-point labels of the FIG. 40 fifth Gray map and the FIG. 44 ninth Gray map of 64QAM symbol constellations are both 000000, 000001, 100000 or 100001 throughout an entire OFDM symbol, their OFDM subcarriers are modulated antipodally, to curtail their combined peak power similarly to what obtains in SCC. So, when the QAM mappers 71 and 72 use respective ones of the fifth and the ninth Gray maps of 64QAM symbol constellations, PAPR is substantially lower than when the QAM mappers 71 and 72 use respective ones of the fifth and sixth Gray maps of 64QAM symbol constellations.

FIG. 45 is a tenth Gray mapping of 64QAM symbol constellations that modifies the FIG. 44 ninth Gray mapping by twisting the pattern of map labels in each quadrant about one of its diagonal axes, thereby exchanging the positions of innermost and outermost lattice-point labels in each quadrant. This reduces the maximum peak power associated with any of the 000000, 000001, 100000 and 100001 lattice-point labels being associated with the respective QAM modulation of all OFDM carriers during a COFDM symbol. This should improve PAPR somewhat further when the QAM mappers 71 and 72 use respective ones of the fifth and tenth Gray maps of 64QAM symbol constellations, rather than respective ones of the fifth and sixth Gray maps of 64QAM symbol constellations.

FIGS. 46, 47, 48, 49, 50 and 51 depict eleventh, twelfth, thirteenth, fourteenth, fifteenth and sixteenth different Gray mappings of 64QAM symbol constellations, which Gray mappings each arrange the eight palindromic lattice-point labels along a diagonal of its lattice. The diagonal extends through the +I, +Q and −I, −Q quadrants of each of these mappings.

FIGS. 46 and 47 respectively depict eleventh and twelfth Gray maps of lattice points in 64QAM symbol constellations that the QAM mappers 71 and 72 respectively provide in a physical layer pipe in some COFDM DCM transmitter apparatuses embodying aspects of the invention. The FIG. 46 eleventh Gray map implements transmission of coded data in one of the asymmetric sidebands of a COFDM DCM signal, and the FIG. 47 twelfth Gray map implements transmission of the same coded data in the other asymmetric sideband of that COFDM DCM signal. The FIG. 46 and FIG. 47 Gray maps govern quadrature amplitude modulation of their respective sets of OFDM carriers according to eleventh and twelfth 64QAM Gray mapping patterns, respectively. A sequence of map labels 010010, 000000, 001100, 011110, 111111, 101101, 100001, 110011 extends along a diagonal from the top right corner of each of the FIG. 46 and FIG. 47 Gray maps to its bottom left corner.

The 010010 and 1100011 palindromic lattice-point labels are located at similar corner lattice points in both of the FIG. 46 and FIG. 47 Gray maps. Therefore, there is no reduction of PAPR compared with conventional DSB COFDM when QAM mappers 71 and 72 use respective ones of the FIG. 46 eleventh Gray map and the FIG. 47 twelfth Gray map of 64QAM symbol constellations. This is because peak power is as large as in conventional DSB COFDM when lattice-point labels in both sets of QAM symbol constellations have the same 110010 or 010011 lattice-point label throughout an entire OFDM symbol. Average power over a series of COFDM symbols conveying random coded data is similar to that for conventional DSB COFDM.

Rotation of one of FIG. 46 and FIG. 47 Gray maps by π radians or 180° does not result in a pair of mappings for COFDM DCM with reduced PAPR compared to that of conventional DSB COFDM. Such rotation causes the 110010 and 010011 lattice-point labels at the corners of the QAM constellations to be similarly positioned. Peak power is as large as in conventional DSB COFDM when lattice-point labels in both sets of QAM symbol constellations have the same 000001 or 100000 lattice-point label throughout an entire OFDM symbol.

FIG. 48 depicts a thirteenth Gray mapping of 64QAM symbol constellations that flips the eleventh Gray mapping over by rotating the FIG. 46 eleventh Gray map 180° around its 110010-to-010011 diagonal axis. QAM mappers 71 and 72 using respective ones of the FIG. 47 twelfth Gray map and the FIG. 48 thirteenth Gray map of 64QAM symbol constellations support BRA to provide the same shaping gain as with QAM mappers 71 and 72 using respective ones of the FIG. 46 eleventh Gray map and the FIG. 47 twelfth Gray map of 64QAM symbol constellations. Whenever the lattice-point labels of the FIG. 47 twelfth Gray map and the FIG. 48 thirteenth Gray map of 64QAM symbol constellations are both 010010, 010011, 110010 and 110011 throughout an entire OFDM symbol, their OFDM subcarriers are modulated antipodally, to curtail their combined peak power similarly to what obtains in SCC. So, when the QAM mappers 71 and 72 use respective ones of the twelfth and the thirteenth Gray maps of 64QAM symbol constellations, PAPR is substantially lower than when the QAM mappers 71 and 72 use respective ones of the eleventh and twelfth Gray maps of 64QAM symbol constellations.

FIG. 49 is a fourteenth Gray mapping of 64QAM symbol constellations that modifies the FIG. 48 thirteenth Gray mapping by twisting the pattern of map labels in each quadrant about one of its diagonal axes, thereby exchanging the positions of innermost and outermost lattice-point labels in each quadrant. This reduces the maximum peak power associated with any of the 010010, 010011, 110010 and 110011 lattice-point labels being associated with the respective QAM modulation of all OFDM carriers during a COFDM symbol. This should improve PAPR somewhat further when the QAM mappers 71 and 72 use respective ones of the twelfth and fourteenth Gray maps of 64QAM symbol constellations, rather than respective ones of the twelfth and thirteenth Gray maps of 64QAM symbol constellations.

FIG. 50 is a fifteenth Gray mapping of 64QAM symbol constellations that that flips the twelfth Gray mapping over by rotating the FIG. 47 twelfth Gray map 180° around its 010011-to-110010 diagonal axis. QAM mappers 71 and 72 using respective ones of the FIG. 46 eleventh Gray map and the FIG. 50 fifteenth Gray map of 64QAM symbol constellations support BRA to provide the same shaping gain as with QAM mappers 71 and 72 using respective ones of the FIG. 46 eleventh Gray map and the FIG. 47 twelfth Gray map of 64QAM symbol constellations. Whenever the lattice-point labels of the FIG. 46 eleventh Gray map and the FIG. 50 fifteenth Gray map of 64QAM symbol constellations are both 010010, 010011, 110010 and 110011 throughout an entire OFDM symbol, their OFDM subcarriers are modulated antipodally, to curtail their combined peak power similarly to what obtains in SCC. So, when the QAM mappers 71 and 72 use respective ones of the eleventh and the fifteenth Gray maps of 64QAM symbol constellations, PAPR is substantially lower than when the QAM mappers 71 and 72 use respective ones of the eleventh and twelfth Gray maps of 64QAM symbol constellations.

FIG. 51 is a sixteenth Gray mapping of 64QAM symbol constellations that modifies the FIG. 50 fifteenth Gray mapping by twisting the pattern of map labels in each quadrant about one of its diagonal axes, thereby exchanging the positions of innermost and outermost lattice-point labels in each quadrant. This reduces the maximum peak power associated with any of the 010010, 010011, 110010 and 110011 lattice-point labels being associated with the respective QAM modulation of all OFDM carriers during a COFDM symbol. This should improve PAPR somewhat further when the QAM mappers 71 and 72 use respective ones of the eleventh and sixteenth Gray maps of 64QAM symbol constellations, rather than respective ones of the eleventh and fifteenth Gray maps of 64QAM symbol constellations.

The first group of different Gray maps of 64QAM symbol constellations depicted in FIGS. 40, 41, 42, 43, 44 and 45 were compared with the second group of different Gray maps of 64QAM symbol constellations depicted in FIGS. 46, 47, 48, 49, 50 and 51 to discern the features they share. The FIG. 40 fifth Gray map and the FIG. 41 sixth Gray map have similar palindromic lattice-point labels in diagonally opposite corners of each of them. So do the FIG. 46 eleventh Gray map and the FIG. 47 twelfth Gray map. The lattice-point labels in the other corners of the FIG. 40 fifth Gray map have similar values to the lattice-point labels in the other corners of the FIG. 41 sixth Gray map have similar values except for a 180° respective rotation of those other corners in the two Gray maps. This is characteristic of the FIG. 46 eleventh Gray map and the FIG. 47 twelfth Gray map as well. Consideration was made as to whether similar characteristics could be obtained by re-mapping the FIG. 30 and FIG. 31 Gray maps of 64QAM symbol constellations by translating the positions of their lattice point labels. There are more than one set such re-mappings that provide the desired characteristics, a favored one of those sets being described infra.

FIG. 52 is a seventeenth Gray map of a 64QAM constellation, which repositions the +I, +Q quadrant of the FIG. 30 first Gray map of a 64QAM constellation, to be in the center of that seventeenth Gray map of the 64QAM constellation. FIG. 53 is a eighteenth Gray map of a 64QAM constellation, which repositions the +I, +Q quadrant of the FIG. 31 second Gray map of a 64QAM constellation, to be in the center of that eighteenth Gray map of the 64QAM constellation. Palindromic lattice-point labels 110011 and 111111 are positioned at similar corners of both the seventeenth and eighteenth Gray maps of 64QAM constellations, so PAPR of COFDM DCM using these 64QAM constellations will be no better than for DSB COFDM. This is because peak power is as large as in conventional DSB COFDM when both sets of QAM symbol constellations have the same 110011 and 111111 lattice-point label throughout an entire OFDM symbol. Average power over a series of COFDM symbols conveying random coded data is similar to that for conventional DSB COFDM.

FIG. 54 depicts a nineteenth Gray mapping of 64QAM symbol constellations that flips the seventeenth Gray mapping over by rotating the FIG. 52 seventeenth Gray map 180° around its 111011-to-110111 diagonal axis. QAM mappers 71 and 72 using respective ones of the FIG. 54 nineteenth Gray map and the FIG. 53 eighteenth Gray map of 64QAM symbol constellations support BRA to provide the same shaping gain as with QAM mappers 71 and 72 using respective ones of the FIG. 52 seventeenth Gray map and the FIG. 53 eighteenth Gray map of 64QAM symbol constellations. Whenever the lattice-point labels of the FIG. 53 eighteenth Gray map and the FIG. 54 nineteenth Gray map of 16QAM symbol constellations are both 110011, 110111, 111011 or 111111 throughout an entire OFDM symbol, their OFDM subcarriers are modulated antipodally, to curtail their combined peak power similarly to what obtains in SCC. So, when the QAM mappers 71 and 72 use respective ones of the eighteenth and nineteenth Gray maps of 64QAM symbol constellations, PAPR is substantially lower than when the QAM mappers 71 and 72 use respective ones of the seventeenth and eighteenth Gray maps of 64QAM symbol constellations.

FIG. 55 is a twentieth Gray mapping of 64QAM symbol constellations that modifies the FIG. 54 nineteenth Gray mapping by twisting the pattern of map labels in each quadrant about one of its diagonal axes, thereby exchanging the positions of innermost and outermost lattice-point labels in each quadrant. This reduces the maximum peak power associated with any of the 110011, 110111, 111011 or 111111 lattice-point labels being associated with the respective QAM modulation of all OFDM carriers during a COFDM symbol. This should improve PAPR somewhat further when the QAM mappers 71 and 72 use respective ones of the eighteenth and twentieth Gray maps of 64QAM symbol constellations, rather than respective ones of the eighteenth and nineteenth Gray maps of 64QAM symbol constellations.

FIG. 56 depicts an twenty-first Gray mapping of 64QAM symbol constellations that flips the eighteenth Gray mapping over by rotating the FIG. 53 eighteenth Gray map 180° around its 110111-to-111011 diagonal axis. QAM mappers 71 and 72 using respective ones of the FIG. 58 twenty-first Gray map and the FIG. 52 seventeenth Gray map of 64QAM symbol constellations support BRA to provide the same shaping gain as with QAM mappers 71 and 72 using respective ones of the FIG. 52 seventeenth Gray map and the FIG. 53 eighteenth Gray map of 64QAM symbol constellations. Whenever the lattice-point labels of the FIG. 52 seventeenth Gray map and of the FIG. 56 twenty-first Gray map of 16QAM symbol constellations are both 110011 or 111111 throughout an entire OFDM symbol, their OFDM subcarriers are modulated antipodally, to curtail their combined peak power similarly to what obtains in SCC. So, when the QAM mappers 71 and 72 use respective ones of the seventeenth and twenty-first Gray maps of 64QAM symbol constellations, PAPR is substantially lower than when the QAM mappers 71 and 72 use respective ones of the seventeenth and eighteenth Gray maps of 64QAM symbol constellations.

FIG. 57 is a twenty-second Gray mapping of 64QAM symbol constellations that modifies the FIG. 56 twenty-first Gray mapping by twisting the pattern of map labels in each quadrant about one of its diagonal axes, thereby exchanging the positions of innermost and outermost lattice-point labels in each quadrant. This reduces the maximum peak power associated with any of the 110011, 110111, 111011 or 111111 lattice-point labels being associated with the respective QAM modulation of all OFDM carriers during a COFDM symbol. This should improve PAPR somewhat further when the QAM mappers 71 and 72 use respective ones of the seventeenth and twenty-second Gray maps of 64QAM symbol constellations, rather than respective ones of the seventeenth and twenty-first Gray maps of 64QAM symbol constellations.

FIGS. 58 and 59 depict first and second optimized maps of lattice points in 64QAM symbol constellations that the QAM mappers 71 and 72 respectively provide in a physical layer pipe in some COFDM DCM transmitter apparatuses embodying aspects of the invention. The respective 6-bit labels of adjacent points in the lattice of an optimized mapping of 64QAM differ in three, four or five of their bits, rather than differing in only one or two of their bits. This benefits receiver apparatus employing iterative de-mapping and decoding procedures when reception is via a Rayleigh channel, without impairing reception via an AWGN channel too much.

The FIG. 58 optimized map of 64QAM symbol constellations was disclosed by Kyle Govindasamy, HongJun Xu and Narushan Pillay in their paper "Space-time block coded spatial modulation with labeling diversity" published September 2017 in *Wiley Online Library* and published January 2018 in *International Journal of Communication Systems*, Vol. 31, No. 1. They described using optimized and Gray maps of 64QAM symbol constellations together in MIMO wireless transmissions.

The FIG. 59 optimized map of 64QAM symbol constellations was derived by Allen LeRoy Limberg from the FIG. 58 optimized map using the following technique, which appears applicable for deriving the FIG. 29 optimized map of 64QAM symbol constellations from the FIG. 28 optimized map. The map labels of the original optimized map of square QAM symbol constellations are mirrored in a first preliminary map, which is then rotated 180° around map center to generate a second preliminary map. Each quadrant of the second preliminary map is then rotated 180° around its own center to generate a final optimized map of square QAM symbol constellations having labeling diversity respective to the initial optimized map of square QAM symbol constellations. So, this pair of optimized maps of 64QAM symbol constellations is one suited for use in COFDM DCM signals. Other pairs of optimized maps of 64QAM symbol constellations having labeling diversity are likely possible. The preceding technique can be applied to other forms of non-Gray mapping of square QAM symbol constellations thereby to develop pairs of maps having labeling diversity. E.g., the technique can be applied to anti-Gray mapping of the sort described by Alexander Boronka and Joachim Speidel in their paper "A low complexity MIMO system based on BLAST and iterative anti-Gray-demapping" published in 14*th IEEE Proceedings on Personal, Indoor and Mobile Radio Communications*, 2003, Vol. 2, pp. 1400-1404. The technique can also be applied to maximum squared Euclidean weight (MSEW) symbol mapping.

FIGS. 60, 61, 62 and 63 respectively depict first, second, third and fourth Gray maps of lattice points in 16APSK symbol constellations having FEC code rate 6/15. 16APSK is sometimes referred to as non-uniform QAM with 16 lattice points or "16NuQAM". Owing to the quadrantal symmetry, a complete 16APSK symbol constellation can be described by defining just the first quadrant of its complex constellation points. The complex constellation points for the +I, +Q first quadrant have respective energy values 0.5115+j1.2092, 1.2092+j0.5115, 0.2663+j0.4530, and 0.4530+j0.2663 in each of the 16APSK mappings. The complex constellation points for the +I, −Q second quadrant are the negative complex conjugates of the complex constellation points for the +I, +Q first quadrant and have respective energy values −0.5115+j1.2092, −1.2092+j0.5115, −0.2663+j0.4530, and −0.4530+j0.2663. The complex constellation points for the −I, −Q third quadrant are the negatives of the complex constellation points for the +I, +Q first quadrant and have respective energy values −0.5115−j1.2092, −1.2092−j0.5115, −0.2663−j0.4530, and −0.4530−j0.2663. The complex constellation points for the +I, −Q fourth quadrant are the complex conjugates of the complex constellation points for the +I, +Q first quadrant and have respective energy values 0.5115−j1.2092, 1.2092−j0.5115, 0.2663−j0.4530, and 0.4530−j0.2663.

In some COFDM DCM transmitter apparatuses embodying aspects of the invention the QAM mappers 71 and 72 in a physical layer pipe provide 16APSK symbol constellations mapped per FIGS. 60 and 61 respectively. The FIG. 60 first 16APSK map implements transmission of coded data in the lower sideband of a COFDM DSB signal, and the FIG. 61 second 16APSK map implements transmission of the same coded data in the upper sideband of that COFDM DSB signal. The FIG. 60 and FIG. 61 16APSK maps govern quadrature amplitude modulation of their respective sets of OFDM carriers according to first and second patterns, respectively, to support BRA to provide shaping gain. Bits of the labels for the FIG. 60 map of 16APSK symbol constellations more likely to experience error caused by accompanying AWGN correspond to bits of the labels for the FIG. 61 map of 16APSK symbol constellations less likely to experience error caused by accompanying AWGN. Bits of the labels for the FIG. 61 map of 16APSK symbol constellations more likely to experience error caused by accompanying AWGN correspond to bits of the labels for the FIG. 60 map of 16APSK symbol constellations less likely to experience error caused by accompanying AWGN.

FIGS. 60 and 62 respectively depict first and third Gray maps of lattice points in 16APSK symbol constellations that the QAM mappers 71 and 72 respectively provide in a physical layer pipe in other ASB-COFDM transmitter apparatuses embodying aspects of the invention. The labeling of lattice points in the FIG. 62 16APSK Gray map corresponds to the labeling of lattice points in the FIG. 60 first 16APSK map were that first 16APSK map rotated by 7C radians or 180°. The peak energy associated with any lattice point in the FIG. 60 first 16APSK map having an associated map label is countervailed to some degree by the peak energy associated with the lattice point in the FIG. 62 third 16APSK mapping having the same map label. The goal is to reduce PAPR of the COFDM symbols in the COFDM DCM.

FIGS. 60 and 63 respectively depict first and fourth Gray maps of lattice points in 16APSK symbol constellations that the QAM mappers 71 and 72 respectively provide in a physical layer pipe in still other ASB-COFDM transmitter apparatuses embodying aspects of the invention. The labeling of lattice points in the FIG. 63 fourth Gray map corresponds to the labeling of lattice points in the FIG. 61 second Gray map were that second Gray map rotated by 7C radians or 180°. Employing the first and fourth Gray maps of lattice points in 16APSK symbol constellations that the QAM mappers 71 and 72 respectively provide in a physical layer pipe provides the same improvement in SNR of reception over an AWGN channel as employing the first and second Gray maps of lattice points in 16APSK symbol constellations that the QAM mappers 71 and 72 respectively provide. However, PAPR is reduced by employing the first and fourth Gray maps of lattice points in 16APSK symbol constellations that the QAM mappers 71 and 72 respectively provide.

Mapping techniques of the sorts described in reference to FIGS. 6-59 are adaptable for application to large square QAM symbol constellations with more lattice points. Mapping techniques similar to those described in reference to FIGS. 60-63 are adaptable for application to larger APSK constellations. In variants of the mappings of any of the symbol constellations described supra, the second and fourth maps apply to the lower sideband of the COFDM DCM signal, and the first and third maps apply to the upper sideband of the COFDM DCM signal. Each pair of maps of QAM symbol constellations explicitly suggested for use by the QAM mappers 71 and 72 may be modified by ones' complementing the bits in all of their map labels to generate another pair of maps of OFDM symbol constellations to be used in the lower and upper sidebands of a COFDM DCM signal. The ordering of the bits in lattice point labels of QAM symbol constellations may be juggled, and sometimes this is done for a specific reason.

In the Gray mappings of square 16QAM symbol constellations depicted in FIGS. 6-9, one of the two sets of alternate bits in the map labels describe the ±I coordinates of successive QAM symbols, and the other of the two sets of alternate bits in the map labels describe the ±Q coordinates of those square QAM symbols. This is also so in the Gray mappings of square 64QAM symbol constellations depicted in FIGS. 30-34. Such labeling arrangements place the pair of bits specifying the mapping quadrant side-by-side in an effort to make it easier for viewers to sort out quadrant designations. The initial two bits of the map labels of the first map of square QAM and rearrangements thereof identify the mapping quadrants therein, and the final two bits of the map labels of the second map of square QAM and rearrangements thereof identify the mapping quadrants therein. This labeling arrangement also makes it easier to discern which bits in each pair of QAM symbols used for DCM are more or less susceptible to error caused by accompanying AWGN.

Other ordering of the bits in Gray map labels for describing square QAM symbol constellations can be used, however. Various other orderings of bits are characterized in general in the following way: the ±I coordinates and the ±Q coordinates of a succession of square QAM symbols are described by respective halves of the map labels of the QAM mapping. One specific example of this general technique is as follows. In one of the two sidebands of the COFDM DCM signal, the initial halves of map labels describe the ±I coordinates of the square QAM symbols therein, and the final halves of map labels describe the ±Q coordinates of those square QAM symbols. In the other sideband of the COFDM DCM signal the initial halves of map labels describe the ±Q coordinates of the square QAM symbols therein, and the final halves of map labels describe the ±I coordinates of those square QAM symbols. In another example of the same general technique, the initial halves of map labels describe the ±I coordinates of the square QAM symbols in both sidebands of the COFDM DCM signal, and the final halves of map labels describe the ±Q coordinates of those square QAM symbols. In yet another example of that general technique, the initial halves of map labels describe the ±Q coordinates of the square QAM symbols in both sidebands of the COFDM DCM signal, and the final halves of map labels describe the ±I coordinates of those square QAM symbols.

Figure 64:
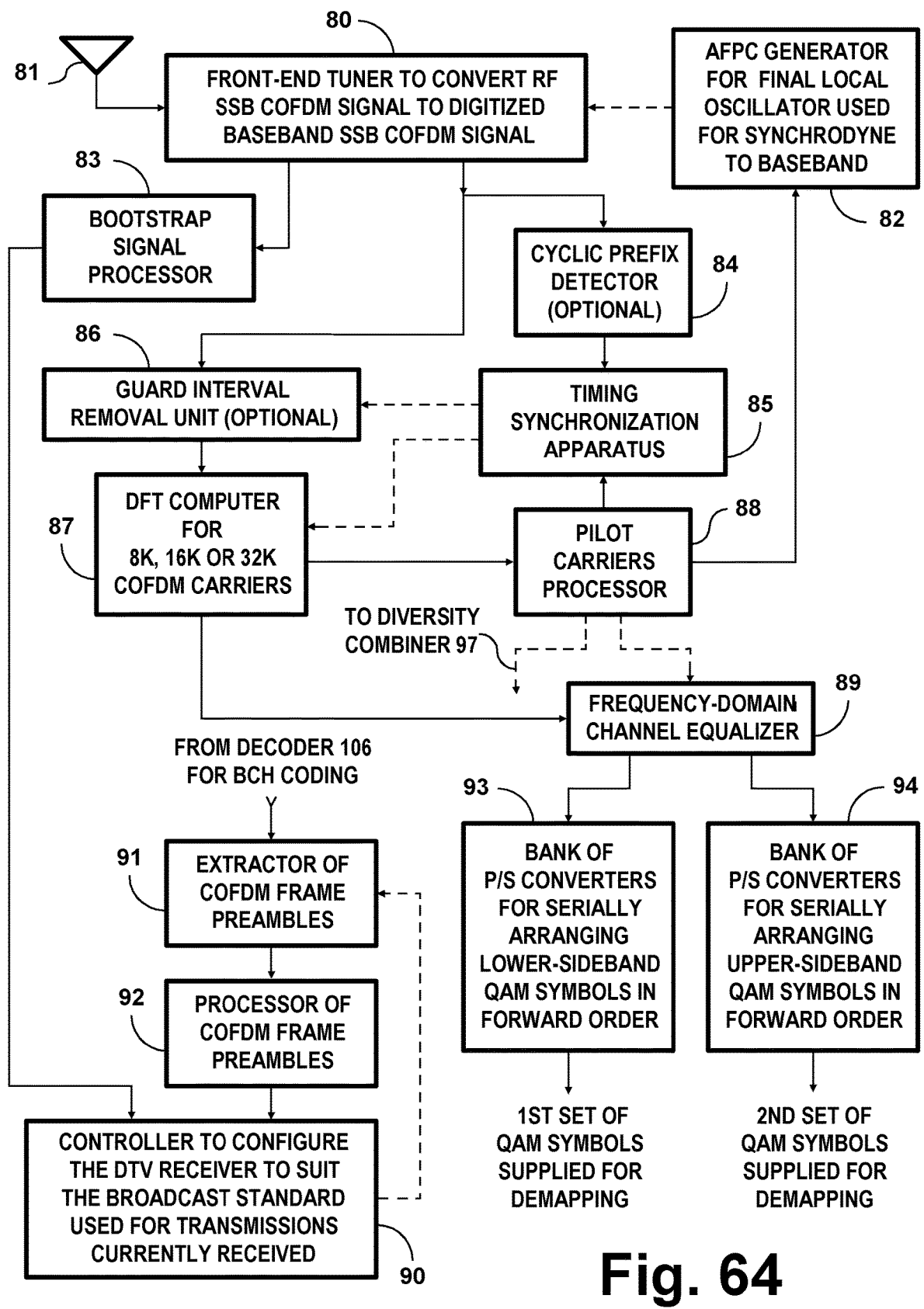
FIGS. 64 and 65 together form a schematic diagram of the general structure of single-sideband receiver apparatus adapted for receiving COFDM DCM radio-frequency signals in accordance with aspects of the invention.

FIG. 64 shows the initial portion of a receiver designed for iterative-diversity reception of COFDM signals as transmitted at VHF or UHF by a DTV transmitter, such as the one depicted in FIGS. 1, 2 and 3. A front-end tuner 80 of the receiver selects its input signal from one of the radio-frequency (RF) signals captured by a reception antenna 81 (or, alternatively, received via cable connection). The front-end tuner 80 can be of a double-conversion type composed of initial single-conversion super-heterodyne receiver circuitry for converting the selected RF COFDM signal to an intermediate-frequency (IF) COFDM signal followed by circuitry for performing a final conversion of that IF COFDM signal to baseband single-sideband COFDM (SSB-COFDM) signal. The initial conversion circuitry typically comprises a tunable RF amplifier for RF COFDM signal incoming from the reception antenna, a tunable first local oscillator, a first mixer for heterodyning the amplified RF COFDM signal with local oscillations from the first local oscillator to obtain an IF COFDM signal, and an intermediate-frequency (IF) amplifier for the IF COFDM signal. Typically, the front-end tuner 80 further includes a synchronous demodulator for performing the final conversion from IF COFDM signal to baseband SSB-COFDM signal and an analog-to-digital converter for digitizing that baseband signal. Synchronous demodulation is performed with respect to carrier frequency at one of the edges of the reception channel rather than with respect to carrier frequency at the center of the reception channel, so the baseband COFDM signal is single-sideband (SSB) in nature and is considered to be an SSB-COFDM baseband signal. Synchronous demodulation circuitry typically comprises a final local oscillator with automatic frequency and phase control (AFPC) of its oscillations, a second mixer for synchrodyning amplified IF SSB-COFDM signal with local oscillations from the final local oscillator to obtain the baseband SSB-COFDM signal, and a low-pass filter for suppressing image signal accompanying the baseband SSB-COFDM signal. In some designs of the front-end tuner 80, synchronous demodulation is performed in the analog regime before subsequent analog-to-digital conversion of the resulting complex baseband single-sideband COFDM signal. In other designs of the front-end tuner 80, analog-to-digital conversion is performed before synchronous demodulation is performed in the digital regime.

Simply stated, the front-end tuner 80 converts radio-frequency COFDM signal received at its input port to digitized samples of baseband COFDM signal supplied from its output port, without the frequency spectrum of the COFDM signal being folded in half. Typically, the digitized samples of the real component of the baseband SSB-COFDM signal are alternated with digitized samples of the imaginary component of that baseband signal for arranging the complex baseband SSB-COFDM signal in a single stream of digital samples. FIG. 64 depicts an AFPC generator 82 for generating the automatic frequency and phase control (AFPC) signal for controlling the final local oscillator within the front-end tuner 80.

The output port of the front-end tuner 80 is connected for supplying digitized samples of baseband SSB-COFDM signal to the respective input ports of a bootstrap signal processor 83 and of a cyclic prefix detector 84. The cyclic prefix detector 84 differentially combines the digitized samples of baseband SSB-COFDM signal with those samples as delayed by the duration of an effective COFDM symbol. Nulls in the difference signal so generated should occur, marking the guard intervals of the baseband SSB-COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 85.

A first of two output ports of the timing synchronization apparatus 85 is connected for supplying gating control signal to the control input port of a guard-interval-removal unit 86, the signal input port of which is connected for receiving digitized samples of baseband ASB-COFDM signal from the output port of the front-end tuner 80. The output port of the guard-interval-removal unit 86 is connected for supplying the input port of discrete-Fourier-transform computer 87 with windowed portions of the baseband ASB-COFDM signal that contain effective COFDM samples. A second of the output ports of the timing synchronization apparatus 85 is connected for supplying the DFT computer 87 with synchronizing information concerning the effective COFDM samples.

Although the ASB-COFDM signals have the preferred format illustrated in FIG. 5, the guard-interval-removal unit 86 for ASB-COFDM signals is similar to conventional guard-interval-removal units used for SSB-COFDM signals. The guard-interval-removal unit 86 works with COFDM signals that have not had their frequency spectrum folded in half by synchrodyne, but is similar to conventional guard-interval-removal units used in reception of DSB-COFDM signals.

The indications concerning the phasing of COFDM symbols that the cyclic prefix detector 84 supplies to the timing synchronization apparatus 85 are sufficiently accurate for initial windowing of a baseband SSB-COFDM signal that the guard-interval-removal unit 86 supplies to the DFT computer 87. A first output port of the DFT computer 87 is connected for supplying demodulation results for at least all of the pilot carriers in parallel to the input port of a pilot carriers processor 88, and a second output port of the DFT computer 87 is connected for supplying demodulation results for each of the COFDM carriers to the input port of a frequency-domain channel equalizer 89. The processor 88 selects the demodulation results concerning pilot carriers for processing, part of which processing generates weighting coefficients for channel equalization filtering in the frequency domain. A first of four output ports of the processor 88 that are explicitly shown in FIG. 64 is connected for supplying these weighting coefficients (via wiring depicted as a dashed-line connection) to the frequency-domain channel equalizer 89, which uses those weighting coefficients for adjusting its responses to the demodulation results for each of the COFDM carriers.

A second of the output ports of the pilot carriers processor 88 that are explicitly shown in FIG. 64 is connected for supplying more accurate window-positioning information to the second input port of the timing synchronization apparatus 85. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 88 explicitly shown in FIG. 64 is connected for forwarding unmodulated pilot carriers to the input port of the AFPC generator 82. The real components of the unmodulated pilot carriers are multiplied by their respective imaginary components in the AFPC generator 82. The resulting products are summed and low-pass filtered to develop the AFPC signal that the AFPC generator 82 supplies to the front-end tuner 80 for controlling the final local oscillator therein. Other methods to develop AFPC signals for the final local oscillator in the front-end tuner 80 are also known, variants of which can replace or supplement the method described above.

E.g., the complex digital samples from the tail of each half OFDM symbol are multiplied by the conjugates of corresponding digital samples from the cyclic prefix of the half OFDM symbol. The resulting products are summed and low-pass filtered to develop the AFPC signal that the AFPC generator 82 supplies to the front-end tuner 80 for controlling the final local oscillator therein. This method is a variant of a known method to develop AFPC signals in receivers for double-sideband COFDM signals described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997.

Figure 65:
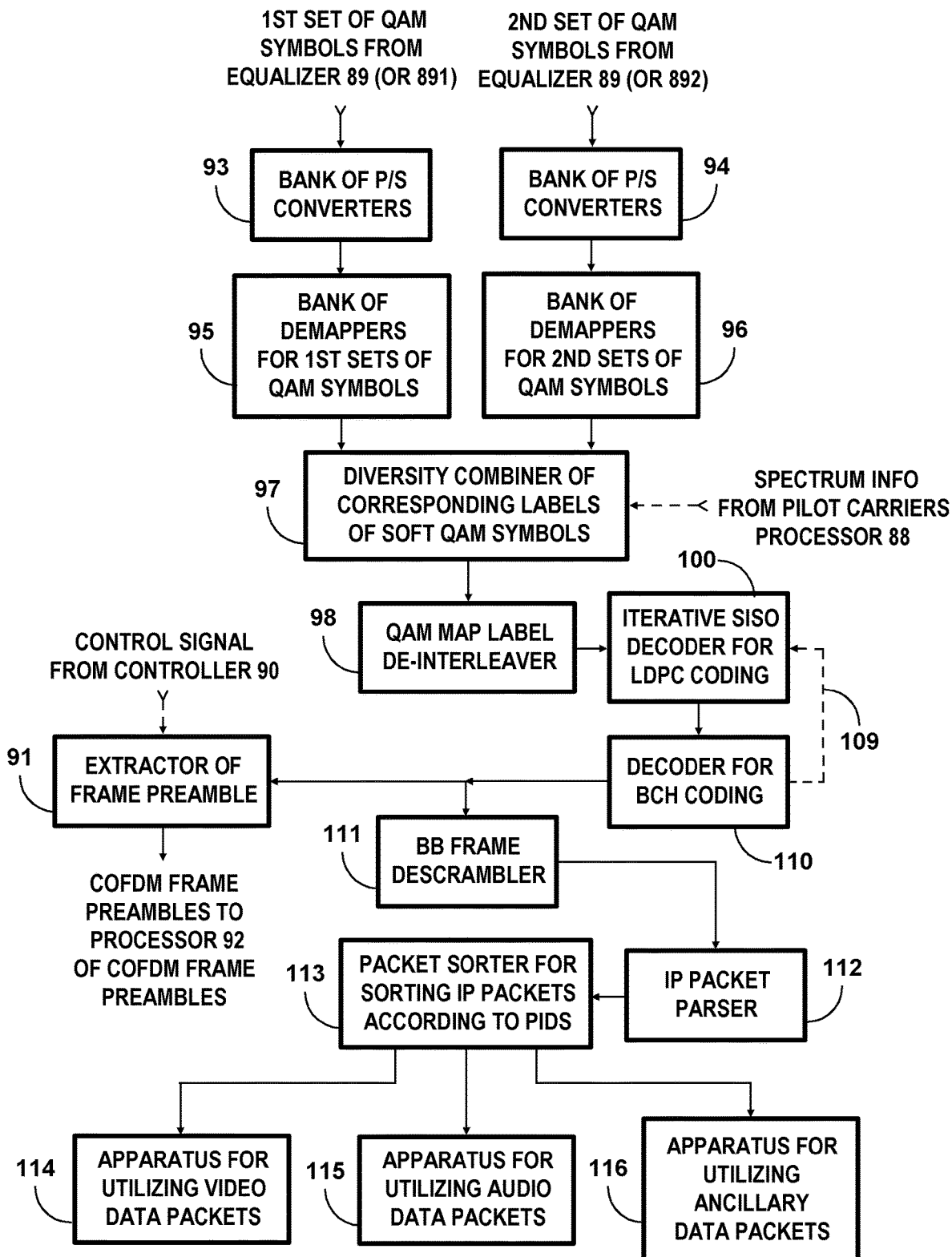

FIG. 64 indicates that a fourth of the output ports of the pilot carriers processor 88 is connected to a diversity combiner 97 (depicted in FIG. 65). Through such connection the pilot carriers processor 88 furnishes information concerning the frequency spectrum of each successive COFDM symbol, which the diversity combiner 97 can use to determine how it will combine its input signals to generate its output signal.

The DFT computer 87 is configured so it can demodulate any one of 8K, 16K or 32K options as to the number of OFDM subcarriers. The correct option is chosen responsive to an instruction from a controller 90 that generates a number of instructions used to configure the COFDM receiver to suit the broadcast standard used transmissions currently received. To keep the drawings from being too cluttered to be easily understood, they do not explicitly illustrate the multitudinous connections from the controller 90 to the elements of the receiver controlled by respective instructions from the controller 90.

As noted supra, the second output port of the DFT computer 87 is connected to supply demodulated complex digital samples of the complex coordinates of QAM symbol constellations in parallel to the input port of the frequency-domain channel equalizer 89. To implement a simple form of frequency-domain channel equalization, the pilot carriers processor 88 measures the amplitudes of the demodulated pilot carriers to determine basic weighting coefficients for various portions of the frequency spectrum. The pilot carriers processor 88 then interpolates among the basic weighting coefficients to generate respective weighting coefficients supplied to the frequency-domain channel equalizer 89 with which to multiply the complex coordinates of QAM symbol constellations supplied from the DFT computer 87. Various alternative types of frequency-domain channel equalizer are also known.

An extractor 91 of COFDM frame preambles selects them from COFDM frames of decoded data supplied from a decoder 106 for BCH coding, which decoder 106 is depicted in FIG. 65. The output port of the extractor 91 of COFDM frame preambles connects to the input port of a processor 92 of the COFDM frame preambles. The controller 90 is connected for responding to elements of COFDM frame preambles forwarded to a second of its input ports from an output port of the COFDM frame preambles processor 92.

The controller 90 is connected for responding to elements of the bootstrap signal forwarded to a first of its input ports from an output port of the bootstrap signal processor 83. The controller 90 supplies COFDM data frame information to the pilot carriers processor 88, which data frame information can be generated responsive to baseband bootstrap signal that the bootstrap signal processor supplies to the controller 90. Since the bootstrap signal is not always received acceptably free of error, it is good design to provide a source alternative to the bootstrap signal processor 83 for supplying the controller 90 back-up information as to the nature of received DTV signal. Such a source is necessary if bootstrap signal is not transmitted or if the receiver does not include a bootstrap signal processor. Accordingly the response of a decoder 106 for BCH coding, which decoder 106 is depicted in FIG. 65, is supplied to input port of an extractor 91 of FEC frame preambles from the decoder 106 response. If the frame preamble at the beginning of each COFDM data frame is repeated, the extractor 91 readily detects when frame preambles occur by correlating successive COFDM symbols in the response from the decoder 106 in accordance with the well-known Schmidl-Cox method. The output port of the extractor 91 of FEC frame preambles is connected for supplying them to the input port of a processor 92 of COFDM frame preambles. The output port of the processor 92 of COFDM frame preambles is connected for supplying an input port of the controller 90 with information as to the nature of received DTV signal, the interconnection between which ports may comprise a plurality of separate connections. FIG. 64 shows a connection from the controller 90 to the extractor 91 of FEC frame preambles through which connection the controller 90 can supply the extractor 91 a control signal including predictions of when FEC frame preambles are expected to occur.

Responsive to information supplied from the bootstrap signal processor 83 or from the processor 92 of COFDM frame preambles, the controller 90 prescribes the basic sample rate and the size of I-FFT that the controller 90 instructs the DFT computer 87 to use in its operation regarding DTV signal. The controller 90 instructs the channel equalizer 89 and the banks 93 and 94 of parallel-input/serial-output converters to configure themselves to suit the size of DFT that the controller 90 instructs the DFT computer 87 to generate.

The frequency-domain channel equalizer 89 is connected for supplying complex coordinates of the QAM symbol constellations from the lower-frequency half COFDM symbol, in parallel and in forward spectral order, to the bank 93 of parallel-to-serial (P/S) converters. One of these P/S converters as selected by the controller 90 supplies the complex coordinates of a first set of QAM symbol constellations extracted from the lower-frequency halves of successive COFDM symbols. The frequency-domain channel equalizer 89 is further connected for supplying complex coordinates of the QAM symbol constellations from the higher-frequency half COFDM symbol, in parallel and in forward spectral order, to the bank 94 of parallel-to-serial (P/S) converters. One of these P/S converters as selected by the controller 90 supplies the complex coordinates of a second set of QAM symbol constellations extracted from the higher-frequency halves of successive COFDM symbols.

"Forward spectral order" refers to the complex coordinates of each successive QAM symbol constellation from a half COFDM symbol having been conveyed by the COFDM subcarrier next higher in frequency than that having conveyed its predecessor QAM symbol. Each of the banks 93 and 94 of P/S converters comprises respective P/S converters that are appropriate for half the number of OFDM carriers that can convey data in a COFDM symbol of prescribed size. The pair of P/S converters selected for current reception is determined by a control signal that the controller 90 supplies in common to each of the banks 93 and 94 of P/S converters.

The first sets of QAM symbol constellations are those that originate from the first mapping procedures in the COFDM transmitter apparatus and are supplied from the output port of the bank 93 of P/S converters to the input port of a bank 95 of demappers for the first sets of QAM symbol constellations, as depicted in FIG. 65. The second sets of QAM symbol constellations are those that originate from the second mapping procedures in the COFDM transmitter apparatus and are supplied from the output port of the bank 94 of P/S converters to the input port of a bank 96 of demappers for the second sets of QAM symbol constellations, as depicted in FIG. 65. Each of the banks 95 and 96 of demappers comprises a respective set of QAM demappers for different sizes of QAM symbol constellations—e.g., one for square 16QAM, one for 16APSK, one for square 64QAM, one for square 256QAM, and possibly one for larger-size square QAM or APSK. The pair of demappers selected for current reception is determined by a control signal that the controller 90 supplies in common to each of the banks 95 and 96 of QAM demappers.

The pairs of QAM demappers in the banks 95 and 96 of demappers could be paired Gray demappers, paired SCM demappers, paired natural demappers, paired anti-Gray demappers, paired "optimal" demappers of various types or some mixture of those types of paired demappers. However, if the demapping results from the antiphase-energy QAM demappers are to be maximal-ratio combined at bit level to improve effective SNR for AWGN reception, it is strongly recommended that QAM symbol constellations be Gray mapped or SCM mapped. It is practical for each of the QAM demappers to constitute a plurality of read-only memories (ROMs), one for each bit of map labeling, addressed by the complex coordinates descriptive of the current QAM symbol. Each ROM is read to provide a "hard" bit followed by a confidence factor indicating how likely that bit is to be correct. Customarily these confidence factors are expressed as logarithm of likelihood ratios (LLRs). The order of bits in a pair of Gray or SCM lattice-point labels can be similarly shuffled from ones depicted in FIGS. 6-63 to facilitate alternative demapping procedures that demap the in-phase and quadrature-phase components of QAM symbols separately from each other.

The confidence factors are usually based, at least in substantial part, on judgments of the distance of the complex coordinates descriptive of the current QAM symbol from the edges of the bin containing the "hard" bit. The confidence factors can be further based on whether or not the bin containing the "hard" bit is at an edge of the current QAM symbol constellation and, if so, whether the complex coordinates descriptive of that current QAM symbol closely approach that edge or even pass beyond it a little. The confidence factor that the "hard" bit is correct is increased if the complex coordinates descriptive of that current QAM symbol closely approach a symbol constellation edge or even pass beyond it. This increase applies to all bits in the map label. This effect obtains if mapping of QAM symbol constellations is Gray mapping or is SCM mapping.

FIG. 65 shows connections from the output ports of the banks 95 and 96 of demappers to respective input ports of a diversity combiner 97 of corresponding soft QAM labels operative at bit level. Each soft QAM label is composed of a plurality of "soft" bits. Each of these "soft" bits constitutes a "hard" bit and a confidence factor that that "hard" bit has been correctly decided; this confidence factor is conventionally expressed as a logarithm of likelihood ratio (LLR). This information is utilized in subsequent soft decoding procedures of the FEC coding reproduced in interleaved form from the diversity combiner 97. The output port of the diversity combiner 97 serially supplies soft bits of successive QAM labels to the input port of a bit de-interleaver 98 as soft bits of interleaved LDPC coding.

FIG. 65 shows the read-output port of the QAM map label de-interleaver 98 connected to the input port of an iterative soft-input/soft-output (SISO) decoder 100 for LDPC coding. FIG. 65 further shows the output port of the decoder 100 connected for supplying the results of its decoding LDPC coding to the input port of a decoder 110 of BCH coding. FIG. 65 shows a control connection 109 from the decoder 110 of BCH coding back to the decoder 100 of LDPC coding, through which connection 109 the decoder 110 sends an indication of when it has decoded a correct BCH codeword. This indication signals the decoder 100 of LDPC coding that it can discontinue iterative decoding before reaching a limit on the maximum number of iterations permitted, which early discontinuation of iterative decoding conserves power consumption by the receiver. The output port of the decoder 110 is connected for supplying the results of its decoding BCH coding to the input port of a BB Frame descrambler 111, which includes a de-jitter buffer and null-packet re-inserter that are not explicitly shown in FIG. 65.

FIG. 65 shows the output port of the BB Frame descrambler 111 connected to supply IP packets to the input port of an internet-protocol packet parser 112. The output port of the IP packet parser 112 is connected to supply IP packets to a packet sorter 113 for sorting IP packets according to their respective packet identifiers (PIDs) to one of the respective input ports of apparatus 114 for utilizing video data packets, apparatus 115 for utilizing audio data packets, and apparatus 116 for utilizing ancillary data packets.

FIG. 65 depicts a single SISO decoder 100 for LDPC coding in cascade connection with a single decoder 110 for BCH coding thereafter. In actual practice there are apt to be at least two such cascade connections available, suitable to respective different sizes of FEC code blocks, with one of these cascade connections selected for supplying decoded data to the input port of the BB frame descrambler 111 in accordance with instructions from the controller 90. Alternatively, decoders for other types of FEC coding replace the decoders 100 and 110 in other receiver apparatus embodying aspects of the invention. For example, a cascade connection of decoders for concatenated RS and turbo coding is used instead of the cascade connection of decoders 100 and 110.

Not all COFDM communication systems will concatenate BCH coding and LDPC coding. Cyclic redundancy check (CRC) coding can be used instead of BCH coding for detecting the successful conclusion of LDPC decoding. In such case, the general structure of COFDM receiver apparatus depicted in FIGS. 64 and 65 is modified to replace the decoder 110 for BCH coding with a decoder for CRC coding. However, unlike the decoder 110 for BCH coding, the decoder for CRC coding will not be capable of correcting remnant errors from iterative decoding of LDPC coding.

LDPC coding that lends itself to being successfully decoded in a few iterations will allow the decoder 110 to be replaced by direct connection from the SISO decoder 100 to the input port of the BB Frame descrambler 111. The LDPC block coding that has customarily been used in DTV broadcasting can be replaced with LDPC convolutional coding. Forward-error-correction coding can be used that does not incorporate LDPC coding at all. The techniques for PAPR reduction using single-time retransmission can be applied if multi-level coding (MLC) is used, rather than bit-interleaved coded modulation (BICM). If MLC is used, there is less reason to consider replacing uniform QAM of OFDM carriers with non-uniform QAM than there is for BICM. (Incidentally, convolutional LDPC coding is better adapted to MLC than is block LDPC coding.)

Figure 66:
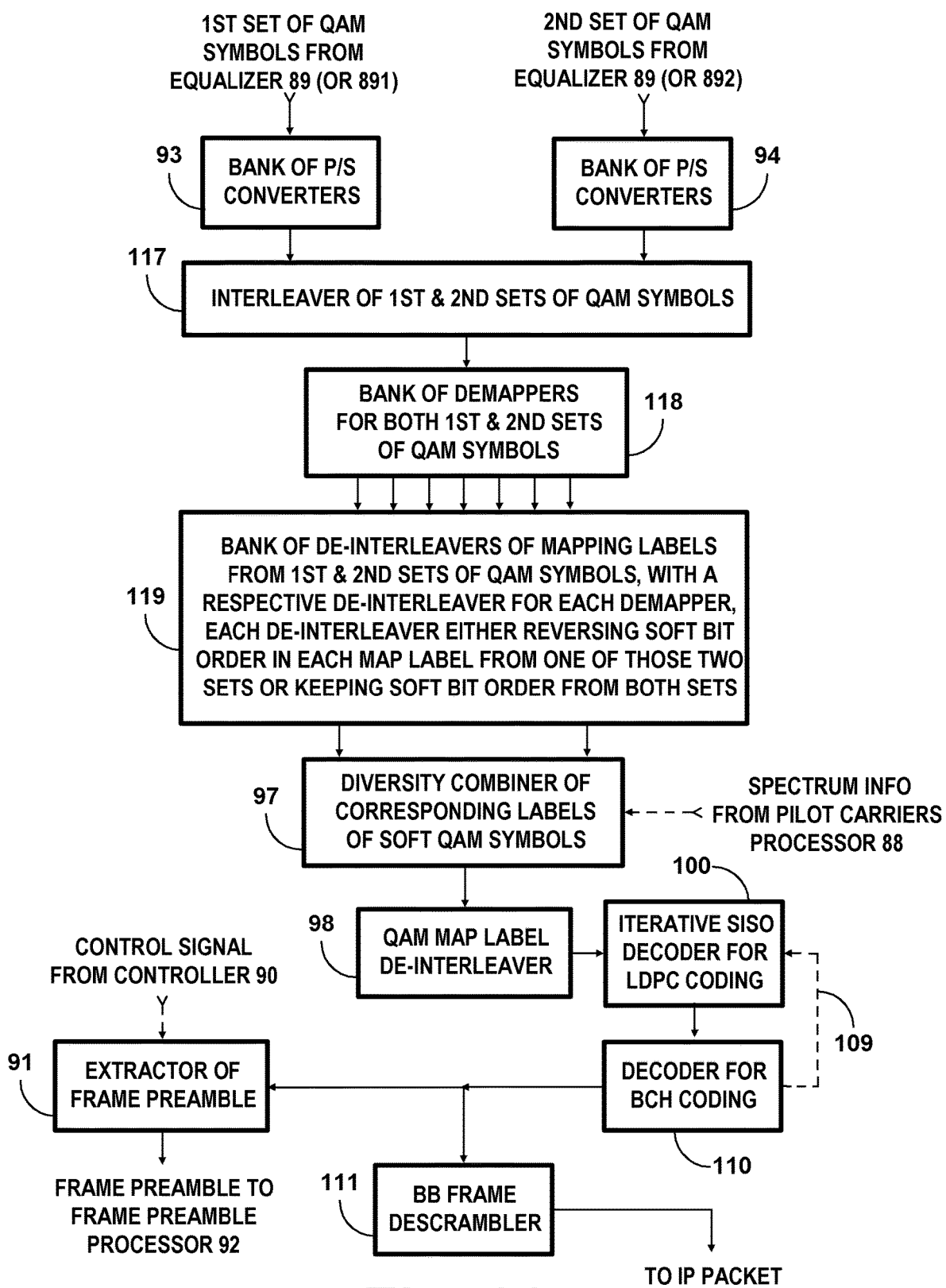
FIGS. 66, 67 and 68 are detailed schematic diagram of various modifications made to the receiver apparatus shown in FIG. 65 to allow QAM symbols from the lower sideband of an COFDM DCM radio-frequency signal and from its upper sideband to be demapped by a common QAM symbol demapper.
Figure 67:
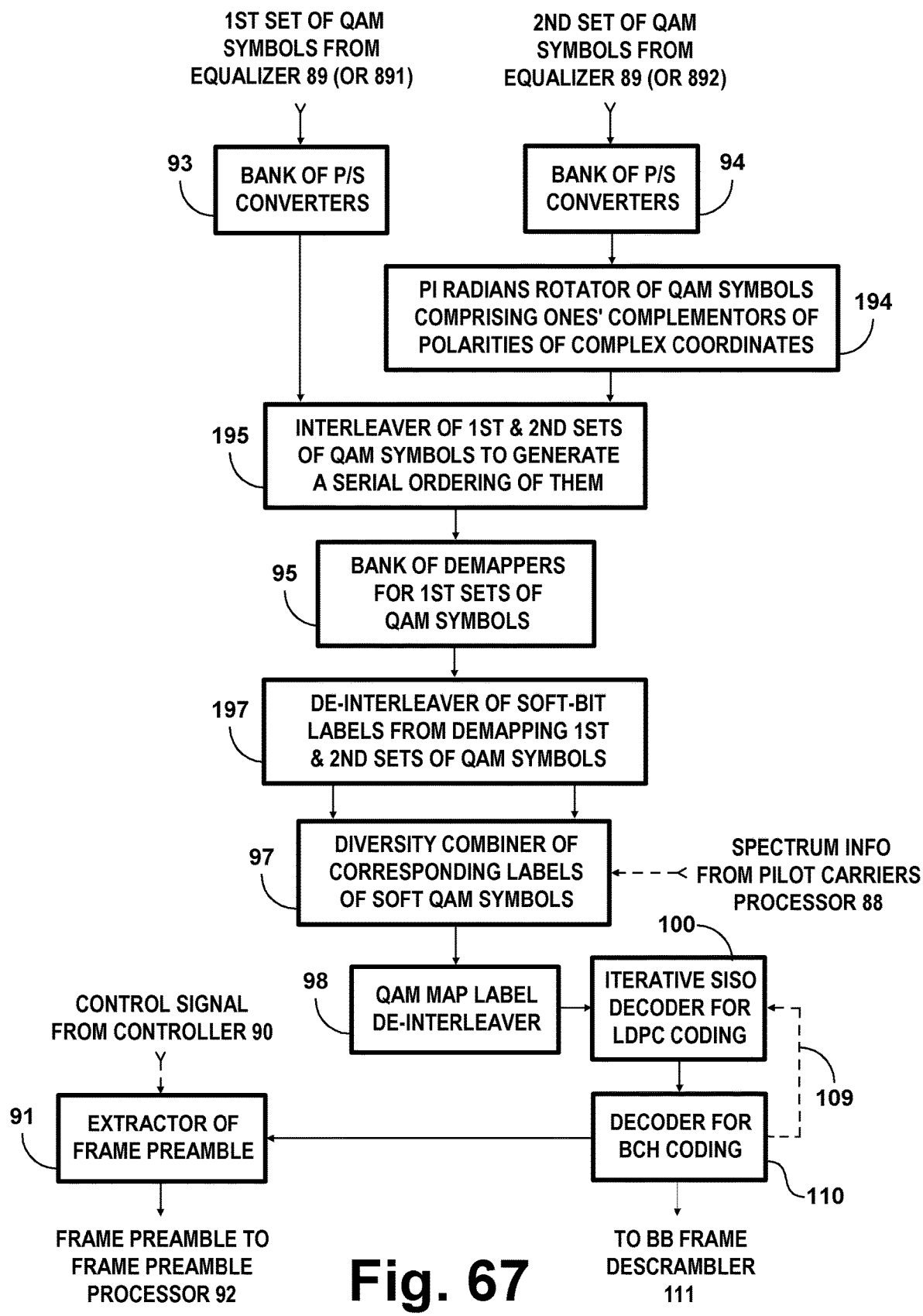
Figure 68:
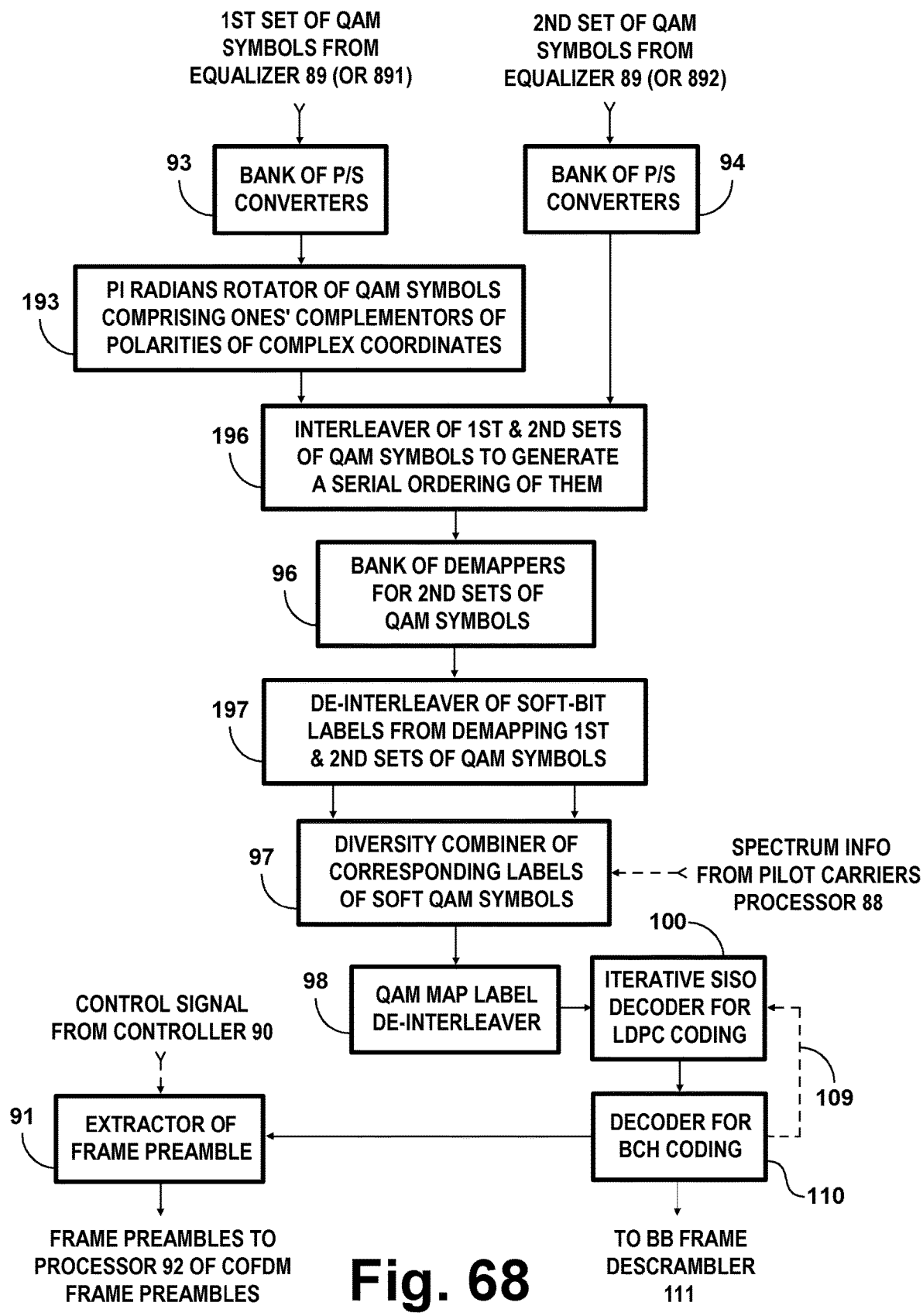

FIGS. 66, 67 and 68 depict the general forms of respective modifications of the FIG. 65 receiver apparatus for COFDM DCM signal, each of which modifications permits both the lower and upper sidebands of that signal to be demapped by shared demapping apparatus. This shared demapping apparatus replaces the separate banks 95 and 96 of demappers for QAM signals for separate portions of COFDM DCM signal that are depicted in FIG. 65. In FIG. 66 this shared mapping apparatus is a single bank 118 of demappers for demapping both the lower and upper sidebands of the COFDM DCM signal. In FIG. 67 this shared mapping apparatus is a single bank 95 of demappers for demapping both the lower and upper sidebands of the COFDM DCM signal. In FIG. 68 this shared mapping apparatus is a single bank 96 of demappers for demapping both the lower and upper sidebands of the COFDM DCM signal. The general forms of the respective portions of receiver apparatus for COFDM DCM signals, as depicted in FIGS. 66, 67 and 68 differ from portions of receiver apparatuses for DSB-COFDM signal disclosed in US-2018-0034677, although there are general similarities to those portions of receiver apparatuses for DSB-COFDM. The respective differences of the portions of receiver apparatus for COFDM DCM signals depicted in FIGS. 66, 67 and 68 are described infra.

Modifications of the FIG. 65 receiver apparatus for COFDM DCM signal per FIGS. 66, 67 and 68 are useful for fewer types of COFDM DCM signal than the FIG. 65 receiver apparatus is useful for, as also described infra. The modifications FIGS. 66, 67 and 68 do not accommodate the QAM mappings that most reduce PAPR of the COFDM DCM signal. If this more limited capability be acceptable, there is some practical advantage in using a single demapper for two sets of QAM symbols, rather than a pair of demappers for respective ones of those two sets of QAM symbols. A QAM demapper is apt to comprise a substantial amount of read-only memory (ROM) that takes up much area on a semiconductor die in monolithic integrated circuitry. This ROM is addressed by the phase and quadrature components of the demodulated QAM symbols and stores the logarithmic likelihood ratio (LLR) of signal to error of each bit in the map label read out in soft-bit form from the ROM.

FIG. 66 is a schematic diagram of a modification of the FIG. 65 portion of some COFDM receiver apparatus, as used in alternative embodiments of the invention. The FIG. 66 modification employs a single bank 118 of demappers for QAM symbols instead of a bank 95 of demappers for the first sets of QAM symbol constellations from the lower sidebands of COFDM DCM signals and another bank 96 of demappers for the second sets of QAM symbol constellations from the upper sidebands of COFDM DCM signals. The output port of the bank 93 of P/S converters is connected for supplying the first set of QAM symbol constellations to a first input port of an interleaver 117 for QAM symbols, and the output port of the bank 94 of P/S converters is connected for supplying the second set of QAM symbol constellations to a second input port of that interleaver 117. The output port of the QAM symbols interleaver 117 is connected for supplying QAM symbol constellations alternatively selected from the first and second sets of them to the input port of the bank 118 of demappers for both sets of QAM symbols.

The respective output port of each of the demappers in bank 118 of them connects to a respective input port of one of the de-interleavers in bank 119 of them. Responsive to received COFDM signal, the controller 90 supplies control signals for selecting a suitable one of the bank 118 of demappers and the one of the bank 119 of de-interleavers that is associated with that selected demapper. The selected one of the bank 119 of de-interleavers is conditioned to supply a separated first set of lattice-point labels from a first output port thereof to the first input port of the diversity combiner 97. The selected one of the bank 119 of de-interleavers is also conditioned to supply a separated second set of lattice-point labels from a second output port thereof to the second input port of the diversity combiner 97. The output port of the diversity combiner 97 connects directly to the input port of the QAM map label de-interleaver 98. Connections following the de-interleaver 98 are similar in FIG. 66 to those described in regard to FIG. 65.

FIG. 66 indicates that each de-interleaver of mapping labels from the first and second sets of QAM symbols in the bank 119 of de-interleavers reverses the soft bit order in each map label from one of those two sets of QAM symbols. More particularly, each de-interleaver of mapping labels reverses the order of soft bits from each map label demapped from one of those two sets of QAM symbols. Accordingly, the FIG. 66 receiver apparatus is useful when the map labels of one of those two sets of QAM symbols mirror the map labels of the other of those two sets of QAM symbols. A de-interleaver of mapping labels can be designed to be appropriate when COFDM DCM signals are generated using the first and second Gray maps of 16QAM constellations of FIGS. 6 and 7, for example. A de-interleaver of mapping labels can be designed to be appropriate when COFDM DCM signals are generated using the first and second SCM maps of 16QAM constellations of FIGS. 10 and 11, for example. A de-interleaver of mapping labels can be designed to be appropriate when COFDM DCM signals are generated using the first and second Gray maps of 64QAM constellations of FIGS. 30 and 31, for example. A de-interleaver of mapping labels can be designed to be appropriate when COFDM DCM signals are generated using the first and second SCM maps of 64QAM constellations of FIGS. 34 and 35, for example.

If de-interleavers of mapping labels in the bank 119 of de-interleavers are modified so as not to reverse the soft bit order in each map label from each of those two sets of QAM symbols, the FIG. 66 receiver apparatus is useful when the QAM symbols in both the lower and the upper sidebands of the COFDM DCM signals use the same labeling of lattice points in their QAM symbol constellations. I.e., the sidebands of such COFDM DCM signals are "independent" only because the similar OFDM carriers in them are both disposed in forward order, rather than in mirrored spectral orders as is the case in a DSB-COFDM signal.

The single-sideband receiver apparatus depicted in FIGS. 64 and 65 can be modified to demodulate and demap DSB-COFDM signals without folding frequency spectrum in half. The bank 93 of P/S converters connected in FIG. 64 for serially arranging lower-sideband QAM symbols in forward order is reconnected for serially arranging lower-sideband QAM symbols in mirror order, and the banks 95 and 96 of demappers for QAM symbols are the same in structure. Such receiver apparatus is depicted explicitly in FIGS. 4 and 5 of the drawings of U.S. patent application Ser. No. 15/641,014 filed by Allen LeRoy Limberg on 3 Jul. 2017 and titled "Double-sideband COFDM signal receivers that demodulate unfolded frequency spectrum".

The single-sideband receiver apparatus depicted in FIGS. 64 and 65 as modified in FIG. 66 can be further modified to demodulate and demap DSB-COFDM signals without folding frequency spectrum in half. In this modification as well, the bank 93 of P/S converters connected in FIG. 64 for serially arranging lower-sideband QAM symbols in forward order is reconnected instead for serially arranging lower-sideband QAM symbols in mirror order. Such further modification of the receiver apparatus depicted in FIGS. 64-66 is depicted explicitly in FIGS. 4, 5 and 8 of the drawings of U.S. patent application Ser. No. 15/641,014.

FIGS. 67 and 68 show modifications that can be made to the receiver apparatus shown in FIG. 66 to permit a common QAM symbol demapper to be used both to demap a first set of QAM symbols from the lower sideband of a COFDM DCM signal and to demap a second set of QAM symbols from the upper sideband of a COFDM DCM signal. These modifications are suitable when QAM symbol constellations in the lower sidebands of an COFDM DCM signal are rotated pi radians or 180° respective to QAM symbol constellations in the upper sidebands of a COFDM DCM signal with similar map labeling. By way of specific examples, these modifications are suitable when QAM symbol constellations in one of these sidebands and the other of these sidebands of a COFDM DCM signal are respectively mapped per separate ones of the FIG. 6 and FIG. 8 Gray maps of 16QAM symbol constellations, per separate ones of the FIG. 10 and FIG. 12 SCM maps of 16QAM symbol constellations, per separate ones of the FIG. 30 and FIG. 32 Gray maps of 64QAM symbol constellations, per separate ones of the FIG. 34 and FIG. 36 SCM maps of 64QAM symbol constellations, or per separate ones of the FIG. 60 and FIG. 62 Gray maps of 16APSK symbol constellations. By way of further specific examples, these modifications are suitable when QAM symbol constellations in one of these sidebands and the other of these sidebands of a COFDM DCM signal are respectively mapped per separate ones of the FIG. 7 and FIG. 9 Gray maps of 16QAM symbol constellations, per separate ones of the FIG. 11 and FIG. 14 SCM maps of 16QAM symbol constellations, per separate ones of the FIG. 31 and FIG. 33 Gray maps of 64QAM symbol constellations, per separate ones of the FIG. 35 and FIG. 38 SCM maps of 64QAM symbol constellations, or per separate ones of the FIG. 61 and FIG. 63 Gray maps of 16APSK symbol constellations.

FIG. 67 is a detailed schematic diagram of modifications made to the receiver apparatus shown in FIG. 65 to allow second sets of QAM symbols as well as first sets of QAM symbols to be demapped by the bank 95 of QAM symbol demapper for the first sets of QAM symbols. A pi radians rotator 194 is connected for changing the polarities of both the real and the imaginary components of the complex coordinates of the second set of QAM symbols supplied from the P/S converter 94. An interleaver 195 of QAM symbols from the first and second sets of them is connected for interleaving the complex coordinates of the first set of QAM symbols supplied from the P/S converter 93 with the complemented complex coordinates of the second set of QAM symbols supplied from the pi radians rotator 194. This interleaving is done on a QAM symbol by QAM symbol basis to generate a serial ordering of QAM symbols supplied as input signal to the bank 95 of demappers for the first maps of QAM symbols. The output port of the bank 95 of demappers is connected for supplying interleaved soft-bit QAM lattice-point labels to a de-interleaver 197, which separates each successive pair of soft-bit QAM lattice-point labels, supplying the soft-bit lattice-point labels of the first set of QAM symbols to the first input port of the diversity combiner 97, and supplying the soft-bit lattice-point labels of the second set of QAM symbols to the second input port of the diversity combiner 97. The output port of the diversity combiner 97 connects directly to the write-input port of the QAM map label de-interleaver 98. Connections following the de-interleaver 98 are similar in FIG. 67 to those described in regard to FIG. 65.

FIG. 68 is a detailed schematic diagram of alternative modifications made to the receiver apparatus shown in FIG. 65 to allow first sets of QAM symbols as well as second sets of QAM symbols to be demapped by the bank 96 of QAM symbol demapper for the second sets of QAM symbols. A pi radians rotator 193 is connected for changing the polarities of both the real and the imaginary components of the complex coordinates of the first set of QAM symbols supplied from the P/S converter 93. An interleaver 196 of odd and even QAM symbols is connected for interleaving the complemented complex coordinates of the first set of QAM symbols supplied from the pi radians rotator 193 with the complex coordinates of the second set of QAM symbols supplied from the P/S converter 94. This interleaving is done on a QAM symbol by QAM symbol basis to generate a serial ordering of QAM symbols supplied as input signal to the bank 96 of demappers for the second sets of QAM symbols. The output port of the bank 96 of demappers is connected for supplying interleaved soft-bit QAM lattice-point labels to a de-interleaver 197, which separates each successive pair of soft-bit QAM lattice-point labels, supplying the soft-bit lattice-point labels of the first set of QAM symbols to the first input port of the diversity combiner 97, and supplying the soft-bit lattice-point labels of the second set of QAM symbols to the second input port of the diversity combiner 97. The output port of the diversity combiner 97 connects directly to the input port of the QAM map label de-interleaver 98. Connections following the de-interleaver 98 are similar in FIG. 68 to those described in regard to FIG. 65.

Further modification of the FIG. 67 or 68 modifications of the FIG. 65 receiver apparatus can be made, which further modification reverses the order of soft bits in lattice-point labels from one of the first and second sets of QAM symbols supplied from the de-interleaver 197 to the diversity combiner 97. Such further modification of the FIG. 67 modification accommodates QAM symbol constellations in the lower sidebands and the upper sidebands of an COFDM DCM signal being respectively mapped per separate ones of the FIG. 6 and FIG. 9 Gray maps of 16QAM symbol constellations, per separate ones of the FIG. 10 and FIG. 13 SCM maps of 16QAM symbol constellations, per separate ones of the FIG. 30 and FIG. 33 Gray maps of 64QAM symbol constellations, or per separate ones of the FIG. 34 and FIG. 37 SCM maps of 64QAM symbol constellations, by way of specific examples. Such further modification of the FIG. 68 modification accommodates QAM symbol constellations in the lower sidebands and the upper sidebands of an COFDM DCM signal being respectively mapped per separate ones of the FIG. 7 and FIG. 8 Gray maps of 16QAM symbol constellations, per separate ones of the FIG. 11 and FIG. 12 SCM maps of 16QAM symbol constellations, per separate ones of the FIG. 31 and FIG. 32 Gray maps of 64QAM symbol constellations, or per separate ones of the FIG. 35 and FIG. 36 SCM maps of 64QAM symbol constellations, by way of specific examples.

Figure 69:
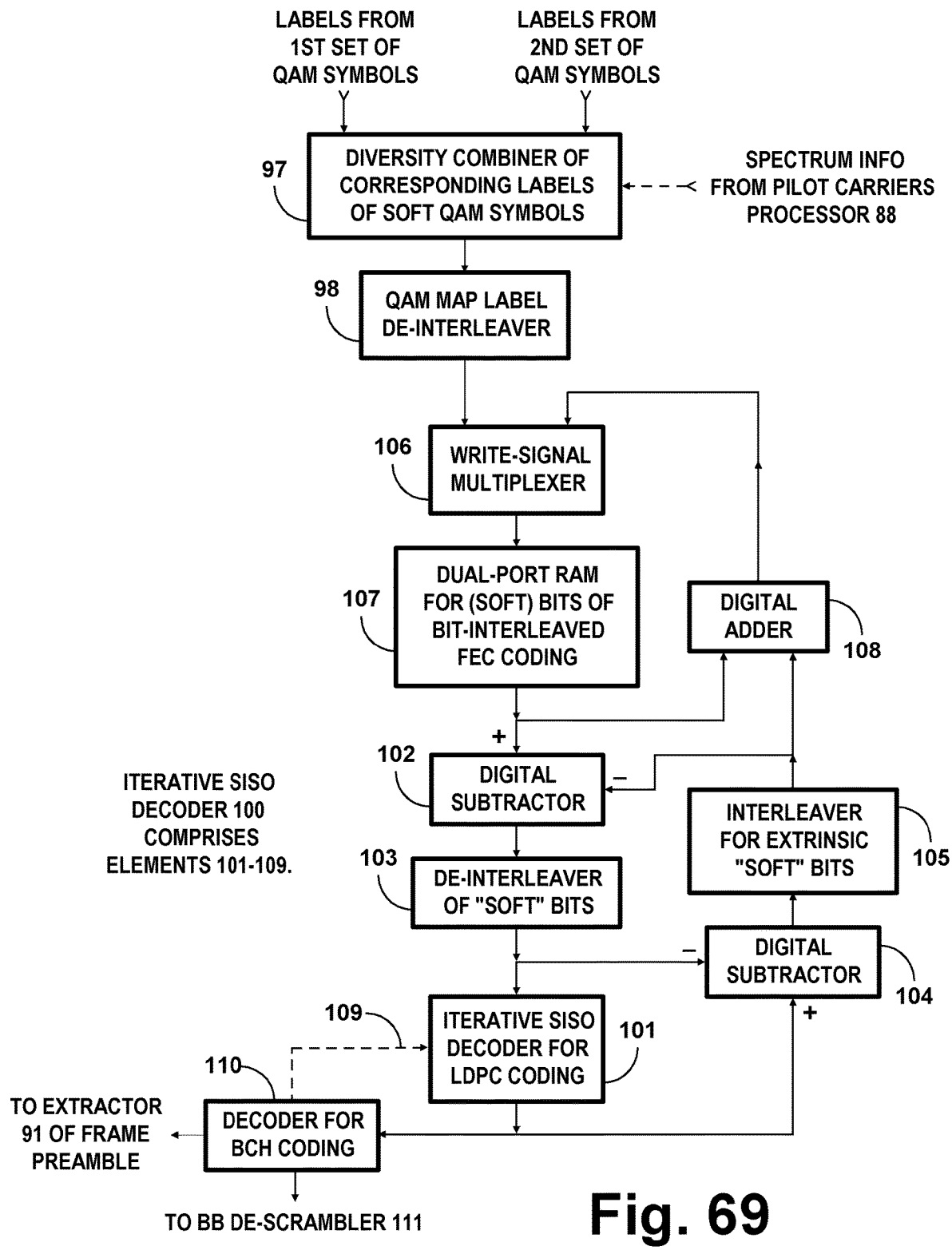
FIG. 69 is a detailed schematic diagram of modifications made to the receiver apparatus shown in FIG. 65 (and in FIGS. 66, 67 and 68) to arrange for performing soft-demapping and soft-decoding procedures iteratively in accordance with the "turbo" principle.

FIG. 69 is a detailed schematic diagram of modifications made to the receiver apparatus shown in FIG. 65—or to that receiver as modified in any of FIGS. 66, 67 and 68 to permit a single bank of demappers to demap both QAM symbols. FIG. 69 depicts the iterative SISO decoder 100 for bit-interleaved LDPC coding in further detail as comprising a component iterative SISO decoder 100, an iterative SISO decoder 101 for LDPC coding, a digital subtractor 102, a de-interleaver 103 of "soft" bits, a digital subtractor 104 and an interleaver 105 for extrinsic "soft" bits. FIG. 69 depicts the iterative SISO decoder 100 further comprising a write-signal multiplexer 106, a dual-port random-access memory (RAM) 107 and a digital adder 108 arranged to cooperate with demappers of QAM symbols to perform soft-demapping and soft-decoding procedures iteratively in accordance with the "turbo" principle. U.S. Pat. No. 6,353,911 titled "Iterative demapping" granted 5 Mar. 2002 to Stefan ten Brink provides generic description of an arrangement for performing such soft-demapping and soft-decoding procedures, which arrangement includes an adaptive QAM demapper. A question that arises with regard to a receiver which includes two QAM demappers, one for the lower sideband of a COFDM DCM signal and the other for its upper sideband, concerns how adaptive demapping can be implemented.

FIG. 69 shows the output port of the diversity combiner 97 connected via the QAM map label de-interleaver 98 to a first of two input ports of the write-signal multiplexer 106. The output port of the multiplexer 106 connects to the write-input port of the dual-port RAM 107. The diversity combiner 97 periodically supplies soft bits of time-interleaved LDPC-coded data to the input port of the QAM map label de-interleaver 98. The de-interleaver 98 response is supplied to a first input port of the write-signal multiplexer 106, thence to be written into the dual-port RAM 107 via its write-input port. The read-output port of the dual-port RAM 107 connects to a first addend-input port of the digital adder 108, the second addend-input port of which adder 108 is connected for receiving a bit-interleaved extrinsic error signal. The sum output port of the adder 108 connects to the second of the two input ports of the write-signal multiplexer 106.

The read-output port of the dual-port RAM 107 is further connected for supplying a posteriori soft demapping results to the minuend-input port of the digital subtractor 102. The subtrahend-input port of the digital subtractor 102 is connected for receiving the bit-interleaved extrinsic error signal from the output port of the interleaver 105 for extrinsic "soft" bits. The difference output port of the digital subtractor 102 connects to the input port of the de-interleaver 103 for bit-interleaved soft bits. The output port of the de-interleaver 103 connects to the input port of the soft-input/soft-output (SISO) decoder 101 for LDPC coding and further connects to the subtrahend input port of the digital subtractor 104. The minuend input port of the subtractor 104 is connected to receive the soft bits of decoding results from the output port of the SISO decoder 101. The subtractor 104 generates soft extrinsic data bits by comparing the soft output bits supplied from the SISO decoder 101 with soft input bits supplied to the SISO decoder 101. The output port of the subtractor 104 is connected to supply these soft extrinsic data bits to the input port of the bit-interleaver 105, which is complementary to the de-interleaver 103. The output port of the bit-interleaver 105 is connected for feeding back bit-interleaved soft extrinsic data bits to the second addend-input port of the digital adder 108, therein to be additively combined with previous a posteriori soft demapping results read from the dual-port RAM 107 to generate updated a priori soft demapping results to write over the previous ones temporarily stored within that memory 107.

More specifically, the RAM 107 is read concurrently with memory within the bit-interleaver 105, and the soft bits read out in LLR form from the memory 107 are supplied to the first input port of the digital adder 108. The adder 108 adds the interleaved soft extrinsic bits fed back via the interleaver 105 to respective ones of the soft bits of a posteriori soft demapping results read from the RAM 107 to generate updated a priori soft demapping results supplied from the sum output port of the adder 108 to the write-input port of the RAM 107 via the write signal multiplexer 106. The soft bits of previous a posteriori demapping results temporarily stored in the RAM 107 are each written over after its being read and before another soft bit is read.

The output port of the bit-interleaver 105 is also further connected for feeding back bit-interleaved soft extrinsic data bits to the subtrahend input port of the subtractor 102. The subtractor 102 differentially combines the bit-interleaved soft extrinsic data bits fed back to it with respective ones of soft bits of the a posteriori demapping results read from the RAM 107, to generate soft extrinsic data bits for the adaptive soft demapper from the difference-output port of the subtractor 102 for application to the input port of the de-interleaver 103. As thus far described, the SISO decoder 101 and the adaptive soft demapper (comprising elements 106-108 in addition to diversity combiner 97, QAM map label de-interleaver 98 and previous demapping elements) are effectively in a turbo loop connection with each other. The turbo cycle of demapping QAM constellations and decoding LDPC can be iterated many times to reduce bit errors in the BCH coding that the SISO decoder 101 finally supplies from its output port to the input port of the decoder 110 for BCH coding. Successful correction of BCH codewords can be used for terminating iterative demapping and decoding of LDPC coding after fewer turbo cycles than the maximum number permitted.

Figure 70:
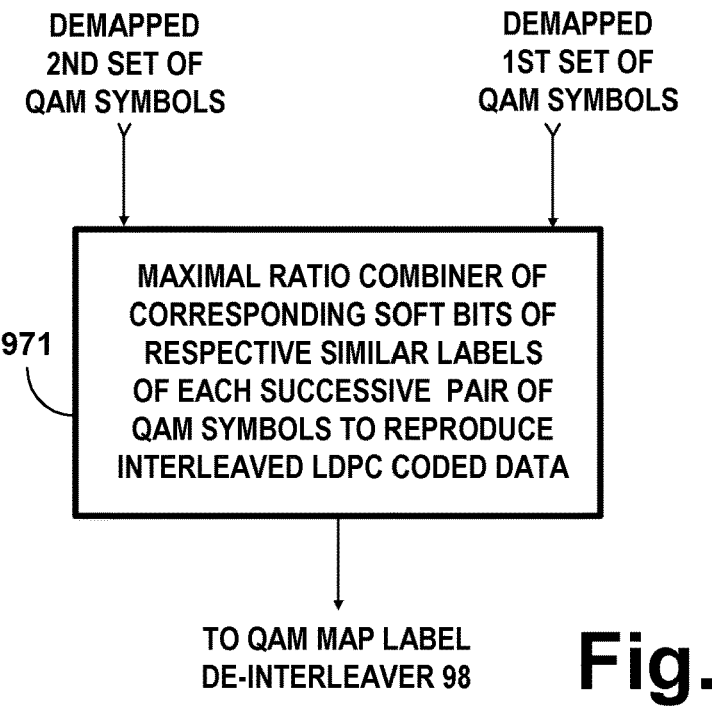
FIG. 70 is a schematic diagram of a diversity combiner that can be used for combining the results of dual QAM demapping in any of the configurations depicted in FIGS. 65-69, which diversity combiner comprises a maximal-ratio combiner of corresponding soft bits of respective similar labels of each successive pair of QAM symbols from dual QAM-symbol demapping procedures, which maximal-ratio combiner is operative on soft bits at bit level, rather than at symbol level.

FIG. 70 depicts a maximal ratio combiner 971 that is a representative specific structure for the diversity combiner 97. The output port of the maximal ratio combiner 971 corresponds to the output port of diversity combiner 97, connecting to the input port of the QAM map label de-interleaver 98. A first of the two input ports of the maximal-ratio combiner 971 is connected to receive the demapped first set of QAM symbols, and the second of the two input ports of the maximal-ratio combiner 971 is connected to receive the demapped second set of QAM symbols. Thus, maximal-ratio combining at bit level is performed after QAM demapping, rather than before. The ratio in which the pairs of corresponding QAM map labels are combined is determined by the respective strengths of QAM symbols before channel equalization, as measured in the pilot carriers processor 88. Maximal-ratio combining soft bits of corresponding QAM-lattice-point labels improves SNR of reception over an AWGN channel by at least 8.5 dB. SNR is improved more than 8.5 dB, if BRA shaping gain techniques are employed.

Each of the banks 95 and 96 of demappers of QAM symbols comprises a plurality of read-only memories (ROMs), one ROM for each bit of a particular size of QAM map label, which ROMs each receive as input address thereto the complex coordinates descriptive of a current one of a succession of QAM symbols. Each ROM generates a respective "soft" bit, a bit metric composed of the more likely one of the "hard" bits 1 and 0 accompanied by a confidence factor. Customarily, the confidence factors a logarithm of likelihood ratio (LLR) indicating how likely that decision as to the "hard" bit is correct. The maximal-ratio combiner 97 considers 1 and 0 "hard" bits as sign bits when combining the LLRs of each successive pair of "soft" bits in a signed addition. The sign bit of the resultant sum determines the "hard" bit in the "soft" bit response from the maximal-ratio combiner 971 and the rest of this resultant sum determines the LLR of the correctness of this "hard" bit in the "soft" bit response from the maximal-ratio combiner 971.

Maximal-ratio combining of frequency-diverse QAM signals is superior to other well-known types of diversity combining when those signals are afflicted by AWGN, atmospheric noise, Johnson noise within the receiver, or imperfect filtering of power from an alternating-current power source. However, maximal-ratio combining of frequency-diverse QAM signals performs less satisfactorily when one QAM signal is corrupted by burst noise or in-channel interfering signal and the other is not. These various conditions of unsatisfactory reception will cause errors in the reproduction of soft bits of FEC-coded data from the maximal-ratio combiner 971. The erroneous bits are dispersed by the QAM map label de-interleaver 98 and by a de-interleaver of soft "bits" within the iterative SISO decoder 100 for LDPC coding, which improves the chances for those erroneous bits to be corrected during the decoding of the forward-error-correction (FEC) coding by the decoders 100 and 106.

Figure 71:
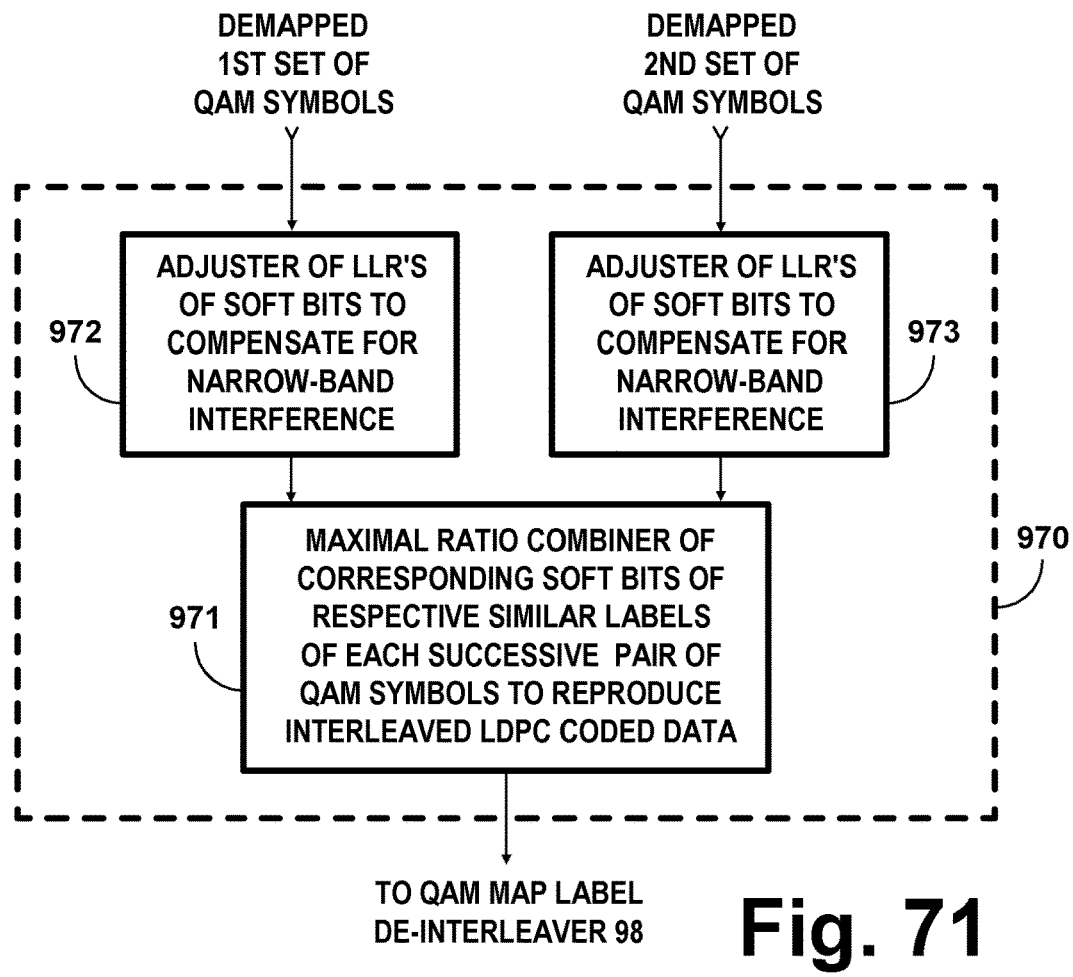
FIG. 71 is a schematic diagram of a diversity combiner that can be used for combining the results of dual QAM demapping any of the configurations depicted in FIGS. 65-69, which diversity combiner comprises a maximal-ratio combiner operative on soft bits at bit level, rather than at symbol level, the results of the dual QAM demappers being adjusted prior to application to the maximal-ratio combiner thus to implement a degree of selective diversity combining.

FIG. 71 depicts a more complex representative specific structure 970 for the diversity combiner 97, which structure 970 includes the maximal-ratio combiner 971. The structure 970 further includes an adjuster 972 of the LLRs of soft bits of the demapped first set of QAM symbols before their application to the first input port of the maximal-ratio combiner 971. The structure 970 also further includes an adjuster 973 of the LLRs of soft bits of the demapped second set of QAM symbols before their application to the second input port of the maximal-ratio combiner 971. The adjuster 972 reduces the LLRs of soft bits of the demapped first set of QAM symbols supplied to the maximal-ratio combiner 971 when the hard bit portions of those soft bits are well out of normal mapping range, so as to compensate for occurrences of narrow-band interference or drop-outs in received signal strength, as detected by the pilot carriers processor 88. The adjuster 973 reduces the LLRs of soft bits of the demapped second set of QAM symbols supplied to the maximal-ratio combiner 971 when the hard bit portions of those soft bits are well out of normal mapping range, so as to compensate for occurrences of narrow-band interference or drop-outs in received signal strength, as detected by the pilot carriers processor 88.

When dual QAM mapping procedures are applied to a single-sideband COFDM signal, so its frequency spectrum is as illustrated in FIG. 5, the lower and upper half spectra can be detected by heterodyning them with beat-frequency oscillations of nominally the same frequency as a pilot tone at the juncture of those half spectra. These procedures treat the SSB amplitude-modulation signal as an asymmetrical-sideband (ASB) signal. These procedures are appreciably less likely to be affected by adjacent-channel interference than the previously described procedures that heterodyne the single-sideband COFDM signal with beat-frequency oscillations of nominally the same frequency as a pilot tone at an edge of the RF channel. These demodulation procedures are facilitated by a front-end tuner 180, 280, 380 or 480 as described infra down-converting the RF COFDM input signal it receives signal to an IF COFDM signal. This IF COFDM signal is then synchrodyned to baseband using beat-frequency oscillations of nominally the same frequency as a pilot tone at the juncture of those half spectra.

The front-end tuner 80 down-converts RF SSB COFDM signal to baseband SSB COFDM signal, which down-conversion converts a pilot subcarrier at one edge of the reception channel to zero frequency (i.e., a DC signal). If an RF DSB-COFDM bootstrap signal of the sort prescribed by the ATSC 3.0 DTV broadcast standard is time-division multiplexed into the RF COFDM input signal received by the front-end tuner 80, a practical configuration of the tuner 80 will include the following additional elements. There is circuitry for down-converting the RF DSB-COFDM bootstrap signal to an IF DSB-COFDM bootstrap signal and circuitry for then synchrodyning that IF DSB-COFDM bootstrap signal to baseband. In the front-end tuners 180, 280, 380 and 480 as described infra, additional circuitry for down-converting to an IF DSB-COFDM bootstrap signal and additional circuitry for then synchrodyning that IF DSB-COFDM bootstrap signal to baseband are unnecessary. The front-end tuners 180, 280, 380 and 480 each include circuitry for down-converting to an IF COFDM DCM signal and respective circuitry for then synchrodyning that IF COFDM DCM signal to baseband. This circuitry, which can also accommodate DSB-COFDM bootstrap signals, replaces the tuner 80 circuitry for heterodyning COFDM DCM signal with beat-frequency oscillations of nominally the same frequency as a pilot tone at an edge of the reception channel.

Figure 72:
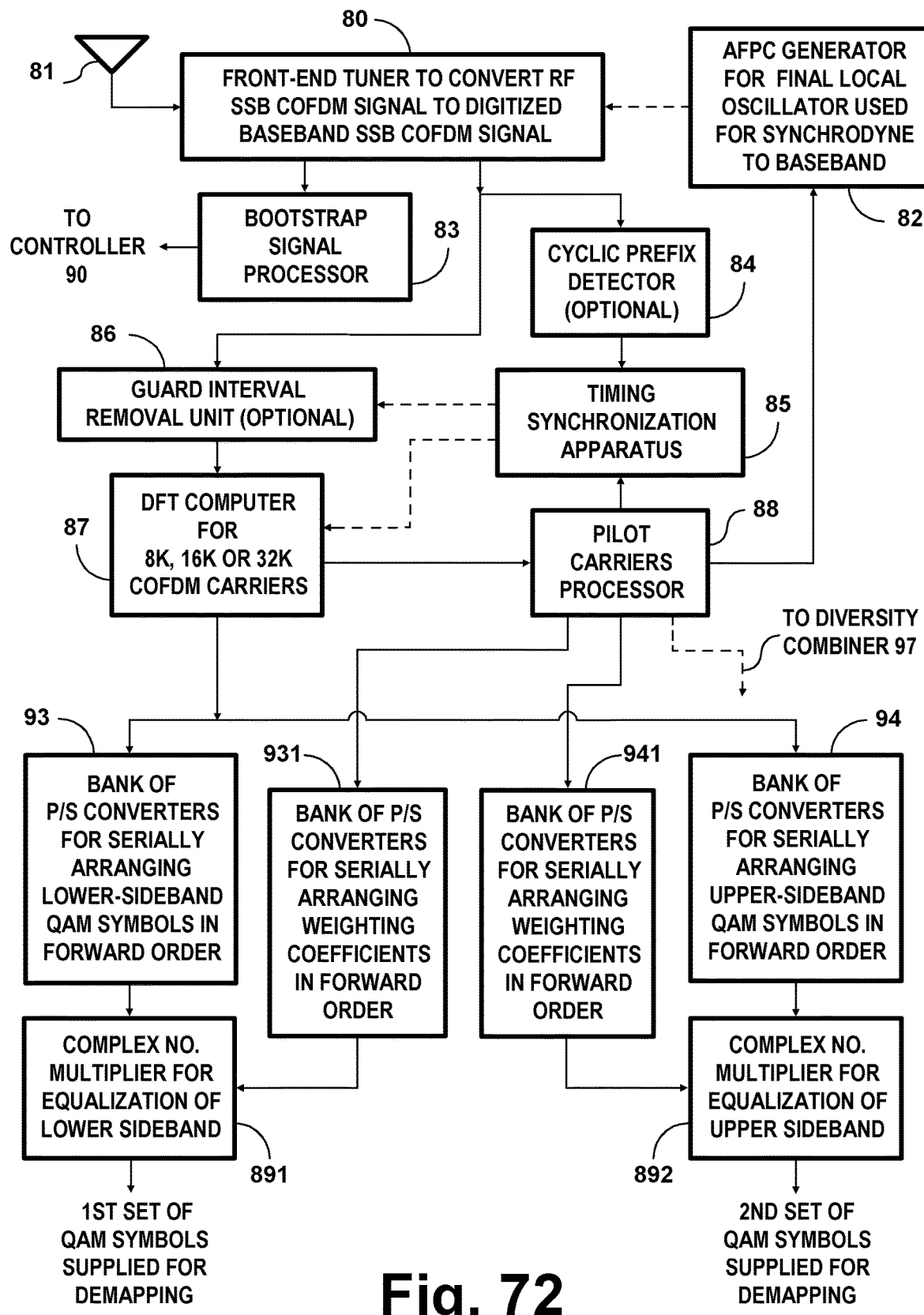
FIG. 72 is a schematic diagram of a variant of the FIG. 64 receiver structure.

FIG. 72 depicts a variant of the FIG. 64 receiver structure. The channel equalizer 89 that performed multiplications on each of the QAM symbols supplied in parallel from the DFT computer 87 is omitted. A complex-number multiplier 891 performs frequency-domain channel equalization on each of the QAM symbols extracted from the lower sideband of the COFDM DCM signal by the DFT computer 87 after their serialization by a selected one of the parallel-to-serial (P/S) converters in the bank 93 of them. Another complex-number multiplier 892 performs frequency-domain channel equalization on each of the QAM symbols extracted from the upper sideband of the COFDM DCM signal by the DFT computer 87 after their serialization by a selected one of the parallel-to-serial (P/S) converters in the bank 94 of them. The first and second sets of QAM symbols supplied from the respective product output ports of the multipliers 891 and 892 are suitable input signals for subsequent demapping apparatus—e.g., as depicted in any of FIGS. 65-68.

More particularly, the QAM symbols that the DFT computer 87 extracts from the lower sideband of the COFDM DCM signal are supplied, in parallel and in forward spectral order, directly to the parallel input ports of the selected one of the P/S converters in the bank 93 of them. The output port of that selected P/S converter responds to supply serialized QAM symbols from the lower sideband of the COFDM DCM signal to the multiplicand input port of the multiplier 891. The parallel input ports of a selected one of the parallel-to-serial (P/S) converters in a bank 931 of them receives, in parallel from the pilot carriers processor 88, the weighting coefficients for frequency-domain channel equalization of the lower sideband of the COFDM DCM signal. The output port of that selected P/S converter responds to supply serialized weighting coefficients for the lower sideband of the COFDM DCM signal to the multiplier input port of the complex-number multiplier 891. The multiplier 891 responds to its multiplicand and multiplier input signals to supply from its product output port an equalized first set of QAM symbols, suitable for subsequent demapping.

More particularly, the QAM symbols that the DFT computer 87 extracts from the upper sideband of the COFDM DCM signal are supplied, in parallel and in forward spectral order, directly to the parallel input ports of the selected one of the P/S converters in the bank 94 of them. The output port of that selected P/S converter responds to supply serialized QAM symbols from the upper sideband of the COFDM DCM signal to the multiplicand input port of the multiplier 892. The parallel input ports of a selected one of the parallel-to-serial (P/S) converters in a bank 941 of them receives, in parallel from the pilot carriers processor 88, the weighting coefficients for frequency-domain channel equalization of the upper sideband of the COFDM DCM signal. The output port of that selected P/S converter responds to supply serialized weighting coefficients for the upper sideband of the COFDM DCM signal to the multiplier input port of the complex-number multiplier 892. The multiplier 892 responds to its multiplicand and multiplier input signals to supply from its product output port an equalized second set of QAM symbols, suitable for subsequent demapping.

Figure 73:
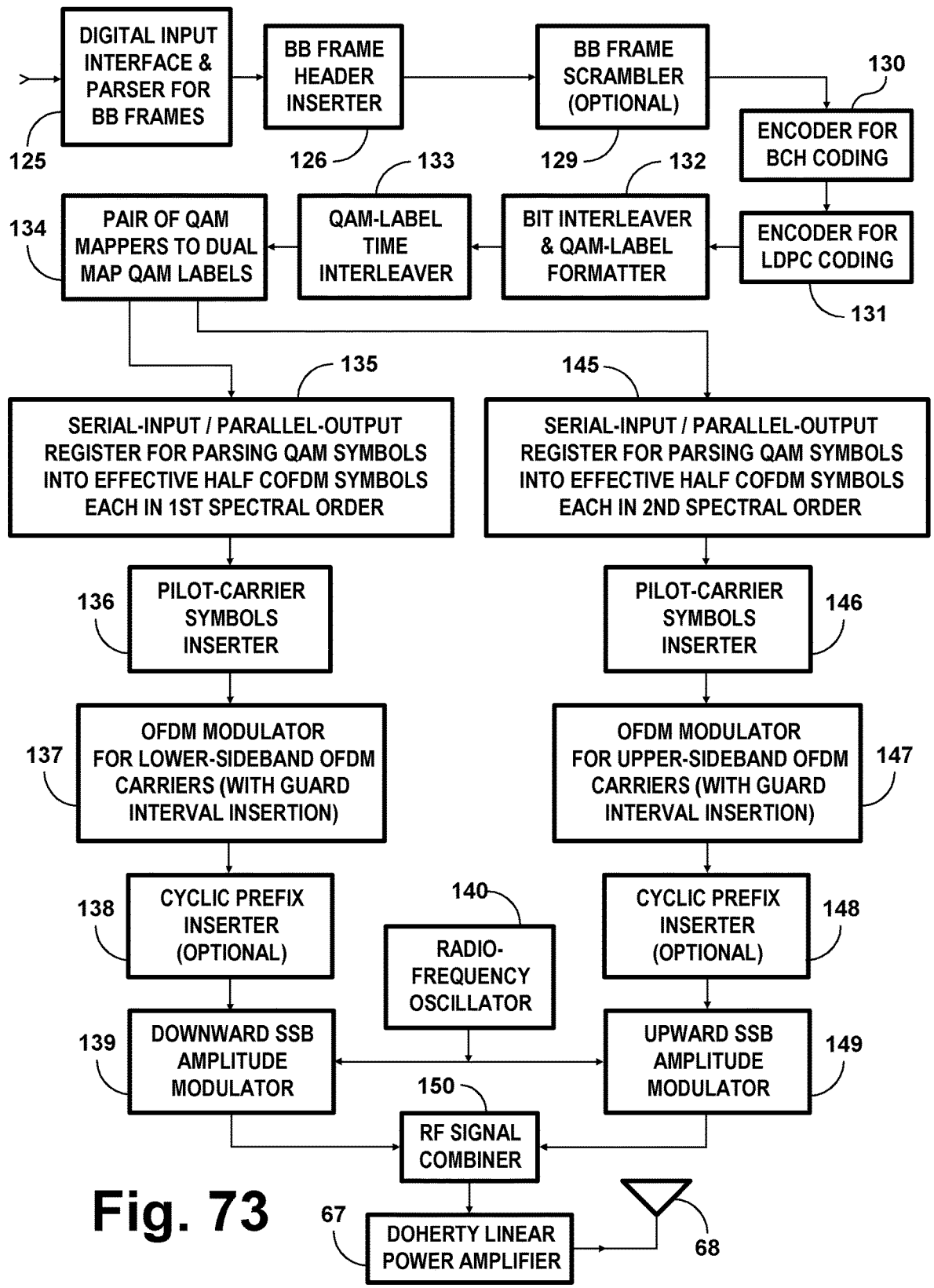
FIG. 73 is a schematic diagram of COFDM transmitter apparatus that is configured for transmitting COFDM DCM radio-frequency signals.

FIG. 73 depicts a transmitter structure for transmitting coded data twice, once in the lower sideband of an ASB-COFDM signal and once in its upper sideband. A digital input interface and parser for baseband frames 125 responds to a digital data stream supplied to its input port for supplying baseband data frames to a baseband frame header inserter 126. FIG. 73 shows the output port of the BB FRAME header inserter 126 connected to the input port of a BBFRAME scrambler 129, which data randomizes the BBFRAME supplied from the output port of the BBFRAME scrambler 129 to the input port of an encoder 130 for BCH coding. If the BBFRAME scrambler 129 is omitted, which omission is optional, the output port of the BBFRAME header inserter 126 can connect directly to the input port of an encoder 130 for BCH coding. FIG. 73 shows the output port of the encoder 130 connected to the input port of an encoder 131 for LDPC coding. FIG. 73 shows the output port of the encoder 131 connected to the input port of a bit-interleaver and QAM label formatter 132. The cascade connection of the encoder 130 for BCH coding and the encoder 131 for LDPC coding is apt to be replaced by means for implementing other forms of forward error-correction (FEC) coding in some variants of the FIG. 73 structure.

FIG. 73 shows the output port of the bit-interleaver and QAM label formatter 132 connected to the input port of a QAM-label time interleaver 133 and the output port of the QAM-label time interleaver 133 connected to the input port(s) of a pair 134 of QAM mappers that map QAM labels differently, thereby to dual map those QAM labels. The QAM-label time interleaver 133 is omitted in some variants of the FIG. 73 structure in which the output port of the bit-interleaver and QAM label formatter 132 connects directly to the input port(s) of the pair 134 of QAM mappers.

A first of the pair 134 of QAM mappers supplies a first stream of complex coordinates of QAM symbols to a serial-input/parallel-output register 135. The SIPO register 135 parses the QAM symbols into effective COFDM symbols, arranging the QAM symbols, each in a first spectral order. The parallel output ports of the SIPO register 135 are connected to the parallel input ports of a pilot carriers insertion unit 136, which introduces binary phase shift keying (BPSK) pilot carrier symbols at suitable intervals between QAM symbols in each effective half COFDM symbol to generate a respective complete half COFDM symbol. The parallel output ports of the pilot carriers insertion unit 136 are connected to the parallel input ports of an OFDM modulator 137 for lower-sideband OFDM carriers. The OFDM modulator 137 performs an I-FFT and supplies the results from its output port to the input port of a cyclic prefixes inserter 138. The output port of the cyclic prefixes inserter 138 is connected for supplying amplitude-modulating signal to the modulating-signal input port of a downward single-sideband amplitude modulator 139, there to modulate radio-frequency carrier supplied from the output port of a radio-frequency oscillator 140 to a principal-carrier input port of the SSB amplitude modulator 139.

A second of the pair 134 of QAM mappers supplies a second stream of complex coordinates of QAM symbols to a serial-input/parallel-output register 145. The SIPO register 145 parses the QAM symbols into effective half COFDM symbols, arranging the QAM symbols, each in second spectral order. The parallel output ports of the SIPO register 145 are connected to the parallel input ports of a pilot carriers insertion unit 146, which introduces binary phase shift keying (BPSK) pilot carrier symbols at suitable intervals between QAM symbols in each effective half COFDM symbol to generate a respective complete half COFDM symbol. The parallel output ports of the pilot carriers insertion unit 146 are connected to the parallel input ports of an OFDM modulator 147 for upper-sideband OFDM carriers. The OFDM modulator 147 performs an I-FFT and supplies the results from its output port to the input port of a cyclic prefixes inserter 148. The output port of the cyclic prefixes inserter 148 is connected for supplying amplitude-modulating signal to the modulating-signal input port of an upward single-sideband amplitude modulator 149, there to modulate radio-frequency carrier supplied from the output port of the radio-frequency oscillator 140 to a principal-carrier input port of the SSB amplitude modulator 149. While it is preferable to insert cyclic prefixes into guard intervals between COFDM symbols, it is not necessary to do so. The cyclical prefixes inserters 138 and 148 are optional and may both be replaced by respective direct connections of the output ports of the OFDM modulators 137 and 147 to the modulating-signal input ports of the amplitude modulators 139 and 149.

The pilot-carrier symbols insertion units 136 and 146 combine with the SIPO registers 135 and 145 so as to constitute a COFDM symbol generator for supplying respective halves of COFDM symbols to the OFDM modulators 137 and 148, which halves of COFDM symbols are respectively responsive to first and second sets of QAM symbols supplied from respective ones of the pair 134 of QAM mappers. First and second input ports of a radio-frequency signal combiner 150 are respectively connected for receiving the lower SSB amplitude-modulated RF signal from the output port of the amplitude modulator 139 and for receiving the upper SSB amplitude-modulated RF signal from the output port of the amplitude modulator 149. The RF oscillator 140, SSB amplitude modulator 139, SSB amplitude modulator 149 and RF signal combiner 150 combine to constitute a generator of COFDM DCM radio-frequency signal. Owing to arrangements of first and second sets of successive QAM symbols in the frequency spectrum carried out by the preceding generator of COFDM symbols, the lower-frequency sideband of this RF signal conveys the first set of successive QAM symbols and the upper-frequency sideband of this RF signal conveys a second set of successive QAM symbols. The output port of the RF signal combiner 150 is connected for supplying ISB signal to the input port of the linear power amplifier 67, which is preferably of Doherty type. The output port of the linear power amplifier 67 is connected for driving RF analog COFDM signal power to the transmission antenna 68. The effective COFDM symbols are caused to have spectral response as shown in FIG. 5 by (a) arranging the SIPO register 135 to parse QAM symbols in descending spectral order in each effective half COFDM symbol for the lower sideband and (b) arranging the SIPO register 145 to parse QAM symbols in ascending spectral order in each effective half COFDM symbol for the upper sideband.

Figure 74:
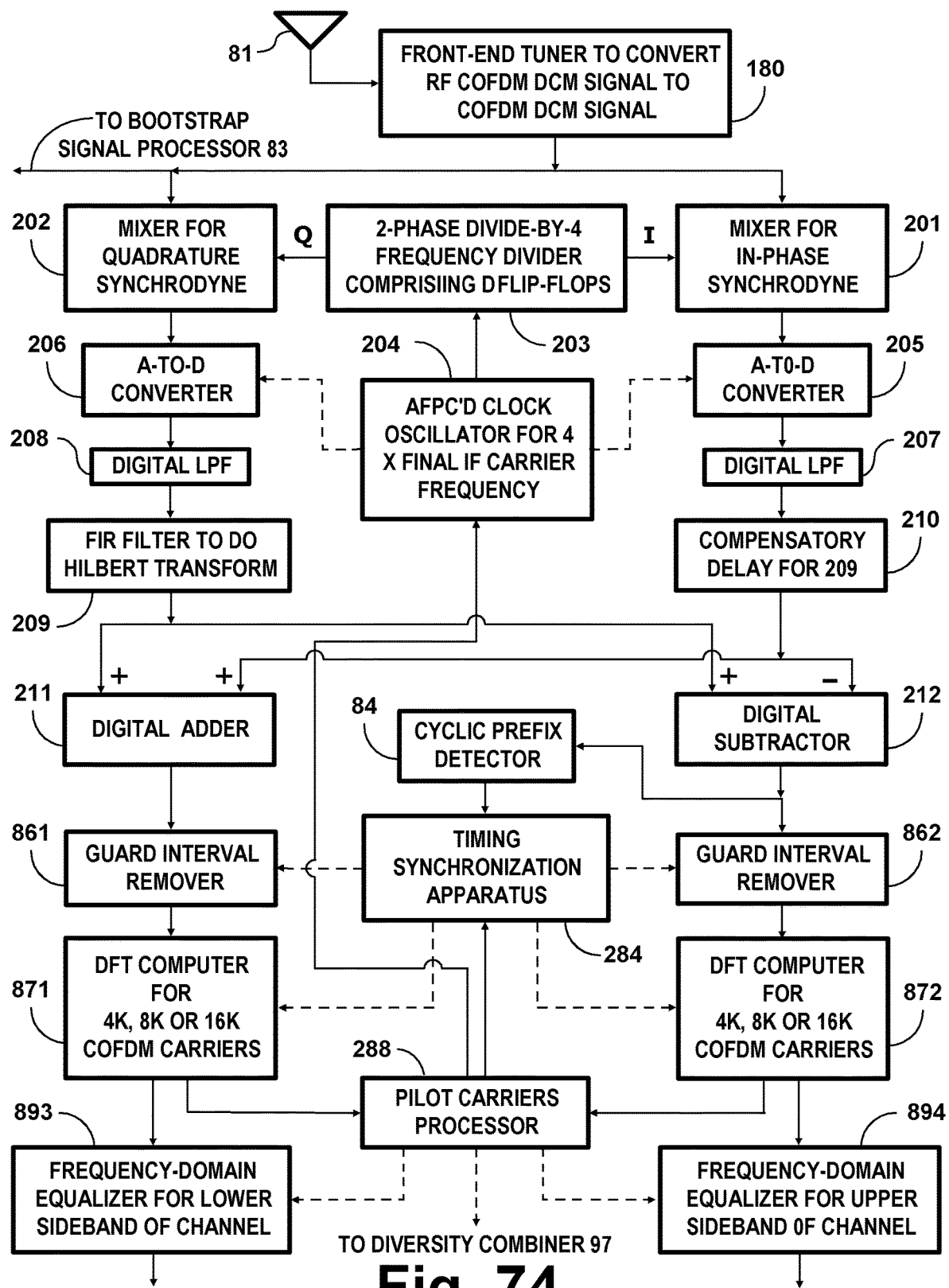

FIGS. 74 and 65 together depict receiver apparatus for asymmetric-sideband (ASB) demodulation of COFDM signals using respective phase-shift methods to respond separately to the concurrent lower and upper sidebands of COFDM DCM signals. The receiver apparatus depicted in FIG. 74 applies the well-known phase-shift methods for demodulating ASB amplitude-modulation signals to demodulating the lower and upper sidebands of COFDM DCM signals to certain extent separately from each other. A reception antenna 81 captures the radio-frequency COFDM DCM signal for application as input signal to a front-end tuner 180 of the receiver. The front-end tuner 180 converts a selected radio-frequency COFDM DCM signal to an intermediate-frequency COFDM DCM signal, which is supplied to the respective signal input ports of mixers 201 and 202.

U.S. provisional Pat. App. 62/488,793 filed 23 Apr. 2017 by A. L. R. Limberg and titled "Double-sideband COFDM signal receivers that demodulate unfolded frequency spectrum" illustrates a beat-frequency oscillator (BFO) supplying in-phase (I) and quadrature (Q) beat-frequency oscillations to the respective carrier input ports of analog mixers and via a direct connection and via a −90 phase-shifter, respectively. Such practice is problematic in the following two respects. It is difficult to realize a phase-shifter with analog circuitry, which phase-shifter provides exact −90 phase shift despite change in BFO frequency. Also, maintaining the amplitudes of the beat-frequency oscillations to the respective carrier input ports of the two analog mixers the same is rather difficult.

Figure 75:
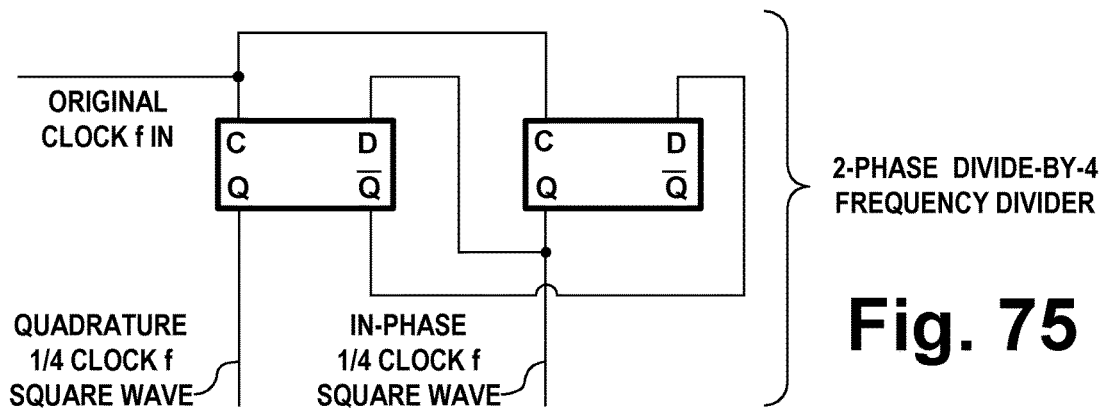
FIG. 75 is a schematic diagram of a two-phase divide-by-four frequency divider constructed from gated D flip-flops or data latches, which sort of frequency divider is an element in the receiver apparatus depicted in FIGS. 74, 77-79, and 81.

The latter of these difficulties is avoided by mixers 201 and 202 being of switching type receiving I and Q square waves at their respective carrier input ports. Fundamental-frequency components of the I and Q square waves that are at quite exactly at 0° and −90° relative phasings, despite change in frequency, are supplied from a 2-phase divide-by-4 frequency divider 203 in response to rising edges of pulses from a clock oscillator 204. The frequency divider 203 can be constructed from two gated D flip flop-flops (or data latches) suitably connected as depicted in FIG. 75. The clock oscillator 204 is subject to automatic frequency and phase control (AFPC) that adjusts the frequency of clock pulses to be four times the final intermediate-frequency (IF) carrier of the COFDM signals. A voltage-controlled crystal oscillator (VCXO) supplying oscillations nominally at 44 MHz is perhaps the optimal choice for the clock oscillator 204. The mixer 201 is conditioned to perform an in-phase synchrodyne of intermediate-frequency COFDM DCM signal to baseband, responsive to its carrier input port receiving leading in-phase (I) square wave from the frequency divider 203. The mixer 202 is conditioned to perform a quadrature synchrodyne of intermediate-frequency COFDM DCM signal to baseband, responsive to its carrier input port receiving lagging quadrature (Q) square wave from the frequency divider 203.

An analog-to-digital converter 205 performs analog-to-digital conversion of baseband signal supplied from the output port of the mixer 201. The sampling of the mixer 201 output signal by the A-to-D converter 205 is timed by a first set of alternate clock pulses received from the clock oscillator 204. An analog-to-digital converter 206 performs analog-to-digital conversion of the baseband signal supplied from the output port of the mixer 202. The sampling of the mixer 202 output signal by the A-to-D converter 206 is timed by a second set of alternate clock pulses received from the clock oscillator 204. The digitized in-phase baseband signal supplied from the output port of the A-to-D converter 205 is supplied to the input port of a digital lowpass filter 207. The digitized quadrature baseband signal supplied from the output port of the A-to-D converter 206 is supplied to the input port of a digital lowpass filter 208. The digital lowpass filters 207 and 208 are of similar design, each to supply a response to a respective sideband which response is free of components of image signal remnant from the synchrodyning procedures. Preferably, that is, the design of the digital lowpass filters 207 and 208 provides a rapid roll-off of their higher-frequency responses, so as to suppress adjacent-channel interference (ACI).

The response of the digital lowpass filter 208 to quadrature baseband signal is supplied to the input port of a finite-impulse-response digital filter 209 for Hilbert transformation. The response of the digital lowpass filter 207 to in-phase baseband signal is supplied to the input port of a clocked digital delay line 210 that affords delay to compensate for the latent delay through the FIR filter 209. The Hilbert transform response of the FIR filter 209 and the response of the digital delay line 210 are supplied to respective addend input ports of a digital adder 211 operative to recover, at baseband, the lower sideband of the COFDM DCM signal at its sum output port. The Hilbert transform response of the FIR filter 209 and the response of the digital delay line 210 are supplied respectively to the minuend input port and the subtrahend input port of a digital subtractor 212 operative to recover, at baseband, the upper sideband of the COFDM DCM signal at its difference output port.

The sum output port of the digital adder 211 connects to the input port of a guard interval remover 861. The output port of the guard interval remover 861 is connected for supplying the input port of a discrete-Fourier-transform (DFT) computer 871 with windowed portions of the baseband digitized lower sideband of the COFDM DCM signal that span respective COFDM symbol intervals. The complex coordinates of QAM symbols the DFT computer 871 extracts from lower sideband carriers in each COFDM symbol sampling interval that convey coded data are supplied as parallel input signal to a frequency-domain channel equalizer 893 for just those QAM symbols connected for supplying equalized QAM symbols to the parallel inputs of the P/S converter 93 in the FIG. 65 portion of the television receiver.

Subsequent to the recovery of the digitized upper sideband of the COFDM DCM signal at baseband by phase shift method, it is supplied from the difference output port of the digital subtractor 212 to the input port of a guard interval remover 862. The output port of the guard interval remover 862 is connected for supplying the input port of a DFT computer 872 with windowed portions of the baseband digitized upper sideband of the COFDM DCM signal that span respective COFDM symbol intervals. The complex coordinates of QAM symbols the DFT computer 872 extracts from upper sideband carriers in each COFDM symbol sampling interval that convey coded data are supplied as parallel input signal to a frequency-domain channel equalizer 894 just for those QAM symbols. Parallel output ports of the channel equalizer 894 are connected for supplying equalized QAM symbols to the parallel inputs of the P/S converter 94 in the FIG. 65 portion of the television receiver.

The DFT computers 871 and 872 are similar in construction, each configured so it can demodulate any one of 4K, 8K or 16K options as to the nominal number of OFDM carriers in half the spectrum of COFDM DCM signal. The correct option is chosen responsive to an instruction from a controller 90 that generates a number of instructions used to configure the COFDM receiver to suit the broadcast standard used transmissions currently received. The bootstrap signal processor 83, the controller 90, the extractor 91 of FEC frame preambles, and the processor 92 of COFDM frame preambles are not explicitly depicted in any of the FIGS. 72, 74, 77, 79, 81 and 82, but such elements are implicitly included in the structure of each of the COFDM DCM receivers shown in part in these figures of the drawing.

The guard interval removers 861 and 862 are each constructed similarly to the guard interval remover 86 in the FIG. 64 receiver apparatus, removing guard intervals responsive to the occurrences of cyclic prefixes having been detected by a cyclic prefix detector 84. FIG. 74 shows the input port of the cyclic prefix detector 84 connected for detecting the occurrences of cyclic prefixes in the digitized upper sideband of the COFDM DCM signal supplied at baseband from the output port of the digital subtractor 212. Alternatively, the input port of the cyclic prefix detector 84 can instead be connected for detecting the occurrences of cyclic prefixes in the digitized lower sideband of the COFDM DCM signal supplied at baseband from the output port of the digital adder 211. The cyclic prefix detector 84 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 84 is connected to supply these indications to a first of two input ports of timing synchronization apparatus 285. First and second output ports of the timing synchronization apparatus 285 are connected for supplying similar gating control signals to the control input ports of the guard interval removers 861 and 862. Third and fourth output ports of the timing synchronization apparatus 285 are connected for supplying indications of the phasing of COFDM symbols to the DFT computers 871 and 872 respectively.

The complex coordinates of QAM symbols extracted from pilot carriers in each COFDM symbol sampling interval are supplied as parallel input signal to a pilot carriers processor 288. The pilot carriers processor 288 responds to complex coordinates of QAM symbols extracted from lower-sideband pilot carriers to generate weighting coefficients for the frequency-domain channel equalizer 893 to apply to QAM symbols extracted from the upper sideband of the COFDM DCM signal. A first of five output ports of the processor 288 that are explicitly shown in FIG. 74 is connected for supplying these weighting coefficients (via wiring depicted as a dashed-line connection) to the frequency-domain channel equalizer 893, which uses those weighting coefficients for adjusting its responses to the demodulation results for each of the lower-sideband COFDM carriers that convey data. The pilot carriers processor 288 responds to complex coordinates of QAM symbols extracted from upper-sideband pilot carriers to generate weighting coefficients for the frequency-domain channel equalizer 894 to apply to QAM symbols extracted from the upper sideband of the COFDM DCM signal. A second of the five output ports of the processor 288 that are explicitly shown in FIG. 74 is connected for supplying these weighting coefficients (via wiring depicted as a dashed-line connection) to the frequency-domain channel equalizer 894, which uses them for adjusting its responses to the demodulation results for each of the upper-sideband COFDM carriers that convey data.

A third of the output ports of the pilot carriers processor 288 that are explicitly shown in FIG. 74 is connected for supplying more accurate window-positioning information to the second input port of the timing synchronization apparatus 285. This window-positioning information is an adjustment generated by a feedback loop that seeks to minimize the noise accompanying pilot carriers, which noise increases owing to intercarrier interference from adjoining modulated carriers when window positioning is not optimal. A fourth of the output ports of the pilot carriers processor 288 explicitly shown in FIG. 74 is connected for forwarding automatic frequency and phase control (AFPC) developed from unmodulated pilot carriers to the AFPC input port of the clock oscillator 204. The real components of the unmodulated pilot carriers are multiplied by their respective imaginary components in the pilot carriers processor 288. The processor 288 sums and low-pass filters the resulting products to develop the AFPC signal that the processor 288 supplies to the clock oscillator 204. Responsive to this AFPC signal, the clock oscillator 204 regulates the frequency of its oscillations to be four times the carrier frequency of the final IF signal that the front-end tuner 180 supplies to the input ports of the mixers 201 and 202. This AFPC signal controls the frequency and phase of the clock pulses that the clock oscillator 204 supplies to the 2-phase divide-by-4 frequency divider 203.

A fifth of the output ports of the pilot carriers processor 288 explicitly shown in FIG. 74 is connected for supplying a diversity combiner 97 (depicted in each of FIGS. 65-69) with information concerning the frequency spectrum of each successive COFDM symbol.

FIG. 75 depicts two data latches—i.e., gated D flip-flops_connected to provide a two-phase divide-by-four frequency divider, such as the frequency divider 203 depicted in FIG. 74. The respective clock (C) input connections of the two data latches are each connected for receiving an original clock signal of frequency f, which clock signal is received from the clock oscillator 204 for the frequency divider 203 depicted in FIG. 74. Each of the two data latches has its own normal (Q) output connection and its own complementary ($\overline{Q}$) output connection. There is wire connection from the complementary ($\overline{Q}$) output connection of the data latch at left to the data (D) input connection of the data latch at right, and there is wire connection from the normal (Q) output connection of the data latch at right to the data (D) input connection of the data latch at left. The normal (Q) output connection of the data latch at right supplies a leading square wave having an "in-phase" fundamental frequency f/4, and the normal (Q) output connection of the data latch at left supplies a lagging square wave having a "quadrature" fundamental frequency f/4 that lags the "in-phase" fundamental frequency by 90°.

Figure 76:
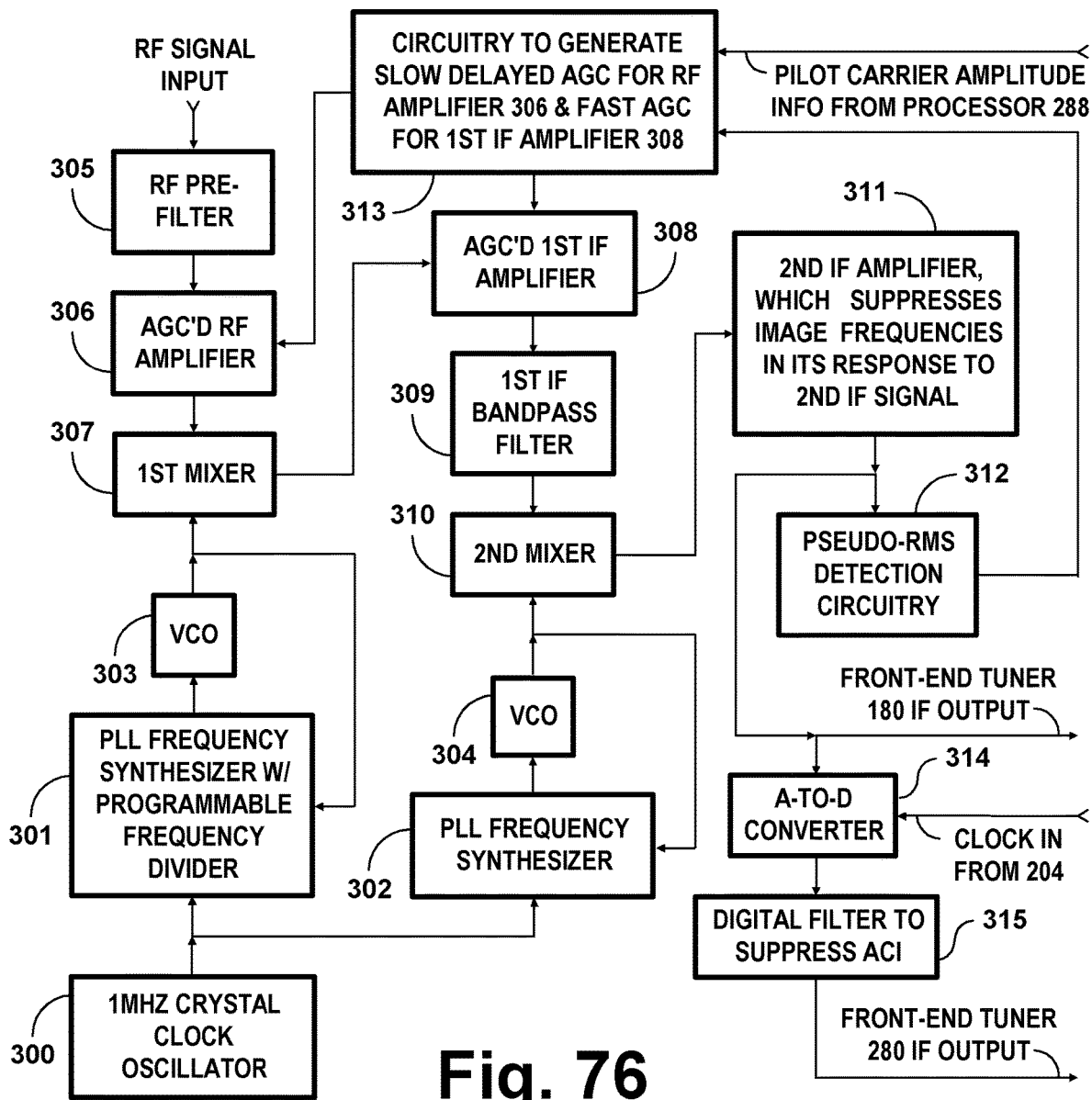
FIG. 76 is a schematic diagram of double superheterodyne front-end tuner structure suitable for inclusion in any of the apparatuses for demodulating COFDM DCM radio-frequency signals depicted in FIGS. 64, 72, 74, 77-79, and 81.
Figure 77:
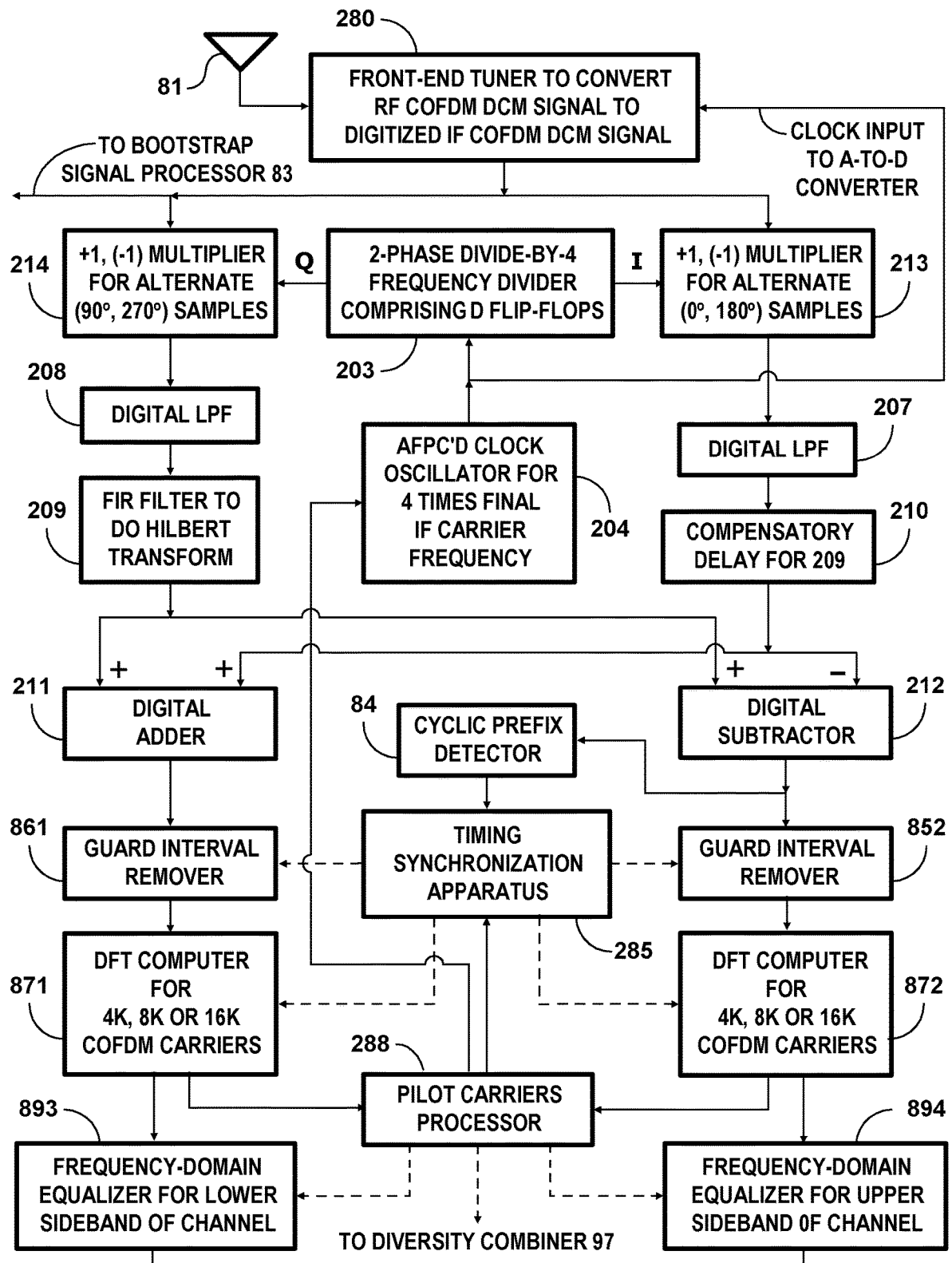
Figure 78:
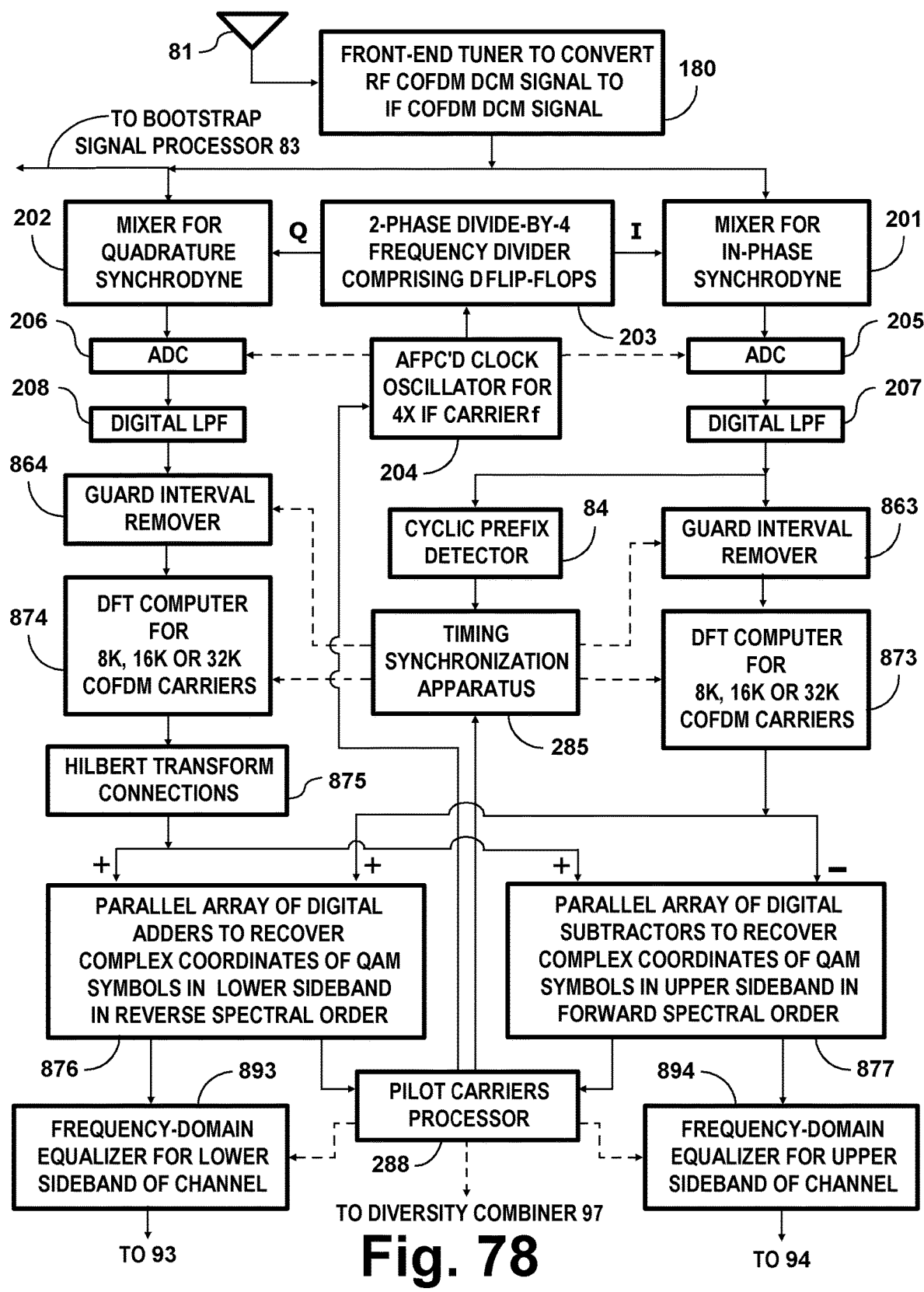
Figure 79:
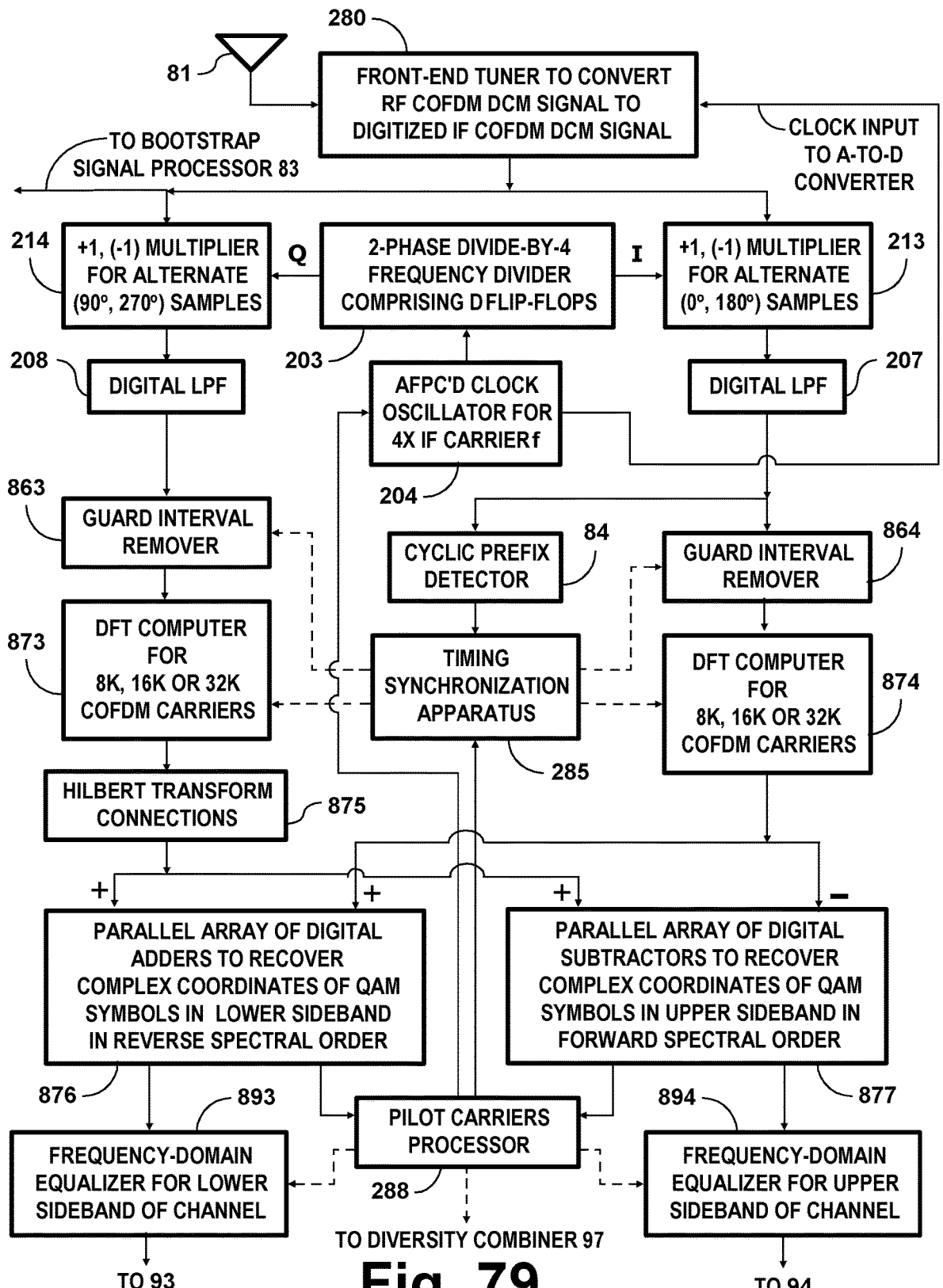

FIG. 76 depicts double-conversion front-end tuner structure suitable for the front-end tuner 180 depicted in FIGS. 74 and 78, and for the front-end tuner 280 depicted in FIGS. 77 and 79. Double-conversion front-end tuners are particularly advantageous over single-conversion front-end tuners when more television channels are more closely packed within the allocated television frequency spectrum. The structure is quite similar in general aspects to that described in U.S. Pat. No. 6,118,499 titled "Digital television signal receiver" granted to George Fang on 12 Sep. 2000. In a first frequency-conversion a selected radio-frequency COFDM DCM signal is up-converted in frequency to first-intermediate-frequency COFDM DCM signal at frequencies above the UHF television broadcasting band. The first-IF COFDM DCM signal is suitable for surface-acoustic-wave (SAW) bandpass filtering. In a second frequency-conversion the bandpass-filtered first-IF COFDM DCM signal is down-converted to second-intermediate-frequency COFDM DCM signal at frequencies substantially below the conventional "final intermediate frequency" (e.g., 41 to 47 MHz in U.S. television receivers). The second-IF COFDM DCM signal is at a sufficiently low frequency such that it can be directly sampled by an analog-to-digital converter after lowpass filtering to suppress image signal.

In FIG. 76 a crystal oscillator 300 is connected for supplying 1 MHz reference oscillations to phase-lock-loop frequency synthesizers 301 and 302. The PLL frequency synthesizer 301 is connected for supplying automatic frequency and phase control (AFPC) voltage to a voltage-controlled oscillator 303, which VCO 303 generates the first local oscillations used in the upward conversion of radio-frequency COFDM DCM signal to first-IF COFDM DCM signal. The PLL frequency synthesizer 302 is connected for supplying AFPC voltage to a voltage-controlled oscillator 304, which VCO 304 generates the second local oscillations used in the downward conversion of first-IF COFDM DCM signal to second-IF COFDM DCM signal.

The PLL frequency synthesizer 301 includes a programmable frequency divider, a clocked counter that counts the first local oscillations supplied to its counter input connection from the VCO 303. When the count reaches a selected large positive integer, the counter resets to zero count and generates a carry pulse supplied to an AFPC detector within the PLL frequency synthesizer 301. Responsive to carry pulses from the counter, that AFPC detector samples the 1 MHz oscillations from the crystal oscillator and integrates the response of such sampling to generate the AFPC voltage applied to the VCO 303. The crystal oscillator 300 is designed for supplying 1 MHz reference oscillations, because 1 MHz is the largest common submultiple of the central carrier frequencies of all the allocated TV broadcast channels in the U.S.A.

The PLL frequency synthesizer 302 includes a fixed frequency divider, a clocked counter that counts the second local oscillations supplied to its counter input connection from the VCO 304. When the count reaches a prescribed large positive integer, the counter resets to zero count and generates a carry pulse supplied to an AFPC detector within the PLL frequency synthesizer 302. Responsive to carry pulses from the counter, that AFPC detector samples the 1 MHz oscillations from the crystal oscillator and integrates the response of such sampling to generate the AFPC voltage applied to the VCO 304. Choosing the prescribed large positive integer at which the counter in the PLL frequency synthesizer 302 resets to zero count is preferably done so as to position the central carrier frequency of the second-IF COFDM DCM signal at 11 MHz. This frequency is low enough that analog-to-digital conversion of the second-IF COFDM DCM signal is practical. Also, the fourth harmonic of the central carrier frequency of the second-IF signal is at 44 MHZ, which is at the center of the 41-47 megahertz final IF signals commonly used in prior-art television receivers. Since these frequencies are not allocated for high-power RF transmissions, this reduces the possibility of strong interference with operation of the clock oscillator 204 depicted in FIGS. 74, 77, 78, 79, 81 and 82.

The input port of a pre-filter 305 is connected for receiving radio-frequency (RF) COFDM signal supplied by an antenna or a cable distribution system. (The pre-filter 305 is typically constructed either as a group of fixed frequency band pass filters, or as a tracking type of filter.) The pre-filter 305 reduces the bandwidth of the signal entering the subsequent radio-frequency amplifier 306, which RF amplifier 306 is subject to automatic gain control (AGC). The pre-filter 305 reduces the number of channels amplified by the AGC'd RF amplifier 306, thereby reducing the intermodulation interference generated by the amplifier 306 and subsequent circuits. In a pre-filter 305 comprising a group of fixed-frequency bandpass filters, the proper band is selected according to channel selection information supplied from a controller that is not explicitly depicted in FIG. 76. Alternatively, in a tracking type pre-filter 305, an analog control voltage is generated responsive to channel selection information supplied from the controller. The controller also supplies the channel selection information to the PLL frequency synthesizer 301 for determining the frequency division its programmable frequency divider affords to oscillations supplied thereto from the VCO 303.

The RF output of the pre-filter 305 is amplified or attenuated to a desired level by the AGC'd RF amplifier 306 and then supplied to a first mixer 307, there to be mixed with first local oscillations from the VCO 303. The signal at the output port of first mixer 307, resulting from the desired TV channel signal being multiplied by the VCO 303 oscillations, is defined as the first intermediate frequency signal. The frequency of this first IF signal is the difference between the frequency of the VCO 303 first local oscillations and the frequency of the COFDM DCM signal to be received. Since the mixer 307 shifts the spectrum of the desired TV channel to a frequency higher than the TV broadcast frequency, this operation is referred to as an up-conversion. The first IF is chosen to be above all of the spectrum used by terrestrial or cable distribution TV broadcasting in the particular environment in which the tuner operates in. By this choice, the image frequency (the frequency which is the numerical sum of the VCO 303 signal and the first IF frequency) generated in the up-conversion process can be rejected by the pre-filter 305. This choice of first intermediate frequencies also requires the frequency of the VCO 304 to be above the spectrum used by TV broadcasting, thereby avoiding other possible interference.

The first IF output signal supplied from the mixer 307 is amplified by a narrow-band amplifier 308 and then supplied to a first-IF bandpass filter 309 such as a dielectric resonance filter, a strip-line filter or a SAW filter. The characteristics of the first-IF BPF 309 are designed, with consideration to the characteristics of subsequent digital filtering that will be used to suppress ACI (adjacent-channel interference). I.e., the bandwidth of the first-IF BPF 309 is no less than that of a single digital TV channel, and the passband group delay response is sufficiently linear so as not to cause adverse effects on subsequent demodulation of a second-intermediate-frequency (second-IF) COFDM DCM signal. Furthermore, the first-IF BPF 309 is designed to have sufficient out-of-band attenuation at the image frequency range of the subsequent down-conversion process by a second mixer 310 so as not to introduce excessive image frequency interference to degrade the performance of the subsequent demodulation of the second-IF COFDM DCM signal. (In alternative front-end tuner designs the positions of the first-IF amplifier 308 and the first-IF BPF 309 within their cascade connection are interchanged.)

The output signal from the first-IF BPF 309 principally consists of just the desired TV channel signal as up-converted, possibly accompanied by small amounts of up-converted adjacent-channel signals that have not been completely attenuated owing to the band-edge roll-off characteristics of BPF 309. This signal is supplied to a second mixer 310 to be mixed with second local oscillations, which are supplied from the VCO 304. The signal supplied from the output port of the mixer 310, resulting from the first-IF COFDM DCM signal being multiplied by second local oscillations from the VCO 304, is defined as the second-intermediate-frequency (second-IF) COFDM DCM signal. The frequency of this second-IF COFDM DCM signal is the numerical difference between the frequency of second local oscillations from the VCO 304 and the somewhat lower frequencies of the first-IF COFDM DCM signal. The second-IF COFDM DCM signal supplied from the output port of the mixer 310 is amplified by a second IF amplifier 311 of such design as to suppress image signals that have frequencies almost twice that of the frequency of the second local oscillations above the UHF TV band. Since the mixer 310 shifts the first IF signal to a lower frequency, this operation is referred to as a down-conversion.

The amplified second-IF COFDM DCM signal supplied from the output port of the second IF amplifier 311 is applied to the input port of pseudo-RMS detection circuitry 312. The output port of the pseudo-RMS detection circuitry 312 is connected for supplying an approximation of the RMS (root-mean-square) voltage of the response from the second IF amplifier 311 to a first input port of circuitry 313 for generating respective automatic gain control (AGC) signals for the RF amplifier 306 and for the first IF amplifier 308. The peak-to-average ratio (PAPR) of COFDM signals is very high, and permitting occasional peak clipping of them is better design. Detecting the peak voltage of the response from the second IF amplifier 311 would not provide a good basis from which to develop AGC signals.

A second port of the circuitry 313 for generating AGC signals is connected for receiving pilot carrier amplitude information from the pilot carriers processor 288 depicted in FIG. 74 or any of FIGS. 77-82. The pilot carrier amplitude information provides a more precise basis for assuring that the level of response from the second IF amplifier 311 is adjusted to suit subsequent analog-to-digital conversion and QAM demapping procedures.

Designs of circuitry for generating AGC signals in double-conversion radio receivers are known in the prior art. The circuitry 313 generates delayed AGC signal for the RF amplifier 306, avoiding reduction of the RF amplifier 306 gain as long as RF signal strength is not so strong that RF amplifier 306 response consistently drives the first mixer 307 outside its range of acceptably linear response. During the reception of such weaker strength RF signals, the circuitry 313 generates AGC signal for the first IF amplifier 308 that regulates its gain control to maintain desired value of the approximate RMS value of the second IF amplifier 311 response. This maintains the second mixer 310 within its range of acceptably linear response. The circuitry 313 generates the delayed AGC signal for the RF amplifier 306 so as to exhibit slower response to second IF amplifier 311 output signal than the AGC signal for the first IF amplifier 308. This accommodates clipping of occasional extraordinarily large peaks of received COFDM signal in the first mixer 307 and the RF amplifier 306. The AGC signal for the first IF amplifier 308 that circuitry 313 generates no longer reduces the gain of the first IF amplifier 308 when circuitry 313 supplies delayed AGC signal to the RF amplifier 306 for reducing its gain.

In a front-end tuner 280 configuration as used in FIGS. 77 and 79, the amplified second-IF COFDM DCM signal supplied from the output port of the second IF amplifier 311 is supplied to the input port of an analog-to-digital converter 314. The A-to-D converter 314 samples the amplified second-IF COFDM DCM signal at a clock rate determined by the clock oscillator 204 depicted in FIG. 77 or 79. The output port of the A-to-D converter 314 is connected for supplying the resulting digitized second-IF COFDM DCM signal to the input port of a digital bandpass filter 315. Both the lower- and higher-frequency roll-offs of the bandpass response at the output port of the filter 315 are very steep, better to suppress adjacent-channel interference (ACI). The bandpass-filtered digital second-IF COFDM DCM signal supplied from the output port of the filter 315 is suitable to provide the intermediate-frequency COFDM DCM output signal for a front-end tuner 280 configuration.

The amplified second-IF COFDM DCM signal supplied from the output port of the second IF amplifier 311 is suitable to provide the intermediate-frequency COFDM DCM output signal for a front-end tuner 180 configuration. In such front-end tuner 180 configuration the A-to-D converter 314 and the digital bandpass filter 315 are unnecessary and can be omitted.

FIGS. 77 and 65 together depict a variant of the receiver apparatus for asymmetric-sideband (ASB) demodulation of COFDM DCM depicted in FIGS. 74 and 65, digital circuitry shown in FIG. 77 replacing some of the analog circuitry shown in FIG. 74. The front-end tuner 180 of FIG. 74 that converts a selected radio-frequency COFDM DCM signal to an analog intermediate-frequency COFDM DCM signal is replaced in FIG. 77 by a front-end tuner 280 that converts a selected RF COFDM DCM signal to a digitized intermediate-frequency COFDM DCM signal. This digitized COFDM DCM signal is supplied from the output port of the front-end tuner 280 to respective signal input ports of +1, (−1) multipliers 213 and 214. A 2-phase divide-by-4 frequency divider 203 responds to rising edges of pulses from a clock oscillator 204, by supplying I and Q square waves to respective carrier input ports of the +1, (−1) multipliers 213 and 214. The clock oscillator 204 is subject to automatic frequency and phase control (AFPC) that adjusts the frequency of clock pulses to be four times the final intermediate-frequency (IF) carrier of the COFDM signals. The clock oscillator 204 is connected for supplying the clock pulses to an analog-to-digital converter in the front-end tuner 280, which A-to-D converter digitizes the intermediate-frequency COFDM DCM signal supplied to respective signal input ports of the +1, (−1) multipliers 213 and 214.

The leading I square wave that the frequency divider 203 supplies to the control input port of the +1, (−1) multiplier 213 conditions the +1, (−1) multiplier 213 to perform a 2-to-1 decimation of the 0°, 90°, 180° and 270° digital samples of COFDM DCM signal supplied to its input port, selecting the 0° digital samples for multiplication by +1 responsive to positive half cycles of I square wave, and selecting the 180° digital samples for multiplication by −1 responsive to negative half cycles of I square wave. The output port of the +1, (−1) multiplier 213 is connected for supplying the in-phase synchrodyne results to the input port of a digital lowpass filter 207. The lowpass filter 207 responds to the baseband portion of the in-phase synchrodyne results, but not to image signal. FIG. 77 shows the output port of the lowpass filter 207 connected for supplying its response to the input port of the clocked digital delay line 210 providing compensatory delay for the latent delay of the digital FIR filter 209 used to perform Hilbert transformation.

The lagging Q square wave that the frequency divider 203 supplies to the control input port of the +1, (−1) multiplier 214 conditions the +1, (−1) multiplier 214 to perform a 2-to-1 decimation of the 0°, 90°, 180° and 270° digital samples of COFDM DCM signal supplied to its input port, selecting the 90° digital samples for multiplication by −1 responsive to negative half cycles of Q square wave, and selecting the 270° digital samples for multiplication by +1 responsive to positive half cycles of Q square wave. The output port of the +1, (−1) multiplier 214 is connected for supplying quadrature synchrodyne results to the input port of to the input port of a digital lowpass filter 208. The lowpass filter 208 responds to the baseband portion of the quadrature synchrodyne results, but not to image signal. FIG. 77 shows the output port of the lowpass filter 208 connected for supplying its response to the input port of the FIR filter 209 for performing Hilbert transformation.

If the front-end tuner 280 contains digital lowpass filtering of the digitized IF COFDM DCM signal with rapid roll-off to suppress ACI, there is no reason for the digital lowpass filters 207 and 208 necessarily having to have sharp roll-offs of higher frequencies to suppress ACI. The Hilbert transform response of the FIR filter 209 and the response from digital delay line 210 are utilized in the subsequent portions of the FIG. 77 and FIG. 65 receiver apparatus in the same way as in the corresponding portions of the FIG. 74 and FIG. 65 receiver apparatus.

FIGS. 78 and 65 together depict another general structure of receiver apparatus for ISB demodulation of COFDM DCM signals. In accordance with further aspects of the invention, the FIG. 78 portion of this receiver apparatus employs phase-shift methods of ISB demodulation modified in a novel first manner particularly well suited for COFDM DCM signals. However, initial portions of the FIG. 78 apparatus are similar to the initial portions of the FIG. 74 apparatus.

As with the FIG. 74 apparatus, a reception antenna 81 captures the radio-frequency COFDM DCM signal for application as input signal to a front-end tuner 180 of the receiver. The front-end tuner 180 converts a selected radio-frequency COFDM DCM signal to an intermediate-frequency COFDM DCM signal, which is supplied to the respective signal input ports of mixers 201 and 202. The mixers 201 and 202 are of switching type connected for receiving I and Q square waves at their respective carrier input ports, as supplied from a 2-phase divide-by-4 frequency divider 203 in response to rising edges of pulses from a clock oscillator 204. The clock oscillator 204 is subject to AFPC that adjusts the frequency of clock pulses to be four times the final IF carrier of the COFDM signals. The leading, in-phase (I) square wave that the frequency divider 203 supplies to the carrier input port of the mixer 201 conditions the mixer 201 to provide an in-phase synchrodyning of intermediate-frequency COFDM DCM signal to baseband. The lagging, quadrature (Q) square wave that the frequency divider 203 supplies to the carrier input port of the mixer 202 conditions the mixer 202 to provide a quadrature synchrodyning of intermediate-frequency COFDM DCM signal to baseband.

As with the FIG. 74 apparatus, an A-to-D converter 205 performs analog-to-digital conversion of the baseband signal supplied from the output port of the mixer 201. The digitized in-phase baseband signal supplied from the output port of the A-to-D converter 205 is supplied to the input port of a digital lowpass filter 208. An A-to-D converter 206 performs analog-to-digital conversion of the baseband signal supplied from the output port of the mixer 202. The digitized quadrature baseband signal supplied from the output port of the A-to-D converter 206 is supplied to the input port of a digital lowpass filter 208.

Subsequent portions of the FIG. 78 apparatus differ from subsequent portions of the FIG. 74 apparatus. The digital FIR filter 209 that the FIG. 74 apparatus includes for performing Hilbert transform is complex in nature and takes up considerable area on the silicon die in a monolithic integrated circuit construction. The FIG. 78 apparatus dispenses with the digital FIR filter 209, the digital delay line 210, the digital adder 211, and the digital subtractor 212.

The digital lowpass filter 207 is connected for supplying digitized samples of baseband folded COFDM DCM signal to the input port of the cyclic prefix detector 84. (Alternatively, the digital lowpass filter 208 is connected for supplying digitized samples of baseband folded COFDM DCM signal to the input port of the cyclic prefix detector 84 instead). The cyclic prefix detector 84 differentially combines the digitized samples of baseband folded COFDM DCM signal with those samples as delayed by the duration of an effective COFDM symbol. Nulls in the difference signal so generated should occur, marking the guard intervals of the baseband folded COFDM DCM signal. The nulls are processed to reduce any corruption caused by noise and to generate better-defined indications of the phasing of COFDM symbols. The output port of the cyclic prefix detector 84 is connected to supply these indications to the first of two input ports of the timing synchronization apparatus 285.

The signal input port of a guard interval remover 863 is connected for receiving digitized samples of an in-phase baseband COFDM signal from the output port of the digital lowpass filter 207. The output port of the guard interval remover 863 is connected for supplying the input port of a discrete-Fourier-transform (DFT) computer 873 with windowed portions of the quadrature baseband signal that span respective COFDM symbol intervals. The signal input port of the guard interval remover 864 is connected for receiving digitized samples of a quadrature baseband COFDM signal from the output port of the digital lowpass filter 208. The output port of the guard interval remover 864 is connected for supplying the input port of a discrete-Fourier-transform (DFT) computer 874 with windowed portions of the in-phase baseband signal that span respective COFDM symbol intervals. The DFT computers 873 and 874 are similar in construction, each having the capability of transforming COFDM carriers nominally 8K, 16K or 32K in number to the complex coordinates of respective QAM symbols. The DFT computers 873 and 874 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 78 structure.

The timing synchronization apparatus 285 is connected for supplying gating control signals to respective control input ports of the guard interval removers 863 and 864. The timing synchronization apparatus 285 is further connected for supplying COFDM symbol timing information to the DFT computers 873 and 874. The indications concerning the phasing of COFDM symbols that the cyclic prefix detector 84 supplies to the timing synchronization apparatus 285 are sufficiently accurate for (a) initial windowing of the in-phase baseband folded COFDM signal that the guard interval remover 863 supplies to the DFT computer 873 and (b) initial windowing of the quadrature baseband folded COFDM signal that the guard interval remover 862 supplies to the DFT computer 874.

The output port of the DFT computer 874 is connected via Hilbert transformation connections 875 for supplying complex coordinates of QAM symbols conveyed by respective ones of the received COFDM carriers to first addend input ports of a parallel array 876 of digital complex-number adders and to minuend input ports of a parallel array 877 of digital complex-number subtractors. These connections 875 are such as to perform Hilbert transform of the complex coordinates of QAM symbols, which procedure is explained in greater detail in the remaining portion of this paragraph. The real coordinates of the complex coordinates of QAM symbols are applied as imaginary components of input signals to the first addend input ports of the parallel array 876 of digital adders and to the minuend input ports of the parallel array 877 of digital subtractors. The imaginary coordinates of the complex coordinates of QAM symbols are applied as real components of input signals to the first addend input ports of the parallel array 876 of digital adders and to the minuend input ports of the parallel array 877 of digital subtractors. There is essentially no delay in this Hilbert transformation procedure, and it takes up little if any extra area on the silicon die in a monolithic integrated circuit construction. The output port of the DFT computer 873 is connected for supplying complex coordinates of QAM symbols conveyed by respective ones of the received COFDM carriers to second addend input ports of the parallel array 876 of digital complex-number adders and to subtrahend input ports of the parallel array 877 of digital complex-number subtractors.

The parallel array 876 of digital adders additively combines the complex coordinates of QAM symbols the DFT computer 873 generates, as transformed by the Hilbert transformation connections 875, with the complex coordinates of corresponding QAM symbols the DFT computer 874 generates. The sum output ports of the parallel array 876 of digital adders recover at baseband the complex coordinates of QAM symbols from the lower sideband of the COFDM DCM signal. The complex coordinates of QAM symbols extracted from pilot carriers in each COFDM symbol sampling interval are supplied as parallel input signal to the pilot carriers processor 288. The complex coordinates of QAM symbols extracted from carriers in each COFDM symbol sampling interval that convey coded data are supplied as parallel input signal to the frequency-domain channel equalizer 893 for QAM symbols extracted from the lower sideband of the COFDM DCM signal.

The parallel array 877 of digital subtractors differentially combines the complex coordinates of QAM symbols the DFT computer 874 generates, as transformed by the Hilbert transformation connections 875, with the complex coordinates of corresponding QAM symbols the DFT computer 873 generates. The difference output ports of the parallel array 877 of digital subtractors recover at baseband the complex coordinates of QAM symbols from the upper sideband of the COFDM DCM signal. The complex coordinates of QAM symbols extracted from pilot carriers in each COFDM symbol sampling interval are supplied as parallel input signal to the pilot carriers processor 288. The complex coordinates of QAM symbols extracted from carriers in each COFDM symbol sampling interval that convey coded data are supplied as parallel input signal to the frequency-domain channel equalizer 894 for QAM symbols extracted from the upper sideband of the COFDM DCM signal.

FIGS. 79 and 65 together depict a variant of the receiver apparatus for ISB demodulation of COFDM DCM depicted in FIGS. 78 and 65, digital circuitry depicted in FIG. 79 replacing some of the analog circuitry depicted in FIG. 78. FIG. 79 depicts modification of FIG. 78 morphologically and operationally similar to the modification of FIG. 74 depicted in FIG. 77. The components 180, 201, 202, 205 and 206 of FIG. 78 are replaced in FIG. 79 by components 280, 213 and 214 previously described in reference to FIG. 77. The DFT computers 873 and 874 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 79 structure.

Figure 80:
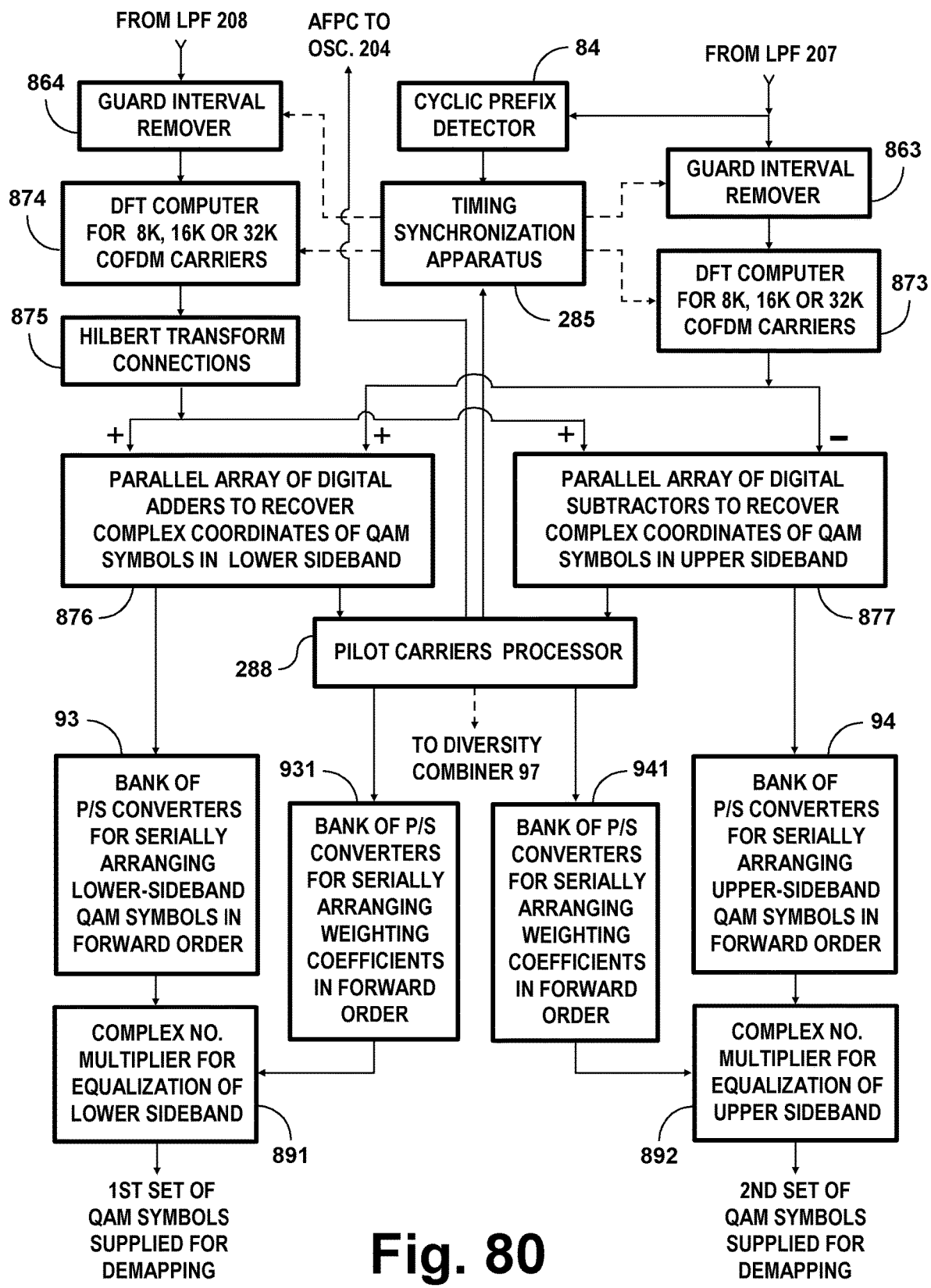
FIG. 80 is a schematic diagram of a modification suitable for both the FIG. 78 receiver structure and the FIG. 79 receiver structure.

FIG. 80 depicts modifications of either of the receiver structures depicted in FIGS. 78 and 79, which modifications reduce the number of complex-number multipliers needed for frequency domain channel equalization. The channel equalizer 893 that performed multiplications on each of the QAM symbols supplied it in parallel from the parallel array 876 of digital adders is omitted, and the channel equalizer 894 that performed multiplications on each of the QAM symbols supplied to it in parallel from the parallel array 877 of digital subtractors is also omitted. A complex-number multiplier 891 performs frequency-domain channel equalization on each of the QAM symbols from the lower sideband of the COFDM DCM signal furnished it by the parallel array 876 of digital adders after their serialization by a selected one of the parallel-to-serial (P/S) converters in the bank 93 of them. Another complex-number multiplier 892 performs frequency-domain channel equalization on each of the QAM symbols from the upper sideband of the COFDM DCM signal furnished it by the parallel array 877 of digital subtractors after their serialization by a selected one of the parallel-to-serial (P/S) converters in the bank 94 of them. The first and second sets of QAM symbols supplied from the respective product output ports of the multipliers 891 and 892 are suitable input signals for subsequent demapping apparatus—e.g., as depicted in any of FIGS. 65-68.

More particularly, the QAM symbols from the lower sideband of the COFDM DCM signal that convey data are supplied by respective ones of the parallel array 876 of digital adders directly to respective ones of the parallel input ports of the selected one of the P/S converters in the bank 93 of them. The output port of that selected P/S converter responds to supply serialized QAM symbols from the lower sideband of the COFDM DCM signal to the multiplicand input port of the multiplier 891. The parallel input ports of a selected one of the parallel-to-serial (P/S) converters in a bank 931 of them receives, in parallel from the pilot carriers processor 288, the weighting coefficients for frequency-domain channel equalization of the lower sideband of the COFDM DCM signal. The output port of that selected P/S converter responds to supply serialized weighting coefficients for the lower sideband of the COFDM DCM signal to the multiplier input port of the complex-number multiplier 891. The multiplier 891 responds to its multiplicand and multiplier input signals to supply from its product output port an equalized first set of QAM symbols, suitable for subsequent demapping.

More particularly, the QAM symbols from the upper sideband of the COFDM DCM signal that convey data are supplied by respective ones of the parallel array 877 of digital subtractors directly to the parallel input ports of the selected one of the P/S converters in the bank 94 of them. The output port of that selected P/S converter responds to supply serialized QAM symbols from the upper sideband of the COFDM DCM signal to the multiplicand input port of the multiplier 892. The parallel input ports of a selected one of the parallel-to-serial (P/S) converters in a bank 941 of them receives, in parallel from the pilot carriers processor 288, the weighting coefficients for frequency-domain channel equalization of the upper sideband of the COFDM DCM signal. The output port of that selected P/S converter responds to supply serialized weighting coefficients for the lower sideband of the COFDM DCM signal to the multiplier input port of the complex-number multiplier 892. The multiplier 892 responds to its multiplicand and multiplier input signals to supply from its product output port an equalized second set of QAM symbols, suitable for subsequent demapping.

The modified phase shift method of ASB demodulation as described in connection with FIGS. 78-80 avoids the need for a digital FIR filter to perform Hilbert transform, but introduces parallel arrays of digital adders and digital subtractors to separate the lower-sideband QAM symbols from the upper-sideband QAM symbols. Receiver apparatus using a Weaver method of ASB demodulation as described in connection with FIGS. 81 and 82 also avoids the need for a digital FIR filter to perform Hilbert transform, but the modified phase shift method of ASB demodulation is more practical to implement.

Figure 81:
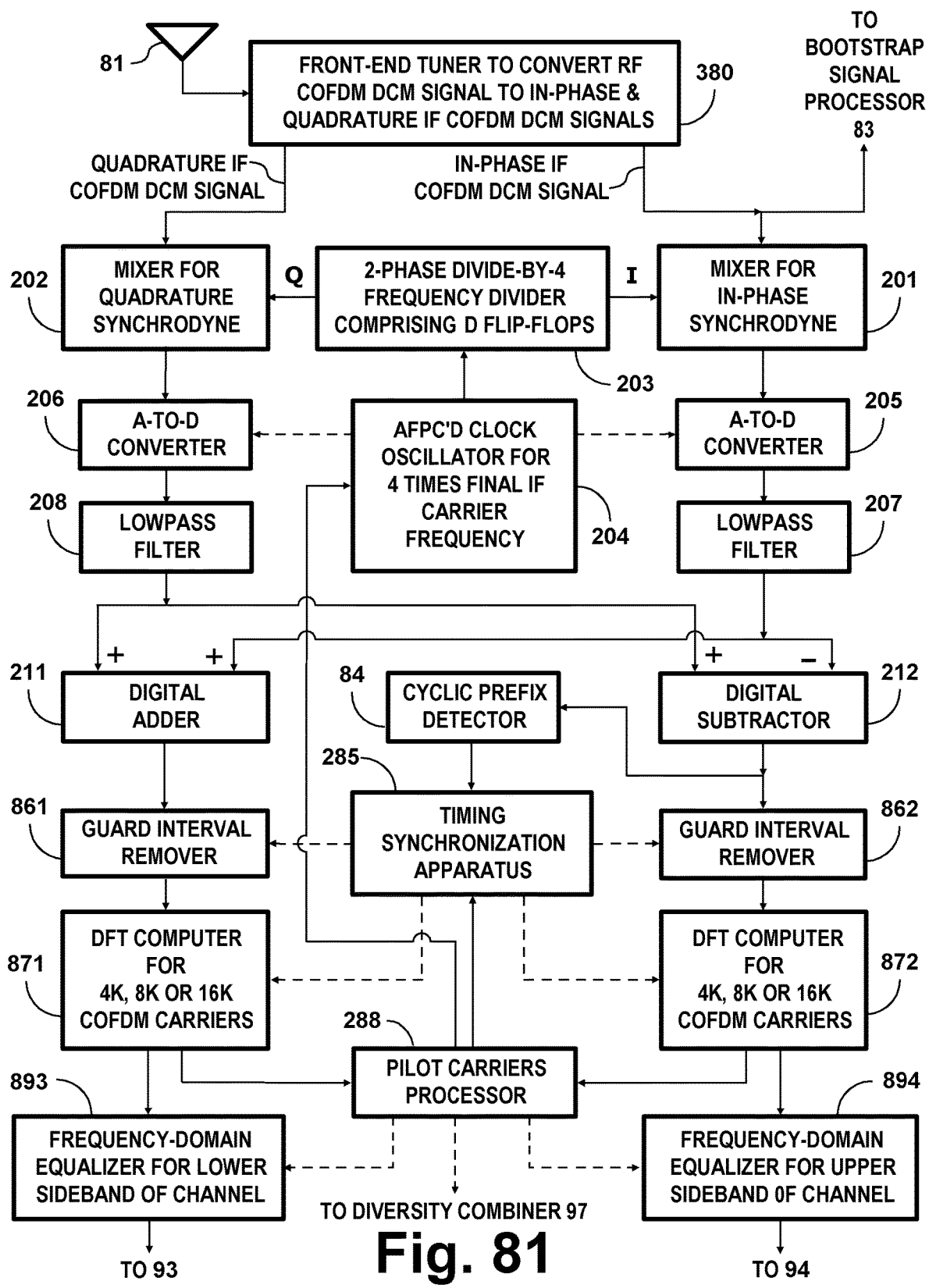

FIGS. 81 and 65 together depict the general structure of receiver apparatus for ISB demodulation of COFDM DCM signals using methods based on methods for demodulating SSB amplitude-modulation signals described by Donald K. Weaver, Jr. in his paper "A third method of generation and detection of single sideband signals", Proceedings of the IRE, vol. 44, December 1956 issue, pp. 1203-1205. The FIG. 81 structure for ISB demodulation of COFDM DCM signals differs from the FIG. 74 structure for ISB demodulation of COFDM DCM signals in the following regards. The front-end tuner 180 to convert RF COFDM DCM signal to IF COFDM DCM signal for application to the multiplicand input ports of the mixers 201 and 202 is replaced by a front-end tuner 380 to convert RF COFDM DCM signal to (a) an in-phase IF COFDM DCM signal for application to the multiplicand input port of the mixer 201 and (b) a quadrature IF COFDM DCM signal for application to the multiplicand input port of the mixer 202. The application of quadrature IF COFDM DCM signal, rather than in-phase IF COFDM DCM signal, to the multiplicand input port of the mixer 202 obviates the need for an FIR digital filter 209 for Hilbert transformation. Accordingly, there is no call for digital delay line 210 to compensate for latent delay through the filter 209.

An A-to-D converter 205 performs analog-to-digital conversion of the in-phase and quadrature components of the baseband signal supplied from the output port of the mixer 201. An A-to-D converter 206 performs analog-to-digital conversion of the in-phase and quadrature components of the baseband signal supplied from the output port of the mixer 202. The digitized in-phase baseband signal supplied from the output port of the A-to-D converter 205 is supplied to the input port of a digital lowpass filter 207. The digitized quadrature baseband signal supplied from the output port of the A-to-D converter 206 is supplied to the input port of a digital lowpass filter 208. Preferably, the design of the digital lowpass filters 207 and 208 provides a rapid roll-off in frequency response, so as to suppress adjacent-channel interference (ACI). The DFT computers 871 and 872 perform bandpass filtering of individual OFDM carriers which bandpass filtering should be unresponsive to frequencies outside baseband. This bandpass filtering may allow digital lowpass filters 207 and 208 to be replaced by respective direct connections in modified FIG. 81 structure.

The output port of the lowpass filter 207 and the output port of the lowpass filter 208 are connected to respective addend input ports of the digital adder 211, which is operative to recover at baseband the lower sideband of the COFDM DCM signal at its sum output port. The output ports of the lowpass filters 207 and 208 are respectively connected to the subtrahend input port and the minuend input port of the digital subtractor 212, which is operative to recover at baseband the upper sideband of the COFDM DCM signal at its difference output port. The responses from the sum output port of the digital adder 211 and from the difference output port of the digital subtractor 212 are utilized in the subsequent portions of the FIG. 81 and FIG. 65 receiver apparatus in the same way as in the corresponding portions of the FIG. 74 and FIG. 65 receiver apparatus.

Figure 82:
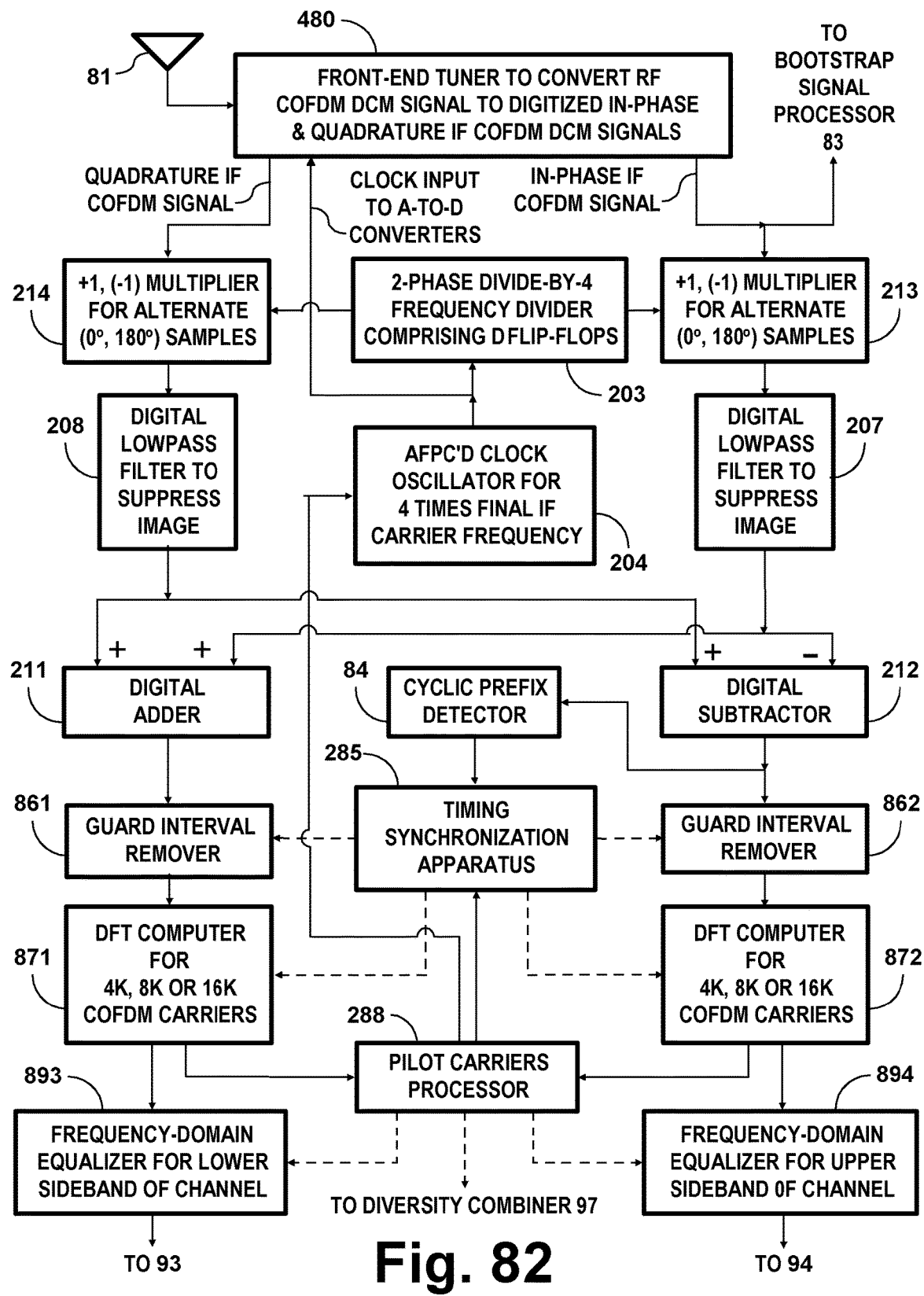

FIGS. 82 and 65 together form a schematic diagram of a variant of the receiver apparatus for ISB demodulation of COFDM DCM depicted in FIGS. 81 and 65, digital circuitry depicted in FIG. 82 replacing some of the analog circuitry depicted in FIG. 81. The front-end tuner 380 depicted in FIG. 81 that is operable to convert RF COFDM signal to both in-phase and quadrature analog IF COFDM signals is replaced in FIG. 82 by a front-end tuner 480 operable to convert RF COFDM signal to both in-phase and quadrature digital IF COFDM DCM signals. The front-end tuner 480 is connected to supply the in-phase digital IF COFDM DCM signals to the multiplicand input port of the +1, (−1) multiplier 213 for in-phase synchrodyne to baseband. The front-end tuner 480 is connected to supply the quadrature digital IF COFDM DCM signals to the multiplicand input port of a +1, (−1) multiplier 214 for quadrature synchrodyne to baseband. A 2-phase divide-by-4 frequency divider 203 responds to rising edges of pulses from a clock oscillator 204, by supplying I and Q square waves to respective carrier input ports of the +1, (−1) multipliers 213 and 214. The clock oscillator 204 is subject to automatic frequency and phase control (AFPC) that adjusts the frequency of clock pulses to be four times the final intermediate-frequency (IF) carrier of the COFDM signals.

The leading I square wave that the frequency divider 203 supplies to the control input port of the +1, (−1) multiplier 213 conditions the +1, (−1) multiplier 213 to select the 0° digital samples of the in-phase second-IF COFDM DCM signal for multiplication by +1 responsive to positive half cycles of I square wave, and selecting the 180° digital samples of the in-phase second-IF COFDM DCM signal for multiplication by −1 responsive to negative half cycles of I square wave. The output port of the +1, (−1) multiplier 213 is connected for supplying the in-phase synchrodyne results to the input port of a digital lowpass filter 207. The lowpass filter 207 responds to the baseband portion of the in-phase synchrodyne results, but not to image signal.

The lagging Q square wave that the frequency divider 203 supplies to the control input port of the +1, (−1) multiplier 214 conditions the +1, (−1) multiplier 214 to select the −90 digital samples of the quadrature second-IF COFDM DCM signal for multiplication by +1 responsive to positive half cycles of Q square wave, and selecting the 90° digital samples of the quadrature second-IF COFDM DCM signal for multiplication by −1 responsive to negative half cycles of Q square wave. The output port of the +1, (−1) multiplier 214 is connected for supplying quadrature synchrodyne results to the input port of to the input port of a digital lowpass filter 208. The lowpass filter 208 responds to the baseband portion of the quadrature synchrodyne results, but not to image signal.

If the front-end tuner 480 contains digital lowpass filtering of the digitized IF COFDM DCM signal with rapid roll-off in frequency response for suppressing ACI, there is no reason for the digital lowpass filters 207 and 208 necessarily having to have rapid roll-offs in frequency response to suppress ACI. The output port of the lowpass filter 207 and the output port of the lowpass filter 208 are connected to respective addend input ports of the digital adder 211, which is operative to recover at baseband the lower sideband of the COFDM DCM signal at its sum output port. The output ports of the lowpass filters 207 and 208 are respectively connected to the minuend input port and the subtrahend input port of the digital subtractor 212, which is operative to recover at baseband the upper sideband of the COFDM DCM signal at its difference output port. The responses from the sum output port of the digital adder 211 and from the difference output port of the digital subtractor 212 are utilized in the subsequent portions of the FIG. 82 and FIG. 65 receiver apparatus in the same way as in the corresponding portions of the FIG. 77 and FIG. 65 receiver apparatus. The bandpass filtering of individual OFDM carriers in DFT computers 871 and 872 may allow digital lowpass filters 207 and 208 to be replaced by respective direct connections in modified FIG. 82 structure.

Figure 83:
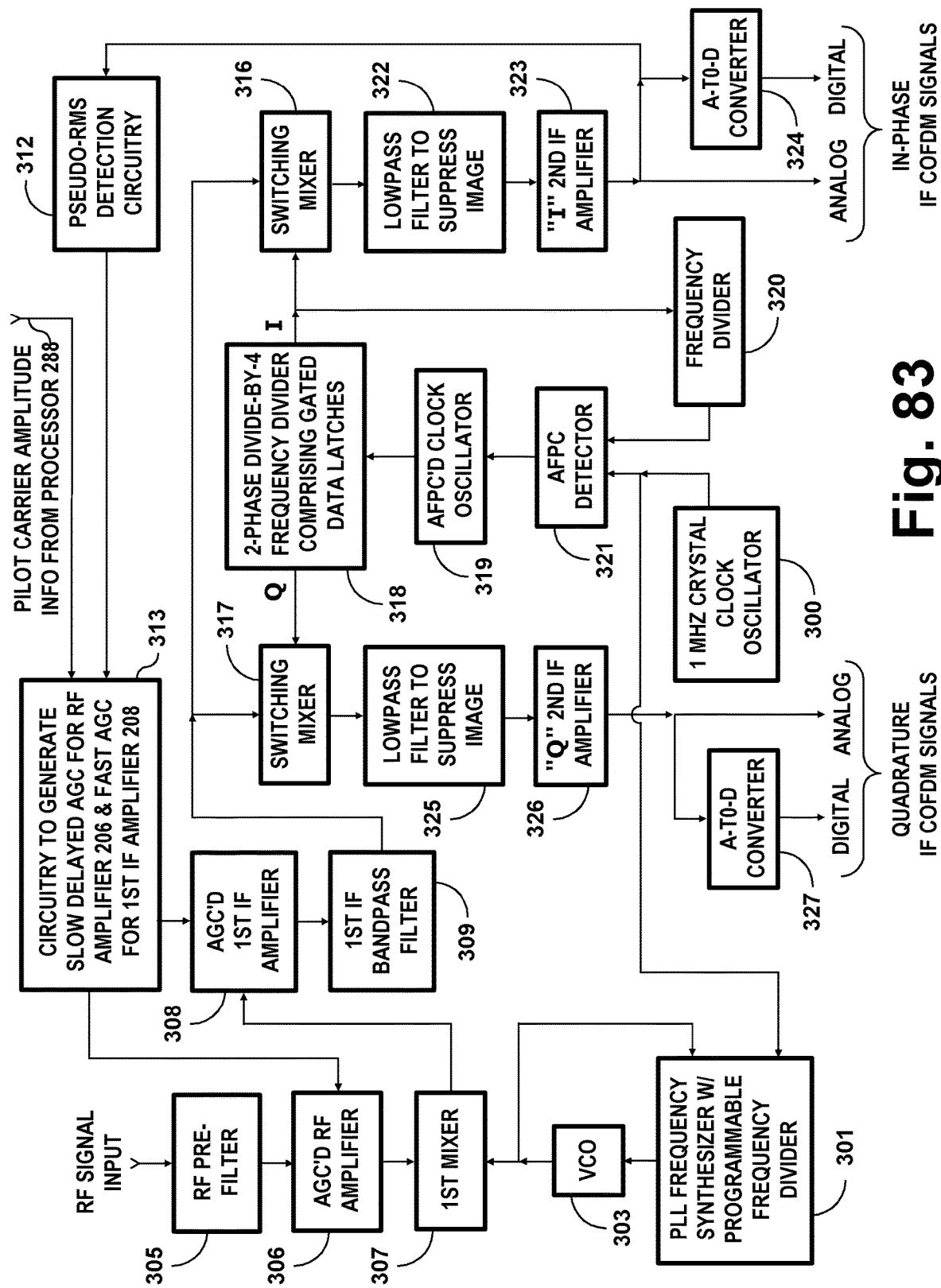
FIG. 83 is a schematic diagram of a double superheterodyne front-end tuner structure suitable for inclusion in either of the apparatuses for demodulating COFDM DCM radio-frequency signals depicted in FIGS. 81 and 82.

FIG. 83 depicts plural superheterodyne front-end tuner structure suitable for implementing the front-end tuner 380 depicted in FIG. 81 or for implementing the front-end tuner 480 depicted in FIG. 82. Elements 300-309, 312 and 313 of the FIG. 83 structure are similar to the elements 300-309, 312 and 313 in the FIG. 76 double-superheterodyne front-end tuner structure. A crystal clock oscillator 300 is connected for supplying 1 MHz reference oscillations to a PLL frequency synthesizer 301 that supplies AFPC voltage to a voltage-controlled oscillator 303. VCO 303 generates the first local oscillations used in the upward conversion of radio-frequency COFDM DCM signal to first-IF COFDM DCM signal. The input port of a pre-filter 305 is connected for receiving RF COFDM DCM signal supplied by an antenna or a cable distribution system. The RF output of the pre-filter 305 is amplified or attenuated to a desired level by an AGC'd RF amplifier 306 and then supplied to a first mixer 307, there to be mixed with oscillations from the first local oscillator 303 to generate first IF signal. The first IF output signal supplied from the mixer 307 is amplified by a narrow-band amplifier 308 and then supplied to a first-IF bandpass filter 309 such as a dielectric resonance filter, a strip-line filter or a SAW filter. The input port of pseudo-RMS detection circuitry 312 is connected for receiving amplified second-IF COFDM DCM signal supplied from the output port of a second IF amplifier. The output port of the pseudo-RMS detection circuitry 312 is connected for supplying an approximation of the root-mean-square RMS voltage of the amplified second-IF COFDM DCM signal to a first input port of circuitry 313 for generating respective automatic gain control (AGC) signals for the RF amplifier 306 and for the first IF amplifier 308. A second port of the circuitry 313 for generating AGC signals is connected for receiving pilot carrier amplitude information from the pilot carriers processor 288 depicted in FIG. 81 or in FIG. 82.

The single second mixer 310 of the FIG. 76 front-end tuner structure is replaced by two switching mixers 316 and 317 in the front-end tuner structure depicted in FIG. 83. A 2-phase divide-by-4 frequency divider 318 responds to rising edges of pulses from a clock oscillator 319, by supplying I and Q square waves to respective carrier input ports of the switching mixers 316 and 317. The fundamental frequency of the Q square wave lags the fundamental frequency of the Q square wave by 90° (π/4 radians). The clock oscillator 319 is subject to automatic frequency and phase control (AFPC) responsive to voltage supplied from a PLL frequency synthesizer comprising the divide-by-4 frequency divider 318, a further frequency divider 320 and an AFPC detector 321. The input port of the frequency divider 320 is connected to receive the I square wave applied to the carrier input port of the switching mixer 316. The output port of the frequency divider 230 is connected to a first input port of the AFPC detector 321. A second input port of the AFPC detector 321 is connected for receiving reference-frequency oscillations from the crystal oscillator 300. The output port of the AFPC detector 321 is connected for supplying voltage to the clock oscillator 319 to implement automatic frequency and phase control (AFPC) thereof.

The output port of the switching mixer 316 connects to the input port of a lowpass filter 322 that suppresses image signal in the response supplied from its output port to the input port of an amplifier 323 of the in-phase ("I") second-IF signal. The output port of the "I" second-IF amplifier 323 is connected to supply analog amplified in-phase second-IF signal suitable for an output signal from the FIG. 81 front-end tuner 380. FIG. 83 shows this amplified in-phase second-IF signal applied to the input port of an analog-to-digital converter 324 that responds to supply digital amplified in-phase second-IF signal suitable for a digital output signal from the FIG. 82 front-end tuner 480.

The output port of the switching mixer 317 connects to the input port of a lowpass filter 325 that suppresses image signal in the response supplied from its output port to the input port of an amplifier 326 of the quadrature ("Q") second-IF signal. The output port of the "Q" second-IF amplifier 326 is connected to supply analog amplified quadrature second-IF signal suitable for an output signal from the FIG. 81 front-end tuner 380. FIG. 83 shows this amplified quadrature second-IF signal applied to the input port of an analog-to-digital converter 327 that responds to supply digital amplified quadrature second-IF signal suitable for an output signal from the FIG. 82 front-end tuner 480.

FIG. 83 shows the input port of the pseudo-RMS detection circuitry 312 connected for receiving amplified in-phase second-IF signal from the output port of the "I" second-IF amplifier 323. With such connection the measurement of second-IF signal amplitude by the pseudo-RMS detection circuitry 312 takes into account the amplitudes of the pilot carriers in the COFDM DCM signal. Alternatively, the pseudo-RMS detection circuitry 312 is connected instead for receiving amplified quadrature second-IF signal from the output port of the "Q" second-IF amplifier 326. With such connection the measurement of second-IF signal amplitude by the pseudo-RMS detection circuitry 312 is nonresponsive to the amplitudes of the pilot carriers in the COFDM DCM signal.

Each of the FIG. 81 and the FIG. 82 COFDM demodulation apparatuses obviates the need for an FIR digital filter to perform Hilbert transformation. However, in order for a Weaver method of demodulation to perform well, these front-end tuners 380 and 480 each need to convert RF COFDM DCM signal to both in-phase and quadrature IF COFDM DCM signals subject to the same amplification. The orthogonal relationship between the in-phase and quadrature IF COFDM DCM signals that either of these front-end tuners 380 and 480 supplies has to be scrupulously maintained, if a Weaver method of ISB demodulation is to perform well. Also, the respective gains of the in-phase and quadrature IF COFDM DCM signals that the front-end tuner supplies have to match closely, if a Weaver method of ISB demodulation is to perform well. The FIG. 83 structure for front-end tuners addresses these problems by using the 2-phase divide-by-4 frequency divider 318 responsive to output signal from the clock oscillator 319. However, the frequency of oscillations supplied from the clock oscillator 319 will approach 3 GHz, in order to position the fundamental frequencies of the I and Q square waves from the frequency divider 318 above the UHF band for television broadcasting.

The structures depicted in FIGS. 74, 77, 81 and 82 are preferred over variants of them that defer lowpass digital filtering to suppress unwanted image frequencies until after the digital adder 211 and the digital subtractor 212.

Rather than operating two DFT computers in parallel in the in-phase and quadrature branches of the receiver apparatus shown in any of FIGS. 74 and 77-82, it is possible to use a single DFT computer in time-division multiplex to serve both branches. While this can reduce "hardware" requirements, higher operating speeds will be required to implement such multiplex.

The communication systems described supra convey the same data concurrently in the lower- and upper-frequency sidebands of the COFDM DCM signal. U.S. Pat. No. 8,958,490 granted to Allen LeRoy Limberg on 17 Feb. 2015, titled "COFDM broadcasting with single-time retransmission of COFDM symbols", describes transmitting the same DSB-COFDM signal twice a second or more apart. Such retransmission is made better to accommodate reception in a moving vehicle, where drop-outs in received signal are likely to occur frequently because of objects obstructing a sufficiently strong signal path. A problem with such retransmission of DSB-COFDM signals is that data throughput is further halved.

The COFDM DCM communication systems described supra can be modified to transmit the same data in the lower- and upper-frequency sidebands of the COFDM DCM signal, but differentially delayed a second or more, so the same data is retransmitted during a COFDM symbol interval later than the one in which the data was previously transmitted. The advantage of such retransmission technique is that data throughput is not further halved. In a receiver for such COFDM DCM signal, the same data from the lower- and upper-frequency sidebands that is earlier demodulated is delayed to concur with that same data as later demodulated, before diversity combining the two sets of the same data. Such compensatory delay can be introduced after DFT computation of QAM subcarriers of the COFDM DCM signal and before QAM symbol demapping procedures, for example. Alternatively, such compensatory delay can be introduced after QAM symbol demapping procedures, but before diversity combining the two sets of QAM symbol demapping results. Still another alternative is possible if the lower- and upper-frequency sidebands are subjected to DFT computations separately from each other; compensatory delay is afforded to the demodulated sideband conveying the same data earlier than the other demodulated sideband.

The improved methods of demodulating asymmetric-sideband digital amplitude-modulation signals described supra can be broadly applied in a number of digital communications systems. Such methods can be utilized by the bootstrap signal processor 83 depicted in FIG. 65, by way of specific example.

Various other modifications and variations can be made in the specifically described apparatuses without departing from the spirit or scope of the invention in certain broader ones of its aspects. For example, in variations of the structures depicted in FIGS. 74 and 77-82, the AFPC'd clock oscillator 204 or 304 is replaced by a fixed-frequency clock oscillator, such as a crystal-controlled oscillator. AFPC signals from the pilot carriers processor 288 are supplied to the front-end tuner for fine-tuning a local oscillator therein, so that the principal carrier of intermediate-frequency COFDM DCM signal(s) supplied from the front end tuner is appropriate for in-phase and quadrature synchrodynes to baseband in those variations of the structures depicted in FIGS. 74 and 77-82.

Persons skilled in the art of designing DTV systems and acquainted with this disclosure are apt to discern that various modifications and variations can be made in the specifically described apparatuses without departing from the spirit or scope of the invention in certain broader ones of its aspects. Accordingly, it is intended that such modifications and variations of the specifically described apparatuses be considered to result in further embodiments of the invention, to be included within the scope of the appended claims and their equivalents in accordance with the doctrine of equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. Receiver apparatus for coded orthogonal frequency-division modulation (COFDM) radio-frequency signals each of a few megahertz bandwidth, the lower and upper halves of the frequency spectrum of each of which COFDM radio-frequency signals convey the same forward-error-correction (FEC) coded data via thousands of component subcarriers, said receiver apparatus comprising:

means for selectively receiving a radio-frequency COFDM signal;

means for developing first and second sets of QAM symbols, said first set of QAM symbols descriptive of a discrete Fourier transform of COFDM carriers from the lower half spectrum of the selectively received COFDM radio-frequency signal, and said second set of QAM symbols descriptive of a discrete Fourier transform of COFDM carriers from the upper half spectrum of the selectively received COFDM radio-frequency signal;

means for serially arranging said first set of QAM symbols in each COFDM symbol in a first prescribed spectral order;

means for serially arranging said second set of QAM symbols in each COFDM symbol in a second prescribed spectral order, such that each successive QAM symbol in said second set of QAM symbols conveys FEC-coded data related to FEC-coded data conveyed by a successive QAM symbol in said first set of QAM symbols as serially arranged in said first prescribed spectral order;

means for demapping said first set of QAM symbols as thus serially arranged in said first prescribed spectral order to recover a first succession of QAM symbol map labels in soft-bit format and for demapping said second set of QAM symbols as thus serially arranged in said second prescribed spectral order to recover a second succession of QAM symbol map labels in soft-bit format; and a diversity combiner for combining soft bits of corresponding QAM symbol map labels in said first and second successions thereof as received by said diversity combiner as first and second input signals thereto, thereby to reproduce soft bits of FEC-coded data as response from said diversity combiner.

2. Receiver apparatus as set forth in claim 1, wherein said means for serially arranging said first set of QAM symbols in each COFDM symbol in a first prescribed spectral order and said means for serially arranging said second set of QAM symbols in each COFDM symbol in a second prescribed spectral order accommodate the spectral orders of the first and second set of QAM symbols being similar to each other in said selectively received radio-frequency COFDM signal, which provides uniform frequency diversity between QAM symbols in said first and said second sets of QAM symbols that convey similar FEC-coded data.

3. Receiver apparatus as set forth in claim 2, wherein said means for demapping said first set of QAM symbols to recover a first succession of QAM symbol map labels in soft-bit format and for demapping said second set of QAM symbols to recover a second succession of QAM symbol map labels in soft-bit format is designed to accommodate that pair of QAM symbol constellations being mutually antipodal to each other.

4. Receiver apparatus as set forth in claim 1, wherein said means for demapping said first set of QAM symbols to recover a first succession of QAM symbol map labels in soft-bit format and for demapping said second set of QAM symbols to recover a second succession of QAM symbol map labels in soft-bit format is designed for said first and said second sets of QAM symbols having labeling diversity respective to each other.

5. Receiver apparatus as set forth in claim 1, further comprising:

means for compensating against any differential delay between corresponding QAM symbol map labels in said first and second successions of corresponding QAM symbol map supplied said diversity combiner as said first and said second input signals thereto.

6. Receiver apparatus as set forth in claim 1, wherein said diversity combiner for combining soft bits of corresponding QAM symbol map labels in said first and second successions thereof as received as first and second input signals by said diversity combiner combines soft bits in the QAM symbol map labels of said first and second successions thereof in the order in which they occur in those QAM symbol map labels as received by said diversity combiner.

7. Receiver apparatus as set forth in claim 1, wherein said means for demapping said first set of QAM symbols and for demapping said second set of QAM symbols comprises:

a first demapper connected for demapping said first set of QAM symbols that map FEC-coded data in a respective prescribed manner, thereby to recover said first succession of QAM symbol map labels in soft-bit format which are supplied as said first input signal to said diversity combiner; and a second demapper connected for demapping said second set of QAM symbols that map FEC-coded data in a respective prescribed manner, thereby to recover said second succession of QAM symbol map labels in soft-bit format which are supplied as said second input signal to said diversity combiner.

8. Receiver apparatus as set forth in claim 4, wherein said first and second demappers are configured to demap each successive pair of QAM symbol constellations based on the assumption that that pair of QAM symbol constellations are mapped such that:

(a) the bits more likely to experience error in the labeling of said first set of QAM symbols in accordance with a first mapping pattern correspond to the bits less likely to experience error in the labeling of said second set of QAM symbols in accordance with a second mapping pattern, and (b) the bits more likely to experience error in the labeling of said second set of QAM symbols in accordance with said second mapping pattern correspond to the bits less likely to experience error in the labeling of said first set of QAM symbols in accordance with said first mapping pattern.

9. Receiver apparatus as set forth in claim 8, wherein said first and second demappers are configured to demap Gray-mapped QAM symbol constellations.

10. Receiver apparatus as set forth in claim 8, wherein said first and second demappers are configured to demap QAM symbol constellations that have superposition-coded-modulation (SCM) mapping.

11. Receiver apparatus as set forth in claim 1, wherein said means for selectively receiving a radio-frequency COFDM signal comprises:

a front-end tuner for selectively receiving a radio-frequency COFDM signal as transmitted in analog form and down-converting said radio-frequency COFDM signal to a baseband single-sideband COFDM signal; and means for digitizing successive samples of said baseband single-sideband COFDM signal.

12. Receiver apparatus as set forth in claim 11, comprising:

a computer connected for computing the discrete Fourier transform of said successive samples of said baseband single-sideband COFDM signal, said computer constituting said means for developing first and second sets of QAM symbols;

a frequency-domain channel equalizer for said first and second sets of QAM symbols said computer computes from each of said successive samples of said baseband single-sideband COFDM signal;

a first parallel-to-serial converter connected for receiving in parallel each equalized said first set of QAM symbols and for supplying each equalized said first set of QAM symbols seriatim to said means for demapping said first set of QAM symbols as thus serially arranged, said first parallel-to-serial converter constituting said means for serially arranging said first set of QAM symbols in each COFDM symbol in said first prescribed spectral order; and a second parallel-to-serial converter connected for receiving in parallel each said second set of QAM symbols said computer computes from a respective one of said successive samples of said baseband single-sideband COFDM signal and for supplying each said second set of QAM symbols seriatim to said means for demapping said second set of QAM symbols as thus serially arranged, said second parallel-to-serial converter constituting said means for serially arranging said second set of QAM symbols in each COFDM symbol in said second prescribed spectral order.

13. Receiver apparatus as set forth in claim 11, comprising:
 a computer connected for computing the discrete Fourier transform of said successive samples of said baseband single-sideband COFDM signal, said computer constituting said means for developing first and second sets of QAM symbols;
 a first parallel-to-serial converter connected for receiving in parallel each said first set of QAM symbols said computer computes from a respective one of said successive samples of said baseband single-sideband COFDM signal, said first parallel-to-serial converter further connected for supplying each said first set of QAM symbols seriatim, said first parallel-to-serial converter constituting said means for serially arranging said first set of QAM symbols in each COFDM symbol in said first prescribed spectral order;
 a first frequency-domain channel equalizer for equalizing said first sets of QAM symbols supplied seriatim from said first parallel-to-serial converter to generate equalized first sets of QAM symbols supplied to said means for demapping said first set of QAM symbols;
 a second parallel-to-serial converter connected for receiving in parallel each said second set of QAM symbols said computer computes from a respective one of said successive samples of said baseband single-sideband COFDM signal, said second parallel-to-serial converter further connected for supplying each said second set of QAM symbols seriatim, said second parallel-to-serial converter constituting said means for serially arranging said second set of QAM symbols in each COFDM symbol in said second prescribed spectral order, and
 a second frequency-domain channel equalizer for equalizing said second set of QAM symbols supplied seriatim from said second parallel-to-serial converter to generate equalized second sets of QAM symbols supplied to said means for demapping said second set of QAM symbols.

14. Receiver apparatus as set forth in claim 1, wherein said means for selectively receiving a radio-frequency COFDM signal comprises:
 a front-end tuner for selectively receiving a radio-frequency COFDM signal as transmitted in analog form and down-converting said radio-frequency COFDM signal to an intermediate-frequency COFDM signal; and
 an independent-sideband demodulator for demodulating said intermediate-frequency COFDM signal to recover first and second baseband signals, said first baseband signal resulting from digitized demodulation of the lower-frequency half spectrum of said intermediate-frequency COFDM signal, and said second baseband signal resulting from digitized demodulation of the upper-frequency half spectrum of said intermediate-frequency COFDM signal.

15. Receiver apparatus as set forth in claim 14, wherein said independent-sideband demodulator is configured for (a) for demodulating the lower-frequency half spectrum of said intermediate-frequency COFDM signal in accordance with a first phase-shift method to recover a first baseband signal and (b), and for demodulating the upper-frequency half spectrum of said intermediate-frequency COFDM signal in accordance with a second phase-shift method to recover a second baseband signal.

16. Receiver apparatus as set forth in claim 14, wherein said independent-sideband demodulator is configured for demodulating said intermediate-frequency COFDM signal to recover first and second baseband signals in accordance with a Weaver method.

17. Receiver apparatus as set forth in claim 14, comprising:
 a first computer included in said means for developing first and second sets of QAM symbols, said first computer connected for computing the discrete Fourier transform of successive samples of said first baseband signal to develop said first set of QAM symbols descriptive of the discrete Fourier transform of COFDM carriers from the lower half spectrum of the selectively received COFDM radio-frequency signal;
 a first frequency-domain channel equalizer for each said first set of QAM symbols said first computer computes from a respective one of said successive samples of said first baseband signal;
 a first parallel-to-serial converter connected for receiving in parallel each equalized said first set of QAM symbols and for supplying each equalized said first set of QAM symbols seriatim to said means for demapping said first set of QAM symbols as thus serially arranged, said first parallel-to-serial converter constituting said means for serially arranging said first set of QAM symbols in each COFDM symbol in said first prescribed spectral order;
 a second computer included in said means for developing first and second sets of QAM symbols, said second computer connected for computing the discrete Fourier transform of successive samples of said second baseband signal to develop said second set of QAM symbols descriptive of the discrete Fourier transform of COFDM carriers from the upper half spectrum of the selectively received COFDM radio-frequency signal;
 a second frequency-domain channel equalizer for each said second set of QAM symbols said second computer computes from a respective one of said successive samples of said second baseband signal; and
 a second parallel-to-serial converter connected for receiving in parallel each equalized said second set of QAM symbols and for supplying each equalized said second set of QAM symbols seriatim to said means for demapping said second set of QAM symbols as thus serially arranged, said second parallel-to-serial converter constituting said means for serially arranging said second set of QAM symbols in each COFDM symbol in said second prescribed spectral order.

18. Receiver apparatus as set forth in claim 14, comprising:
 a first computer included in said means for developing first and second sets of QAM symbols, said first computer connected for computing the discrete Fourier transform of successive samples of said first baseband signal to develop said first set of QAM symbols descriptive of the discrete Fourier transform of COFDM carriers from the lower-frequency half spectrum of the selectively received COFDM radio-frequency signal;
 a first parallel-to-serial converter connected for receiving in parallel each said first set of QAM symbols and for supplying each said first set of QAM symbols seriatim, said first parallel-to-serial converter constituting said means for serially arranging said first set of QAM symbols in each COFDM symbol in said first prescribed spectral order;

a first frequency-domain channel equalizer for equalizing said first sets of QAM symbols supplied seriatim from said first parallel-to-serial converter to generate equalized first sets of QAM symbols supplied to said means for demapping said first set of QAM symbols;

a second computer included in said means for developing first and second sets of QAM symbols, said second computer connected for computing the discrete Fourier transform of successive samples of said second baseband signal to develop said second set of QAM symbols descriptive of the discrete Fourier transform of COFDM carriers from the upper-frequency half spectrum of the selectively received COFDM radio-frequency signal;

a second parallel-to-serial converter connected for receiving in parallel each equalized said second set of QAM symbols and for supplying each equalized said second set of QAM symbols seriatim, said second parallel-to-serial converter constituting said means for serially arranging said second set of QAM symbols in each COFDM symbol in said second prescribed spectral order; and a second frequency-domain channel equalizer for equalizing said second set of QAM symbols supplied seriatim from said second parallel-to-serial converter to generate equalized second sets of QAM symbols supplied to said means for demapping said second set of QAM symbols.

19. Receiver apparatus as set forth in claim 14, wherein said independent-sideband demodulator includes:

apparatus for performing an in-phase synchrodyne and a quadrature synchrodyne of said intermediate-frequency COFDM signal to recover first and second baseband signals respectively; and means for digitizing said each of said first and said second baseband signals.

20. Receiver apparatus as set forth in claim 19, wherein said means for developing first and second sets of QAM symbols comprises:

a first computer connected for computing the discrete Fourier transform of successive samples of said first baseband signal;

a second computer connected for computing the discrete Fourier transform of successive samples of said second baseband signal;

a parallel array of digital adders for generating a first set of QAM symbols responsive to respective sums of (a) the complex coordinates of respective components of the discrete Fourier transform of successive samples of said first baseband signal supplied through respective Hilbert transform connections to respective first addend connections of said digital adders and (b) the complex coordinates of respective components of the discrete Fourier transform of successive samples of said second baseband signal supplied through respective connections to respective second addend connections of said digital adders; and a parallel array of digital subtractors for generating a second set of QAM symbols responsive to respective differences between (a) the complex coordinates of respective components of the discrete Fourier transform of successive samples of said first baseband signal supplied through respective Hilbert transform connections to respective subtrahend connections of said digital adders and (b) the complex coordinates of respective components of the discrete Fourier transform of successive samples of said second baseband signal supplied through respective connections to respective minuend connections of said digital subtractors.

21. Receiver apparatus as set forth in claim 20, further comprising:

a first frequency-domain channel equalizer for each said first set of QAM symbols from sum output connections of said parallel array of digital adders;

a second frequency-domain channel equalizer for each said second set of QAM symbols from difference output connections of said parallel array of digital subtractors;

a first parallel-to-serial converter connected for receiving in parallel each equalized said first set of QAM symbols and for supplying each equalized said first set of QAM symbols seriatim to said means for demapping said first set of QAM symbols as thus serially arranged, said first parallel-to-serial converter constituting said means for serially arranging said first set of QAM symbols in each COFDM symbol in said first prescribed spectral order; and a second parallel-to-serial converter connected for receiving in parallel each equalized said second set of QAM symbols and for supplying each equalized said second set of QAM symbols seriatim to said means for demapping said second set of QAM symbols as thus serially arranged, said second parallel-to-serial converter constituting said means for serially arranging said second set of QAM symbols in each COFDM symbol in said second prescribed spectral order.

22. Receiver apparatus as set forth in claim 4, wherein said means for serially arranging said first set of QAM symbols in each COFDM symbol in a first prescribed spectral order and said means for serially arranging said second set of QAM symbols in each COFDM symbol in a second prescribed spectral order accommodate the spectral orders of the first and second set of QAM symbols being similar to each other in said selectively received radio-frequency COFDM signal, which provides uniform frequency diversity between QAM symbols in said first and said second sets of QAM symbols that convey similar FEC-coded data.

* * * * *